(12) United States Patent
Messner

(10) Patent No.: US 10,143,147 B2
(45) Date of Patent: Dec. 4, 2018

(54) FLUID DISTRIBUTION SYSTEM FOR SELECTIVELY DISTRIBUTING FLUID FROM MULTIPLE LOCATIONS AND CONDUIT ARRANGEMENT FOR DISTRIBUTING FLUID FROM MULTIPLE LOCATIONS

(71) Applicant: KM Electronic Developments Pty Ltd, Blackburn, VIC (AU)

(72) Inventor: Kenneth Wayne Messner, Balwyn North VIC (AU)

(73) Assignee: KM ELECTRONIC DEVELOPMENTS PTY LTD, Blackburn, VIC (AU)

( * ) Notice: Subject to any disclaimer, the term of this patent is extended or adjusted under 35 U.S.C. 154(b) by 48 days.

(21) Appl. No.: 15/110,975

(22) PCT Filed: Jan. 20, 2015

(86) PCT No.: PCT/AU2015/000028
§ 371 (c)(1),
(2) Date: Jul. 12, 2016

(87) PCT Pub. No.: WO2015/106315
PCT Pub. Date: Jul. 23, 2015

(65) Prior Publication Data
US 2016/0338274 A1 Nov. 24, 2016

(30) Foreign Application Priority Data
Jan. 20, 2014 (AU) ................. 2014900171

(51) Int. Cl.
*B05B 17/04* (2006.01)
*A01G 25/16* (2006.01)
(Continued)

(52) U.S. Cl.
CPC .......... *A01G 25/16* (2013.01); *A01G 25/023* (2013.01); *B05B 1/044* (2013.01); *B05B 1/046* (2013.01);
(Continued)

(58) Field of Classification Search
CPC ........ A01G 25/16; A01G 25/023; B05B 1/34; B05B 1/3006; B05B 15/069; B05B 1/20; B05B 1/046; B05B 1/044
(Continued)

(56) References Cited

U.S. PATENT DOCUMENTS

| 4,385,727 A | 5/1983 | Spencer |
| 4,726,520 A | 2/1988 | Brown et al. |

(Continued)

FOREIGN PATENT DOCUMENTS

EP 1958517 B1 8/2013

OTHER PUBLICATIONS

International Search Report dated Mar. 11, 2015 in corresponding Application No. PCT/AU2015/000028; 5 pgs.
International Preliminary Report on Patentability dated Jul. 26, 2016, in connection with corresponding International Application No. PCT/AU2015/000028 (7 pgs.).

*Primary Examiner* — Steven J Ganey
(74) *Attorney, Agent, or Firm* — Maier & Maier, PLLC

(57) ABSTRACT

Fluid distribution system including conduit with openings, membrane for covering of openings, deflector for manipulating membrane, activator which is movable in the conduit with propulsion and control, the activator for communicating via deflector to manipulate membrane and uncover openings for fluid to be emitted from the conduit in relative vicinity.

30 Claims, 55 Drawing Sheets

Figure 1:
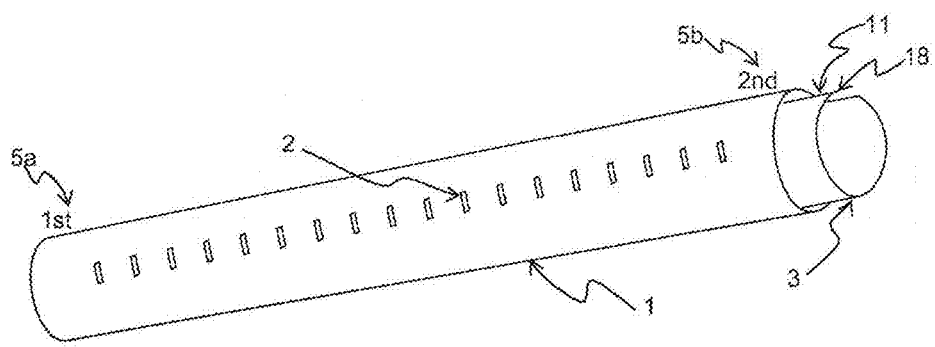
Figure 2:
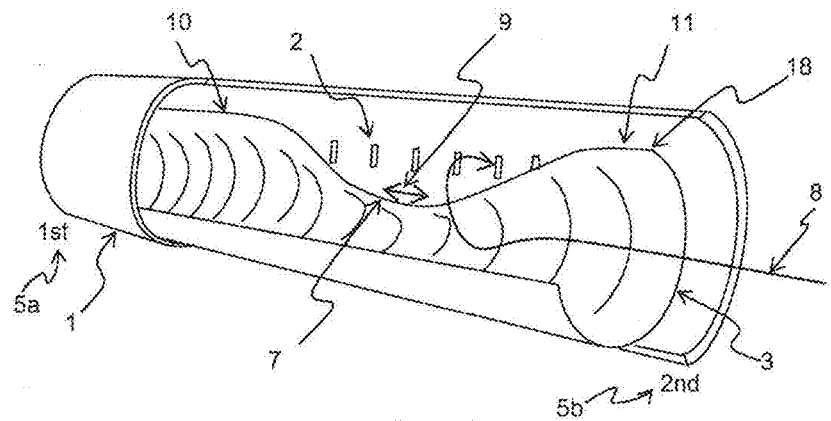

(51) Int. Cl.
    *B05B 1/04*     (2006.01)
    *B05B 1/30*     (2006.01)
    *B05B 1/20*     (2006.01)
    *B05B 1/34*     (2006.01)
    *A01G 25/02*     (2006.01)

(52) U.S. Cl.
    CPC .............. *B05B 1/20* (2013.01); *B05B 1/3006* (2013.01); *B05B 1/34* (2013.01)

(58) Field of Classification Search
    USPC ....... 239/11, 533.1, 542, 547, 562, 566–568, 239/570
    See application file for complete search history.

(56) References Cited

U.S. PATENT DOCUMENTS

| | | | | |
|---|---|---|---|---|
| 4,971,253 | A * | 11/1990 | Lazarus | A01G 25/023 239/542 |
| 5,375,770 | A * | 12/1994 | Roberts | A01G 25/02 239/533.1 |
| 5,404,605 | A | 4/1995 | Samilo | |
| 6,371,390 | B1 * | 4/2002 | Cohen | A01G 25/02 239/542 |
| 8,220,727 | B2 * | 7/2012 | Lee | A01G 25/02 239/547 |
| 8,511,585 | B2 * | 8/2013 | Keren | A01G 25/023 239/533.1 |

\* cited by examiner

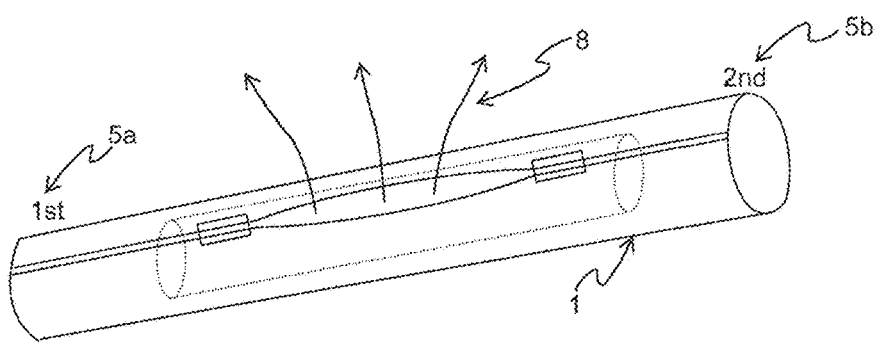
Figure 60 – PRIOR ART
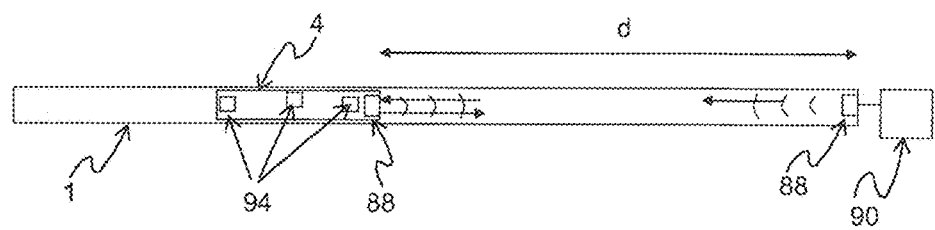
Figure 61
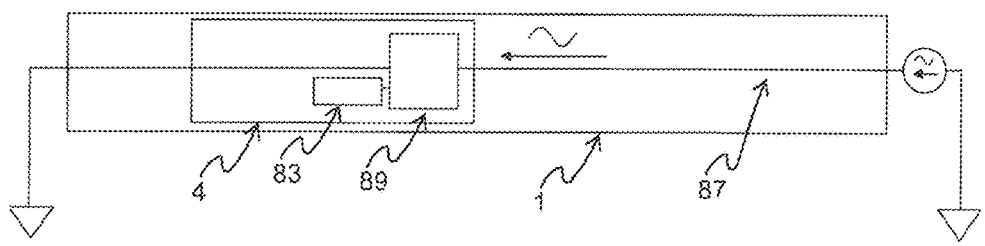
Figure 62

FLUID DISTRIBUTION SYSTEM FOR SELECTIVELY DISTRIBUTING FLUID FROM MULTIPLE LOCATIONS AND CONDUIT ARRANGEMENT FOR DISTRIBUTING FLUID FROM MULTIPLE LOCATIONS

FIELD OF THE INVENTION

The present invention relates to a fluid distribution system for selectively distributing fluid from multiple locations and a conduit arrangement for distributing fluid from multiple locations.

The invention has been developed primarily for use in irrigation and will be described hereinafter with reference to this application. However, it will be appreciated that the invention is not limited to this particular field of use but is applicable to applications ranging from irrigation, washing, flushing, spraying, drying, and any application requiring a distributed dispersion of fluid from a conduit at selective locations along its length.

BACKGROUND OF THE INVENTION

Fluid dispersion from a conduit is often achieved by the use of multiple outlets disposed along its length.

One example is irrigation drip line which has multiple individual outlets distributed evenly along its length, which emit fluid simultaneously when fluid pressure is applied to the line. In high quality drip line, each emitter is individually, precisely regulated to provide equal flow rates from each outlet. In another example, separately actuated valves are often disposed along a conduit, to individually release fluid at their location, such as in an agricultural flood irrigation system. Another example is a pressurized sprinkler system for golf course turf, where individually controlled valves are deployed at each sprinkler outlet point.

There are shortcomings in each example, where a system such as irrigation drip-line or multiple simultaneously operating outlets requires considerable pressure and energy to operate. Conversely, the method of numerous individually controllable outlets while able to achieve more precise and tailored dispersion control, requires expensive valve components and sophisticated control systems, and so is expensive to install and maintain.

Many irrigation systems rely on elaborate apparatus or machinery to move conduit and relocate exit points to provide effective distribution of irrigation fluids. In one example, a moving orifice connection utilizes the "zipper" principle to zip open the conduit ahead of the moving takeoff point and to zip it closed again as it moves past. This is shown in FIG. 60 where such a large uncontrolled opening occurs that weakens the structural integrity and on any localised failure will flood and destroy the localised area.

The technical problem with prior art systems is that the choice of system for fluid delivery and dispersion typically involves trade-offs between fluid use efficiency, system cost, complexity, operational performance, installation, maintenance and running costs. For example, a high pressure, high volume washing system is able to deliver an emission plume to cover a large expanse and reach, and therefore requires fewer outlets compared with a lower pressure system but at the expense of increased energy and running costs. A lower power fluid delivery system typically requires outlets which can be separately operated one at a time, and/or with the ability to be moved, requiring numerous expensive valves and complex control systems, and in the extreme, sophisticated apparatus to move emitter nozzles to the point of application, then with the system being subject to higher wear and maintenance costs.

It is an object of the invention to overcome or at least ameliorate one or more problems of the prior art or to provide a viable alternative.

It is to be understood that, if any prior art information is referred to herein, such reference does not constitute an admission that the information forms part of the common general knowledge in the art, in Australia or any other country.

SUMMARY OF THE INVENTION

The invention seeks to provide improvements in control and efficiency of dispensing and dispersion of fluid (liquids and/or gases) from a length of conduit, as applicable to applications ranging from irrigation, washing, flushing, spraying, drying, and any application requiring a distributed dispersion of fluid from a conduit at selective locations along its length.

According to a first aspect of the present invention, there is provided a fluid distribution system for selectively distributing fluid from multiple locations, the system including a conduit arrangement comprising an enclosed elongated conduit having an internal perimeter for carrying fluid, and a plurality of openings along the length of the conduit side wall of the conduit for allowing escape of the fluid. The at least one membrane element is urged or biased at least discontinuously to the conduit internal perimeter around at least one of said plurality of openings thereby having two longitudinal edges in the longitudinal sense of the conduit and devoid of permanent attachment means to the conduit along a longitudinal length spanning in the longitudinal direction of the conduit at least one opening in the side wall of said conduit The system further has a deflector which manipulates the at least one longitudinal side of the membrane to move away from the internal perimeter of the conduit wall to uncover a pathway for fluid to escape from the at least one of said openings in the conduit side wall wherein the membrane prevents escape of fluid until manipulated to uncover a pathway from which fluid could escape the conduit from the at least one of said openings in the conduit side wall.

In particular forms of the invention there is provided a fluid distribution system for selectively distributing fluid from multiple locations, the system including: a conduit arrangement comprising:

a. an enclosed elongated conduit having a conduit side wall with an internal perimeter for carrying fluid along the conduit side wall;

b. a plurality of openings along the length of the conduit side wall of the conduit for allowing escape of the fluid; and c. at least one closure means for selectively opening and/or closing a plurality of groups of one or more of the plurality of openings along the length of the conduit side wall of the conduit for allowing selective escape of the fluid;

wherein the at least one closure means prevents escape of fluid until manipulated between a closed and an open relative position to uncover a pathway from which fluid could escape the conduit from the at least one of said openings in the conduit side wall.

In one form the fluid distribution system further includes a membrane which forms the closure means over individual openings or group of related openings and a deflector of the membrane which has an effect to physically alter openings between an open and closed arrangement.

The fluid distribution system can further include an activator for activation of closure means where the activator initiates or activates the closure means to undertake selective opening or closing of respective ones of the closure means to uncover a pathway for fluid to escape from the conduit through one or more of the plurality of groups of one or more of the plurality of openings along the length of the conduit side wall.

Preferably the fluid distribution system further includes control of units of fluid distribution system for selectively distributing fluid from particular locations.

Preferably there is further included control over fluid distribution system for selectively distributing fluid from multiple locations to provide a sweep action from single outlet or group of outlets or over multiple of the single outlets or multiple of the groups of outlets.

Figure 5:
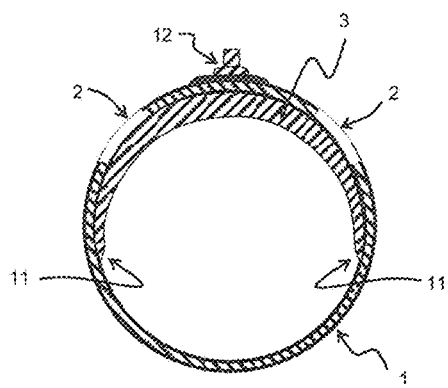

It can be seen that the invention can provide a simple robust system capable of providing a concentrated plume of fluid emission from a variable and movable location along a conduit, and to utilize the dynamics of a moveable plume to deliver the fluid close to the point of application, the operating characteristics being scalable and adjustable to provide the flexibility to optimize the system performance, fluid use efficiency, and energy consumption.

The invention in one form can provide a system which is capable of producing emission from essentially any location or region along a length of conduit, controlled by movable apparatus residing internal to the conduit. The apparatus internal to the conduit is able to travel the length of the conduit internally, uncovering one or more openings and allowing emission of conduit fluid in its vicinity.

The invention in one form can vary the length, size, shape, direction, velocity, modulating characteristics, and longitudinal speed of an emission plume under the control of apparatus internal to the conduit.

The invention in one form can provide various means of propulsion and control of the apparatus performing the function of regulating the emission from the conduit in its vicinity.

Other aspects of the invention are also disclosed.

It can be seen that the invention provides an improved system for fluid delivery and dispersion which typically involves trade-offs between fluid use efficiency, system cost, complexity, operational performance, installation, maintenance and running costs. For example, a high pressure, high volume washing system is able to deliver an emission plume to cover a large expanse and reach, and therefore requires fewer outlets compared with a lower pressure system but at the expense of increased energy and running costs. A lower power fluid delivery system typically requires outlets which can be separately operated one at a time, and/or with the ability to be moved, requiring numerous expensive valves and complex control systems, and in the extreme, sophisticated apparatus to move emitter nozzles to the point of application, then with the system being subject to higher wear and maintenance costs.

The invention in one form can provide a simple robust system capable of providing a concentrated plume of fluid emission from a variable and movable location along a conduit, and to utilize the dynamics of a moveable plume to deliver the fluid close to the point of application, the operating characteristics being scalable and adjustable to provide the flexibility to optimize the system performance, fluid use efficiency, and energy consumption.

The invention can assist providing a system which is capable of producing emission from essentially any location or region along a length of conduit, controlled by movable apparatus residing internal to the conduit. The apparatus internal to the conduit is able to travel the length of the conduit internally, uncovering one or more openings and allowing emission of conduit fluid in its vicinity.

Also the invention can have various forms so as to vary the length, size, shape, direction, velocity, modulating characteristics, and longitudinal speed of an emission plume under the control of apparatus internal to the conduit.

These variations can be provided by various means of propulsion and control of the apparatus performing the function of regulating the emission from the conduit in its vicinity.

Overall the advantageous effects of invention can include the system effectively provides a controlled moving fluid delivery point from along a substantially enclosed and robust conduit, which can be flexibly routed for large scale application, delivering volume flow at desired regions/locations. In its simplest form, the system can provide a basic moving plume along a conduit without operator intervention. With the addition of intelligent robotic control, the system can provide a variable, adjustable, directional, and modulating emission plume, with all of the apparatus residing in and being protected within the confines of the conduit.

In concentrating the fluid delivery close to the point of application, the system can to operate at lower pressure and so requires less energy to operate than a system consisting of numerous simultaneously operating fixed emitters. Also, the system has reduced complexity and cost of installation as compared with equivalent multi-valve systems.

Since outlet openings are larger than in an equivalent system where there are multiple emitters, the system has a lower susceptibility to blockage from fluid particulates.

With the inherent ability to produce a travelling plume, the invention lends itself to applications where a longitudinal wave action or repetitive wave action can assist in moving and displacing solids, fluids and/or gases along a substantial distance, such as in applications involving flushing, drying, aeration, stirring and propulsion of sludge

BRIEF DESCRIPTION OF THE DRAWINGS

Notwithstanding any other forms which may fall within the scope of the present invention, preferred embodiments of the invention will now be described, by way of example only, with reference to the accompanying drawings in which:

FIG. 1—Oblique view of conduit with water emitting openings as slits, and end showing resilient membrane FIG. 2—Oblique view of conduit cut away section, showing membrane peeling back and stretching along a longitudinal edge to allow fluid to exit FIG. 3—Oblique view of conduit with multiple membrane sections to localize the fluid pressure impact on the membrane—Conduit is shown cut away and shortened to uncover the end most section of membrane FIG. 4—Cross sectional view of pipe with membrane and emitter holes on both sides of attachment line—Type 1—Left diagram shows membrane covering emitter openings; Middle diagram shows membrane peeled away from openings and fluid emitting via the openings; Right hand diagram, shows presence of PIG apparatus for manipulating the membrane.

FIG. 5—Cross sectional view of pipe with half-moon shaped Membrane and fastening studs integral to the membrane.

Figure 6:
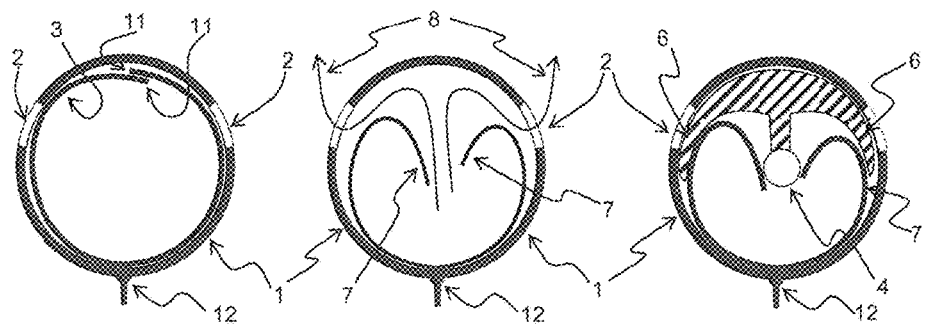

FIG. 6—Cross sectional view of pipe with membrane overlapping itself—Type 2—Left diagram shows membrane covering emitter openings; Middle diagram shows membrane peeled away from openings and fluid emitting via the openings; Right hand diagram, shows presence of PIG apparatus for manipulating the membrane.

Figure 7:
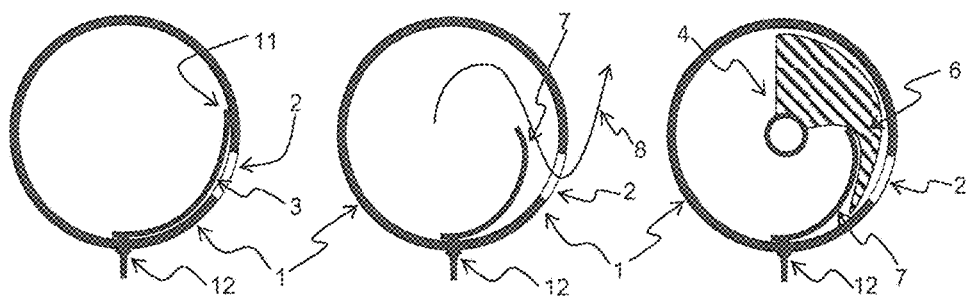

FIG. 7—Cross sectional view of pipe with single sided membrane—Type 3—Left diagram shows membrane covering emitter openings; Middle diagram shows membrane peeled away from openings and fluid emitting via the openings; Right hand diagram, shows presence of PIG apparatus for manipulating the membrane.

Figure 8:
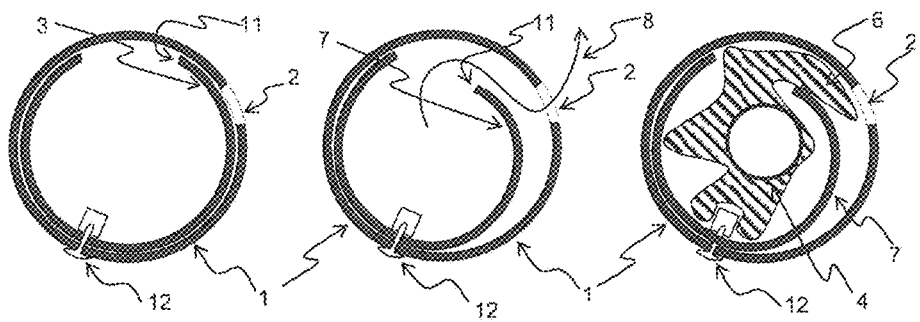

FIG. 8—Cross sectional view of pipe with membrane made of stiff pipe material—Left diagram shows membrane covering emitter openings; Middle diagram shows membrane peeled away from openings and fluid emitting via the openings; Right hand diagram, shows presence of PIG apparatus for manipulating the membrane.

Figure 9:
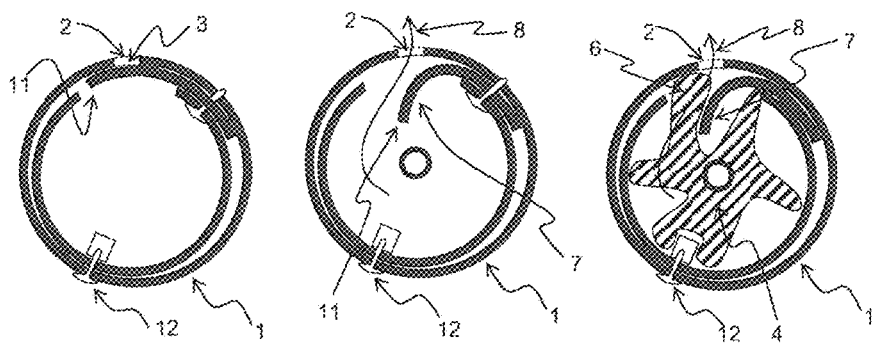

FIG. 9—Cross sectional view of pipe topology for hand fabrication with PVC pipe and rubber membrane—Left diagram shows membrane covering emitter openings; Middle diagram shows membrane peeled away from openings and fluid emitting via the openings; Right hand diagram, shows presence of PIG apparatus for manipulating the membrane.

Figure 10:
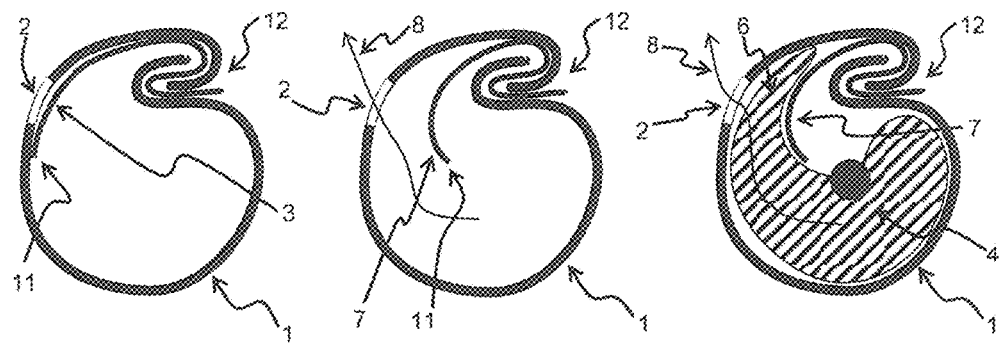

FIG. 10—Cross sectional view of conduit manufactured with an interlocking seam which also serves to fasten the membrane—Type 3—Left diagram shows membrane covering emitter openings; Middle diagram shows membrane peeled away from openings and fluid emitting via the openings; Right hand diagram, shows presence of PIG apparatus for manipulating the membrane.

Figure 11:
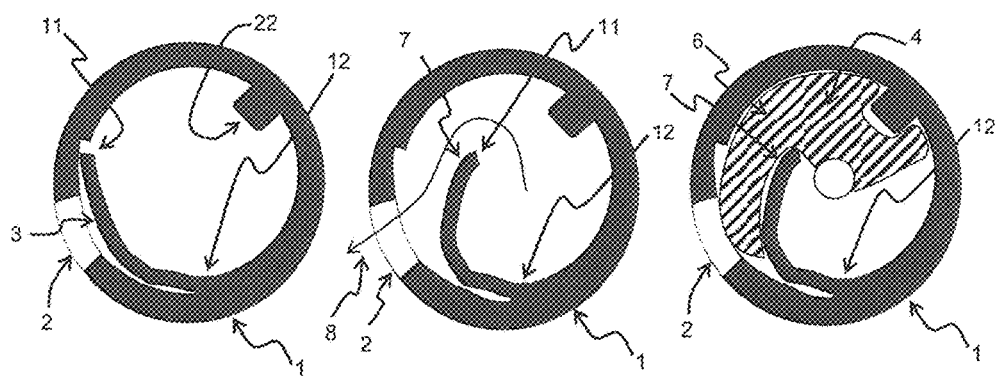

FIG. 11—Cross sectional view of pipe with integral membrane—Type 3—Left diagram shows membrane covering emitter outlets; Middle diagram shows membrane peeled away from openings and fluid emitting via the openings; Right hand diagram, shows presence of PIG apparatus for manipulating the membrane.

Figure 12:
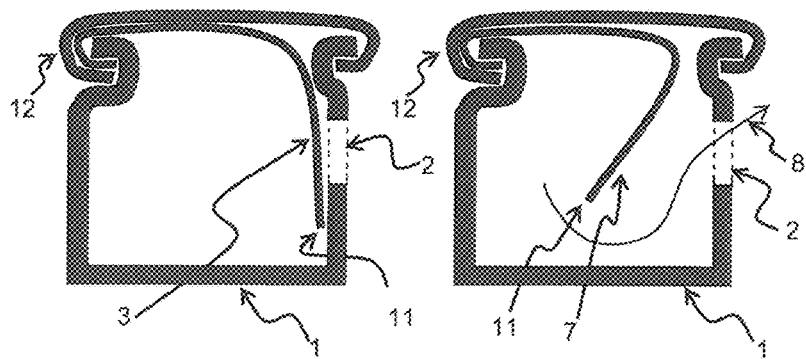

FIG. 12—Cross sectional view of conduit as a rectangular cross section with snap on lid—Left diagram shows membrane covering emitter openings; Right hand diagram shows membrane peeled away from openings and fluid emitting via the openings.

Figure 13:
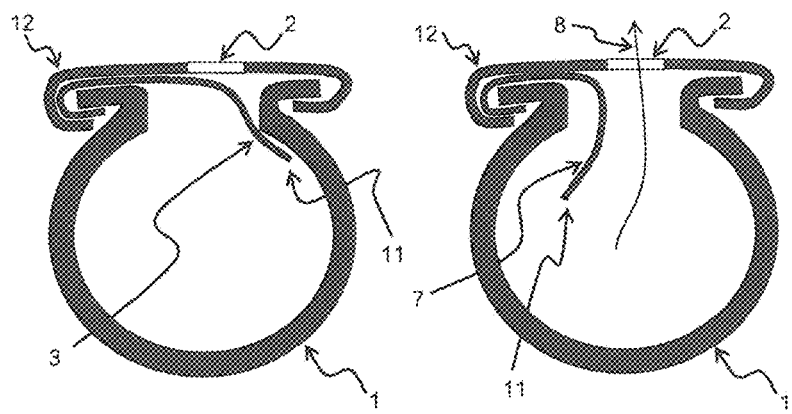

FIG. 13—Cross sectional view of circular conduit section with snap on lid, where the openings are in the lid—Left diagram shows membrane covering emitter openings; Right hand diagram shows membrane peeled away from openings and fluid emitting via the openings.

Figure 14:
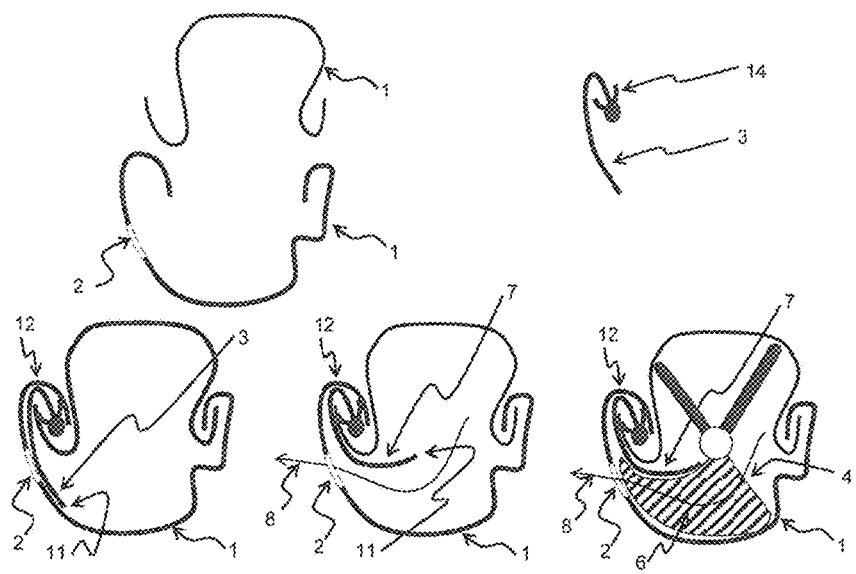

FIG. 14—Cross sectional view of Two-part pipe with membrane doubling as a seal in the pipe seam—Type 3—Top diagram showing separate conduit components; lower Left diagram shows membrane covering emitter openings; Lower middle diagram shows membrane peeled away from openings and fluid emitting via the openings; Lower right hand diagram, shows presence of PIG apparatus for manipulating the membrane.

Figure 15:
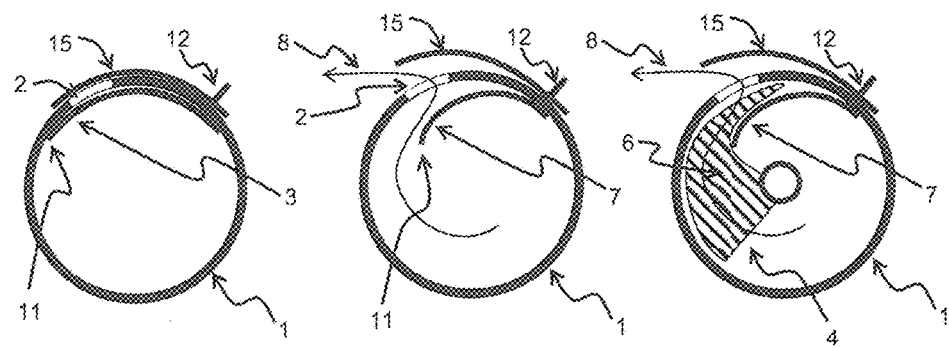

FIG. 15—Cross sectional view of conduit with optional external flap for backflow prevention, the outer flap being lifted by flow of fluid out of the conduit—Left diagram shows membrane covering emitter openings; Middle diagram shows membrane peeled away from openings and fluid emitting via the openings; Right hand diagram, shows presence of PIG apparatus for manipulating the membrane.

Figure 16:
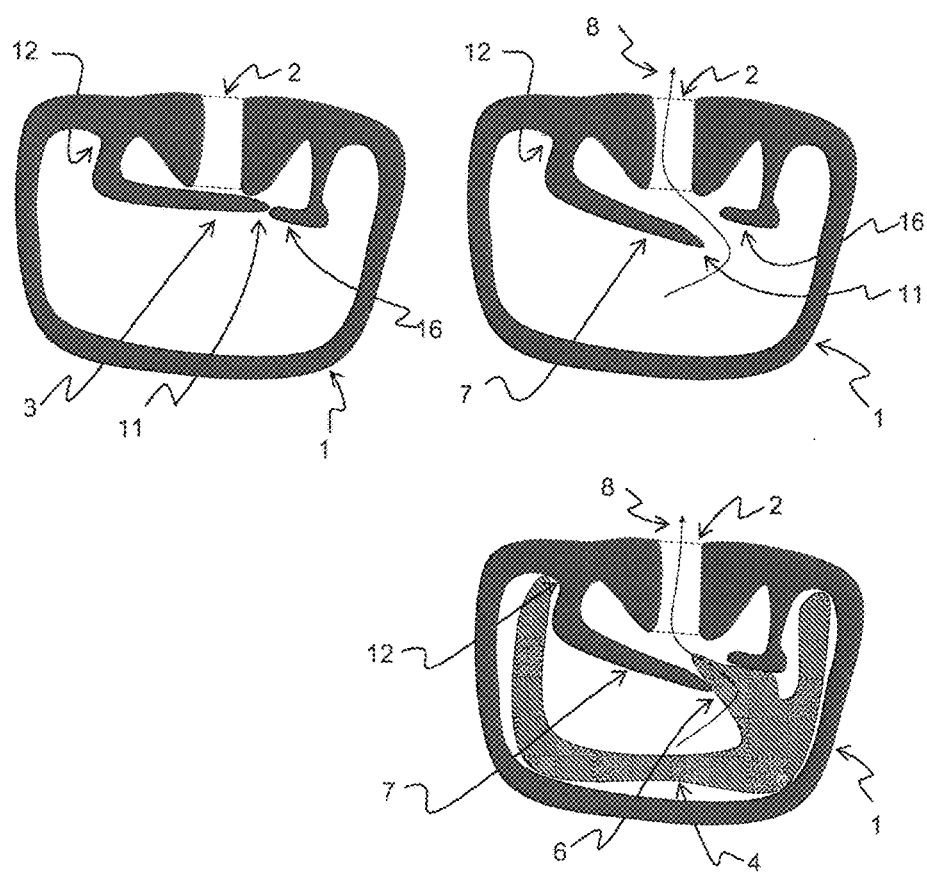

FIG. 16—Cross sectional view of conduit with membrane integral to conduit manufactured as a single part extrusion, and membrane non-permanently restrained along un-bonded longitudinal edge—Upper left diagram showing membrane covering emitter openings and latched closed by additional overhang member; Upper right diagram shows membrane peeled away from openings and fluid emitting via the openings; Lower right hand diagram, shows presence of PIG apparatus for manipulating the membrane.

Figure 17:
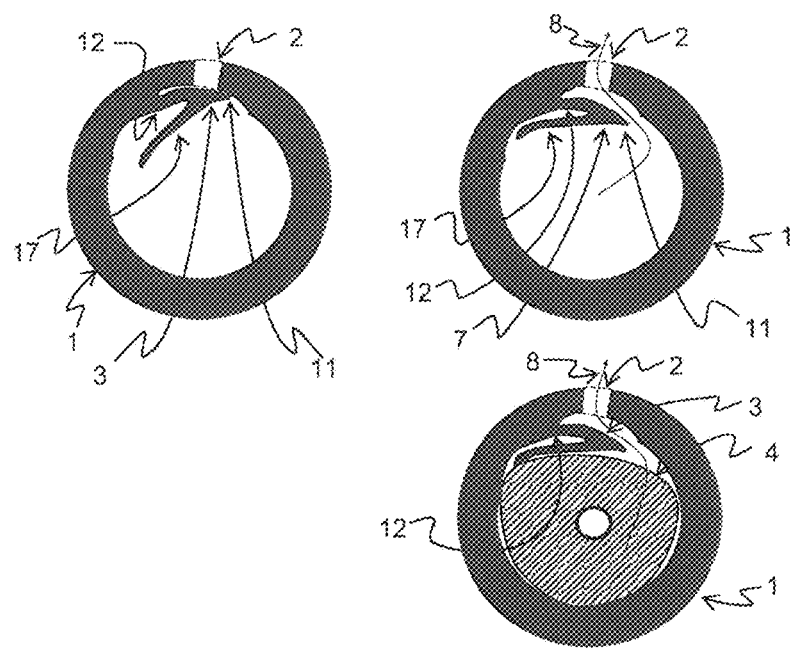

FIG. 17—Cross sectional view of conduit with integral membrane manufactured as a single part extrusion, and membrane formed with Integral Lever section acting from the tip of the unrestrained long edge of membrane—Upper left diagram showing membrane covering emitter openings; Upper right diagram shows membrane peeled away from openings and fluid emitting via the openings; Lower right hand diagram, shows presence of PIG apparatus for manipulating the membrane, applying force to the membrane lever to uncover openings in its vicinity.

Figure 18:
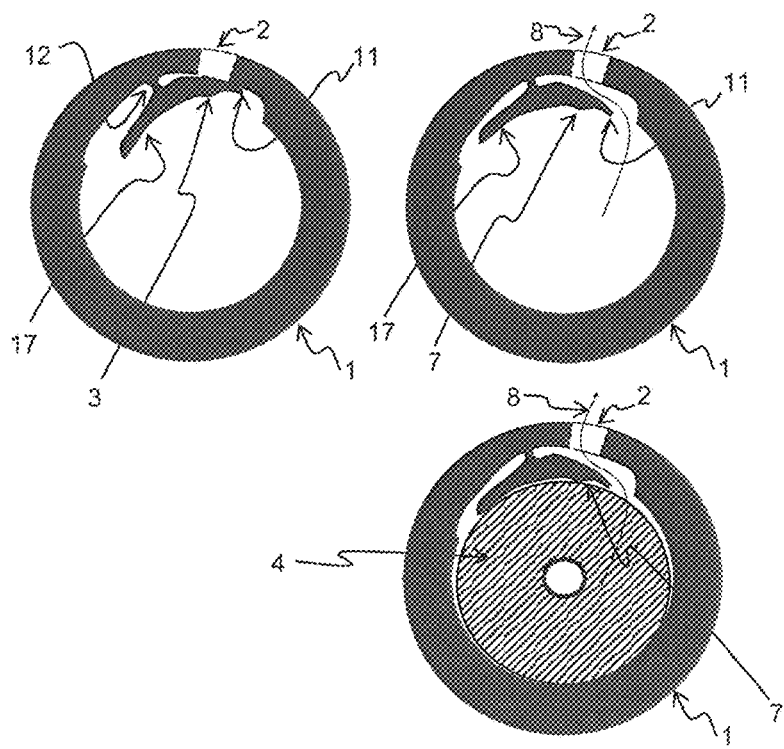

FIG. 18—Cross sectional view of conduit with hinged membrane and Integral Lever acting from opposite side of membrane hinge line—Upper left diagram showing membrane covering emitter openings; Upper right diagram shows membrane peeled away from openings and fluid emitting via the openings; Lower right hand diagram, shows presence of PIG apparatus for manipulating the membrane, applying force to the membrane lever on opposite side of the attachment point acting as a hinge/fulcrum to uncover openings in its vicinity.

Figure 19:
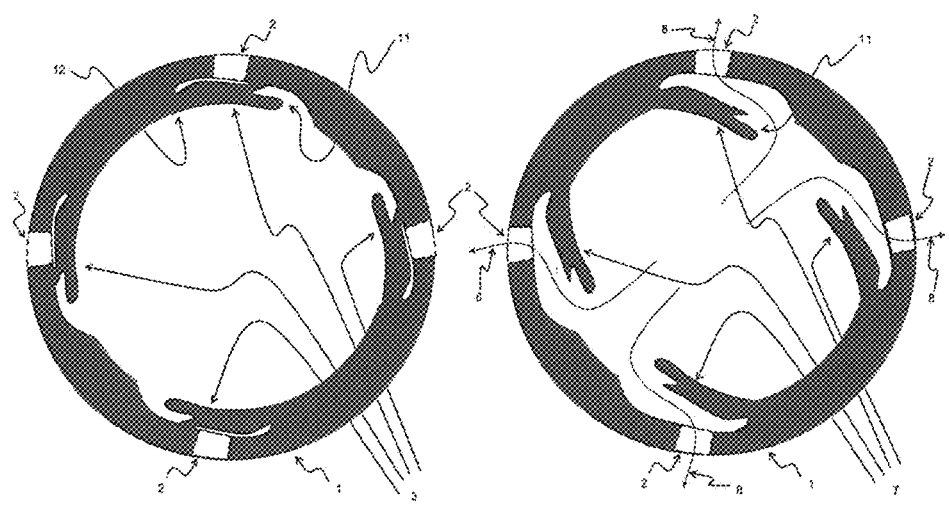

FIG. 19—Cross sectional view of conduit with multiple integral membranes, for 360 degree plume, balanced peeling force, in confines of standard pipe cross section—Manufacture by die cutting into a standard pipe—Left diagram showing x4 membranes covering emitter openings; Right hand diagram showing x4 membranes peeled away from openings and fluid emitting via the openings.

Figure 20:
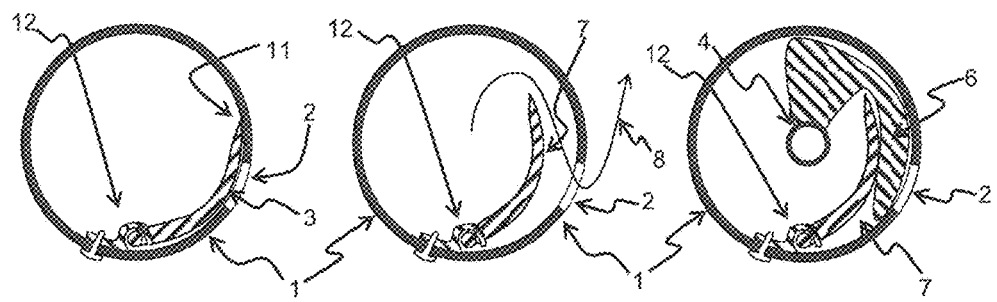

FIG. 20—Cross sectional view of conduit with membrane attached by axially rotating hinge—Left diagram showing membrane covering emitter openings; Center diagram showing membrane peeled away from openings and fluid emitting via the openings; Right hand diagram showing presence of membrane manipulating apparatus.

Figure 21:
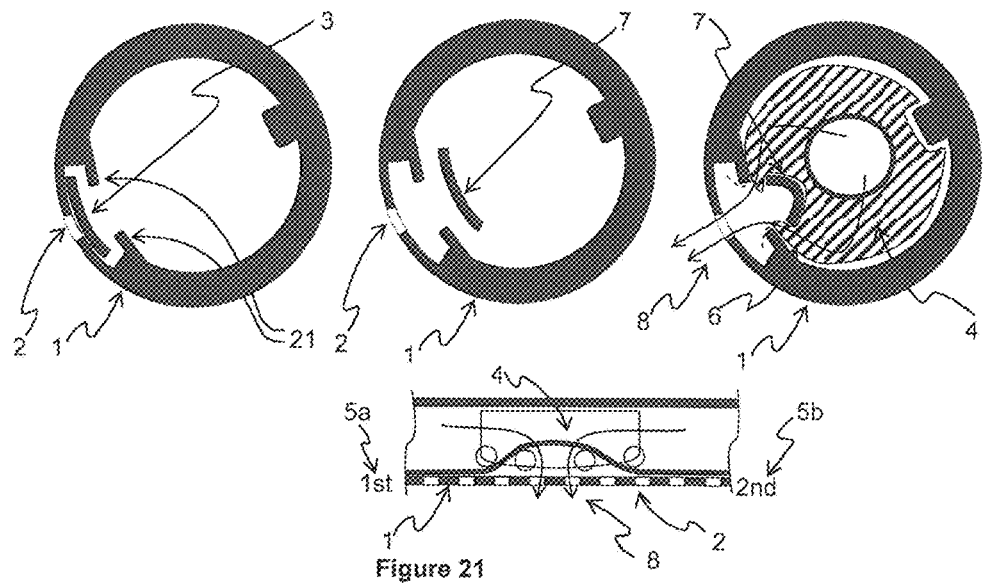

FIG. 21—Cross sectional view of conduit with membrane retained in captive area integral to conduit—Left diagram showing membrane covering emitter openings; Center diagram showing membrane peeled away from openings and fluid emitting via the openings; Right hand diagram showing presence of membrane manipulating apparatus; Lower diagram showing cutaway side view in reduced scale.

Figure 22:
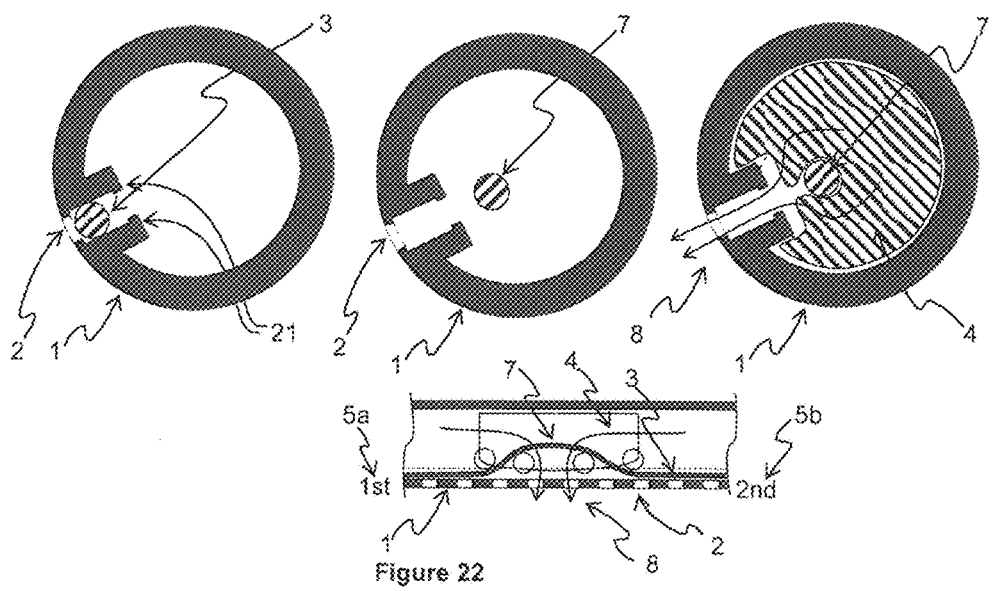

FIG. 22—Cross sectional view of conduit with integral captive area to retain membrane of circular cross section—Left diagram showing membrane covering emitter openings; Center diagram showing membrane peeled out of captive area; Right hand diagram showing presence of membrane manipulating apparatus; Lower diagram showing cutaway side view in reduced scale. (A variation on FIG. 21).

Figure 23:
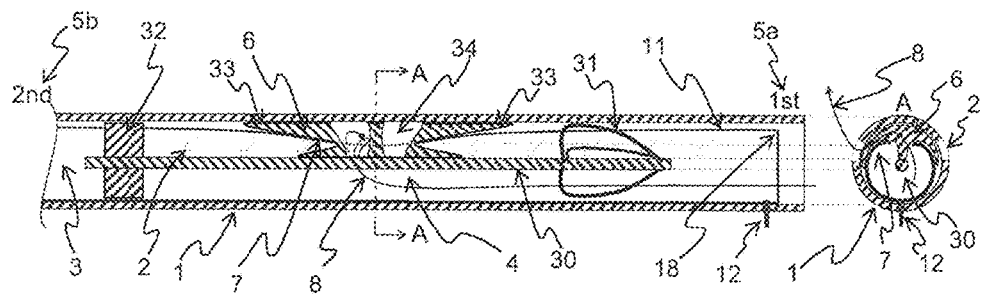

FIG. 23—Illustration of PIG with single broad finger wrapping from both sides for prizing membrane—Left, a cut-away side view of PIG in pipe; Right, cross sectional view taken at "A-A"—For use with conduit design of Type 1 as per FIG. 4, FIG. 5, and Type 2 as per FIG. 6. (Note: Fluid pathways through protrusion are not visible in sectioned views).

Figure 24:
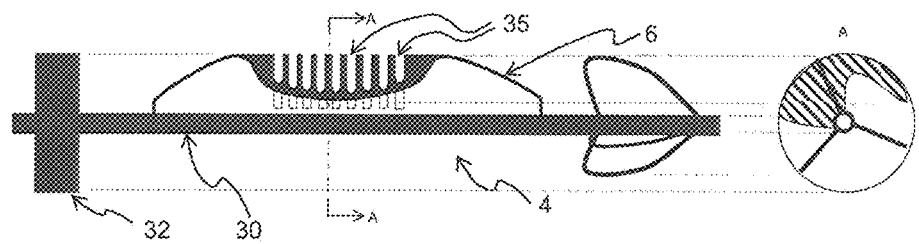

FIG. 24—PIG design side view (left), and cross section taken along "A-A" (right)—Single broad finger for prizing membrane on one side only, and with slits to allow fluid path to conduit emitter openings—For use with conduit design Type 3 as per FIG. 7.

Figure 25:
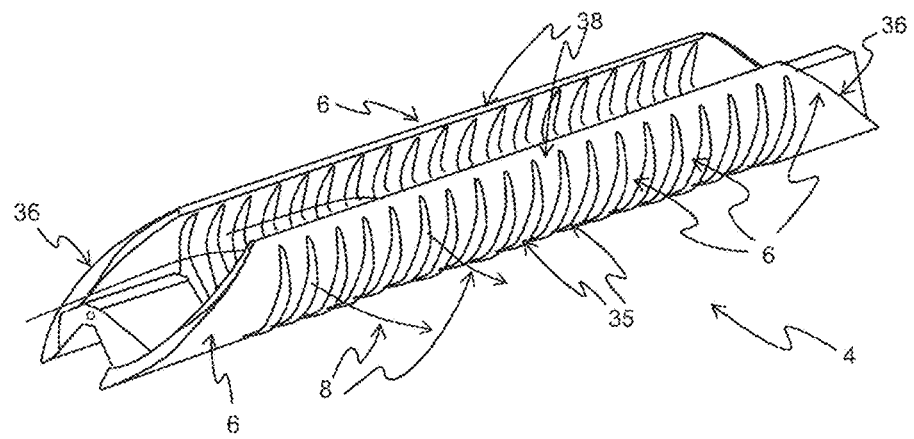

FIG. 25—Oblique view of PIG molded as one piece—Slits in body, attachment points at ends for connecting cable/chain—PIG design where slits in the body allow fluid to flow under the membrane to the conduit openings. For use with conduit design of Type 1 as per FIG. 4, and Type 2 as per FIG. 6, where the membrane peels inward from the conduit from both sides of an attachment line.

Figure 26:
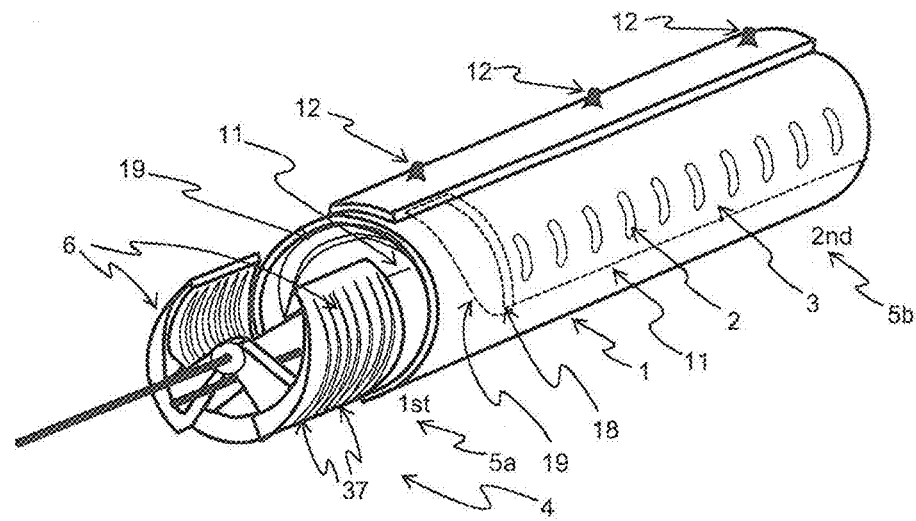

FIG. 26—Oblique view of PIG as per FIG. 25, with propulsion cables connected, set up for entry to conduit section also shown.

Figure 27:
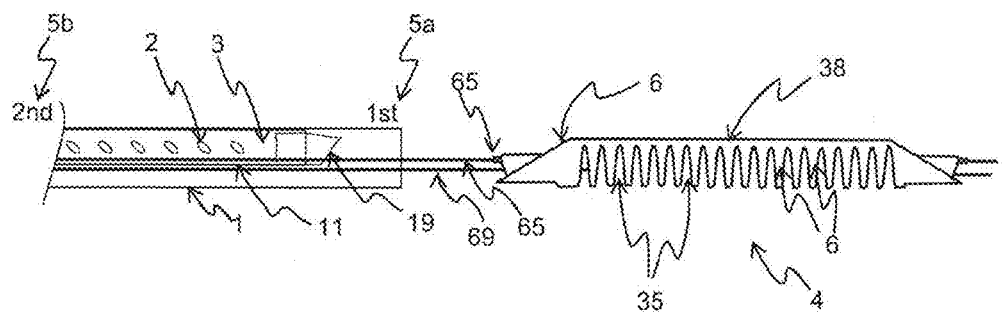

FIG. 27—Side view of PIG and conduit as per FIG. 25, FIG. 26—Showing PIG outside pipe, and attached to cable ready for assembly into the conduit—Side view of PIG shows the cutout slits in the body resulting in a narrow ridge along the tip, giving the body flexibility to bend through sections of curved conduit.

Figure 28:
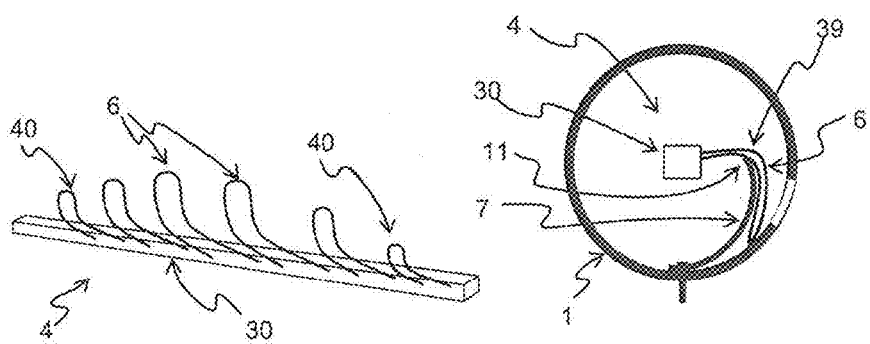

FIG. 28—PIG design where membrane manipulation is performed by a plurality of wire loop fingers—The Left hand diagram is an oblique view of the PIG showing a simple rectangular backbone and a plurality of membrane manipulating wire loop fingers protruding therefrom; the Right hand diagram shows the cross section of the PIG in the conduit, with the fingers engaged to separate the membrane from the conduit in the vicinity of the openings.

Figure 29:
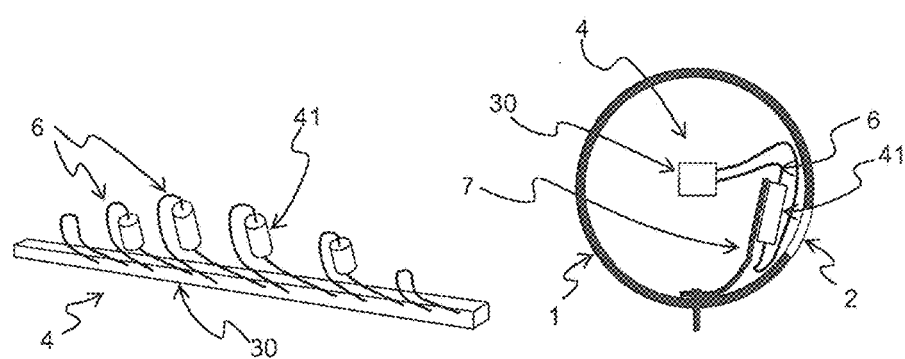

FIG. 29—PIG design enhancement of FIG. 28 in which rollers are used to reduce friction and resistance to longitudinal movement—The Left hand diagram is an oblique view of the PIG showing a simple rectangular backbone and a plurality of wire loop fingers protruding therefrom, with significant finger loops having rollers; the Right hand diagram shows the cross section of the PIG in the conduit, with the fingers engaged to separate the membrane from the conduit in the vicinity of the openings with the aid of the rollers.

Figure 30:
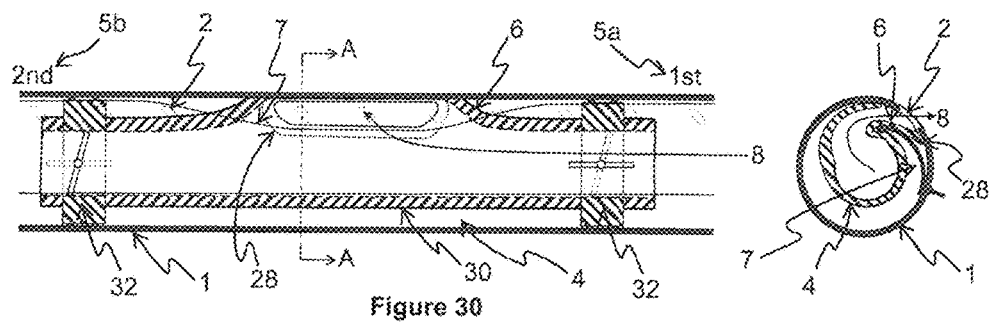

FIG. 30—PIG topology with piston at both ends and fluid feed path direct to conduit openings—The conduit region between the pistons being relieved of pressure from the supply at the 1st and/or 2nd ends, allows the membrane to be peeled back more easily—The Left hand diagram is a side view of the PIG in the conduit, with the fluid path from either end direct to the conduit wall, and with optional valves at each end to enable fluid engagement for propulsion; The right hand diagram is a cross sectional view taken at location A-A, showing the path of fluid flow from center directly to the conduit side wall at the location of the openings.

Figure 31:
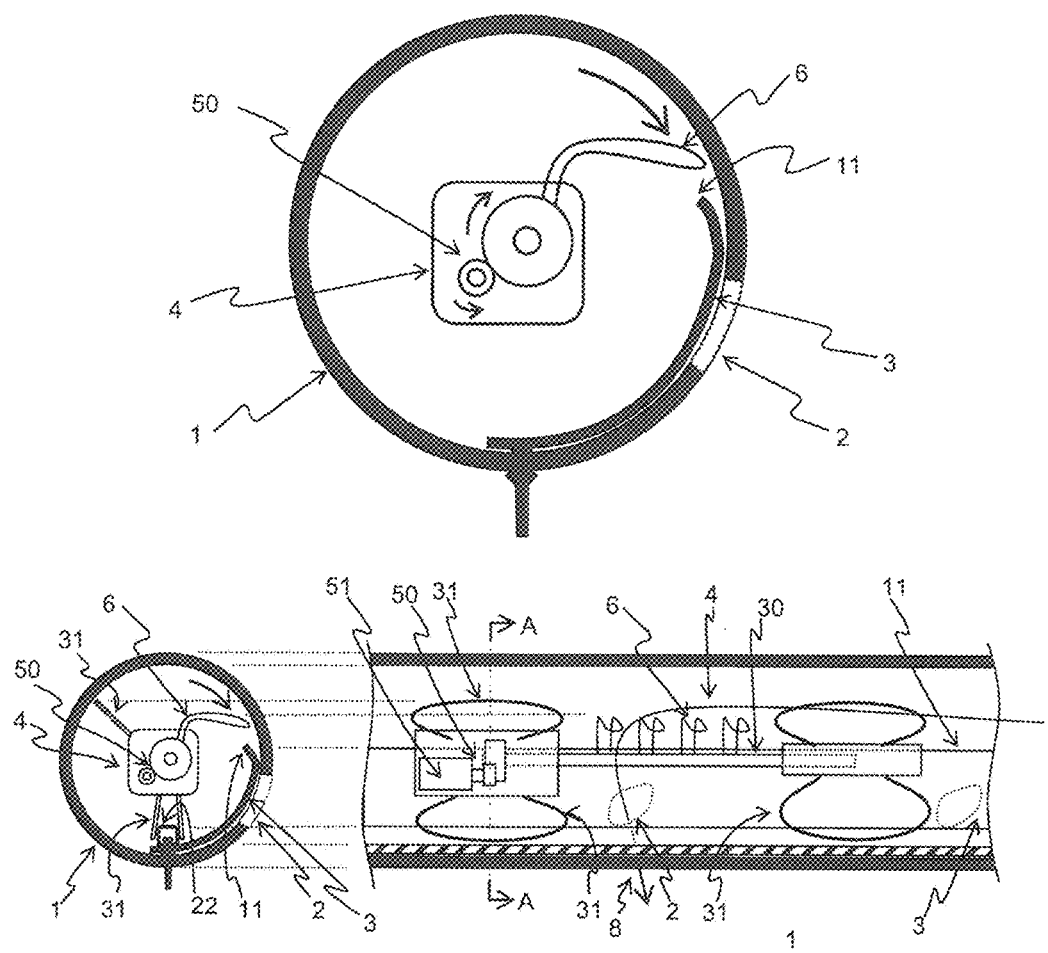

FIG. 31—Membrane manipulation by Servo actuated fingers on PIG apparatus—Top diagram is cross sectional view; Bottom right is a side view of the conduit and PIG apparatus; Bottom left is cross sectional view taken from side view at A-A.

Figure 32:
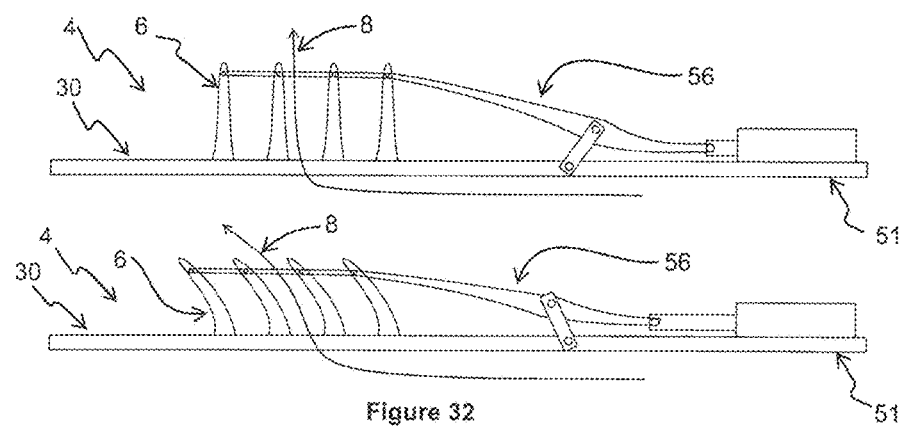

FIG. 32—Side view of PIG apparatus with flexible, controllable membrane manipulating members to also change fluid velocity & direction—Top diagram showing relaxed position; Lower diagram showing the protruding members flexing to alter fluid direction.

Figure 33:
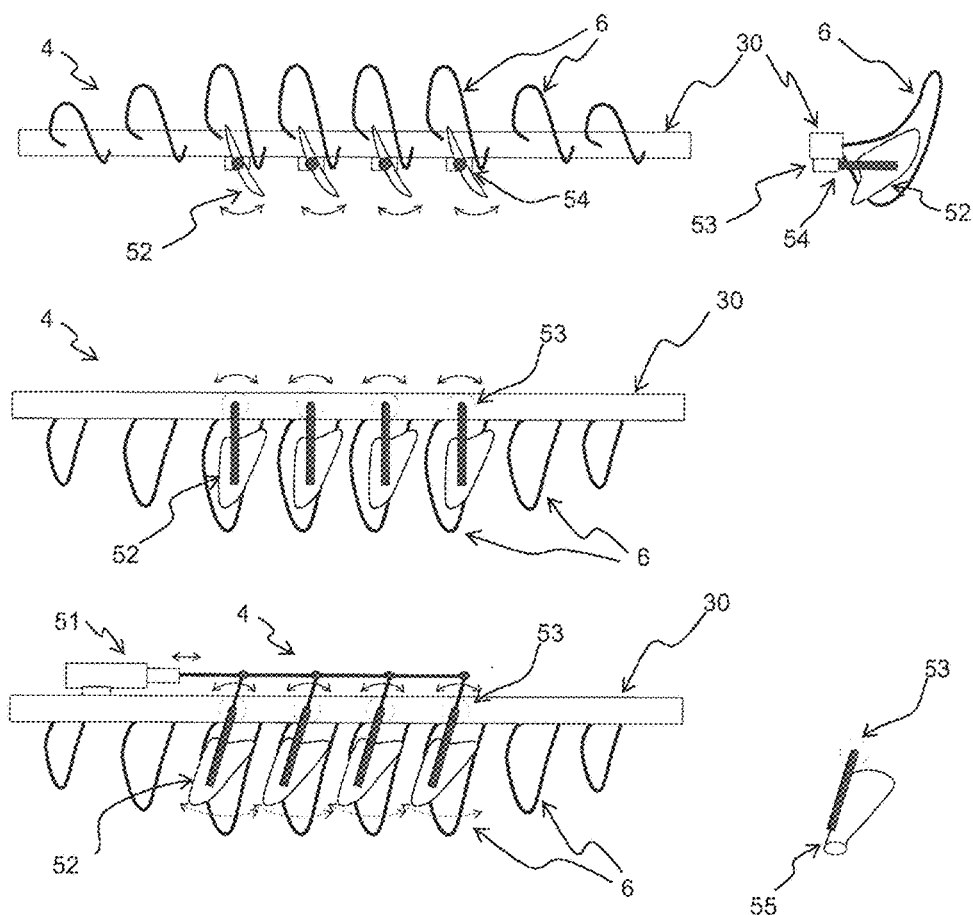
Figure 34:
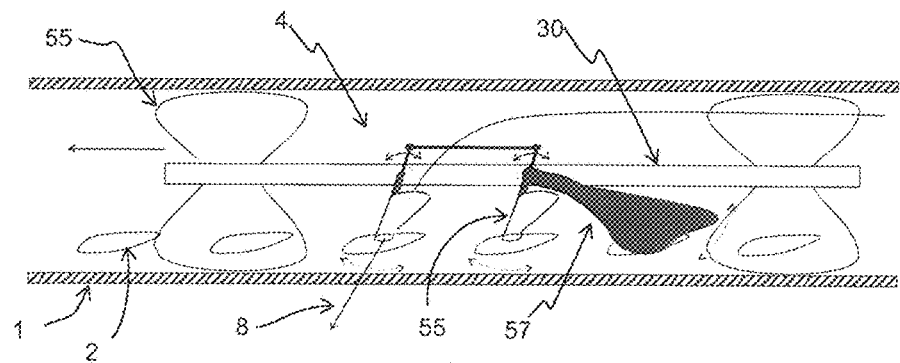

FIG. 33—PIG apparatus with active fins in vicinity of exit flow to adjust emission plume characteristics and direction (2 axes of rotation shown)—Dedicated fins are shown positioned in the flow path of fluid travelling out of the conduit via the openings. The Fins can be replaced with directional nozzles. Top Left diagram—PIG side view; Top right diagram—front view; Middle left diagram—PIG bottom side view; Bottom left diagram—PIG bottom view with moved deflecting elements; Bottom right diagram—example of Nozzle as directing element.

FIG. 34—Cutaway side view of PIG apparatus inside conduit, with fluid directing nozzles movable by modulating member interacting with irregularities integral to the conduit.

FIG. 35—Left, conduit side view showing internal membrane and membrane guide attached to the membrane end; Right, cross sectional view—The membrane guide being shaped to allow the leading fingers of PIG to engage and slide under the membrane, while the conical end of a sealing piston would slide over the outside.

FIG. 36—Side section view of conduit, membrane, and end guides in presence of PIG—Top diagram shows conical piston of PIG gliding over the end guide; Bottom diagram shows PIG fingers engaging under the end guide and subsequently under the membrane as the PIG moves from Right to Left in the diagrams.

FIG. 37—Side view of PIG illustrating a propulsion method—illustrated with PIG design as per FIG. 28 located inside the conduit—PIG with end slug/piston to enable propulsion by the conduit fluid supplied or released from the 2nd end, while bulk fluid is being emitted from the conduit supplied from the 1st end of the conduit. (Conduit membrane and openings are not shown).

FIG. 38—Cutaway Side view of PIG illustrating a propulsion method—For symmetric bidirectional operation with opposing interconnected valves—Propulsion control fluid enters the conduit from opposite end to bulk fluid delivery. The valves at each end of the PIG are interconnected such that they are in opposite states (when one is closed, the other is driven open). Each valve acts as a one-way valve which closes when fluid flows from the conduit toward the PIG. The valve can be held in the closed state by maintaining fluid pressure against the closed valve, which in turns maintains the opposite end valve in the open position to receive delivery fluid from the other conduit end, which is passed through the valve body and into the area of the PIG where the membrane is manipulated away from the conduit wall, allowing fluid to exit the conduit. (Conduit membrane and openings are not shown).

FIG. 39—Cutaway side view of PIG apparatus inside conduit illustrating a propulsion method utilizing independent actuator controlled valve bodies at each end. (Conduit membrane and openings are not shown).

FIG. 40—Side view of PIG illustrating a propulsion method—Control fluid is fed down a concentric tube to the closed end of the conduit to force the PIG upstream of bulk fluid flow, the PIG being sealed and slidable along the concentric inner control tube. (Conduit membrane and openings are not shown).

FIG. 41—Side view of PIG propulsion method of Cable or chain drive—Top diagram, PIG with cable attachments; Bottom diagram, conduit assembly with, sheaves at either end, cable return path is via a dedicated path through the PIG—To drive the PIG toward the 1st end, the sheave at the 1st end is driven in the counter clockwise direction, pulling the cable/chain directly. To drive the PIG toward the 2nd end the sheave at the 1st end is driven in the counter clockwise direction. (Conduit membrane and openings are not shown).

FIG. 42—Side view of PIG propulsion method—Propulsion force is generated hydraulically by cable connected piston in a separate control tube—Supplying fluid to the control tube at the 1st end pushes the control piston toward the 2nd end, and in turn by cable attachment via pulley, draws the PIG to toward the 1st end. Similarly moving the PIG to toward the 2nd end involves supplying fluid pressure to the control tube at the second end and releasing pressure from the control tube at the 1st end. (Conduit membrane and openings are not shown).

Figure 43:
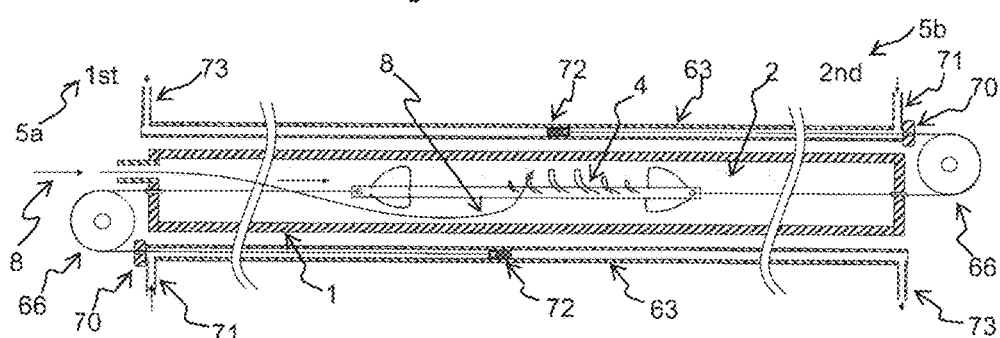

FIG. 43—Side view of PIG propulsion method—Propulsion force is generated hydraulically by cable connected pistons in separate control tubes for each direction—In order to move the PIG toward the 1st end, fluid pressure is supplied to the lower control tube at the 1st end, while controlling the release of fluid at the 2nd end. In order to move the PIG toward the 2nd end, fluid pressure is supplied to the upper control tube at the 2nd end while controlling the release of fluid at the 1st end of the upper control tube. (Conduit membrane not shown).

Figure 44:
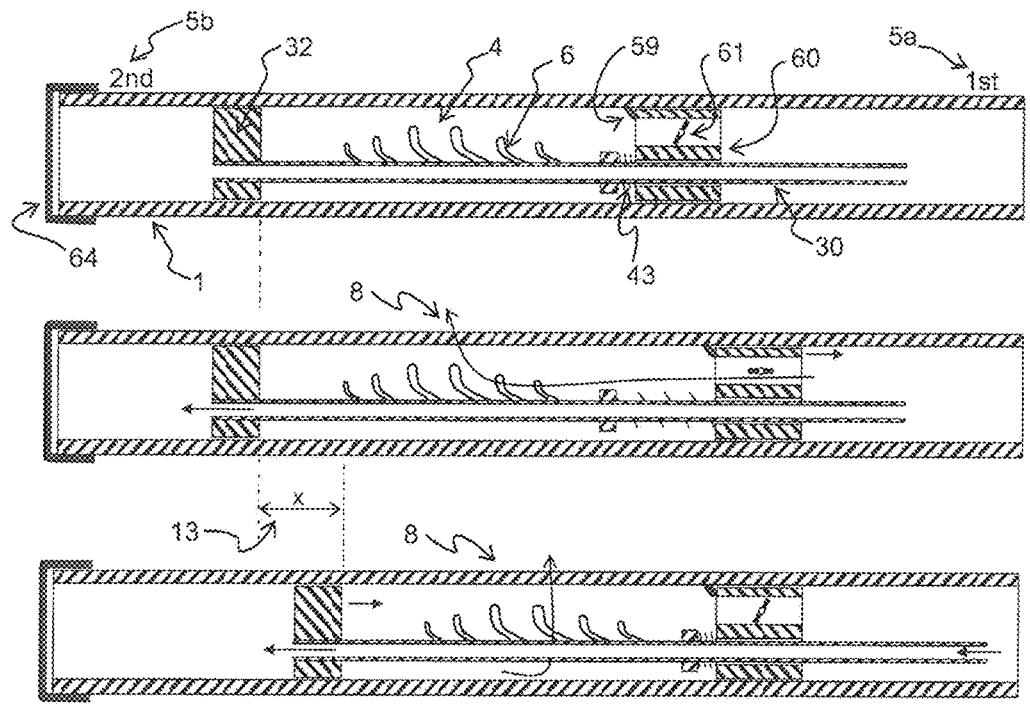

FIG. 44—Side views of PIG propulsion method, conduit capped at far end—The PIG able to move upstream against the bulk fluid delivery by reciprocating action (oscillating valve)—The PIG backbone is hollow allowing fluid to pass from the conduit 1st end, to the 2nd end which is closed—The Top diagram shows a closed valve in the slidable valve body and a spring in communication between the PIG valve body and rod in the compressed state; The middle diagram shows the valve open allowing fluid to flow from the conduit 1st end through the valve body to the area where the PIG fingers have prized the membrane from the conduit wall, the slidable valve body then moving toward the 1st end as the spring expands; The lower diagram shows the valve cycling to the closed state resulting in the fluid pressure acting to compress the spring by moving the piston at the 2nd end toward the valve body at the 1st end, and resulting in a net movement of the PIG upstream shown as a distance "X". (Conduit membrane and openings are not shown).

Figure 45:
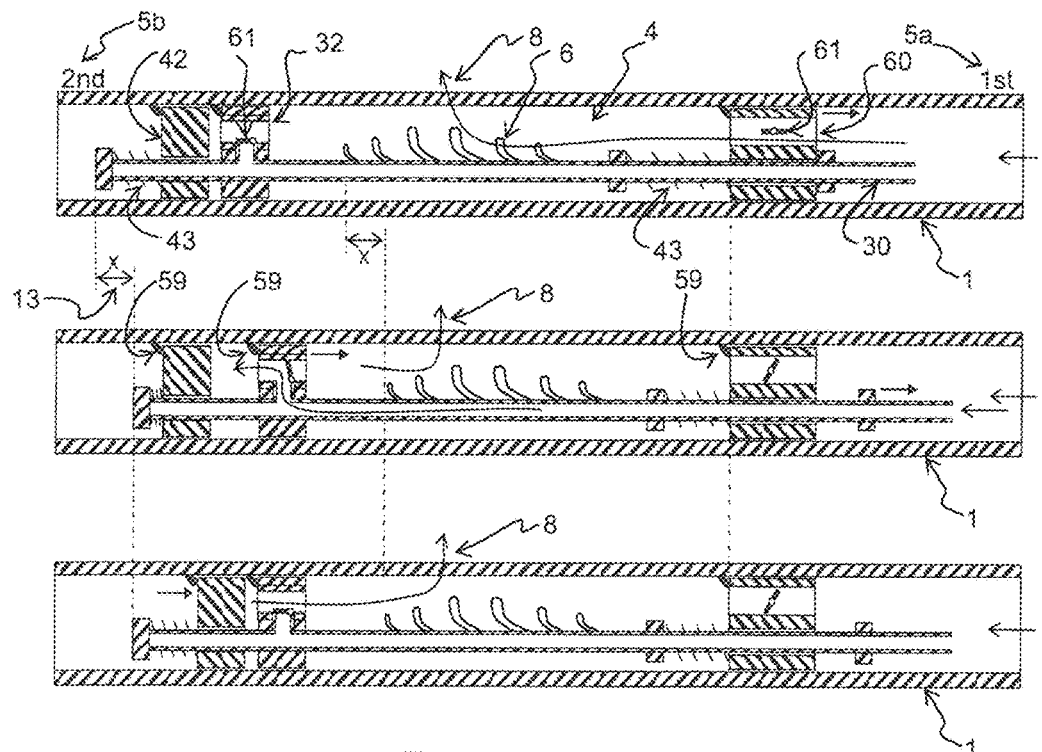

FIG. 45—Side views of PIG propulsion method using worm-like action, conduit open at far end—The PIG able to move against the flow of fluid in a reciprocating action—Top diagram shows first phase of reciprocating action; Middle diagram shows second phase of reciprocating action; Bottom diagram shows third phase of reciprocating action. (Conduit membrane and openings are not shown).

Figure 46:
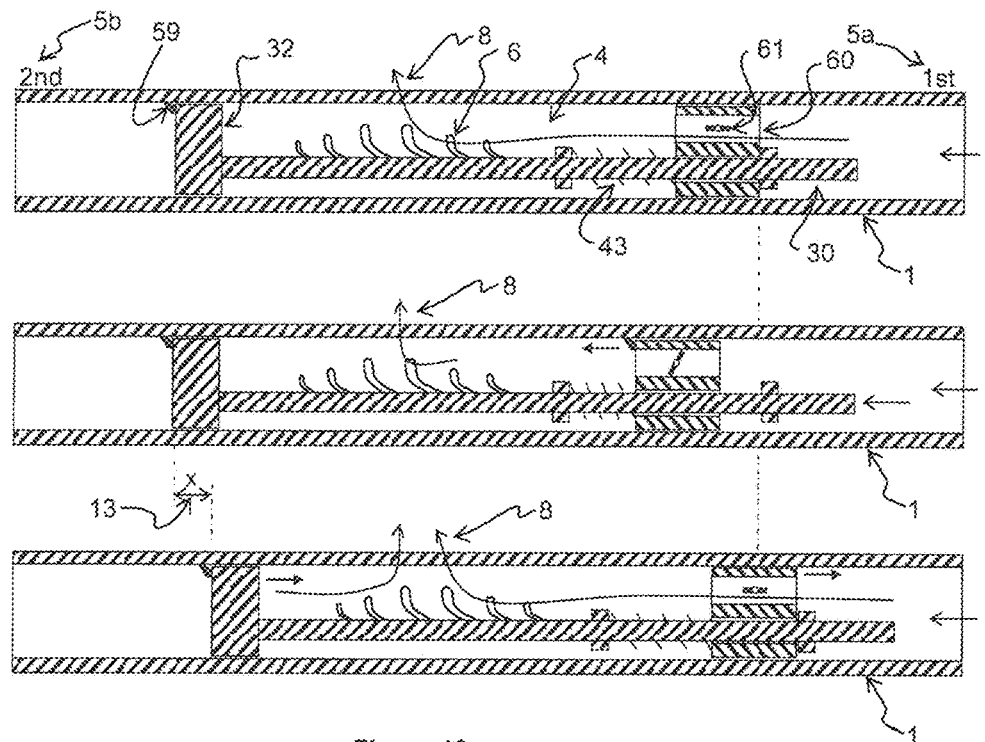

FIG. 46—Side views of PIG propulsion method using percussion, conduit open at far end—The PIG able to move against the flow of fluid by reciprocating action—Top diagram shows resting state and first phase of reciprocating action; Middle diagram shows second phase of reciprocating action compressing a spring; Bottom diagram shows third phase of reciprocating action, being the release of spring energy imparting momentum to the apparatus. (Conduit membrane and openings are not shown).

Figure 47:
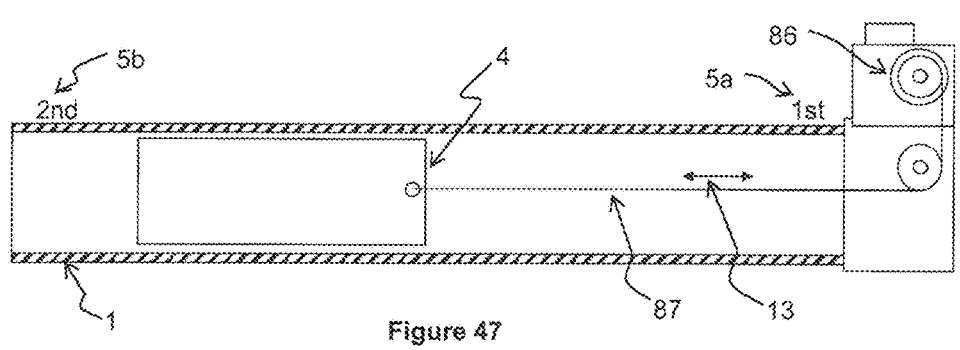

FIG. 47—Side view of PIG in conduit with communication and Sensing line on a self-tensioning reel to sense, gauge position of, and communicate with PIG (Conduit openings and membrane are not shown).

Figure 48:
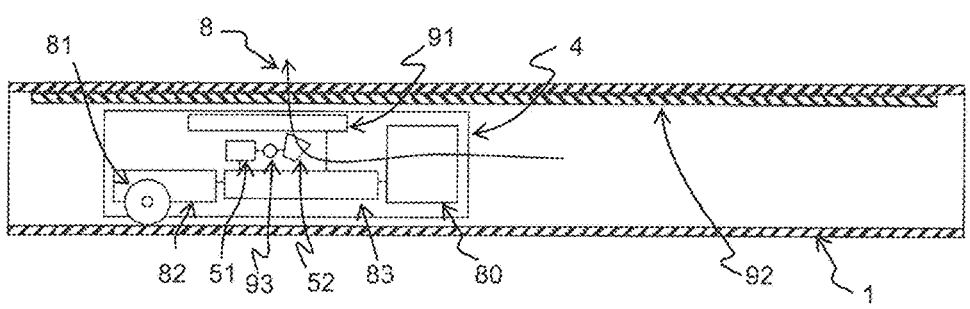

FIG. 48—Side view of generic PIG design with on board fluid to electrical power generation, power storage, program control circuitry, propulsion mechanism, controlled manipulator for interacting with fluid emission control apparatus integral to the conduit, actuator controlled movable fluid directing elements.

Figure 49:
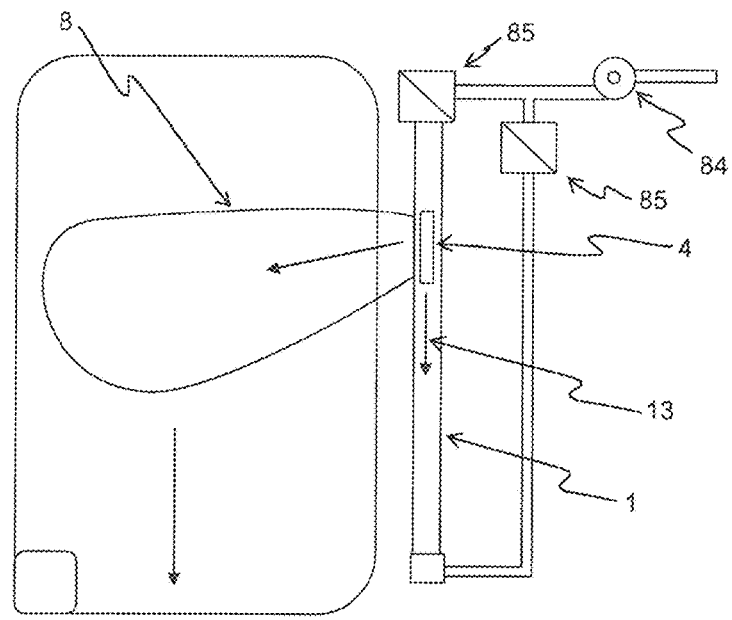

FIG. 49—Simple floor/yard washing application—Conduit installed down one side of the floor/yard, and washing plume reaching across the floor/yard with a plume directional bias in the direction of the washing wave. (Conduit membrane and openings are not shown).

Figure 50:
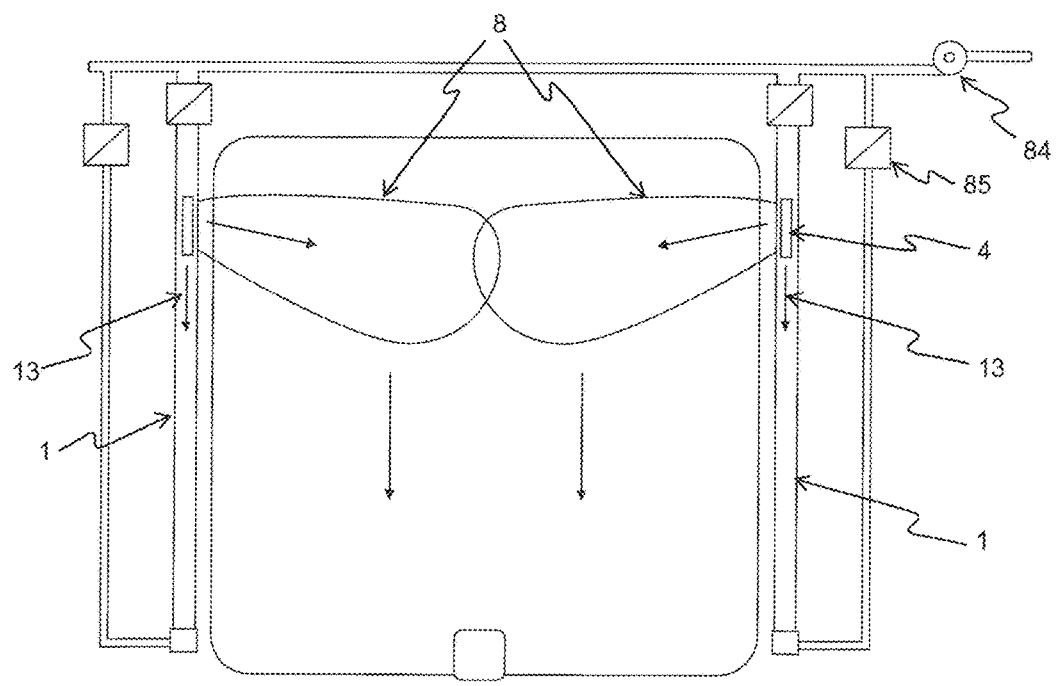

FIG. 50—Wide yard washing application—A conduit system is installed along each long edge of the yard, the respective washing plumes opposing and optionally synchronized in position and movement. (Conduit membrane and openings are not shown).

Figure 51:
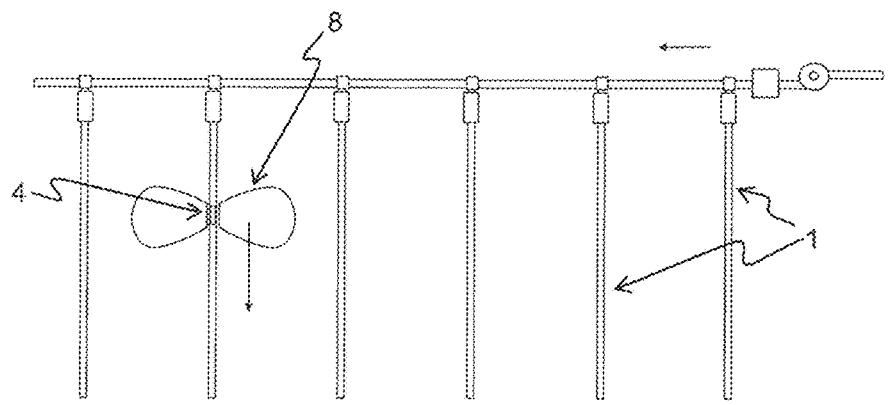

FIG. 51—Irrigation paddock layout—Type 1 (A common header line feeds multiple parallel individually valved distribution lines).

Figure 52:
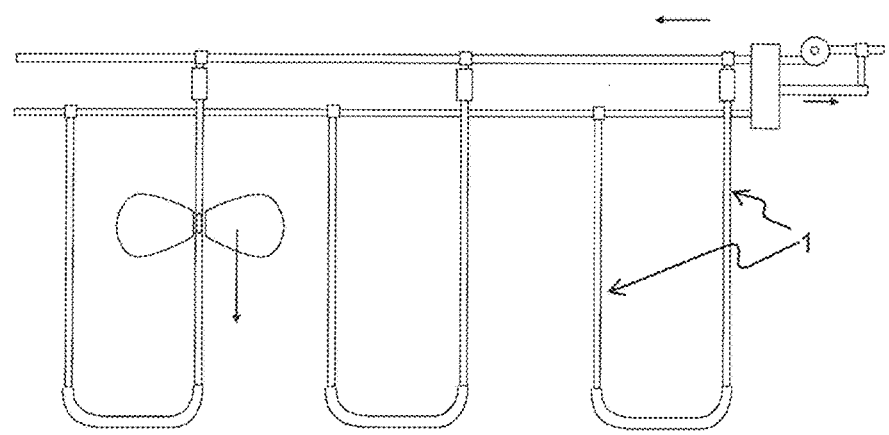

FIG. 52—Irrigation paddock layout—Type 2 (A header line feeds multiple individually valved outlet lines, with a common return path).

Figure 53:
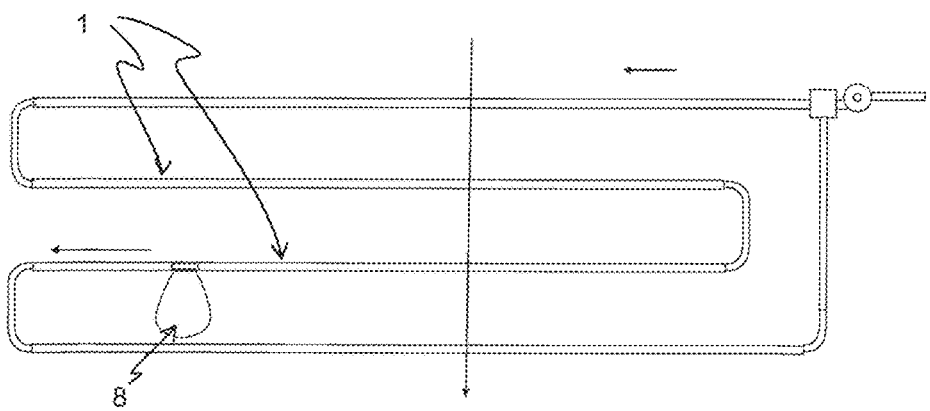

FIG. 53—Irrigation paddock layout—Type 3 (A single distribution line is routed as a complete loop, back and forth to cover a defined area, and return to a common valve point. The area shown is sloping in the direction indicated by the arrow, and emission is from the downhill side of the conduit).

Figure 54:
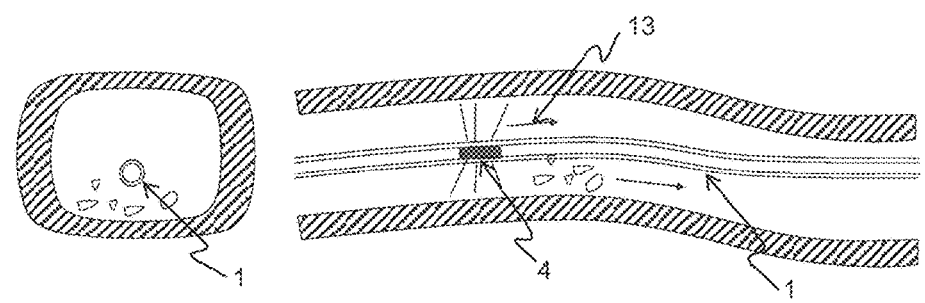

FIG. 54—Large duct (eg Sewer pipe) flushing technique by travelling orifice inside a small concentric conduit. (Conduit membrane and openings are not shown).

Figure 55:
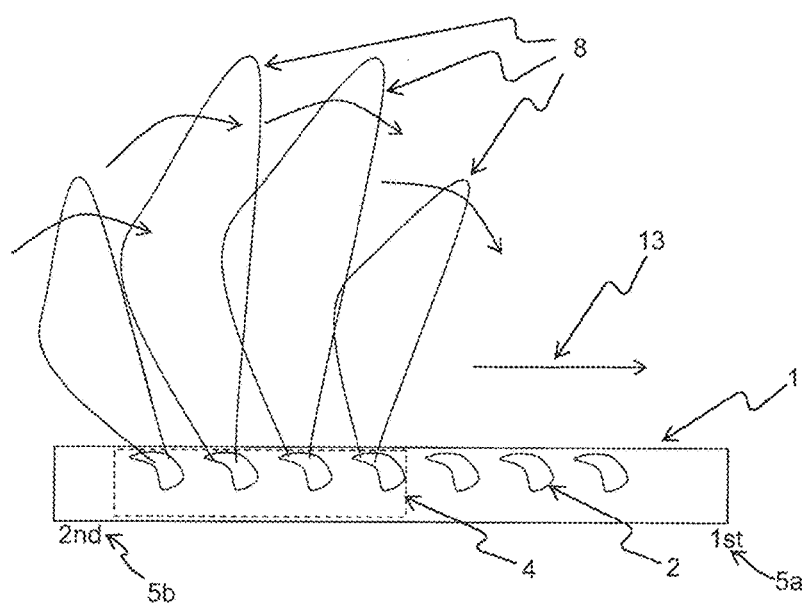

FIG. 55—Dynamic emission plume—Emission plume patterns and dynamics are influenced in combination by the shape of the conduit openings, the shape of membrane prizing elements on the PIG apparatus, and the active control of flow directing elements as in FIG. 31, FIG. 32, FIG. 33, FIG. 34, FIG. 67, FIG. 68, FIG. 69.

Figure 56:
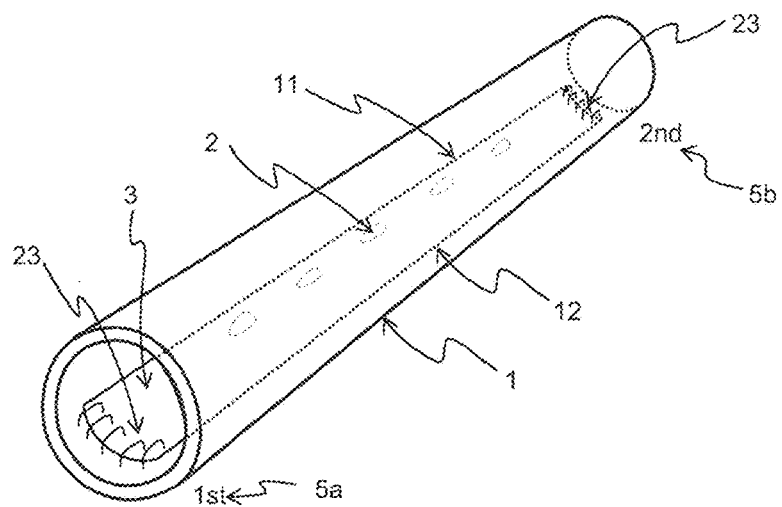

FIG. 56—Oblique view of conduit with membrane attachment at ends only

Figure 57:
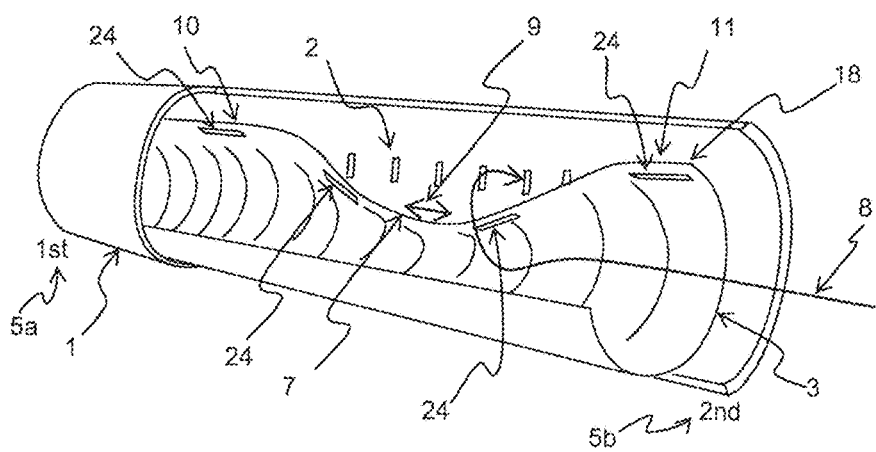

FIG. 57—Oblique cutaway view of conduit with membrane having magnetically responsive elements attached.

Figure 58:
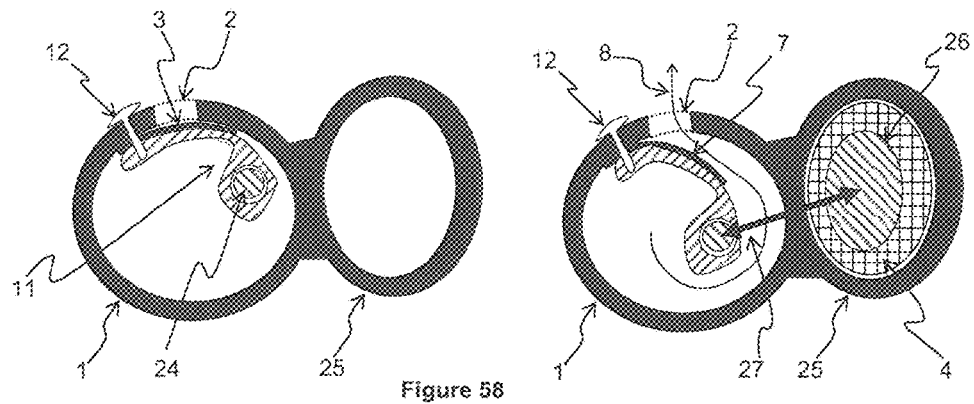

FIG. 58—Cross sectional view of conduit with magnetically responsive membrane integrated with adjacent control conduit for carriage of magnetically responsive apparatus—The Left hand diagram shows the membrane in the closed position; the Right hand diagram shows the presence of apparatus manipulating the membrane by magnetic interaction.

Figure 59:
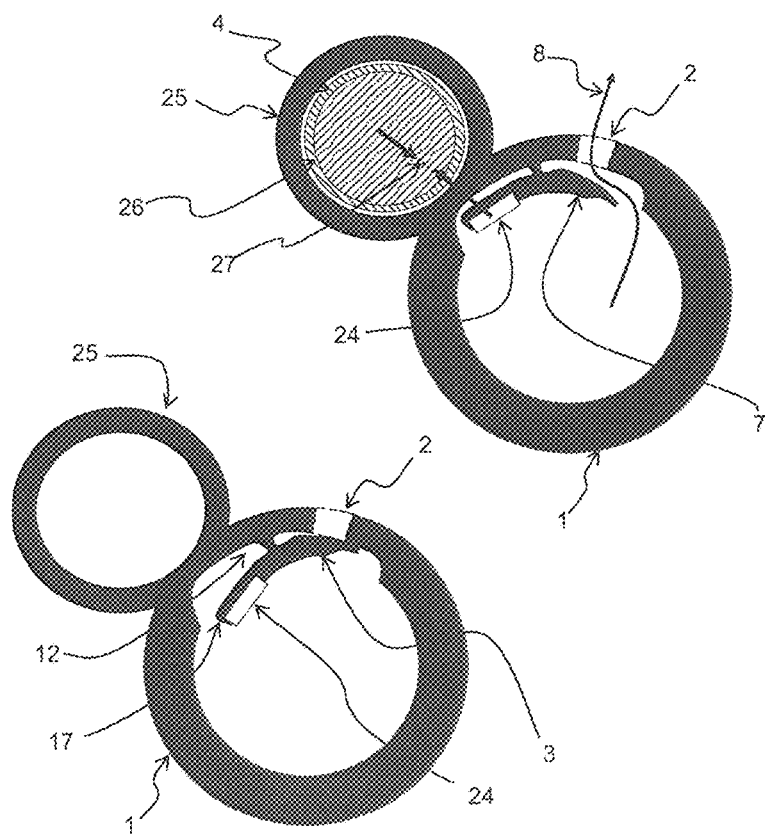

FIG. 59—Cross sectional view of conduit with magnetically responsive membrane integrated with adjacent control conduit for carriage of magnetically responsive apparatus—The Lower diagram shows the membrane in the closed position; the Upper diagram shows the presence of apparatus in the adjacent conduit, manipulating the membrane by magnetic interaction.

FIG. 60—PRIOR ART—Pipe Zipped open and closed to produce movable orifice.

FIG. 61—PIG Apparatus in conduit, where communications to common point and central computer system is by sonic signaling FIG. 62—PIG apparatus in conduit, receiving electrical power and signaling via electrical AC loop (single conductor type shown)

Figure 63:
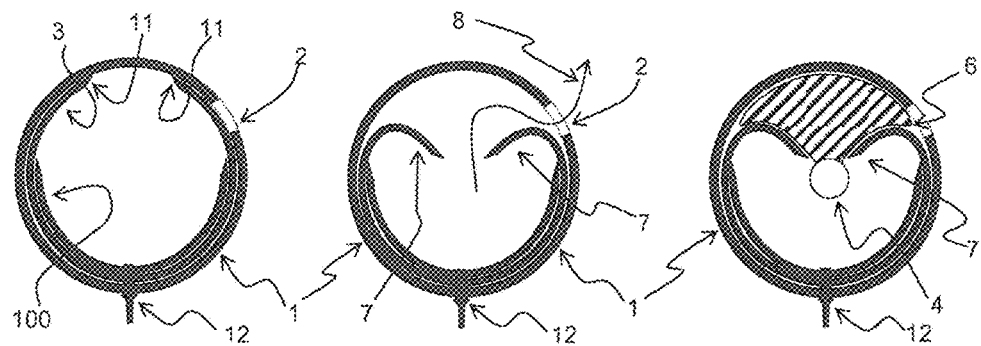

FIG. 63—Cross sectional view of conduit utilizing a stiff inner former (half pipe) to retain the membrane and facilitate the assembly process (The former reduces or eliminates the need for multiple membrane fasteners along its length, and also acts to constrain the PIG device from rotation).

Figure 64:
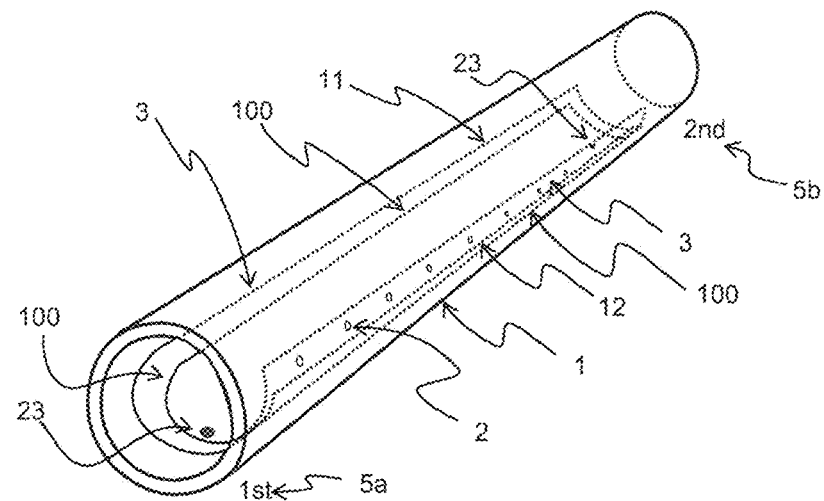
Figure 65:
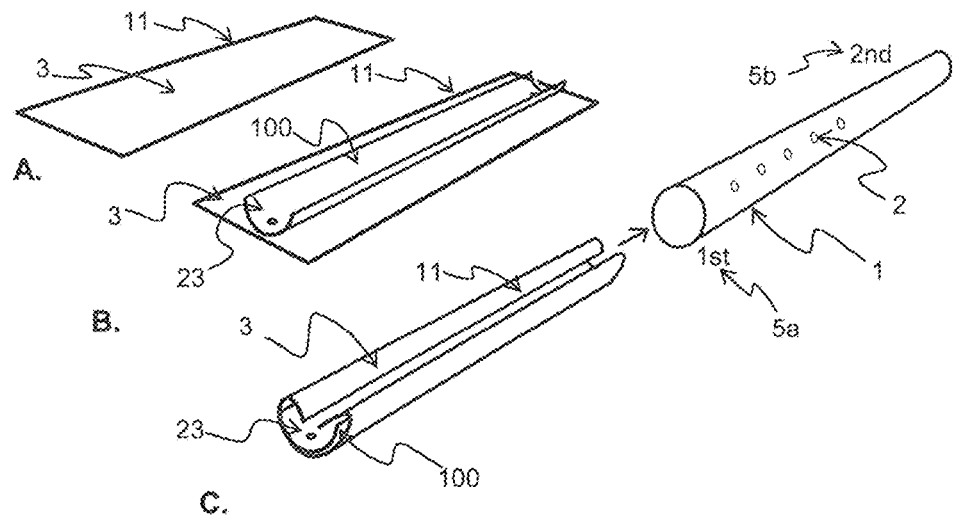

FIG. 64—Oblique view of conduit of FIG. 63, utilizing a stiff inner former to retain the membrane and facilitate the assembly process FIG. 65—Method of assembly of conduit of FIG. 63, (Steps A, B, C shown)

Step A. Lay out and cut membrane to size, B. Attach membrane to resilient former, C Insert membrane and former into conduit.

Figure 66:
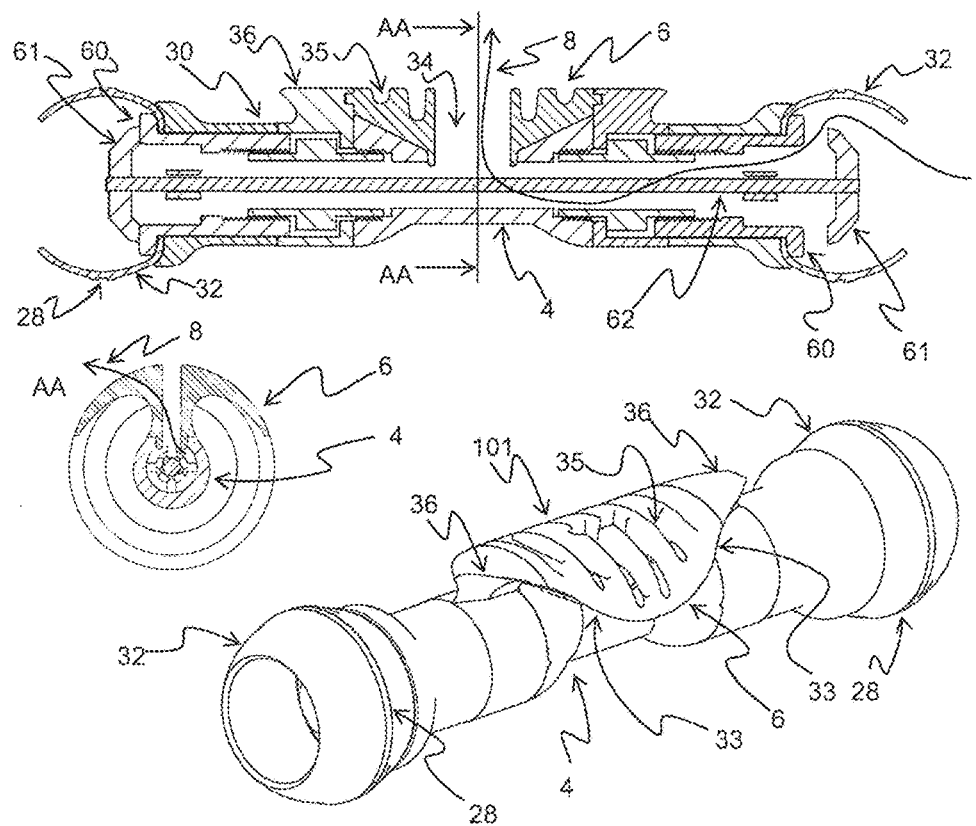

FIG. 66—PIG device for use in conduit of FIG. 63

Top diagram:—Side view of section cut along center of the length of pig. Middle diagram:—Front end view as sectioned at position AA. Lower diagram:—Oblique view FIG. 67—PIG device for use in conduit of FIG. 63, showing fitment options of the membrane manipulating component with various topologies producing different output plume characteristics.

Upper diagram:—Oblique view of PIG with insert options A, B, C, D.

Lower diagram:—Side view of PIG with insert options A, B, C, D.

Option A. produces a dynamically changing spray plume as pig moves past holes in conduit, B. produces a higher volume further reaching plume, C. with progressively angled vanes produces a plume angled in one direction away from perpendicular to the conduit, with a progressively changing angle as pig moves past holes in conduit. D. produces a further reaching plume angled toward (or away from) the direction of pig travel.

Figure 68:
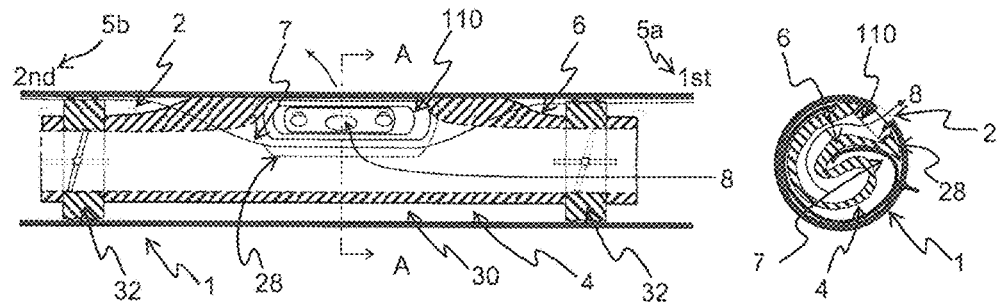

FIG. 68—PIG device with a fluid path through to a nozzle assembly at the point of outlet, which engages with conduit holes as they move into range and subsequently disengages as the holes move out of range.

Left hand diagram:—Side view of Pig in conduit with membrane shown prized away from conduit wall. Right hand diagram:—End section view of Pig in conduit taken at location AA.

Figure 69:
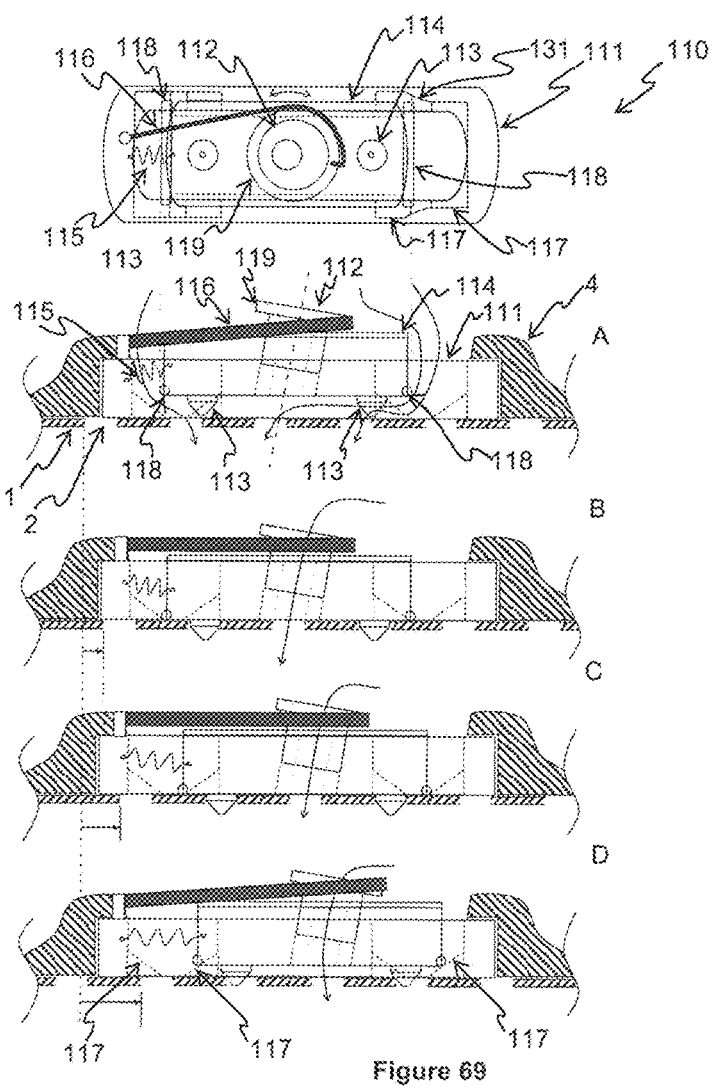

FIG. 69—Nozzle assembly of FIG. 68, comprising a slotted frame, for loosely constraining a laterally movable carriage with a directional nozzle and locating pins for maintaining nozzle alignment with conduit holes, and a strap linkage between the frame/PIG and nozzle head partially encircling the nozzle head to impart a rotation and modulation adjustment of the nozzle as the carriage moves relative to the PIG.

Top:—PIG nozzle assembly as viewed from inside the PIG/conduit, (ie in the direction looking out through the conduit holes).

Views A,B,C,D—Side section view of Nozzle assembly within the PIG against the conduit wall, the section view taken at the location of the conduit holes.

View A. Nozzle carriage not yet engaged with conduit holes

View B. Nozzle carriage initial engagement with conduit holes, and fluid flow through nozzle View C. Nozzle carriage moves relative to pig as pig moves forward, the strap applying a rotation to the nozzle.

View D. Nozzle carriage approaching end of travel moves up ramps in frame and disengages with holes before returning under spring force to position A. resulting in a cycle of reciprocation.

Figure 70:
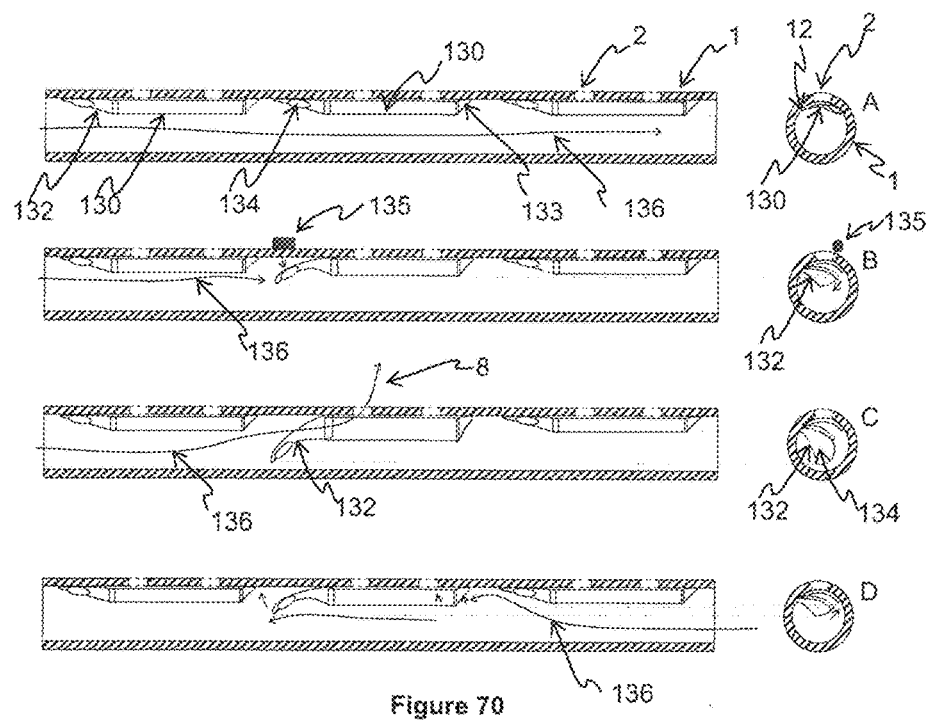

FIG. 70—Leading edges of membrane sections in a conduit (akin to FIG. 3), are urged into the oncoming fluid flow by the presence of external magnetically responsive material, resulting in the fluid momentum then prizing the membrane section from the conduit wall and exposing the conduit opening(s)—(control magnet is external to main conduit, eg transported by adjacent external conduit, not shown)

Views A,B,C,D show different control states, where left hand diagrams are side views of conduit showing conduit walls, conduit openings/holes and membrane sections, and right hand diagrams are end on views of conduit showing conduit holes and membrane positions.

View A. shows fluid passing through conduit with all membrane sections covering conduit holes.

View B. shows the presence of an external magnet applying a force to the membrane leading edge, urging the leading edge into the oncoming fluid flow.

View C. shows fluid momentum applying force to further move the membrane leading edge and subsequently all of the membrane section from the conduit wall exposing conduit openings and allowing fluid to flow from the conduit.

View D. shows fluid flowing in the reverse direction, applying a closing force to the membrane opposite end leading edge, and returning the membrane to the conduit wall thereby closing/resetting any open membrane sections.

Figure 71:
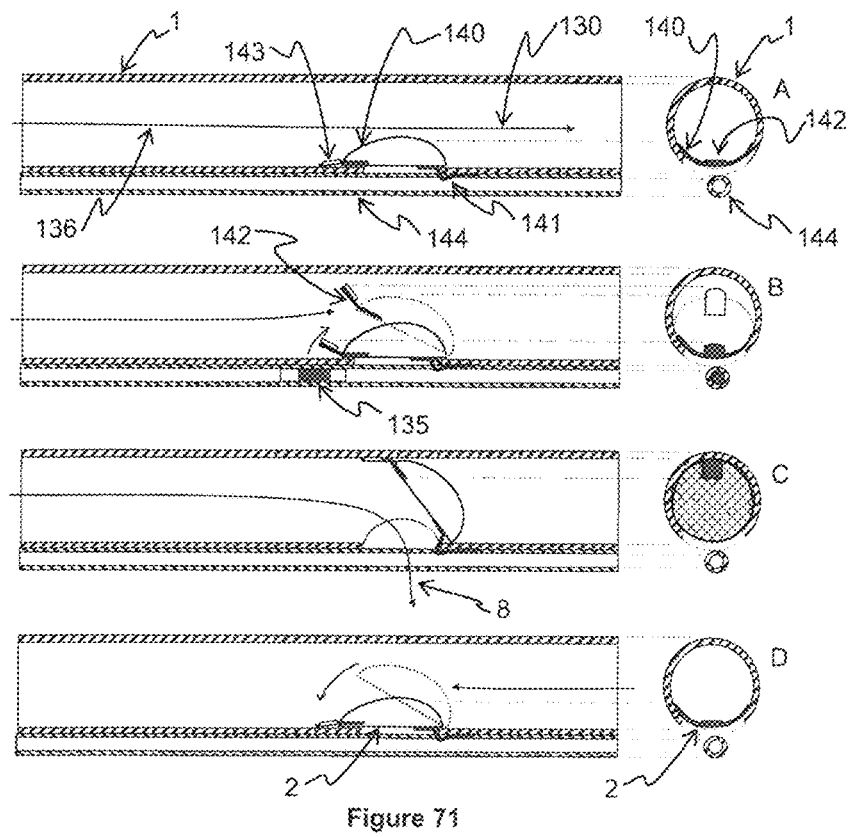

FIG. 71—A special case of FIG. 70 in which the conduit opening is a significant proportion of the conduit diameter, and the membrane therefore also requiring a higher stiffness/resilience can be hinged such that when open, fluid flow past the hole is substantially blocked thereby forcefully diverting fluid out of the conduit hole and away from any other downstream holes (not shown) which may have been previously open.

Views A,B,C,D show different control states. The left hand diagrams are side views of conduit showing conduit walls, a conduit opening/hole and a membrane section. Right hand diagrams are end views of conduit showing conduit hole and membrane position.

View A. shows fluid passing through conduit with the membrane section covering/sealing the conduit hole.

View B. shows the presence of an external magnet applying a force to the membrane leading edge, urging the leading edge into the oncoming fluid flow.

View C. shows fluid momentum having applied a force to further move the membrane to the fully open position, diverting fluid out of the conduit opening.

View D. shows fluid flowing in the reverse direction, applying a closing force to the membrane thereby returning it to the conduit wall and closing the conduit opening (and any other similar openings not shown).

Figure 72:
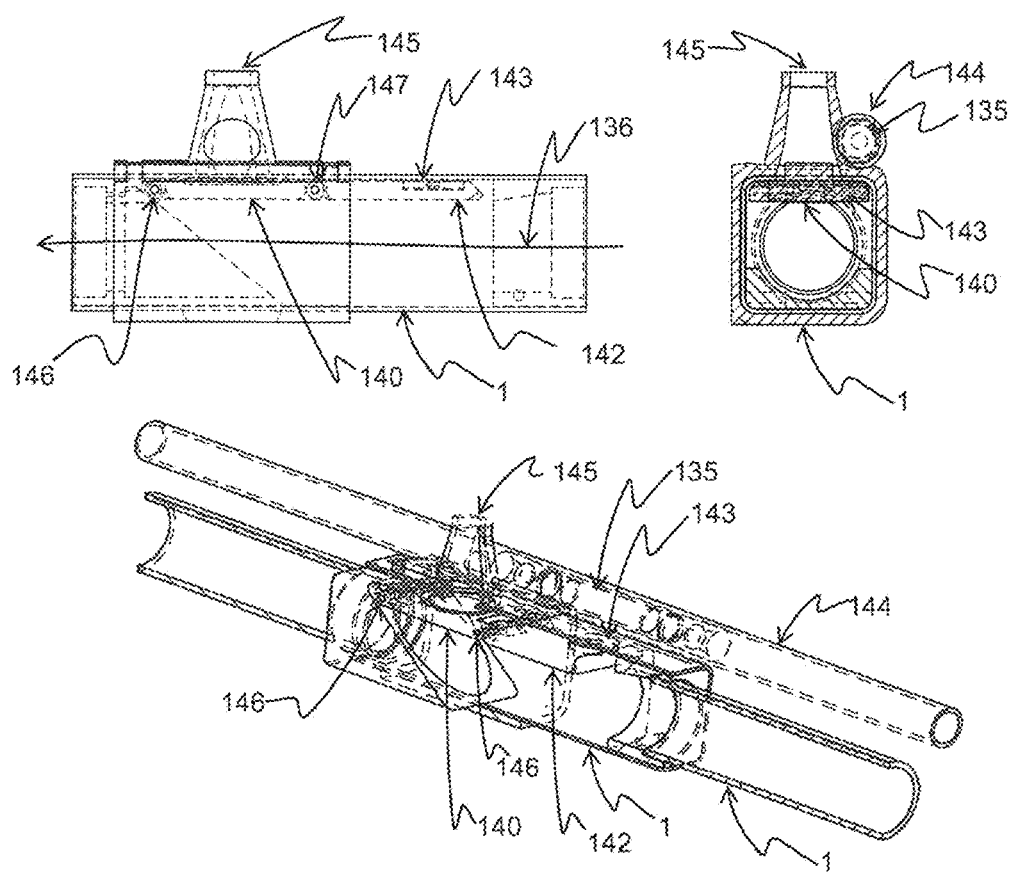

FIG. 72—An implementation of FIG. 71, utilizing a rigid hinged flap as the membrane, with a subsequent hinged flap as the leading edge, the outlet provided with a nozzle for use in high pressure, high flow sequential distribution systems, such as in a cosmetic fountain.

Top left: Side view, showing unhindered through flow path with flaps in closed position Top right: End view, also showing control tube in place.

Lower: Oblique cutaway view and control tube with control PIG in vicinity to impart force by magnetic field to a leading edge flap.

Figure 73:
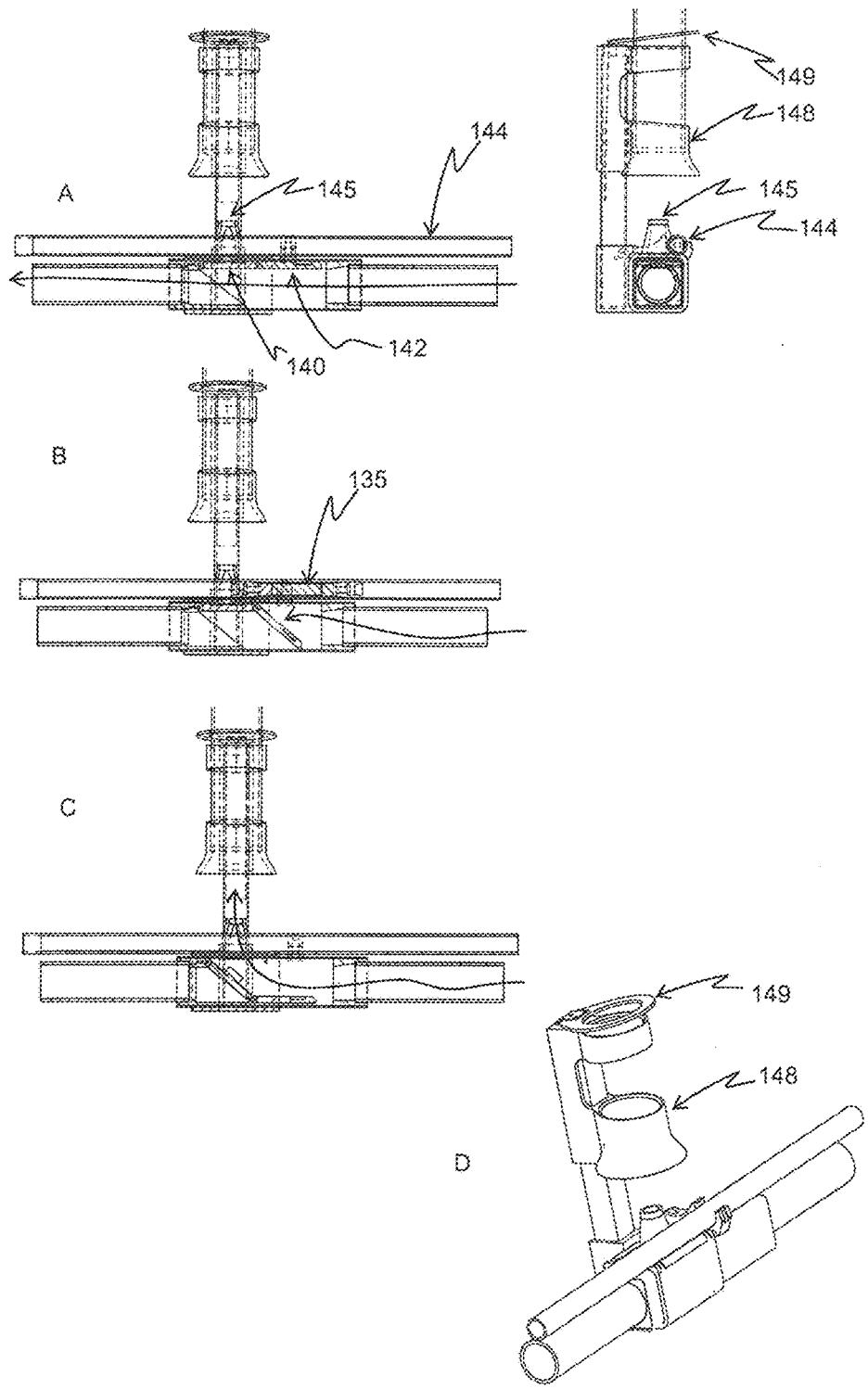

FIG. 73—The valve system of FIG. 72 adapted for use as a row cropping siphon starter, is equipped with a saddle to hold a Siphon tube at a suitable distance from the nozzle outlet.

View A. shows fluid passing through conduit with the membrane section covering/sealing the conduit hole.

View B. shows the presence of an external magnetic PIG in a control tube applying a force to the membrane leading edge flap, urging the leading edge into the oncoming fluid flow.

View C. shows fluid momentum having applied a force to further move the membrane flap to the fully open position, diverting fluid out of the conduit opening, through the nozzle and into the intake end of a siphon tube.

View D. Oblique view showing harnesses for maintaining the control tube and siphon tube position.

Figure 74:
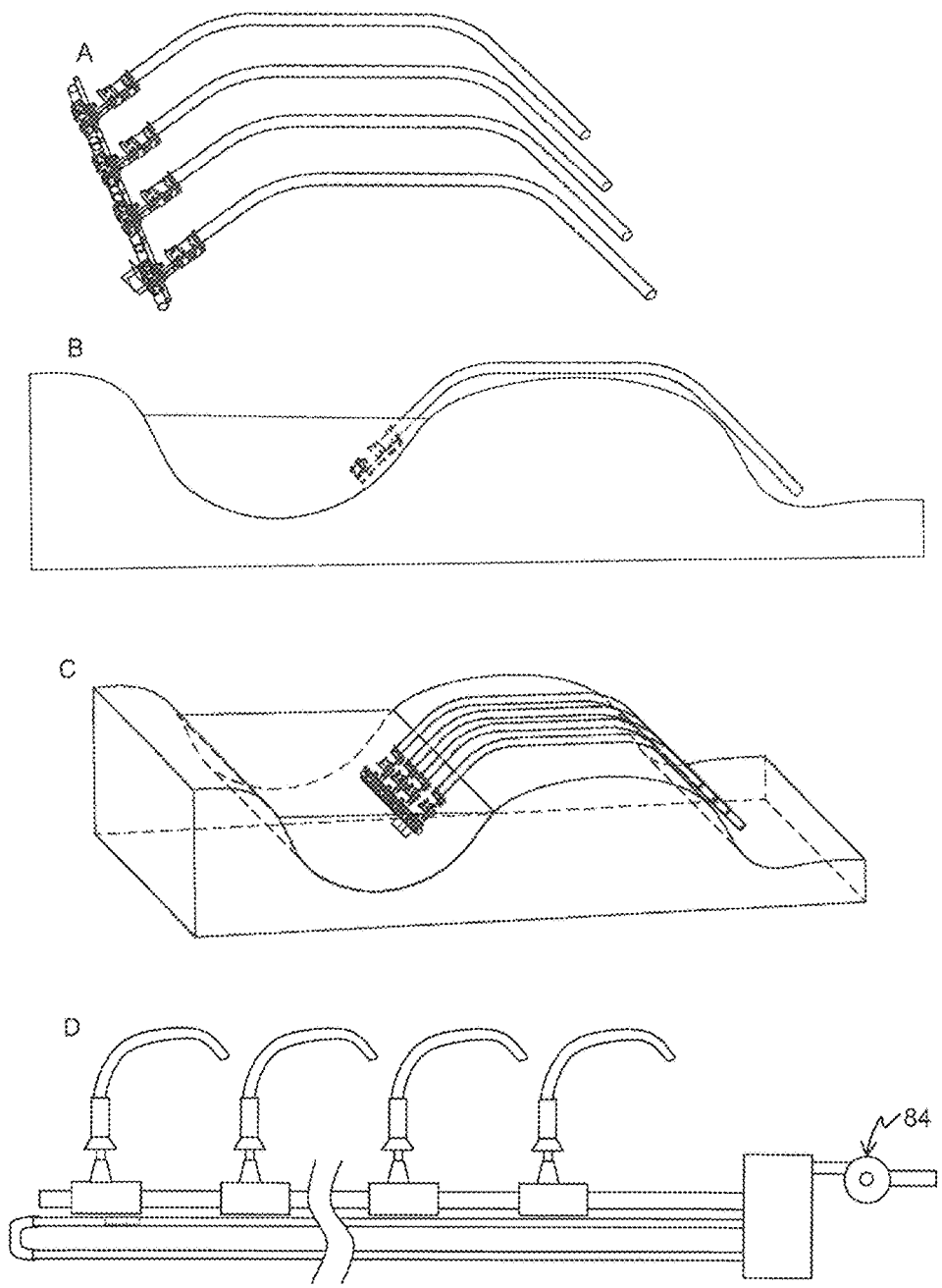

FIG. 74—Deployment of multiple valve units of FIG. 73 for use in starting a system of multiple row crop siphons Upper diagram—oblique view of multiple Siphon starter units connected to common supply and control lines.

Middle diagram—Side view of Siphon tubes with the head end submerged in a supply channel/ditch, the siphon tubes passing over the ditch bank to supply water to crops.

Lower middle diagram—oblique view of Siphon tubes with head end including the control and supply lines submerged in a supply channel/ditch, the siphon tubes passing over the ditch bank to supply water to crops.

Bottom diagram—System connection arrangement of cascade connected siphon starter units and siphon tubes connected to a dedicated control box and pump.

Operation—Apply fluid to main line in forward direction, then move pig towards the source (by applying separate fluid to the control line), to sequentially open each valve for a finite duration. A valve being temporarily open results in a high velocity jet up into the siphon tube to forcefully fill the tube thereby priming the siphon tube and allowing bulk fluid to continue to siphon from the channel/ditch to the outlet side and thereby apply water the crops.

Figure 75:
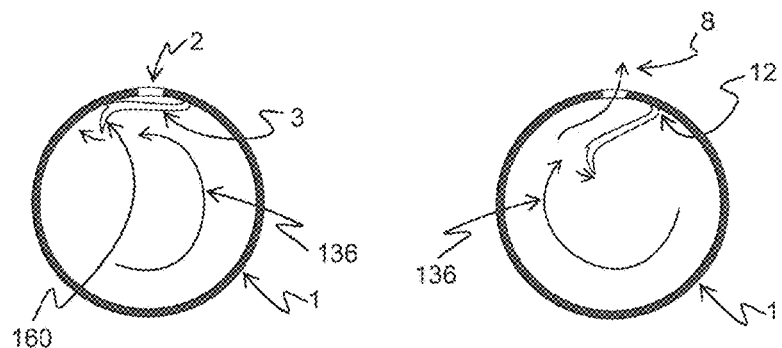

FIG. 75—A conduit having a membrane with an inwardly protruding longitudinal lip like edge adapted to engage with rotational fluid motion such as a vortex to prize the membrane from the conduit wall and expose conduit openings, and conversely with opposite fluid rotation replacing the membrane against the conduit wall.

Right hand diagram—Illustrates how a clockwise fluid motion acts to prize the membrane from the conduit wall and expose conduit openings for fluid to escape.

Left hand diagram—Illustrates how a counter clockwise fluid motion acts to replace a membrane against the conduit wall.

Figure 76:
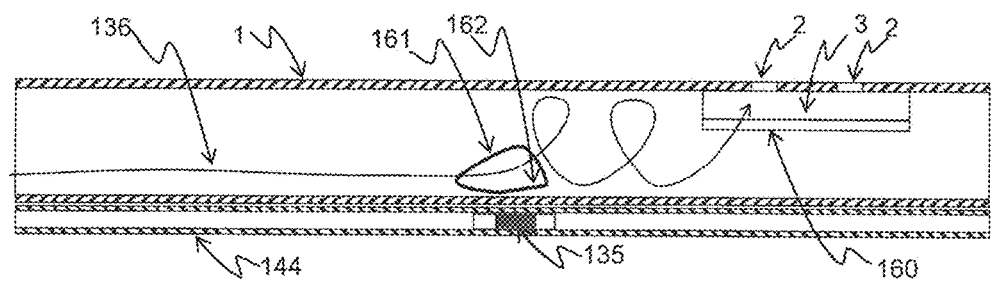

FIG. 76—Side view of a conduit of FIG. 75 with a flap/fin hinged such that it is able to respond to the presence of a magnetic PIG in an adjacent conduit such that its leading edge is lifted into the oncoming fluid flow which forcefully lifts and fully exposes the fin to the fluid flow at an angle so as to deflect linear fluid momentum to produce a circular motion which can subsequently exert force to the longitudinal membrane lip to separate it from the conduit wall and thereby uncover conduit openings, the flap/fin able to retreat to a lay down unexposed position on cessation of fluid flow and absence of the PIG, also then allowing the membrane to retreat to the conduit wall and cover the conduit openings.

Figure 77:
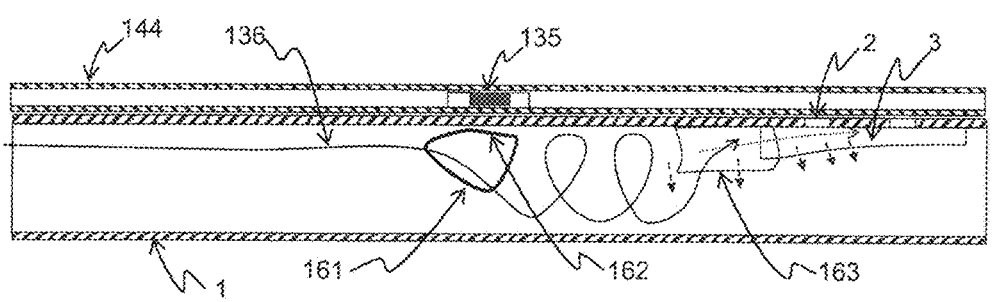

FIG. 77—Side view of a conduit as a variation on FIG. 76, in which the leading edge end preparation or end piece of the membrane section (as opposed to the longitudinal edge) performs the interaction with the circular fluid momentum in initiating the peeling process of the membrane section from the conduit wall, which subsequently propagates down the length of the section to progressively peel the remainder of the membrane section from the conduit wall.

Figure 78:
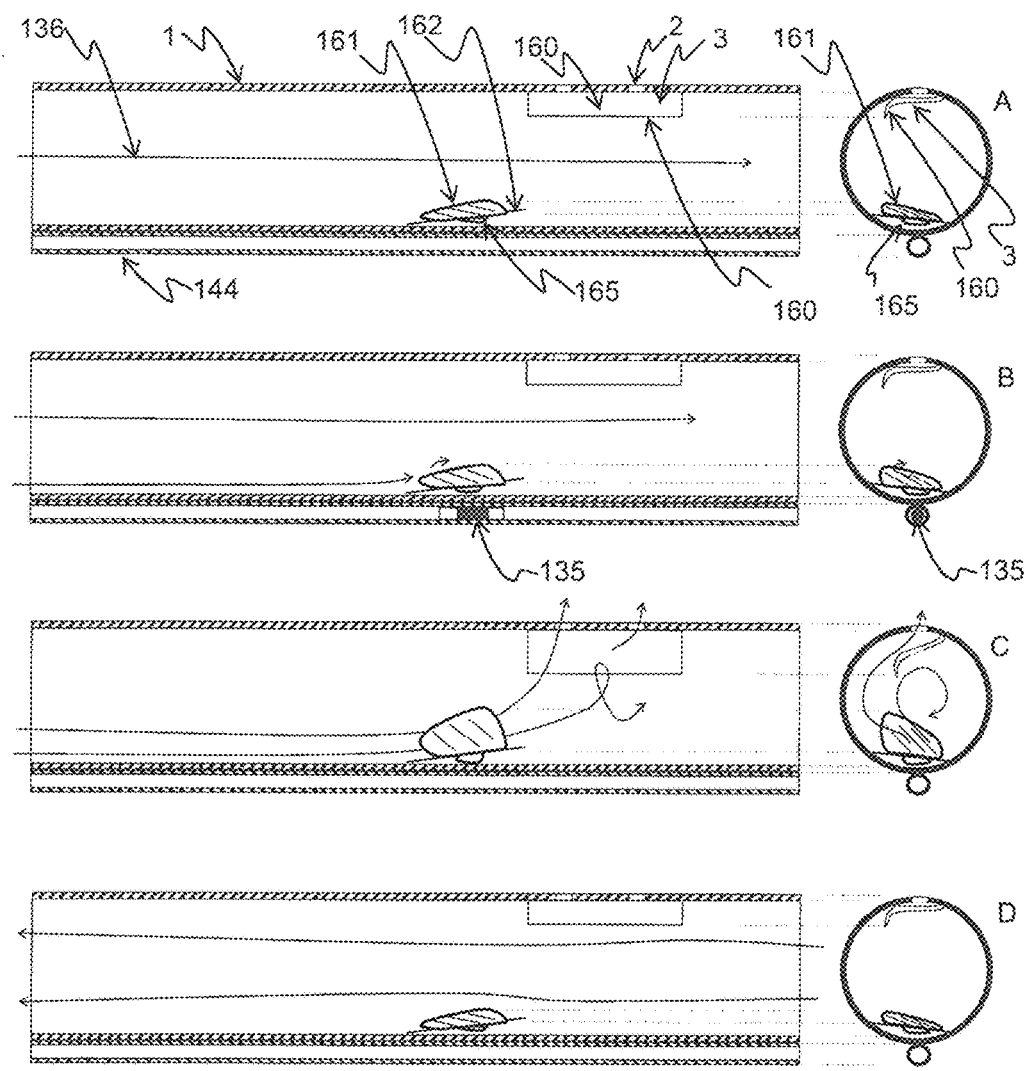

FIG. 78—Illustration of the controlling process of a conduit of FIG. 76, the conduit having a membrane section and corresponding diverting fin/flap hinged at the conduit wall and cantilevered with a magnetically responsive element for responding to the presence of a magnetic PIG travelling in a separate control conduit.

In each diagram A,B,C,D—the left hand view illustrates a side section of conduit and adjacent control line/conduit. The right hand view illustrates the corresponding conduit end view.

View A. shows fluid passing through the conduit with the flap/fin in the lay-down position allowing fluid to pass through unhindered, and the membrane section in the relaxed position covering/sealing the conduit opening(s).

View B. shows the presence of an external magnetic PIG in the control tube exerting a force of attraction force to the hinged flap/fin cantilever, urging the leading edge away from the conduit wall and into the oncoming fluid flow.

View C. shows fluid momentum having applied a force to further move and hold the flap/fin at its hinged rotational limit, where it remains exposed at an angle to the oncoming fluid flow to divert fluid around the perimeter of the conduit where it in turn acts on the longitudinal lip of the membrane section peeling it from the conduit wall, exposing conduit openings and allowing fluid to escape.

View D. shows fluid having been first stopped to allow the membrane section to return to its relaxed position against the conduit wall, followed by a reversal of flow to forcefully return the flap/fin to the lay-down or reset position.

Figure 79:
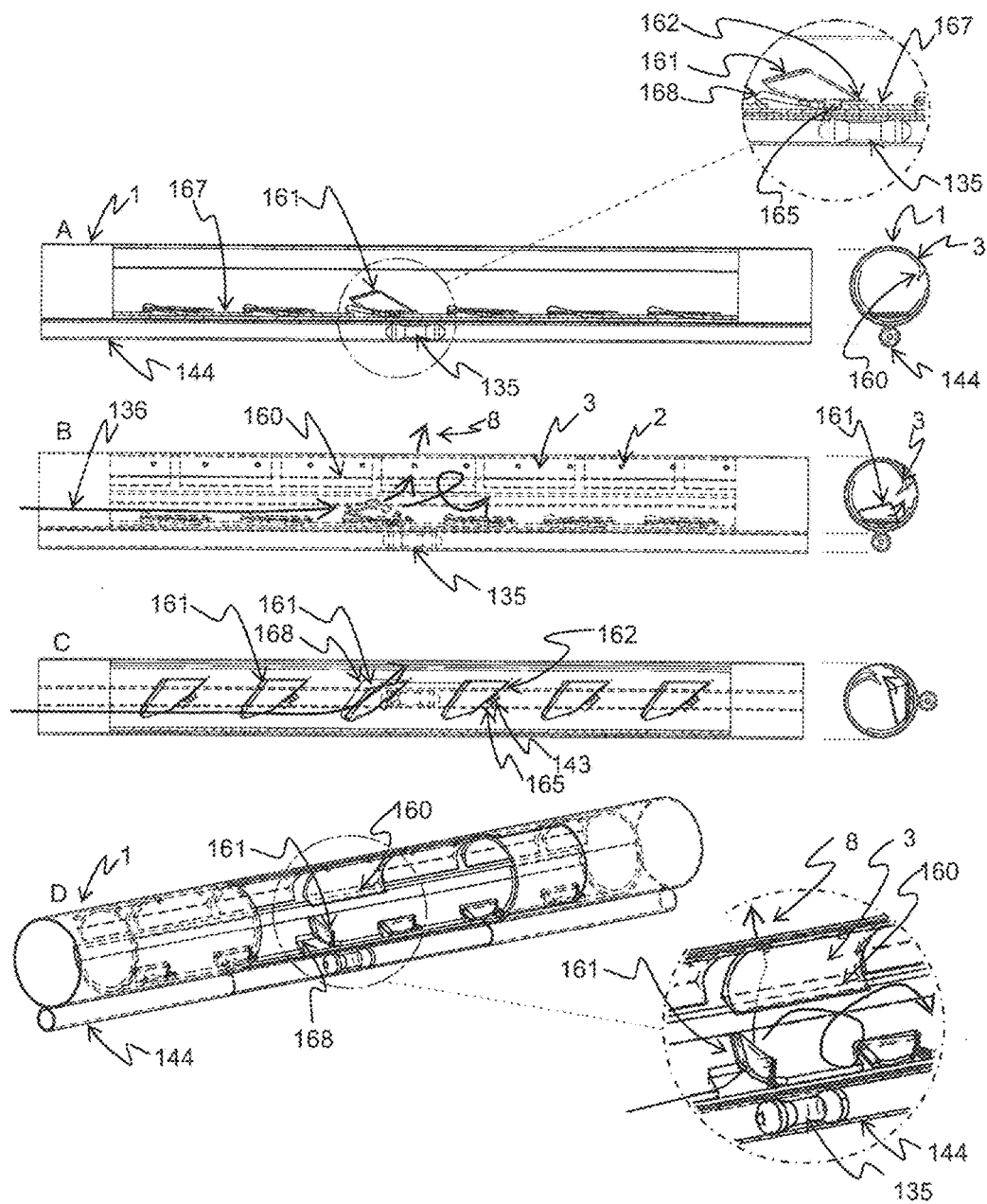

FIG. 79—A conduit and separate control tube with a plurality of groups of membrane sections and fins/flaps (similar to FIG. 78) distributed along its length, the membrane fabricated as a continuous length and with cutouts to define the membrane sections. A plurality of flaps/fins integral to and distributed along a continuous former (of conduit length) the fins each being effectively hinged to the former, the former residing against the conduit wall such that each flap/fin is in optimal offset alignment with its respective membrane section.

In diagrams A,B,C—the left hand view illustrates a side section of conduit, and the presence of a magnetic PIG in an adjacent control line/conduit. The right hand view illustrates the corresponding conduit end view.

View A. is a cutaway view of conduit with no fluid flow and all membrane sections in relaxed position covering the conduit opening(s), a magnetic PIG applying a force of attraction to the cantilever of the flap/fin in its vicinity results in the flap's leading edge being lifted away from the former.

View B. is a side view of the conduit with all hidden edges visible, and with fluid flow resulting in fluid momentum having applied a force to further move and hold the flap/fin (which was lifted by the adjacent PIG), to its hinged rotational limit, where it remains exposed at an angle to the oncoming fluid flow to divert fluid around the perimeter of the conduit where it in turn acts on the longitudinal lip of the membrane section separating it from the conduit wall, exposing conduit openings and allowing fluid to escape.

View C. is a cutaway view from the top of the conduit showing the same condition as View B.

View D. is an oblique view of the conduit with a cutaway section showing the PIG and flaps/fins in its vicinity under the same conditions as View B.

In operation, an external magnet transported in the separate control tube attracts magnetic responsive material on the inner fulcrum side of a hinged fin, resulting in the leading edge of the fin moving away from the wall into the flow of fluid, the flow then holding and effectively latching the fin in a raised position where it diverts oncoming fluid creating a vortex in the conduit, which in turn acts on the inward protruding leading edge of the sectioned membrane separating it from the conduit wall, exposing conduit openings and allowing fluid to escape.

FIG. 80, FIG. 81, FIG. 82, FIG. 83—A conduit system as described in FIG. 78, with an additional flap/fin similar to that described in FIG. 78, but hinged at the opposite angle to the flow path such that when deployed, diverts fluid flow around the conduit in the opposite direction to return the membrane section to the conduit wall and cover the openings, the flap/fin also situated upstream of the flap performing the membrane opening function, such that it shadows the downstream fin and effectively overrides the previous operation of the downstream flap/fin. In each Figure, top left is conduit side view, Top right is the corresponding end conduit view, bottom left is conduit top view, bottom right is corresponding conduit end view.

Figure 80:
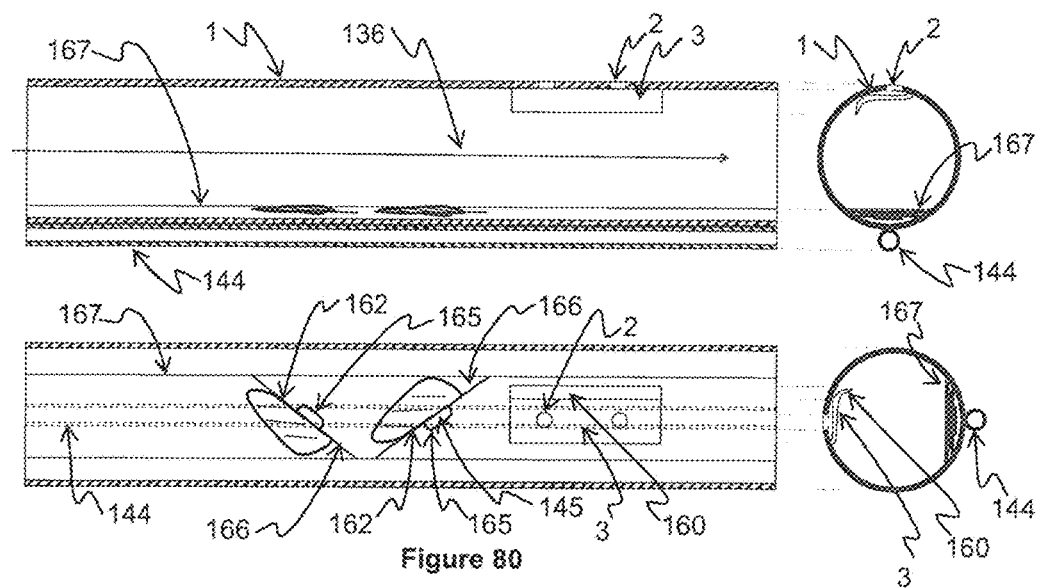

FIG. 80—Fluid passing through the conduit unhindered, the membrane section and flaps/fins in the relaxed state recessed into the former, and the membrane covering conduit openings preventing fluid escaping the conduit.

Figure 81:
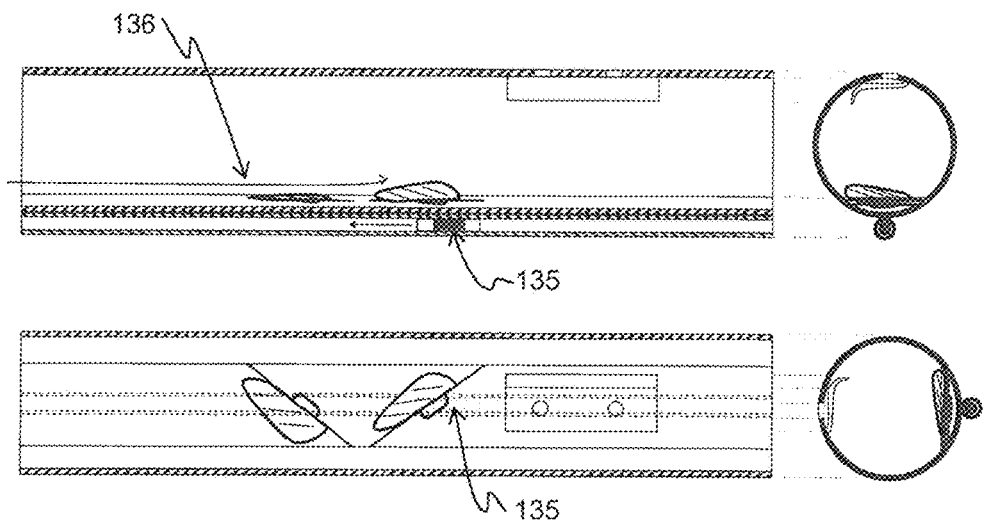

FIG. 81—A PIG with a magnetic responsive element has moved into the vicinity of the first Flap/Fin urging the leading edge of the Fin out of its recess and into the oncoming fluid flow.

Figure 82:
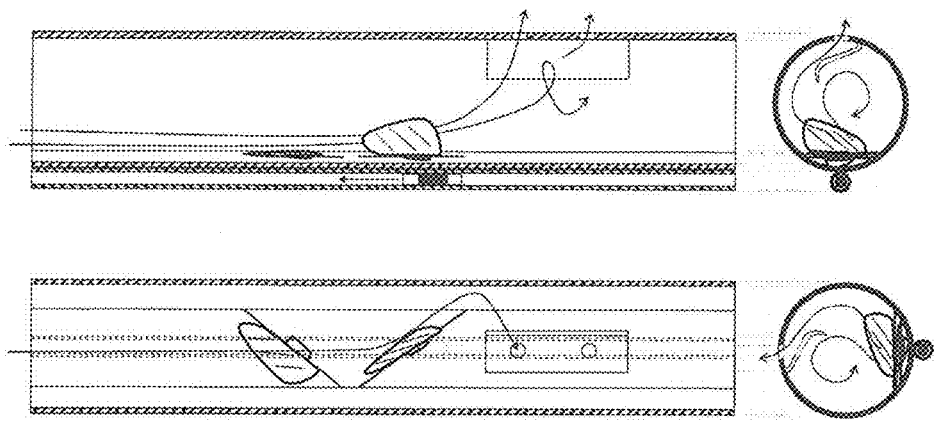

FIG. 82—The fluid flow continues to lift and hold the Flap/Fin at the end of its hinged travel, while causing fluid to divert around the conduit perimeter and incident with the protruding longitudinal lip of the membrane, thereby manipulating the membrane edge and peeling the membrane from the conduit wall, thereby uncovering conduit openings.

Figure 83:
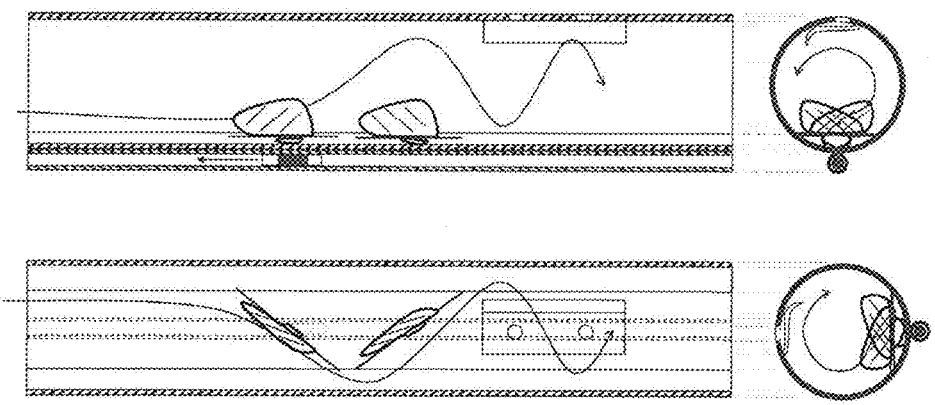

FIG. 83—the PIG has progressed in the control tube to be in the vicinity of the upstream flap/fin, applying a force of attraction to the flap/fin cantilever, urging the flap/fin to rotate on its hinge axis, thus moving the leading edge of the fin into the oncoming fluid path, the moving fluid then continuing to raise and hold the flap/fin at the end of its hinged travel and causing fluid to divert around the conduit perimeter in the opposite direction of rotation resulting from the previous (downstream) fin, the fluid rotation thereby replacing the membrane section against the conduit wall and preventing further fluid from escaping the conduit.

Figure 84:
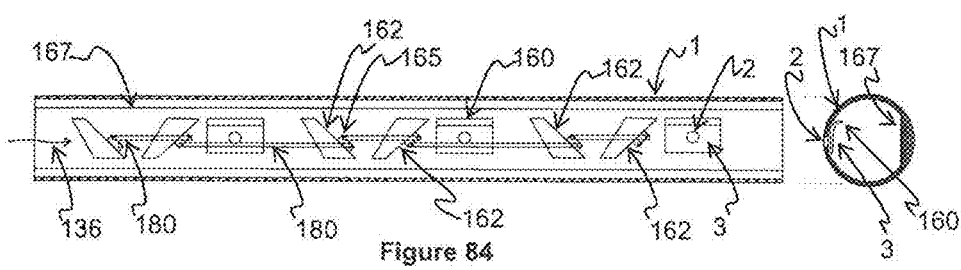

FIG. 84—A conduit of type depicted in FIG. 80, FIG. 81, FIG. 82, FIG. 83, where each successive control element is in communication with the next control element by way of mechanical or fluid linkage (hydraulic or pneumatic), providing automatic propagation of the emission plume Left hand diagram is a top view of conduit showing membrane sections, control flaps, and linkages between successive flaps.

Right hand diagram is an end on view of conduit showing membrane sections and control flaps and linkages embedded in a low profile former.

Figure 85:
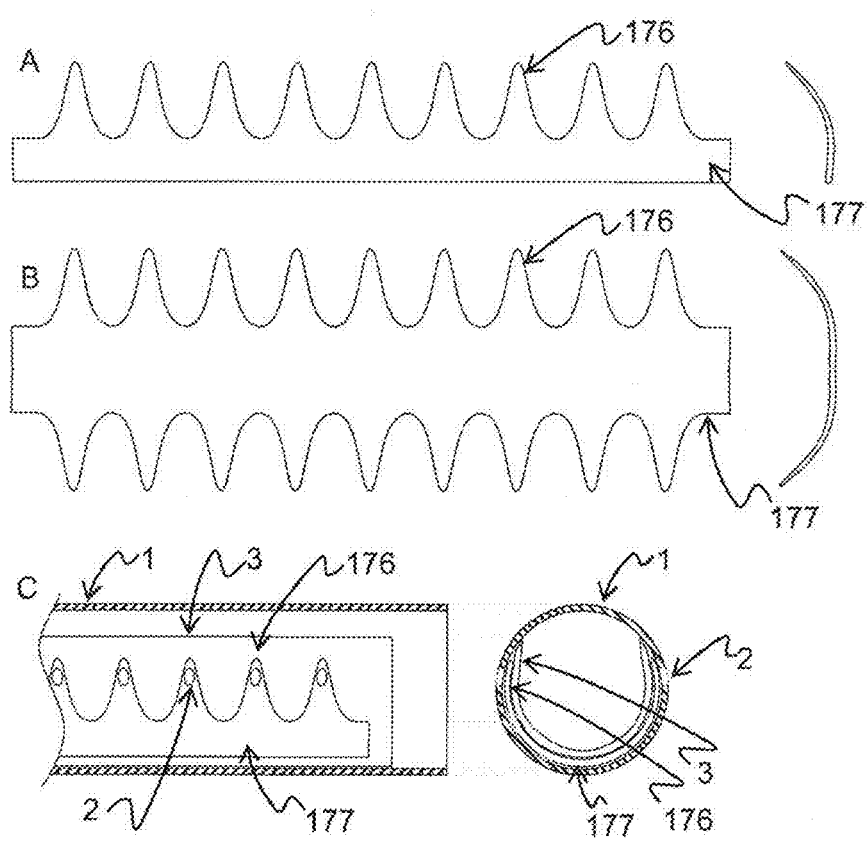

FIG. 85—A thin profile single piece ribbing element for reinforcing and reducing load on membrane near conduit openings.

View A—Ribbing for use in conduit with a single line row of openings. Left hand diagram is side view. Right hand side is end on view.

View B—Ribbing for use in conduit with a two rows of openings. Left hand diagram is side view. Right hand side is end on view.

View C—Conduit with ribbing and membrane in place. Left hand diagram is side view. Right hand side is end on view.

Figure 86:
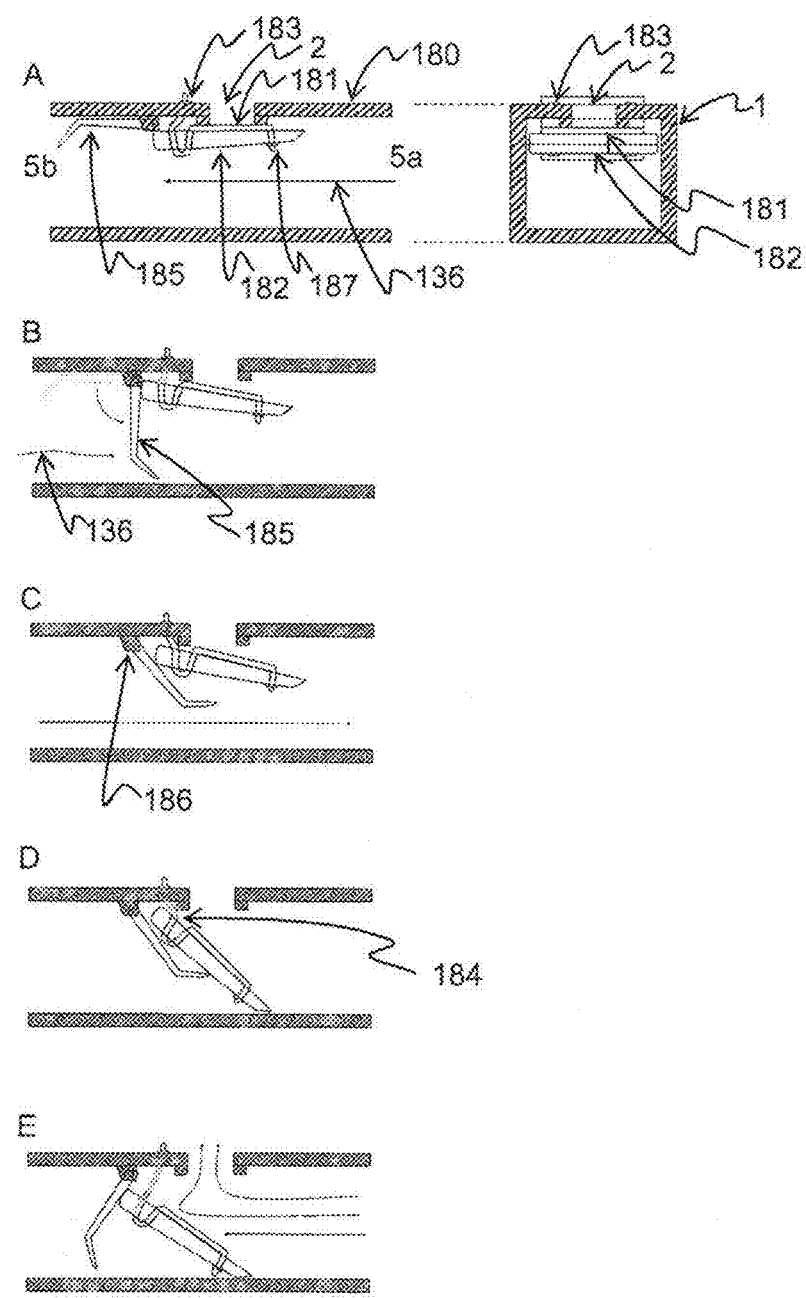

FIG. 86—A conduit inline membrane valve element utilizing a resilient membrane and rigid flap combination, producing a distribution system controllable merely by fluid flow conditions alone.

View A—Closed state, with membrane under stretch holding the membrane-flap combination covering the conduit opening, fluid able to flow freely through conduit. Left hand diagram is side view of short section of conduit. Right hand side is end on view.

View B—Side view of the action for resetting the valve, induced by a reverse flow in conduit. (auxiliary flap moves in response to reverse flow to unseat the membrane flap).

View C—Side view of completion of the reset action, with fluid flow continuing in the conduit and able to reset all other such membranes in the conduit.

View D—Side view of the open state of the valve following a reset action.

View E—Side view of flow in forward direction with fluid passing out of the conduit opening, while also tensioning the membrane and positioning the associated flap for subsequent closure following cessation of the fluid flow.

Figure 87:
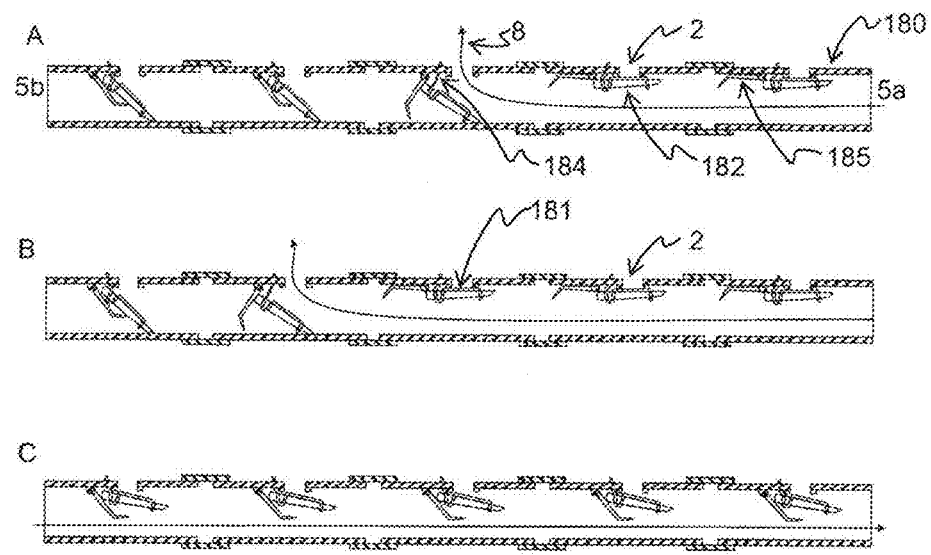

FIG. 87—Operation of a conduit system utilizing a plurality of inline valve elements described in FIG. 86, showing sequential operation and the reset process.

View A—First two membrane valve elements in the closed state, with flow being diverted from the third downstream opening, with flow being prevented from passing to the next downstream valve.

View B—Next phase in the sequence following on from view A, the fluid flow having been ceased and restarted allowing the previous valve to close, thereby exposing the next opening for fluid emission (simply cycling fluid flow from "on" to "off" to "on" moves emission to the next downstream opening).

View C—The reset process, whereby fluid flow from the opposite end (reverse flow), results in all valves being reset to the open state. (Fluid emission then occurs from the first upstream valve when fluid flow resumes in the forward direction).

FIG. 88—An enhancement to the PIG of FIG. 66, with a membrane returning element in the form of a spring wire.

Right hand diagram is an oblique view of PIG, with membrane returning wire spring elements, each protruding from the ends of the PIG body and extending longitudinally toward the opposite end of the PIG, but also outward toward a conduit wall (not shown), to provide a low contact surface to a membrane in providing a returning force to the membrane at the trailing end of the PIG as it moves longitudinally in a conduit to ensure that a prized membrane is again returned to its seated position against the conduit internal wall at the trailing end of the PIG.

Left hand diagram is end on section view of PIG taken at the center line, and showing the wire return spring elements.

FIG. 89—Illustration of alternative to FIG. 70, where a magnetic force of attraction acting in conjunction with a built in fulcrum in the leading edge separates the leading edge from the conduit wall.

Views A,B show different control states, where left hand diagrams are side views of conduit showing conduit walls, conduit openings/holes and membrane sections, and right hand diagrams are end on views of conduit showing conduit holes and membrane positions.

View A. shows the presence of an external magnet applying a force of attraction which is translated by a fulcrum in the leading edge acting against the conduit wall to urge the leading edge into the oncoming fluid flow.

View B. shows fluid momentum applying force to further move the membrane leading edge and subsequently all of the membrane section from the conduit wall exposing conduit openings and allowing fluid to flow from the conduit.

FIG. 90—Illustration of arrangement including conduit traversing apparatus with powered means to impart rotational momentum to fluid in order to manipulate conduit membrane without making physical contact with the membrane A conduit with membrane of type similar to FIG. 77, is able to be separated from the conduit wall to uncover openings and enable emission in response to rotational fluid momentum generated by autonomous conduit traversing apparatus with a powered motor driven rotating shaft with fins, such as a propeller, rotor or impeller, causing fluid rotation in its vicinity. Depending on relative flow rates, the rotor may achieve fluid rotation when unpowered or fixed to the apparatus.

FIG. 91—Illustration of relationships between conduit flow rates, emission flow and PIG velocity as mathematical equations in a conduit system employing a piston, plug or slug for propulsion A conduit with openings (openings not shown), membrane and PIG with membrane manipulator for uncovering openings, and sealable piston, plug or slug, produces emission flow 'Fe' from the conduit determined by the differential between inflow 'F1' and outflow 'F2' represented as equation 'Fe=F1−F2'. Additionally longitudinal PIG velocity 'v' is determined as 'v=F1/A', where 'A' is the conduit effective cross sectional area, also noting that inflow 'F1' and outflow 'F2' can be positive or negative values.

Figure 92:
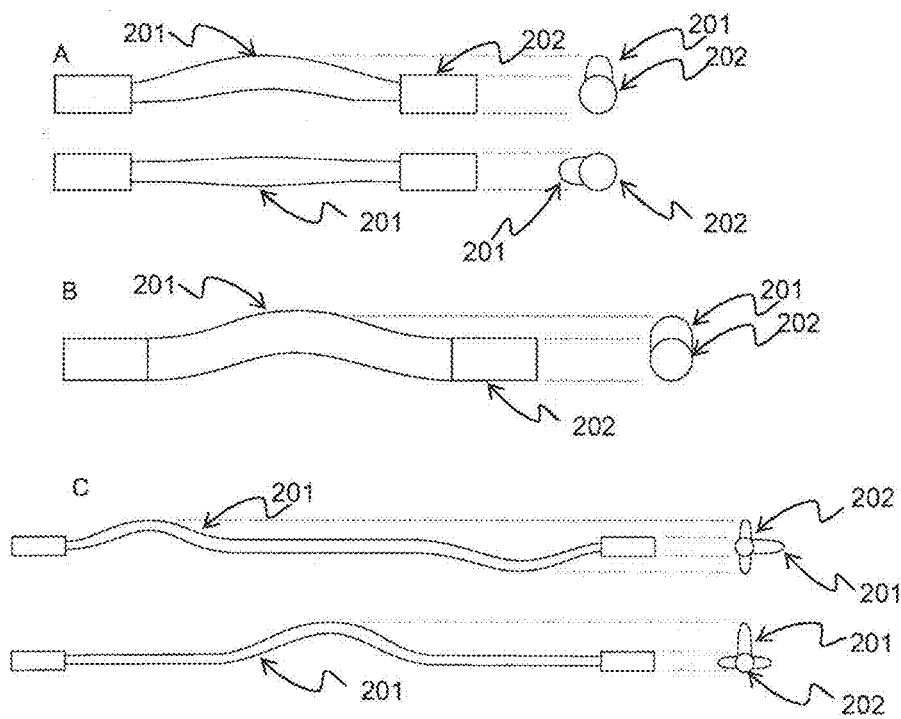

FIG. 92—Illustration of various shaping devices for traversing internal to a control tube or conduit for imparting a strategically shaped distortion effect to the control tube outer surface as the shaping device traverses internal to a control tube In each depiction, upper left is side-on view, and right hand side is the corresponding end on view. Low left is the top view, and right hand side is the corresponding end on view.

Diagram 'A' Top left depicts a simple shaping device with an arch shape in a single plane, and with piston/plug/slug at each end for sealing and receiving fluid pressure inside a conduit.

Diagram 'B' depicts a similar single plane arch where the shaping device including end plugs are a uniform thickness.

Diagram 'C' depicts a complex shaping device, with opposing arches on one plane to provide poise, and a single arch in an orthogonal plane for performing an actuation function.

Figure 93:
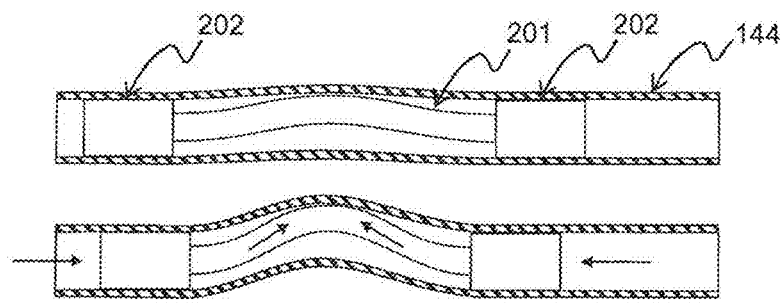

FIG. 93—Illustration of a shaping device or PIG with back pressure applied in the control tube to exacerbate the shape and thereby increase the distortion or shaping effect to the control tube or conduit The upper diagram shows the shaping device in a relaxed state with the control tube having little or no back pressure.

The lower diagram shows the shaping device experiencing pressure from both ends of the control tube against sealed piston plug or slug at each of the ends of the device, the device able to respond to an end to end compressive force by changing its shape such as by way of an increase in curvature and hence an increase in control tube distortion in the vicinity of the shaping device.

Figure 94:
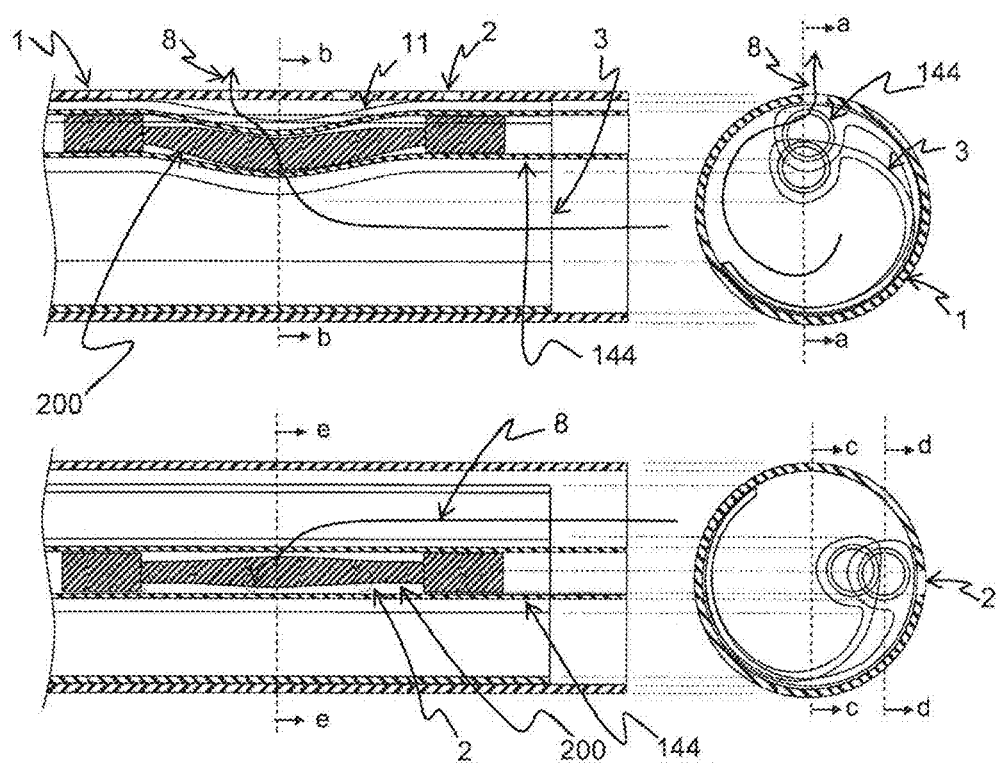

FIG. 94—Illustration of a conduit system comprising a conduit with openings and a membrane disposed internally against the conduit wall for covering the openings, the membrane having integral provision for a control tube to be attached or housed close and adjacent to a longitudinal edge, and a shaping device passing internal to the control tube able to be propelled longitudinally by separately applied fluid pressure in the control tube The upper left diagram is a side on cutaway view taken at 'aa', and shows a simple arched shaping device separating the membrane from the conduit wall and uncovering openings, the shaping device maintaining rotational poise as the rotation angle of least resistance. Upper right is the corresponding end section view taken at 'bb'.

The lower left diagram is a top view of conduit with positions cc and dd superimposed. Lower right is a cutaway view taken at 'ee'

Figure 95:
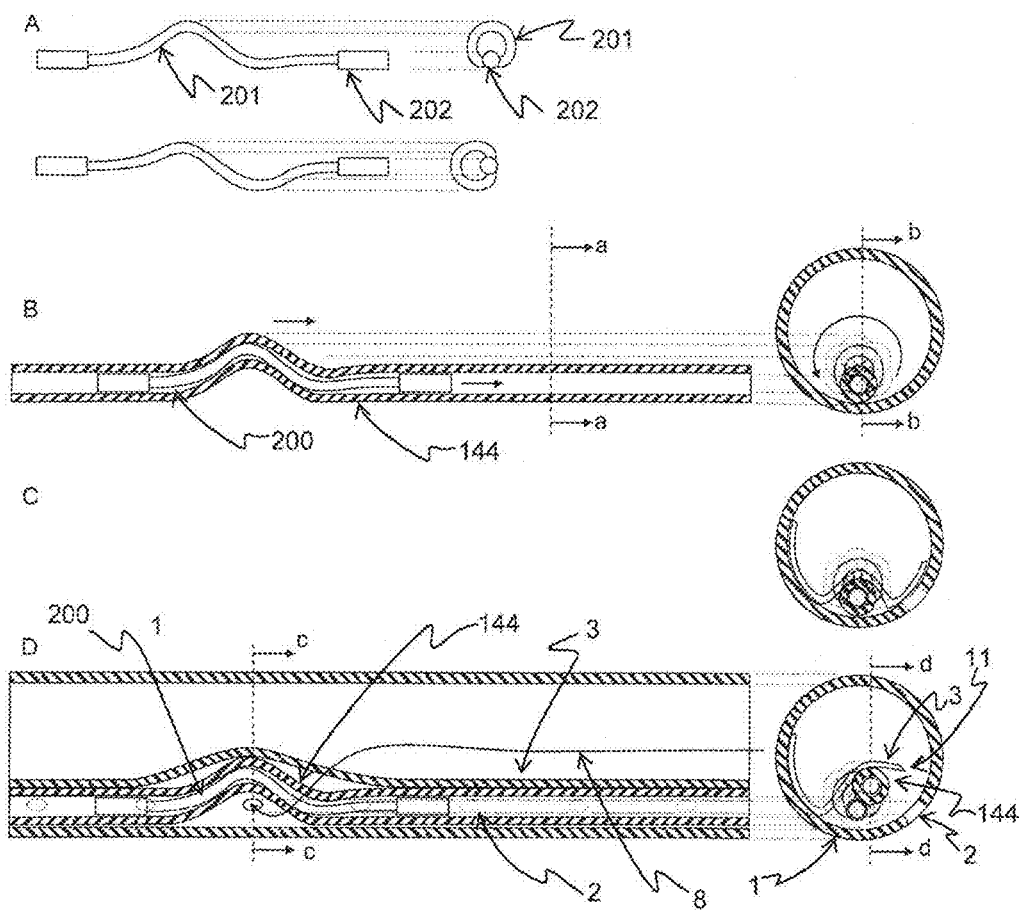

FIG. 95—Illustration of a conduit system utilizing a spiral shaping device in a control tube for performing a circular actuation function in manipulating a membrane from the conduit wall to uncover conduit openings.

Diagram 'A' is a side view of a spiral shaping device, the backbone being a spiral in the longitudinal direction, the spiral being offset such that entry and exit positions are at the base. Upper left is side-on view, and right hand side is the corresponding end on view. Low left is the top view, and right hand side is the corresponding end on view.

Diagram 'B' left depicts the shaping device producing a spiral shaped distortion in the control tube. Right hand diagram is end on view depicting the circular motion of a point on the control tube as the shaping devices passes through, the control tube resting under gravity on the base of the conduit.

Diagram 'C' shows end on view of control tube in conduit with a membrane disposed to the conduit overlaying the control tube and covering conduit openings.

Diagram 'D' left is a side view of conduit taken at 'dd' showing the presence of the shaping device, separating the membrane from the conduit wall at 'cc' and maintaining rotational poise against the base of the conduit. Right is end on section taken at 'cc'

Figure 96:
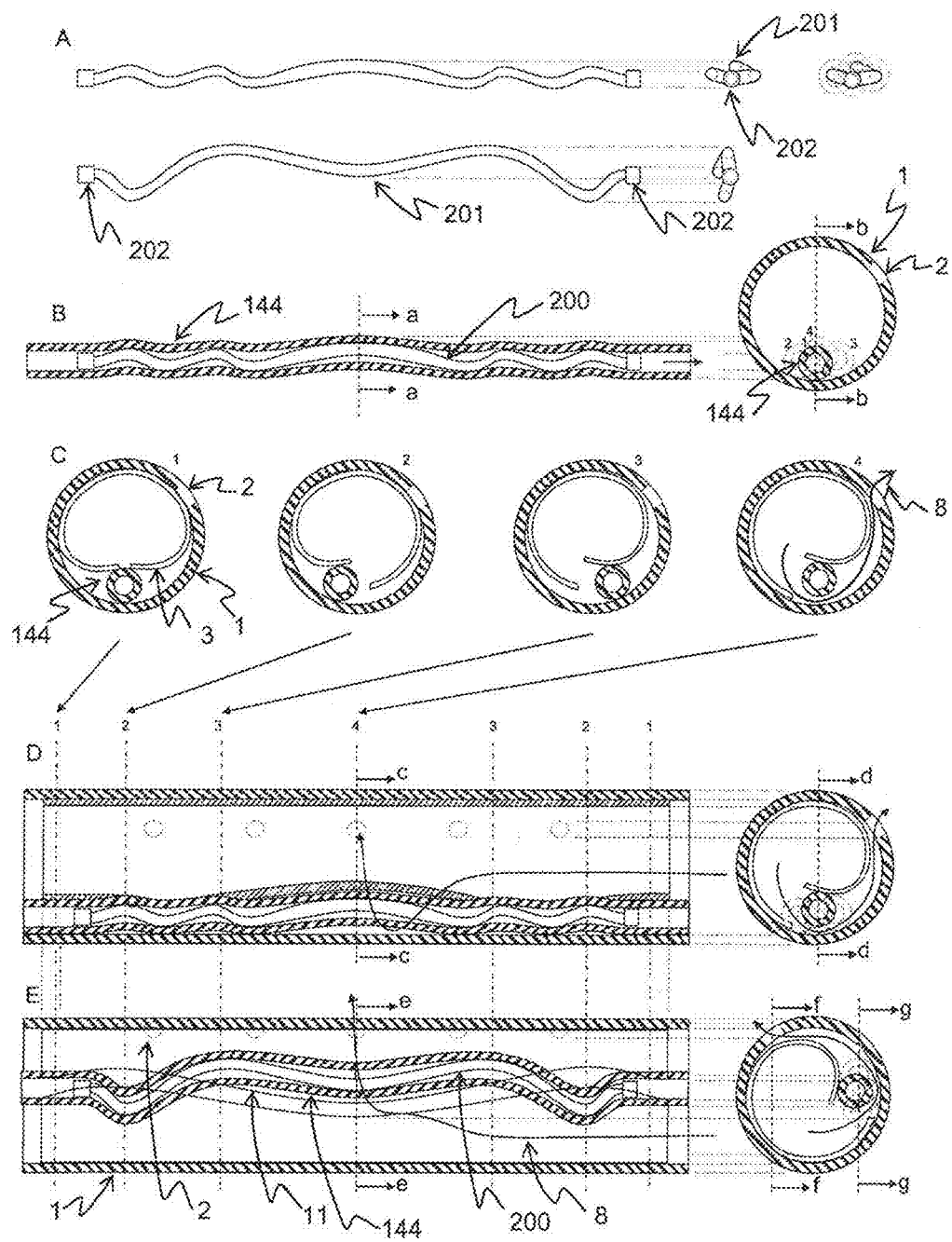

FIG. 96—Illustration of a conduit system utilizing a particular shaping device in a control tube for performing actuation in a motion of a strategic trajectory to manipulate a membrane from the conduit wall to uncover conduit openings.

Diagram 'A' is a side view of the profiled shaping device, the backbone being a series of sweeping snake like bends in the longitudinal direction. Upper left is side-on view, and right hand side is the corresponding end on view. Low left is the top view, and right hand side is the corresponding end on view.

Diagram 'B' left depicts the shaping device producing a snake-like profile shaped distortion in the control tube. Right hand diagram is end on view depicting the motion of a point on the control tube as the shaping devices passes through.

Diagram 'C' shows end on views of conduit and positions of control tube and membrane at major stages in the passage of the shaping device through the control tube; '1' control tube at rest and retained by membrane, '2' pushing under first side of membrane to create a counter poise, '3' pushing under second side of membrane establishing rotational counter poise, '4' separating the control tube and membrane from the conduit wall to create a fluid path to conduit holes.

Diagram 'D' left is a side view of conduit taken at 'dd' showing the presence of the shaping device, separating the membrane from the conduit wall at 'cc' and maintaining rotational poise against the base of the conduit. Right is end on section taken at 'cc'.

Diagram 'E' left is a top view of conduit taken at 'ff' and superimposed with view at 'gg', showing the presence of the shaping device, separating the membrane from the conduit wall at 'ee' and maintaining rotational poise against the base of the conduit. Right is end on section taken at 'ee'.

Figure 97:
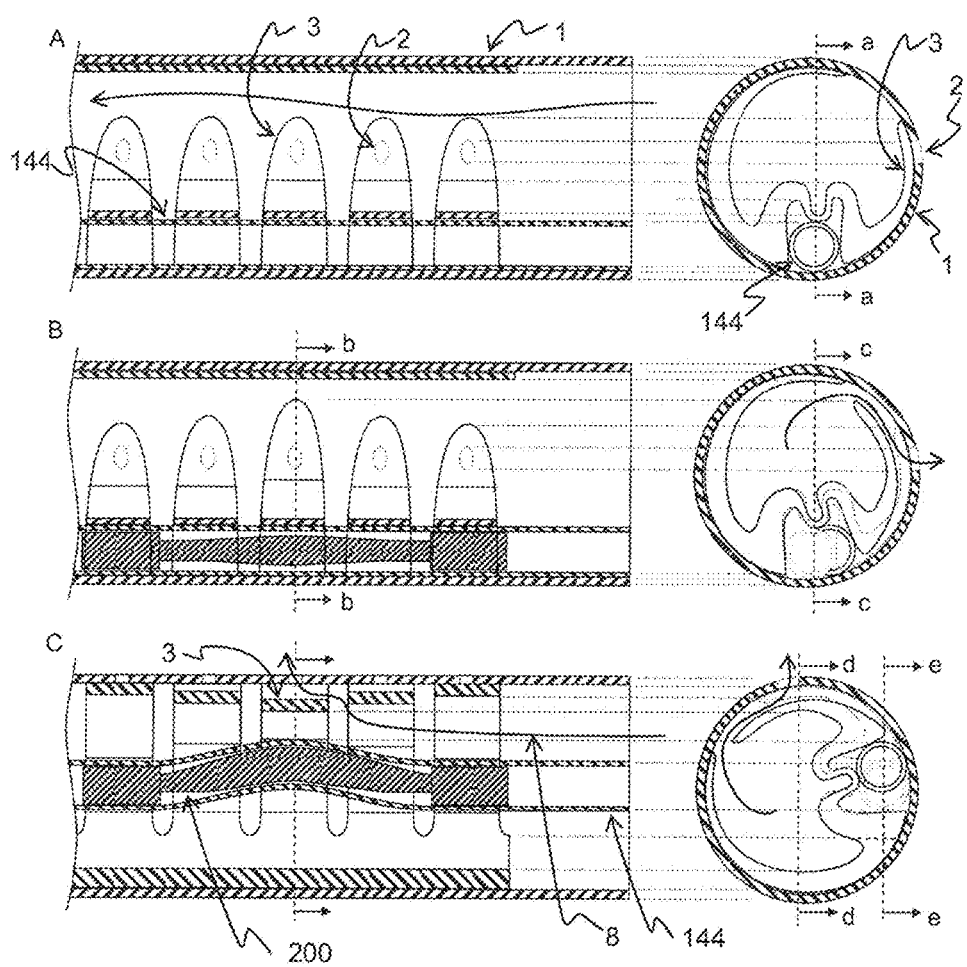

FIG. 97—Illustration of a conduit system utilizing a simple shaping device in a control tube for performing actuation in levering an effective hinged and sectioned membrane from the conduit wall to uncover conduit openings.

Figure 98:
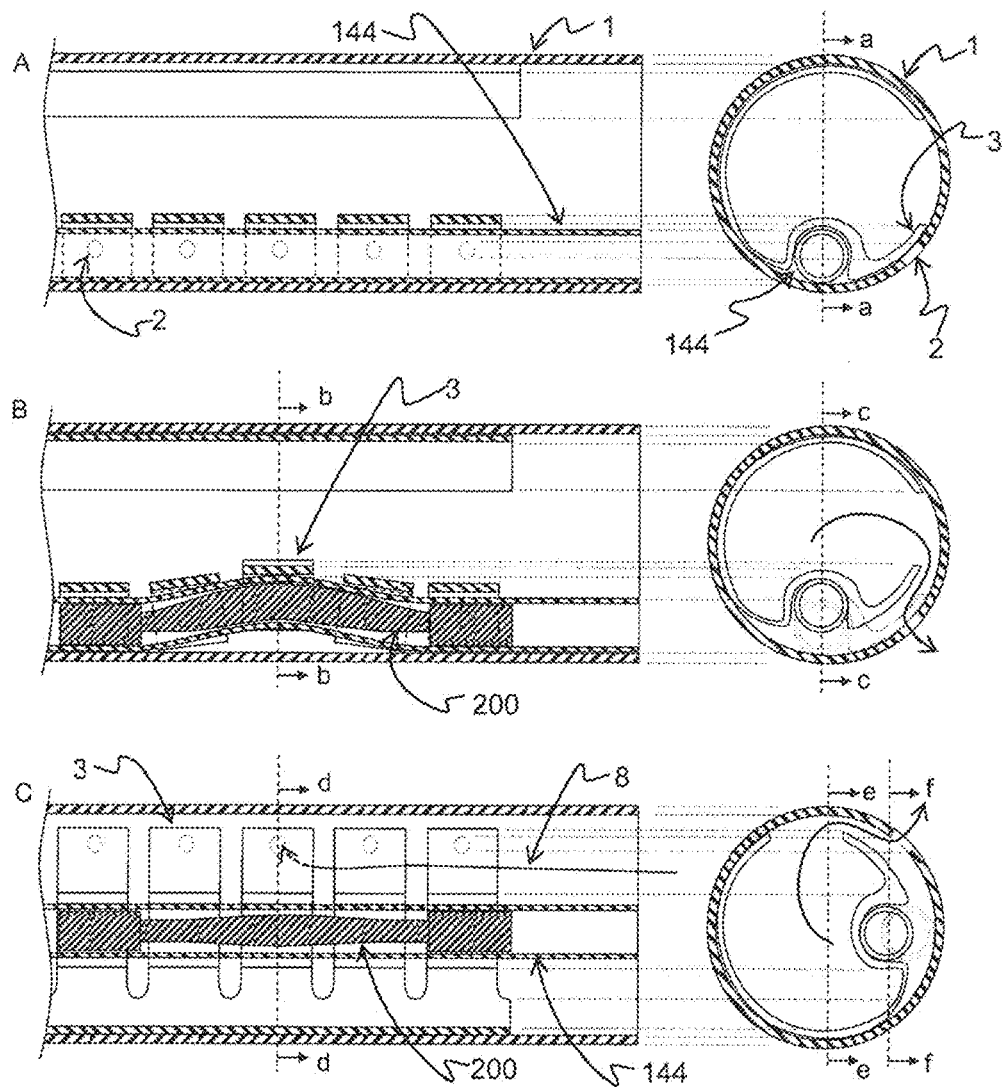

Diagram 'A', side view and corresponding end view of conduit cutaway section with shaping device absent and fluid being retained in the conduit Diagram '13', side view and corresponding end view of conduit cutaway section with shaping device present and fluid being emitted from the conduit Diagram 'C', top view and corresponding end view of conduit cutaway section with shaping device present and fluid being emitted from the conduit FIG. 98—Illustration of a conduit system utilizing a simple shaping device in a control tube for performing actuation in levering an effective hinged and sectioned membrane from the conduit wall to uncover conduit openings. Similar to FIG. 97, but with the shaping device directing force away from the conduit wall.

Figure 99:
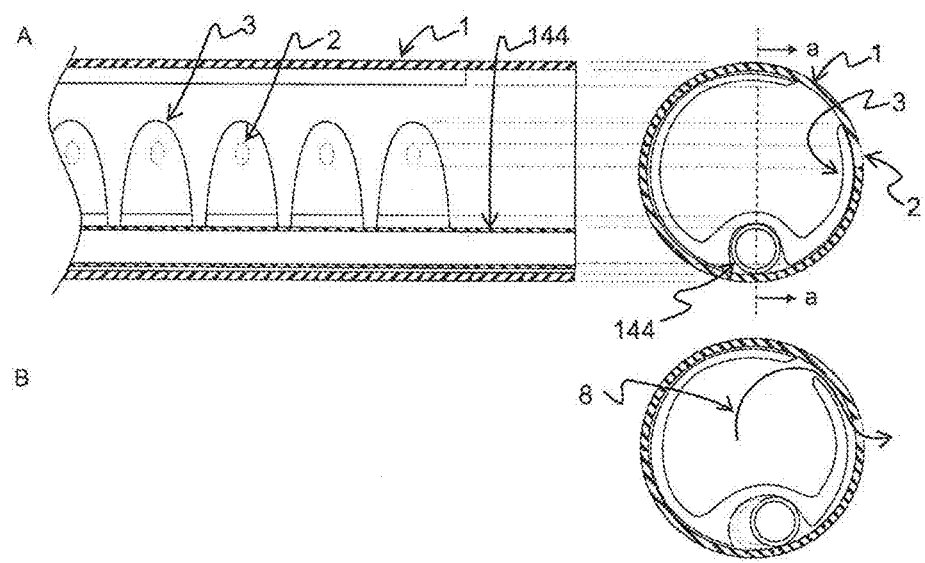
Figure 100:
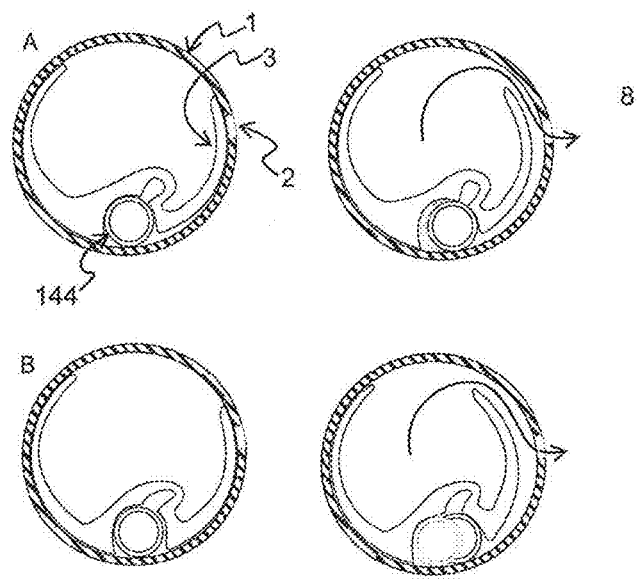

Diagram 'A', side view and corresponding end view of conduit cutaway section with shaping device absent and fluid being retained in the conduit Diagram '13', side view and corresponding end view of conduit cutaway section with shaping device present and fluid being emitted from the conduit Diagram 'C', top view and corresponding end view of conduit cutaway section with shaping device present and fluid being emitted from the conduit FIG. 99—Illustration of a conduit system as a variation to FIG. 97 with a simplified cross section Diagram 'A', side view and corresponding end view of conduit cutaway section with shaping device absent and fluid being retained in the conduit Diagram 'B', end view of conduit cutaway section with shaping device present and fluid being emitted from the conduit FIG. 100—Illustration of a conduit system as a variation to FIG. 97 where the effective hinge position is closer to the conduit openings for improved response to control tube distortion Diagram 'A'—left is end on view with membrane at rest covering conduit openings, right shows a distorted control tube producing expansion of the membrane groove causing the membrane side to rotate about an effective hinge axis and thereby separate from the conduit wall and allow fluid to escape via uncovered openings.

Diagram 'B'—As per diagram 'A' with a subtle variation in hinge formation

Figure 101:
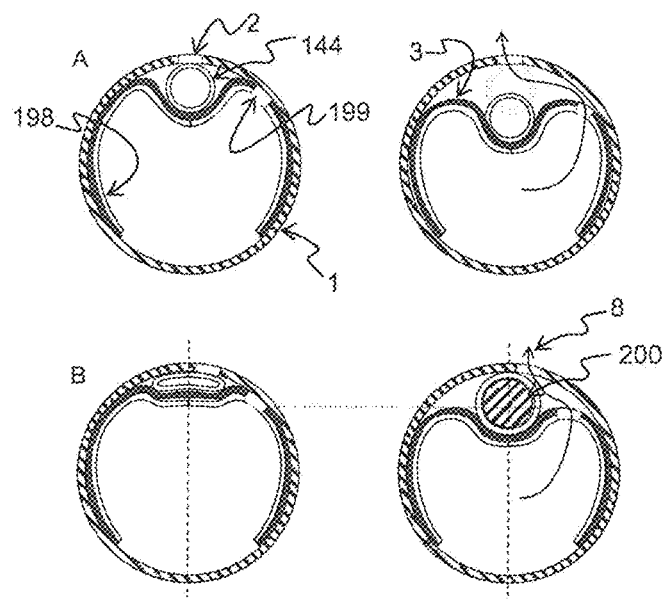

FIG. 101—Illustration of a conduit system utilizing a semi rigid symmetrical membrane former with spring like properties with built in shaped recess or groove for control tube, and membrane liner laminate the membrane including holes which are misaligned with openings in the conduit Diagram 'A'—left is cross section view of conduit with membrane former in relaxed state applying even pressure to the conduit via the membrane lining while also retaining the control tube in position. Right hand view is as per left view but with the membrane and former being separated from the conduit wall by the control tube in the presence of a simple arched shaping device not shown, the membrane being separated from the conduit wall in the region of the membrane holes, thereby providing a fluid path through the membrane into the separated region between the membrane and conduit wall where openings in the conduit are exposed allowing fluid to be released from the conduit.

Diagram 'B'—A similar topology to that of diagram 'A', but where the control tube is a soft material such as a woven fabric allowing it to compress and flatten in the absence or a reduction of fluid pressure, thereby covering conduit openings, while the membrane openings are also covered producing a double stage seal. In the presence of a shaping device such as a simple sphere or cylinder in the control tube, the shaping device dictates the outer surface of the control tube instead of being flattened or distorted against the conduit inner surface thereby uncovering openings in the conduit, while also separating the membrane from the conduit wall in the vicinity, and uncovering holes in the membrane to create a fluid path from the conduit interior to exterior. Fluid pressure in the control tube can be released to localize conduit emissions to only the vicinity of the shaping device, or increased to expand the control tube and produce emission from the entire conduit simultaneously.

Figure 102:
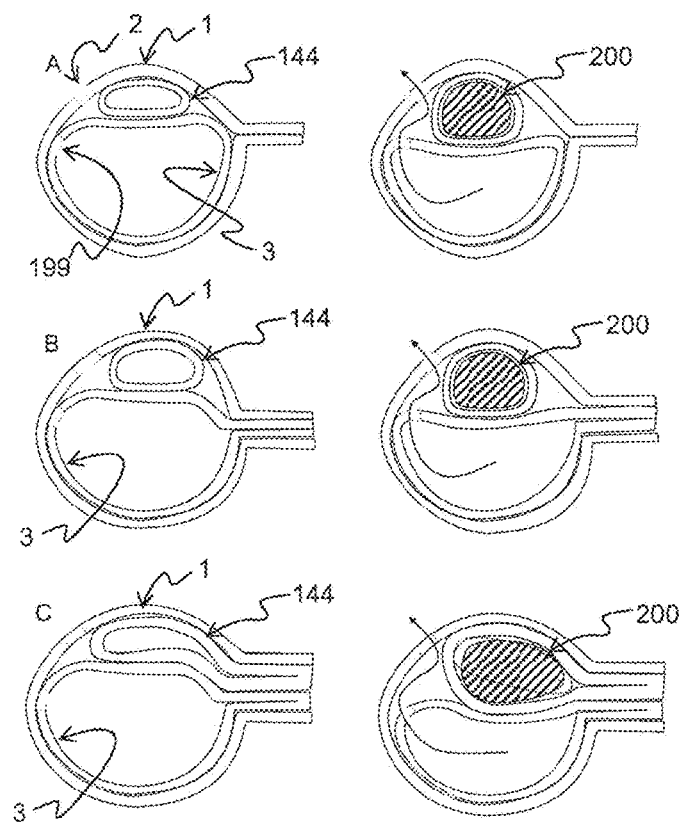

FIG. 102—Illustration of a conduit system being an extension and variation of FIG. 101 utilizing soft flexible materials, enabling a simple compression welding process to combine membrane, control tube and conduit along an external longitudinal seam Diagrams A, B, C—Left is cross sectional view of a conduit topology in absence of shaping device. Right is a corresponding diagram of in the presence of a shaping device in the control tube, distorting the control tube relative to its natural shape in the absence of the shaping device, to manipulate the membrane to uncover openings and allow fluid to escape.

Diagram A—A conduit formed as an outer sheath welded along a seam, encompassing two separate conduits, one acting as a control tube and the other acting as a membrane, both the membrane and sheath having misaligned holes.

Diagram B—As per diagram A but where the membrane is also melded in the seam joining the outer sheath as a conduit to ensure stable alignment of the membrane relative to the outer sheath.

Diagram C—As per diagram B but where the control tube is also melded in the seam joining the outer sheath as a conduit to ensure stable alignment the control tube, membrane and conduit.

Figure 103:
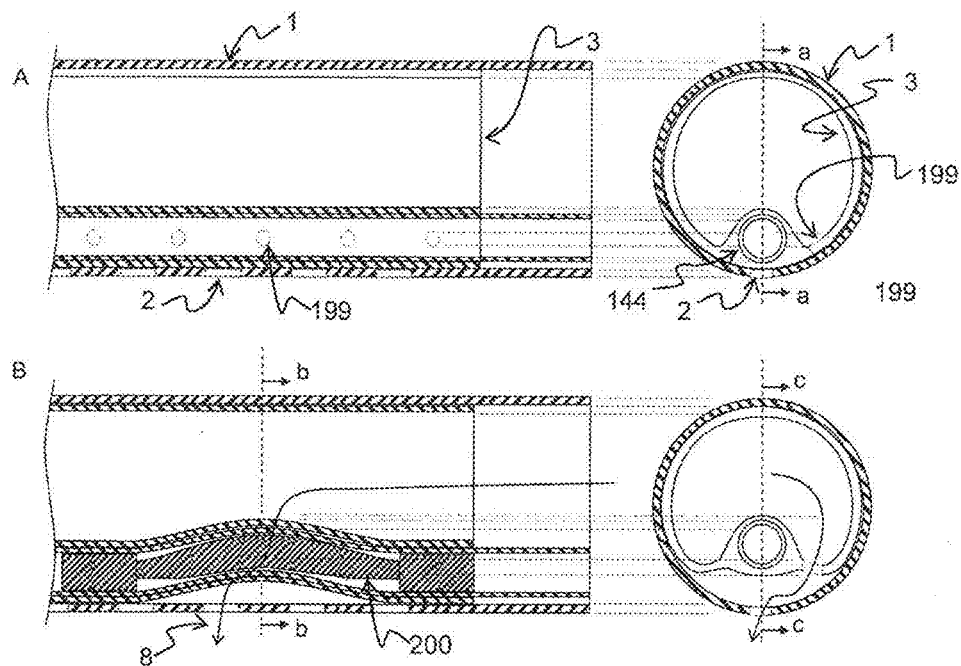

FIG. 103—Illustration of a conduit system with an internal membrane liner completely encompassing the conduit internal cross section, the liner including provision for housing or attachment of a control tube along its length, the liner having holes which are misaligned with conduit openings Diagram A—Left is a side view of conduit along 'aa'. Right is an end view of conduit showing a continuous membrane pressed against the conduit interior by internal fluid pressure, preventing fluid from exiting the membrane hole, and conduit hole.

Diagram B—Left is a side view of conduit along 'cc'. Right is a cross section of conduit taken at location bb FIG. 104—Illustration of a conduit system with a simple internal thin membrane liner completely encompassing the conduit internal cross section and having through holes or openings to expose the conduit wall, an internal dummy tube fixed in place immediately above conduit openings for protection and providing poise to an adjacent control tube between membrane and conduit interior Diagram A—Left is a side view of conduit along 'aa'. Right is an end view of conduit showing a continuous membrane pressed against the conduit interior by internal fluid pressure, preventing fluid from exiting the membrane and conduit holes.

Diagram B—Left is a side view of conduit along 'cc' and superimposed with section of control tube at 'dd'. Right is a cross section of conduit taken at location 'bb'.

Figure 105:
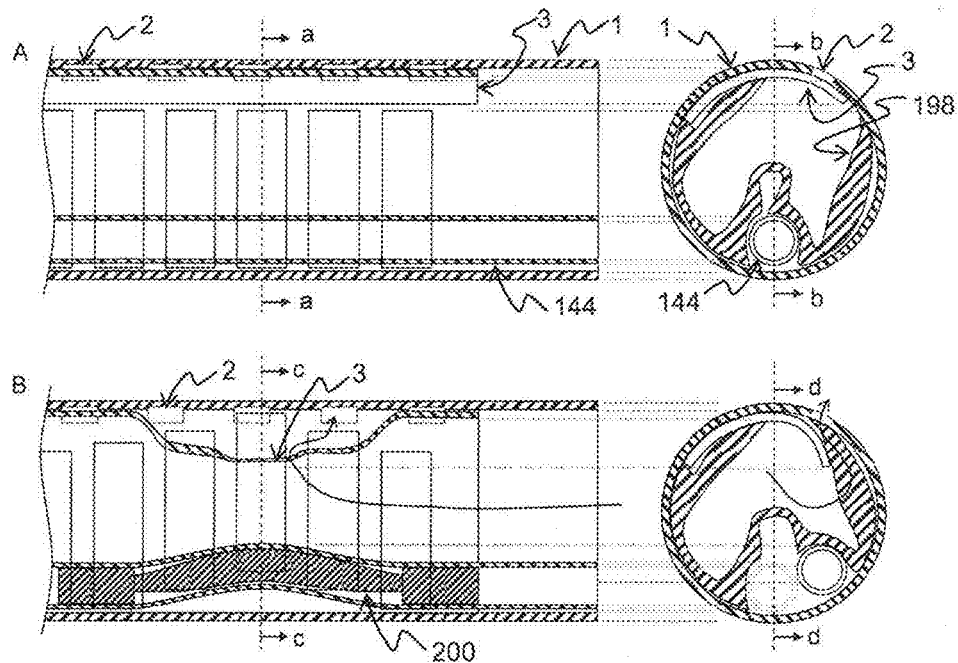

FIG. 105—Illustration of a conduit system where a shaping device in a control tube acts tangentially to produce a separating action within a membrane retaining former at one side of the conduit, causing rotation of a finger like protrusion around the conduit interior and under a narrow resilient membrane exposing conduit openings Diagram A—Left is a side section view of conduit along 'bb'. Right is a cross section view of conduit along 'aa' showing a continuous membrane pressed against the conduit interior by internal fluid pressure, preventing fluid from exiting conduit openings.

Diagram B—Left is a side section view of conduit along 'dd' showing the presence of a shaping device in the control tube. Right is a cross section of conduit taken at location cc showing a finger like protrusion penetrating under the membrane uncovering conduit openings and allowing fluid to escape.

Figure 106:
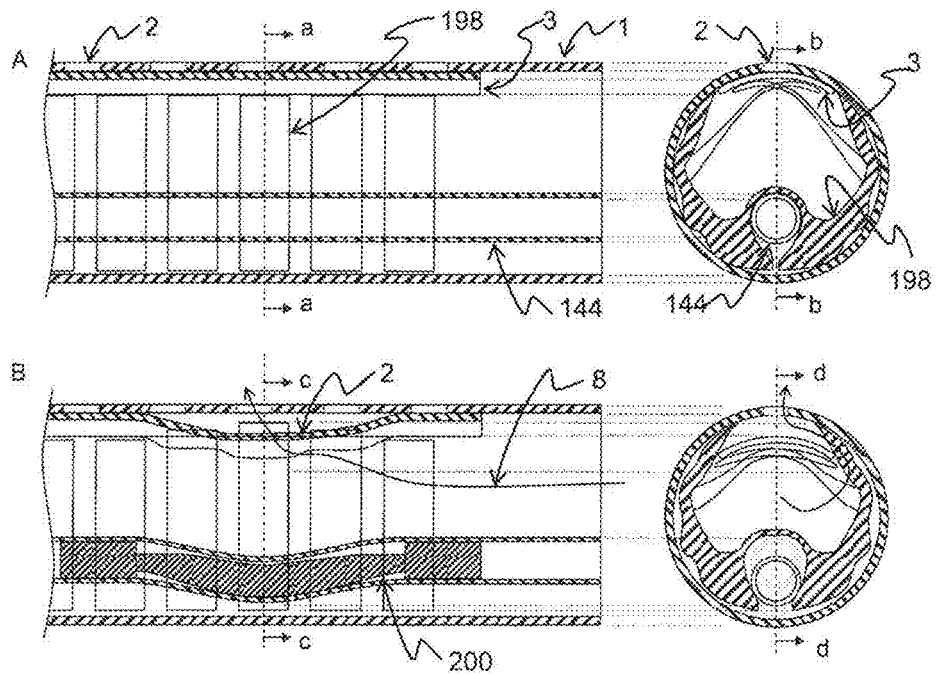

FIG. 106—Illustration of a conduit system where a shaping device in a control tube acts radially in producing a separating action within a membrane retaining former at one side of the conduit, causing symmetric rotation of opposing finger like protrusions around both sides of the conduit interior and under a narrow resilient membrane exposing conduit openings Diagram A—Left is a side section view of conduit along 'bb'. Right is a cross section view of conduit along 'aa' showing a continuous membrane pressed against the conduit interior by retaining members and internal fluid pressure, preventing fluid from exiting conduit openings.

Diagram B—Left is a side section view of conduit along 'dd' showing the presence of a shaping device in the control tube. Right is a cross section of conduit taken at location cc showing a finger like protrusions penetrating under the membrane uncovering conduit openings and allowing fluid to escape.

Figure 107:
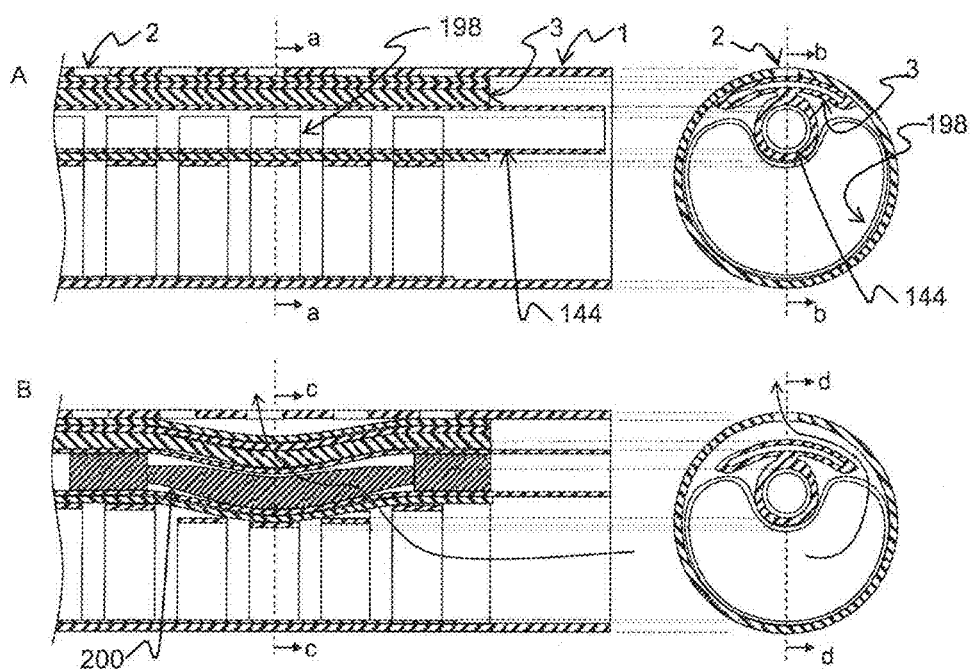

FIG. 107—Illustration of a conduit system where control tube is integral to a narrow continuous membrane with narrowed edges for enhanced sealing, the membrane retained against the conduit wall by a retaining former acting as a spring, a shaping device in the control tube acts radially to directly prize the membrane from the conduit wall to expose conduit openings Note: The formation of the spring retainer can be adapted to encourage the membrane to also incur rotation in response to the presence of a shaping device Diagram A—Left is a side section view of conduit along 'bb'. Right is a cross section view of conduit along 'aa' showing a continuous membrane pressed against the conduit interior by retaining spring former, preventing fluid being emitted from conduit openings.

Diagram B—Left is a side section view of conduit along 'dd' showing the presence of a shaping device in the control tube. Right is a cross section of conduit taken at location cc showing the direct action of the shaping device in separating the membrane from conduit wall uncovering openings to allowing fluid to escape.

Figure 108:
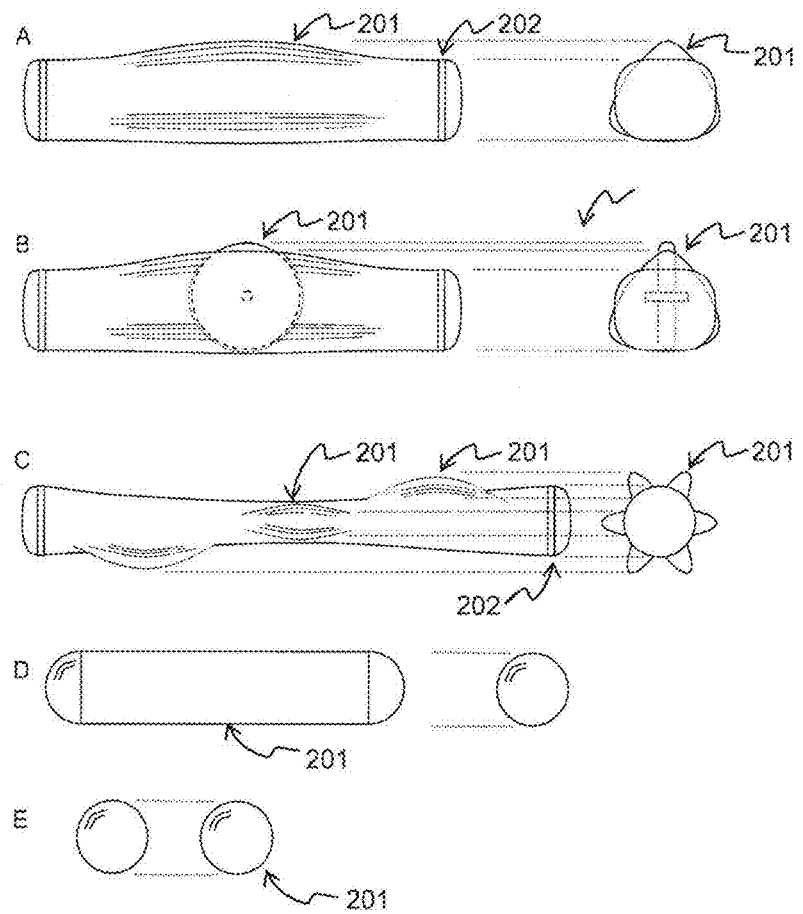

FIG. 108—Illustration of various shaping devices for traversing internal to a control tube and producing distortion in the cross section of the outer surface of the control tube the communication from which can be utilized in performing actuation functions Diagrams A, B, C, D—Left is side view, right is corresponding end view Diagram A—An elongated shaping device with rounded rectangular ends for sealing inside a flexible control tube, the base and sides being substantially flat to aid in maintaining rotational poise such as for use in a suitable guide channel, and the middle having a smooth outward protrusion for communicating to an actuated member via the control tube outer surface, the middle area being correspondingly narrowed to not exceed circumference limitations in the control tube.

Diagram B—An enhancement to that of diagram 'A' in which a wheel with its axis perpendicular to the longitudinal direction is positioned to provide its outer rolling surface as an extension to the outward protrusion to reduce friction and propensity for damage in encountering resistance from the control tube and actuated communicating members.

Diagram C—An enhancement to that of diagram 'A' in which the smooth outward protrusion emanating from the elongated body perpendicular to the longitudinal axis is repeated at separate longitudinal positions and in each position radiating from the center at a different rotational angle, enabling a member in communication with the outside surface of the control tube to receive actuation regardless of the rotational orientation of shaping device in the control tube.

Diagram D—A simple elongated circular cylindrical shaping device, for use in conduit which is not naturally circular in cross section, whereby the presence of the shaping device expands the control tube in at least one dimension its presence ensuring a member in communication with the control tube exterior always receives actuation. The elongated circular cylinder can also be used in a thin walled lay-flat type conduit or control tube, where fluid pressure being released from the control tube exposes the distortion of the shaping device leaving only members in communication with the control tube in its vicinity in an actuated state.

Diagram E—A spherical shaping device being a simplified variation of diagram 'D'.

Figure 109:
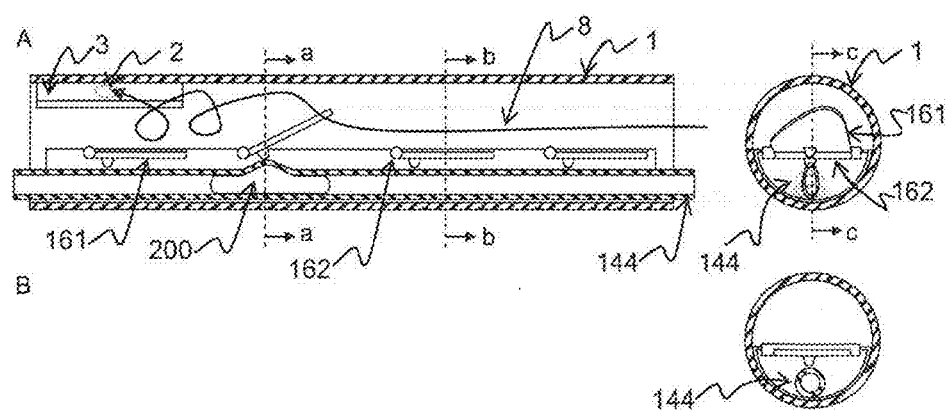

FIG. 109—Illustration of a conduit system of the type such as in FIGS. 76-84, where the control tube transporting a magnetic PIG is instead replaced with a control tube for transporting a shaping device, the control tube disposed internal to the conduit and positioned for its outer surface to be in communication with hinged flaps/fins such that they are deployed in the presence of a shaping device Diagram A—Left, is side view of conduit system along 'cc' where a shaping device in an internal control tube acts directly in deploying flaps/fins to divert fluid flow around the conduit to in turn interact with an inward protruding member(s) or lip(s) of the membrane to separate it from the conduit wall, uncovering conduit openings and allowing fluid to emitted. Right is end on view taken at 'aa'.

Diagram B—Right is end on view taken at 'bb'

Figure 110:
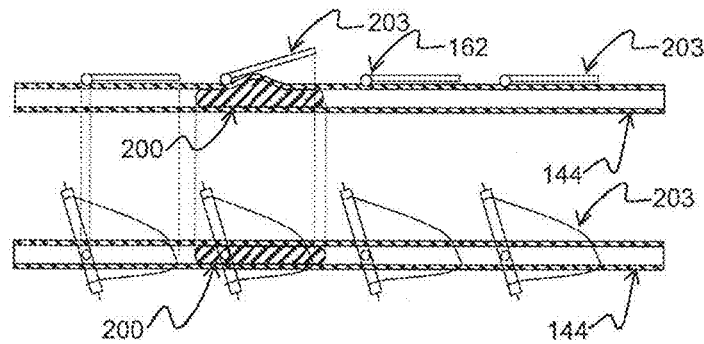

FIG. 110—Illustration of a shaping device in a control tube with communication to actuated members arranged to respond to differential distortion of the control tube Upper diagram is a side view depiction of a control tube and actuated members attached pivotally to the control tube.

Lower diagram is a corresponding top view.

Figure 111:
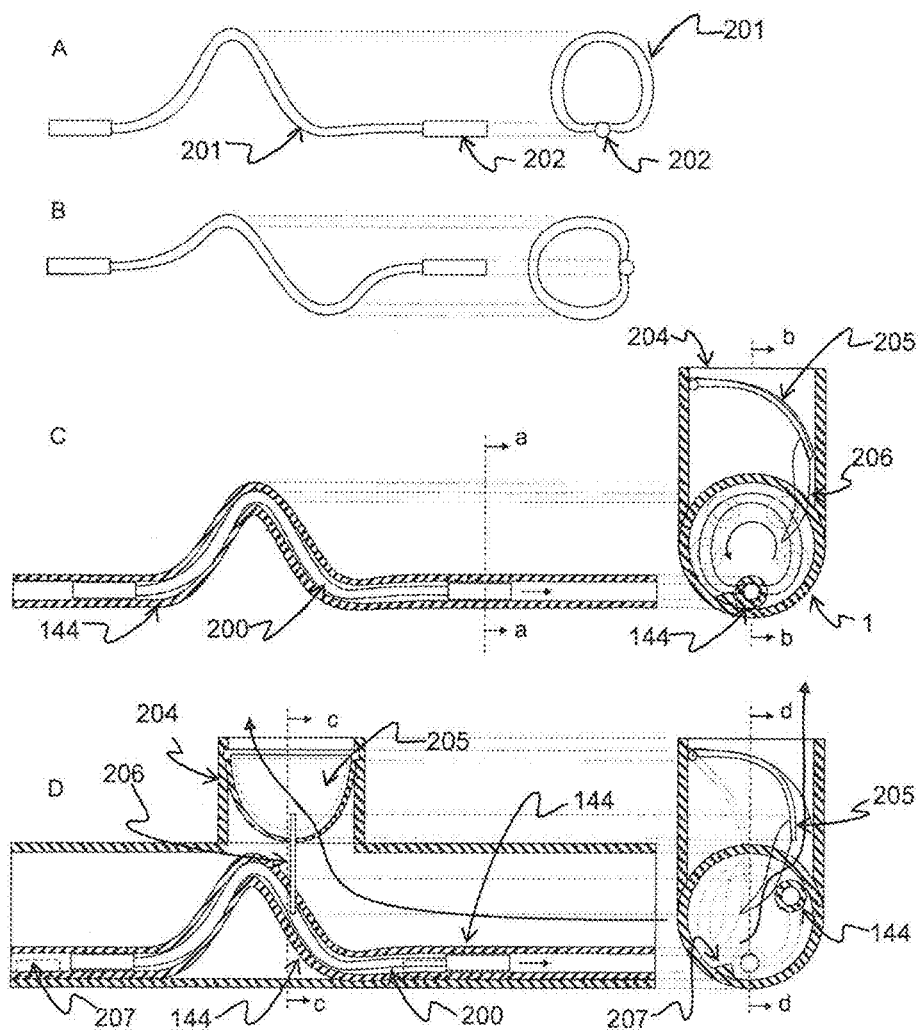

FIG. 111—Illustration of a control tube and shaping device performing the function of actuating an inwardly opening flap valve in a "pipe and riser" type irrigation system.

Diagram A—Left is a side view of a shaping device in the form of an offset spiral for traversing internal to a control tube and producing a circular motion to the outer surface of any point of a the control tube as it moves past a particular location. Right is the corresponding end view.

Diagram B—Left is a top view of the shaping device of diagram 'A'. Right is the corresponding end view.

Diagram C—Left is a side view of the shaping device of diagram 'A' present in a control tube. Right is end view taken along section line 'aa' superimposed with 'cc' depicting the control tube motion within a main fluid delivery conduit, with an off-take and having disposed within the off-take a hinged inwardly acting flap valve with communication member protruding into the path of the control tube for imparting actuation to the control valve. The control valve shown in the closed state.

Diagram D—Left is a side view of the conduit system taken along section line 'dd', with the valve in the process of transitioning from closed to open in response to movement of the shaping device into the vicinity. Right, is an end view taken along section line 'cc', showing the valve flap being peeled open by the control tube acting against the communication member.

Figure 112:
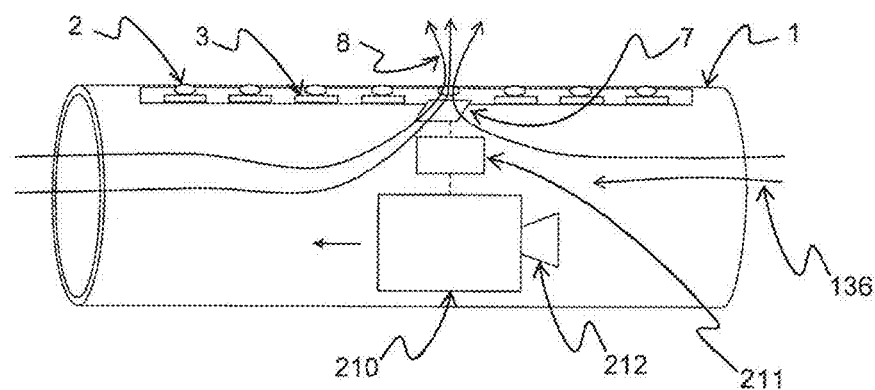
Figure 113:
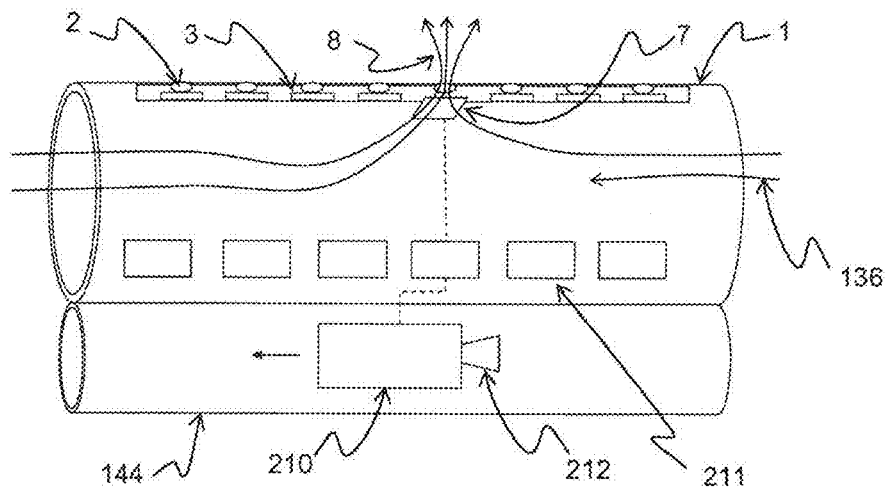
Figure 114:
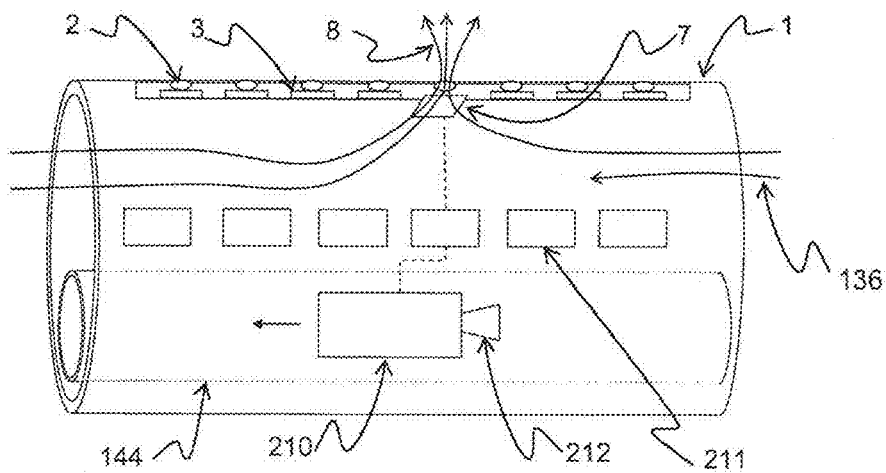

FIG. 112—Illustration of overview of fluid distribution system comprising conduit with openings, membrane for covering of openings, deflector for manipulating membrane, activator which is movable in the conduit with propulsion and control, the activator for communicating via deflector to manipulate membrane and uncover openings for fluid to be emitted from the conduit in relative vicinity.

FIG. 113—Illustration of overview of fluid distribution system comprising conduit with openings, membrane for covering of openings, deflector(s) for manipulating membrane, a control tube external to the conduit, activator which is movable in the control tube with propulsion and control, the activator communicating via deflector to manipulate membrane and uncover openings for fluid to be emitted from the conduit in relative vicinity.

FIG. 114—Illustration of overview of fluid distribution system comprising conduit with openings, membrane for covering of openings, deflector(s) for manipulating membrane, a control tube internal to the conduit, activator which is movable in the control tube with propulsion and control, the activator communicating via deflector to manipulate membrane and uncover openings for fluid to be emitted from the conduit in relative vicinity.

DESCRIPTION OF EMBODIMENTS

It should be noted in the following description that like or the same reference numerals in different embodiments denote the same or similar features.

In the general structure of the invention as shown in FIGS. 112, 113 and 114 there is shown a general outline of preferred embodiments of the fluid distribution system of the invention for selectively distributing fluid from multiple locations.

In particular in FIG. 112 there is a fluid distribution system for selectively distributing fluid from multiple locations, the system including a conduit arrangement comprising: an enclosed elongated conduit having a conduit side wall with an internal perimeter for carrying fluid along the conduit side wall; a plurality of openings along the length of the conduit side wall of the conduit for allowing escape of the fluid; and at least one closure means for selectively opening and/or closing a plurality of groups of one or more of the plurality of openings along the length of the conduit side wall of the conduit for allowing selective escape of the fluid; wherein the at least one closure means prevents escape of fluid until manipulated between a closed and an open relative position to uncover a pathway from which fluid could escape the conduit from the at least one of said openings in the conduit side wall. It further includes a membrane which forms the closure means over individual openings or group of related openings and a deflector of the membrane which has an effect to physically alter openings between an open and closed arrangement. It still further includes an activator for activation of closure means where the activator initiates or activates the closure means to undertake selective opening or closing of respective ones of the closure means to uncover a pathway for fluid to escape from the conduit through one or more of the plurality of groups of one or more of the plurality of openings along the length of the conduit side wall.

In particular FIG. 112 is an overview of fluid distribution system comprising conduit with openings, membrane for covering of openings, deflector for manipulating membrane, activator which is movable in the conduit with propulsion and control, the activator for communicating via deflector to manipulate membrane and uncover openings for fluid to be emitted from the conduit in relative vicinity.

FIG. 113 has the control tube external to the conduit, activator which is movable in the control tube with propulsion and control, the activator communicating via deflector to manipulate membrane and uncover openings for fluid to be emitted from the conduit in relative vicinity.

FIG. 114 has a control tube internal to the conduit, activator which is movable in the control tube with propulsion and control, the activator communicating via deflector to manipulate membrane and uncover openings for fluid to be emitted from the conduit in relative vicinity.

Control of units of the fluid distribution system can allow for selectively distributing fluid from particular locations. In particular control over fluid distribution system for selectively distributing fluid from multiple locations to provide a sweep action from single outlet or group of outlets or over multiple of the single outlets or multiple of the groups of outlets.

With reference to the drawings, an assembly comprising a conduit 1 of FIGS. 1-22 with a first end 5*a*, and second end 5*b*, for transmitting or receiving fluid, having a plurality of openings along its length 2 for emitting fluid, and a membrane 3 disposed inside the conduit for covering said openings to normally restrict the exit of fluid from the conduit, and carriage apparatus disposed inside the conduit referred from here on as an enhanced form of Pipe Inspection Gauge (PIG) 4 of FIGS. 23-34, movable along the length of the conduit is able to manipulate the membrane to selectively uncover openings in the wall of the conduit.

The PIG apparatus comprising one or more finger-like protrusions 6 for selectively applying force to a particular location or region of the conduit to displace the membrane from the conduit wall 7, and allow fluid to flow out through one or more conduit openings 8, the membrane resilient material able to stretch longitudinally 9 (FIG. 2) in response to the longitudinal edge 11 being displaced away from the conduit wall 7 in a localized region of the conduit, allowing the remainder of the membrane portions not receiving an interference force to remain substantially seated against the conduit wall 10 (FIG. 2) and covering the conduit emitter holes or openings, restricting the release of fluid from the conduit in these portions.

The system includes a conduit arrangement which interacts with a deflector to uncover a pathway for fluid to escape from the at least one of said openings in the conduit side wall. The conduit arrangement has an enclosed elongated conduit having an internal perimeter for carrying fluid, and a plurality of openings along the length of the conduit side wall of the conduit for allowing escape of the fluid.

A continuous membrane element is attached discontinuously to the conduit internal perimeter around at least one of said plurality of openings thereby having two longitudinal edges in the longitudinal sense of the conduit. The edges are devoid of permanent attachment means to the conduit along a longitudinal length spanning in the longitudinal direction of the conduit at least one opening in the side wall of said conduit.

Thereby a deflector can manipulate one longitudinal side of the membrane to move away from the internal perimeter of the conduit wall to uncover a pathway for fluid to escape from the at least one of said openings in the conduit side wall. Wherein the membrane prevents escape of fluid until manipulated to uncover a pathway from which fluid could escape the conduit from the at least one of said openings in the conduit side wall.

The system can include control of the deflector wherein the apparatus has disposed elements influencing the passage of fluid through the conduit wall with a member attached and able to communicate with repeating irregularities along the conduit, adapted to producing a modulating movement to said elements in response encountering irregularities as the apparatus moves longitudinally, such that an emission plume from the conduit produces a repeatedly changing characteristic as the apparatus moves.

General Characteristics

It can be seen that the embodiments of the invention comprise one or more of the characteristics of:

a. Conduit arrangement having a fluid flow between conduit side walls
   i. Individual openings that allow fluid flow independently of other openings;
   ii. Related openings that operate together in unison or in sequence;
b. Closure Means
   i. Membrane shape and connection which forms a closure over individual openings or group of related openings;
   ii. Switch means which forms a mechanical flip flop to switch between covering
   iii. Mechanisms which have an effect on openings to physically alter openings between an open and closed arrangement;
c. Activator
   i. Direct or indirect activation of closure means where the activator initiates or activates the closure means with a direct action or in an indirect manner through an intermediary mechanism or electrical or magnetic connection;
   ii. Activator relatively located to closure means, or movable to be moved adjacent to each one or each group of closure means or distantly located from closure means such at an end of the conduit to activate closure means from a distance.
d. Deflector which manipulates the at least one closure means to uncover a pathway for fluid to escape from the conduit through one or more of the plurality of groups of one or more of the plurality of openings along the length of the conduit side wall of the conduit and having types of:
   i. force deflector for transfer of an electrical, magnetic or pressure wave signal or force for effecting manipulation or deflection of closure means.
   ii. Physical deflector for physical contact within conduit such as PIG for transport within conduit;
   iii. Fluid pressure wave for physical activation to deflector to deflect or manipulate closure means;
   iv. Physical deflector for physical contact within conduit such as a shaping device which shapes conduit and deflecting membrane to open closure means and with the shaping device transportable down the conduit to form a deflecting shape;
   v. Physical deflector such as a pivoting or bendable shaping at fixed location for redirecting of fluid momentum
   vi. Physical deflector for indirect contact within conduit via deflected fluid momentum, such as a compliant shaping at fixed location within conduit.
e. Propulsion means for propelling deflector or activator along the conduit to manipulate or deflect the at least one closure means by means of:
   i. Fluid flow
   ii. Physical drive such as connecting wires
   iii. Secondary element such as Magnetic PIG
f. Fluid Dispersal means for dispersing the fluid out of an open individual opening or group of openings in a defined or definable effect, which can be of the types of:
   i. Relative interaction of activator, openings and deflector providing resultant effect;
   ii. Individual interaction with opening providing active effect.
g. Control of units of fluid distribution system for selectively distributing fluid from particular locations.
   i. Control of activator
   ii. Control of deflector
   iii. Control of propulsion means;
   iv. Control of Fluid Dispersal means
   v. Simultaneous control of a plurality of individual units with single means.
h. Control over fluid distribution system for selectively distributing fluid from multiple locations.
   i. Providing a sweep action from single outlet or group of outlets
   ii. Providing a sweep action over multiple outlets or group of outlets It should be understood that each feature or sub-feature are not considered to be equivalent or obvious variations but have been separately explored in various directions to provide multiple different and separate novel combinations. Each combination must therefore been understood in its particular effectiveness and novelty and uniqueness.

Four of the primary embodiments are disclosed but various embodiments are disclosed in the drawings and described also hereinafter.

First Embodiment

Referring to FIGS. 4, 7, and 23 and 24, there is shown an important first preferred type of embodiment in which there is a fluid distribution system for selectively distributing fluid from multiple locations, the system including:
   a. a conduit arrangement comprises an enclosed elongated conduit having an internal perimeter for carrying fluid, and a plurality of openings along the length of the conduit side wall of the conduit for allowing escape of the fluid;
   b. at least one membrane element attached discontinuously to the conduit internal perimeter around at least one of said plurality of openings thereby having two longitudinal edges in the longitudinal sense of the conduit and devoid of permanent attachment means to the conduit along a longitudinal length spanning in the longitudinal direction of the conduit at least one opening in the side wall of said conduit;
   c. a deflector which manipulates the at least one longitudinal side of the membrane to move away from the internal perimeter of the conduit wall to uncover a pathway for fluid to escape from the at least one of said openings in the conduit side wall;
wherein the membrane prevents escape of fluid until manipulated to uncover a pathway from which fluid could escape the conduit from the at least one of said openings in the conduit side wall.

This first embodiment has the deflector in the form of a movable PIG apparatus 4 shown in FIG. 23, which travels down the conduit.

The PIG has a first and second end for descriptive purposes, the first end being closest to the first end of the conduit 5a in which it can reside, and the second end being closest to the second end of the conduit 5b, the body comprising a backbone in the form of a semi rigid rod 30, with a first and second end, the backbone aligned such that the first end is the first end of the body and the second end of the backbone rod is the second end of the body, the backbone rod being substantially smaller than the cross section of the conduit, and substantially longer than the width of cross section of the conduit;

A locating means holds the backbone at a fixed location within the conduit cross section by way of guide prongs or loops 31 radiating from the backbone rod to the conduit wall from at least three angular positions at the first end, and a piston, (plug or slug) 32 disposed at the second end of the rod, sealable and slidable against the internal walls of the conduit 1;

A membrane engaging means, as a shaped protrusion 6 emanating from the backbone rod upward as drawn in FIG. 23, toward the internal wall of said conduit, and then protruding separately left and right around both sides of the conduit cross section, each protrusion wrapping partly around the internal perimeter of the cross section of the conduit in a finger-like manner for penetrating underneath separate unrestrained longitudinal edges 11 of the membrane on left and right hand side of a conduit, and also the protrusion extending longitudinally along the upper wall of the conduit as drawn in FIG. 23, and narrowing at the leading and trailing ends 33 for the purpose of a gradual entry of the protrusion underneath the membrane as it is prized away from the conduit wall 7 and allowing fluid within the conduit to pass out through conduit openings 2 which as a result are uncovered in the vicinity of the location where it is prized away from the wall, resulting in emission 8 of any pressurized fluid from the conduit in the vicinity of the longitudinal position of the PIG apparatus in the conduit. In the first embodiment, the protrusion also has embedded cutouts 34 creating paths for fluid to flow from the conduit interior to the location of the openings in the conduit wall.

In another embodiment of the PIG apparatus illustrated in FIG. 24, the finger like protrusion 6, adapted to displacing a longitudinal edge of substantial length of membrane, has a large extent in the conduit longitudinal axis compared with the conduit cross sectional dimension, and a plurality of cutouts 35 in the form of slits, grooves or holes, each providing a passage through the body from the conduit interior to the region of the openings at the wall of the conduit for fluid to pass 8 from inside to outside of the conduit.

Second Embodiment

Figure 67:
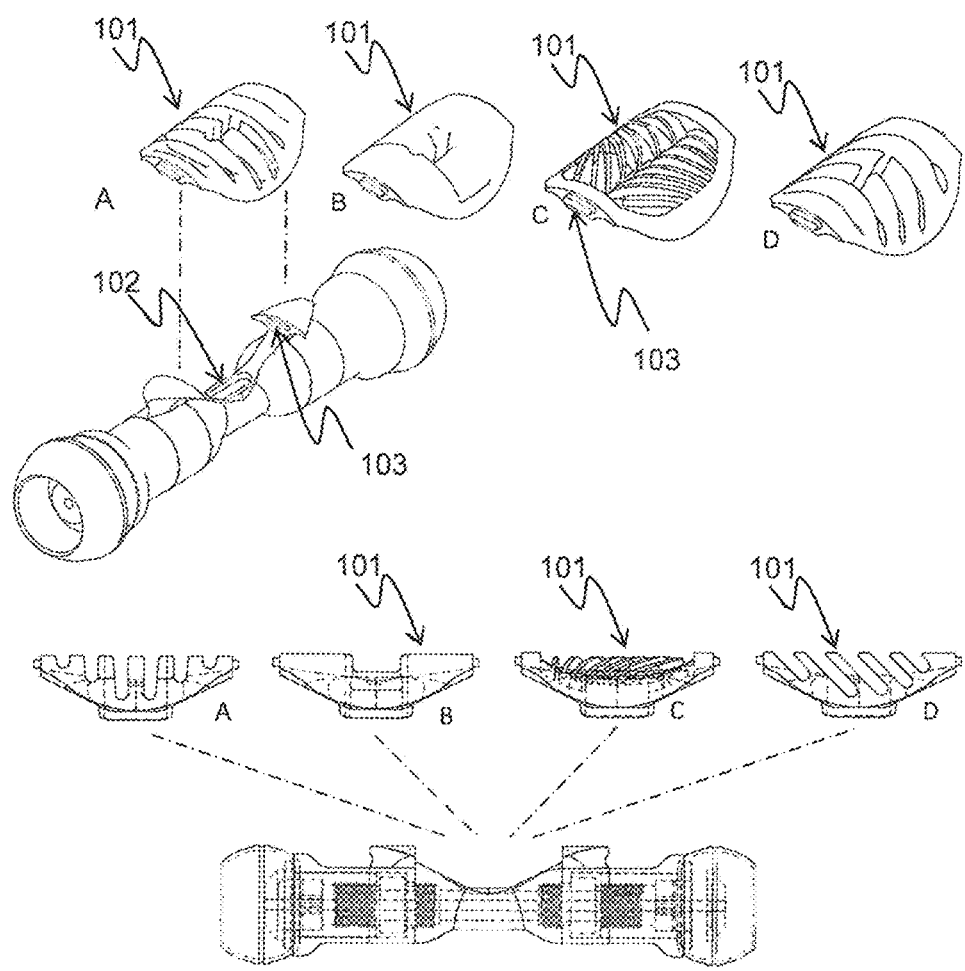

There is an important second embodiment in that in the example shown in FIG. 67 "B", a large fluid path and single laterally radiating channel with a large longitudinal dimension relative to the size of conduit openings, results in a more sustained and perpendicular emission plume from each conduit opening with a reduced animation vibrancy as compared with the fluid directing insert of FIG. 67 "A", In another example shown in FIG. 67 "C", the fluid is directed across the surface of the fluid directing insert by a series of vanes, where the vanes at one longitudinal end of the fluid directing insert are substantially perpendicular to the longitudinal direction of the PIG, with the angle being progressively more slanted from the perpendicular for vanes closer to the opposite longitudinal end, such that the emission plume from a conduit opening in alignment with the fluid directing insert undergoes a subtle graduating change of direction as the PIG progresses longitudinally with successive vanes channeling fluid at a progressively changed angle of flow to the conduit opening, resulting in the emission plume from each opening performing an individual sweeping action for adding a longitudinal component to the movement of debris or foreign matter, with the intention of progressing it to within range of the next conduit opening to in effect perform a progressive long range sweeping action in the direction of movement of the PIG in the conduit such as illustrated in FIGS. 49 and 50, In another example shown in FIG. 67 "D", parallel fluid channels are provided across the surface of the fluid directing insert similar to as described in relation to FIG. 67 "A", but cut in at a constant slant to the longitudinal surface, providing an angled fluid path and resulting in fluid emission from the conduit with a consistent longitudinal component to the plume direction, useful in applications where it is advantageous to displace foreign matter or gases in the direction of movement of the PIG in the conduit, such as for use in displacing smoke from a long corridor by the emission of fluid such as water or air from a conduit system as herein described, residing longitudinally in the corridor.

Such a system can be adapted to perform a range of tasks involving the application of chemicals such as in crop fertigation and chemigation processes, (fertilizer, herbicide, insecticides etc), or for applying surface treatments such as the application of sealers, anticorrosion, and colored coatings to arbitrary bodies such as in a manufacturing process.

While it is evident from the above that there is an infinitum of combinations of conduit opening shape, size and formation of fluid direction insert, each producing a unique fluid plume characteristic, in some cases it is desirable to achieve even tighter control of the emission characteristics, one such example application is in a high performance large expanse surface area washing system, where optimized fine nozzle control is required to maximize the effective working span.

In a PIG topology similar to that depicted in FIG. 68 and similar to FIGS. 30 and 66, additional provision is made for mounting a nozzle assembly 110 embedded in the fluid path for alignment with conduit openings. The nozzle assembly 110 comprises a Nozzle frame 111 having parallel side walls and enclosed at the ends forming a single slotted frame, the frame having cutouts into the side walls from the top of the slot creating a pair of opposing recessed inclines 117 at each end. The nozzle assembly also comprising a nozzle carriage 114 with an elongated body loosely slidable in the slot of the Nozzle frame, the carriage having pointed locating pins 113 protruding downward from the base, the locating pins being sized and positioned for a neat fit into conduit openings. The nozzle carriage also having an extraction pin 118 located at each of the lower extremities, extending across the body and protruding on either side, the pins slidable on the surface of the base of respective recessed cutouts of the nozzle frame, such that when sliding to either extreme, results in the extraction pins riding up an incline 117 and lifting the nozzle carriage.

The nozzle frame also has fitted near the center of the carriage a nozzle 112 extending through the carriage to provide a fluid path there through, the nozzle being mounted at an angle away from perpendicular and somewhat toward the direction of travel of the PIG apparatus. The nozzle has a nozzle head 119 hollow in the center and attached to the nozzle, rotatable about the nozzle axis and spring loaded with a bias such that it returns to one rotational extreme, also has an attachment point such as a grooved recess on the outer circumference for the attachment of a strap. A nozzle suitable for this application is one of the type which provides a variable focus, variable dispersion, and optionally variable direction dependent on the rotational position of the nozzle head. The details of nozzle design are not covered in this description as this is considered standard knowledge of a person skilled in the art of nozzle design. The nozzle assembly also comprises a return spring 115 such as a coiled wire spring attached at one end to the center of one of the end walls of the nozzle frame, and the other to the closest end of the nozzle carriage and biased to be in tension such that it urges the nozzle carriage to rest toward the end of its travel in the slot. The nozzle assembly also optionally comprising a non-elastic but flexible modulating strap 116 such as a thin metal strip with attachment points at the ends, with one end attached to the nozzle frame and the other wrapped partially around and attached to the nozzle head 119.

In operation and with reference to drawings, in FIG. 69, drawing "A" the nozzle frame is supported by the PIG framework longitudinally against the internal wall of a conduit and in line with conduit openings, the nozzle carriage residing in the nozzle carriage slot, with the locating studs able to slide against the conduit as the PIG moves longitudinally, fluid in the conduit is able to pass around the nozzle carriage and escape through the conduit openings, In "B" the conduit has progressed to align with the locating studs allowing the studs to lower into the openings and the nozzle carriage to seat against the conduit wall, urged outward by the flow and pressure of the conduit internal fluid, and once seated in place, blocks fluid from the opening stud filled openings, but provides a fluid path through the nozzle and out through the opening which is currently in alignment the nozzle, the nozzle able to project fluid at an angle away from perpendicular to the conduit.

In "C" the conduit has progressed relative to the PIG with the nozzle carriage still in alignment with the conduit openings, but nearing the end of its travel in the nozzle frame slot, with the nozzle carriage extraction pins approaching the nozzle frame extraction ramp. The nozzle carriage, in moving relative to the nozzle frame causes the modulating strap to impart a rotation to the nozzle head 119 thereby able to progressively change the focus, dispersion and/or direction of the plume while providing a period of sustained emission from a fixed location.

In "D", the conduit has progressed further causing the extraction pins of the nozzle carriage to ride up the extraction ramp, thereby removing the locating studs from the conduit holes and allowing the tensioned return spring 115 to drive the nozzle carriage back to the starting end in the nozzle frame slot as shown in "A", with the nozzle head rotation also retreating to the initial starting point of rotation.

The reciprocation cycle of the nozzle carriage repeating continuously while the PIG progresses in the conduit. It should also be noted that the nozzle assembly in providing a loose guide to the nozzle carriage enables the system a degree of tolerance in the positioning of the conduit holes relative to the rotational alignment of the PIG, the nozzle carriage studs also being tapered are able to engage the conduit holes without necessarily being accurately in rotational alignment.

In summary, the nozzle assembly described, provides a high level of control of a modulated fluid plume from a conduit system, and can be adapted to performing the task of sweeping unwanted debris from a large surface area such as depicted in FIG. 49 for a yard washing system such as an animal yard, utilizing water as a wash fluid where the conduit system described is deployed along the side of a yard area, the yard ideally having a gradual slope, the conduit being generally parallel to the direction of the slope, the conduit openings facing toward the yard to project a fluid plume across the yard.

The yard washing system comprising a conduit 1, with membrane and PIG 4 with a nozzle assembly 110 as described (not shown), a pump 84, individually controllable valves 85 for separately controlling fluid directed to each end of the conduit, the valves each connected to a control system (not shown), the nozzle assembly of the PIG configured to direct fluid across the yard with an angle component in the direction of the slope. With the pump supplying fluid pressure, the valve directing fluid to the downhill end of the conduit is opened, propelling the PIG toward the uphill side of the yard, projecting water as across the yard, wetting and breaking up any heavy debris such as animal manure mounds. On reaching the end of its travel the valve is closed, and the other valve directing fluid to the uphill end of the conduit is opened forcing the uphill end valve of the PIG to close and thereby forcing the PIG to move along the conduit in the downhill direction.

The control system then also opens the valve supplying fluid to the downhill side of the conduit, thereby supplying fluid to the downhill side of the PIG, the end valve of which being open allows water to flow to the nozzle assembly in the PIG which thereby directs a fluid plume across the yard. The reciprocation action of the nozzle assembly previously described is adapted to shifting debris both across and down the slope, whereby at the beginning of the cycle when the nozzle carriage first engages with the conduit the nozzle is provides a substantial dispersion to the fluid plume and directed slightly downward a downward pushing debris away from the conduit, across the yard and angled somewhat in the downhill direction, as the PIG moves relative to the conduit, the nozzle head is rotated as previously described, reducing the dispersion by narrowing the plume, while also marginally adjusting the direction in lifting the plume thereby gradually increasing the reach across the yard.

With each reciprocation cycle producing a sweeping action across the yard area, the system is further improved through careful control of the rate of the sweep, whereby a head of washing fluid is encouraged to build up ahead of the plume, gathering and floating debris across the yard with increasing momentum and volume, keeping debris which has broken free of the surface in flotation in a pooling wave which then continues to form a stream and flow toward the lowest point of the yard, the repeated pooling action producing a substantial improvement in performance and effectiveness of the yard washing system.

By regulating the flow rate to the uphill end of the conduit the control system can control the speed of the PIG in the conduit. Further refinement can be made in more finely modulating the PIG speed during the nozzle reciprocation cycle. The start and end of the nozzle reciprocation cycle can be easily detected remotely by the control system comprising a pressure and flow meter. The detection of periodic changes in pressure and or flow as the nozzle carriage engages and disengages with the conduit can be used by the control system to determine the beginning and end of the reciprocating cycle, to which such a predefined modulation profile must be synchronized. With knowledge of the reciprocation cycle, the control system can deduce the precise position of the PIG in the conduit, by counting the number of cycles from since being in a known position such as at the end of the conduit where the flow ceases.

Third Embodiment

Referring to FIGS. 25 to 28 With further reference to the PIG apparatus 4 of FIG. 25, the first and/or second ends of the finger-like protrusion 6, are progressively narrowed and thinnest nearest the conduit wall, forming bladed edges 36, adapted to sliding close to the conduit wall for peeling the end edge of a membrane laying tightly against a conduit wall away so that the remainder of protrusion 6 can progress between the membrane and conduit as the apparatus moves longitudinally in the conduit. A further feature of the bladed edge of the protrusion is a profile slanting at an angle away from perpendicular to the conduit longitudinal axis, adapted to make for a smooth and progressive engagement of the protrusion members 6 as the apparatus 4 moves along the conduit from a region of conduit wall with no membrane, to sliding into a section where membrane is present and for engaging gradually with the membrane at the membrane narrow end, which is normally seated against the conduit wall, thus avoiding any sudden shudder as the PIG apparatus encounters a leading edge of new section of membrane.

In another embodiment of the PIG apparatus as shown in FIG. 28, there is a plurality of finger-like protrusions 6 each in the form of solid, semi rigid wire loops emanating from and terminating on a backbone rod 30 of the body 4, their shape adapted to prizing a membrane 3 away from the inner wall of a conduit as the PIG apparatus moves longitudinally within a conduit. The wire loops emanating from the backbone rod, protrude toward and along the internal perimeter of a conduit wall with the tip of the loop reaching furthest behind a membrane being closest to the wall to impart progressively less lift to a membrane, the loop therefore having an inward bend 39 as viewed from the perspective of the conduit cross section. The connection of each loop can be angled away from perpendicular to the conduit longitudinal direction to improve resistance to bending when moving longitudinally in a conduit. The loops closer to the leading and trailing loops 40 at the first and second ends can be progressively smaller and lay closer to the conduit wall to provide a progressive take-up of the membrane and to distribute the stretch that the membrane unrestrained edge 11 experiences in being prized away from a conduit wall over a longer expanse of membrane. A further enhancement of the loop topology for the PIG apparatus is the inclusion of one or more longitudinal strips or wires crossing adjacent loops in the conduit longitudinal direction (not shown) to aid in lifting and guiding the membrane over the loops as the apparatus moves longitudinally in a conduit. Another variation to the embodiment is use of a mesh structure in forming the profile described for the multiple loops.

Fourth Embodiment

Referring to FIG. 54 shows a conduit 1 residing within a larger duct for the purpose of providing a controlled, selective, positional or moving release of fluid to the internals of the larger duct for the purpose of for example but not limited to irrigation of and/or displacing unwanted debris from the larger duct for example in the process of repeated automated flushing where the larger conduit is a human bowel, or for the propulsion of sewerage where the larger conduit is a sewer pipe, or for pneumatically propelling particulate matter where the larger pipe is a pneumatic conveyer. In other application possibilities, the conduit can reside in an open channel for the purpose of providing a controlled, selective, positional or moving release of fluid to the internals of the channel for example but not limited to the purpose of propelling sediment from an irrigation channel, propelling a mining waste slurry along an open channel, or for blasting debris from a drainage network such as a house spouting. In another application example, the conduit lays above ground for the purpose of but not limited to supplying irrigation water selectively at relatively high volume and low pressure to open plains, or is buried below ground to deliver irrigation water directly to plant root systems in the sub-surface, or is buried below ground, surrounded in porous material such as screening stones enabling the irrigation water to rise to the surface and controllably flood the surrounding region, or can be buried below the ground surface where irrigation water is blasted to the surface under high pressure, displacing any soil directly in front of the emitting holes. In another application the conduit is installed for the purpose washing of large areas shown in FIG. 49, and FIG. 50 where a pump 84 delivers fluid under pressure via valves 85 to conduit 1 which can release fluid in the presence of PIG apparatus 4. The movement of the PIG apparatus in the conduit and the direction, intensity and pattern of fluid emission therefrom can be controlled by the valving and PIG apparatus to provide a repeatable and transitioning washing plume. The system also has applicability in animal yards, processing plants, or factories, where controlled and automated delivery of a moving washing plume can displace debris and clean large surface areas. In another embodiment, the conduit system can be submersed in a fluid tank such as a dam to perform a stirring or agitation function. The submerged system can be supplied with gaseous fluid to additionally perform an aeration function often required for systems utilizing methods of biological decomposition. In another application the system of selective control of fluid emission from a conduit described here can be adapted for use as a fountain system for cosmetic display purposes, producing a moving and animated emission plume, modulated by internal apparatus and/or changes in the applied pressure. In another application the principle described is built into a filtration system, and enabled periodically to perform the cleaning of an adjacent filter (ie replacing the normal manual process of eg removing a cartridge filter and using a hand held pressure cleaner to remove debris).

Figure 4:
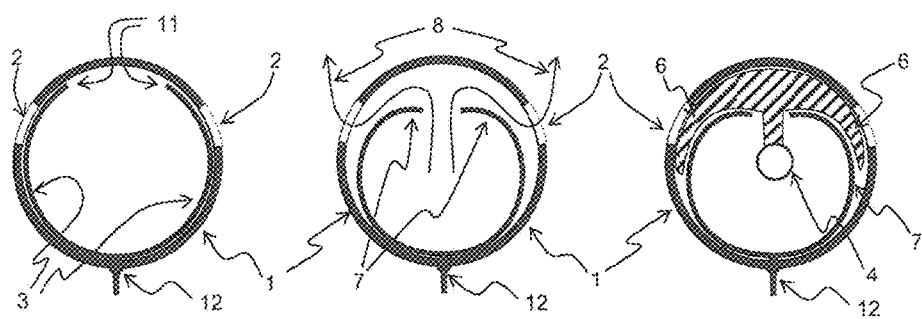

Conduit arrangement;

FIGS. 4, 5, 26—First Embodiment

A conduit 1 with a membrane 3 disposed internally, has at least one point of attachment to the conduit to prevent it moving, sliding or rotating relative to the conduit during manipulation by apparatus moving internal to the conduit and during general movement and flexing of the conduit. The means of attachment of the membrane in the first embodiment is a single longitudinal line of permanent attachment 12 by a plurality of individual fasteners as shown in FIGS. 4, 5, 26.

The membrane 3 has at least one longitudinal edge 11 which is free of permanent attachment points in a longitudinal region spanning the openings in the conduit, and over a sufficient arc section of the conduit cross section to allow the membrane, when moved away from the conduit wall 7 along the longitudinal edge to enable a fluid path 8 from the conduit to openings 2 in the conduit wall. This enables a protruding member of the PIG apparatus 6 to reach from the body of the PIG apparatus 4 in the conduit interior, toward and around the perimeter of the conduit wall and underneath the longitudinal edge 11 of the membrane, prizing it away from the conduit wall thereby uncovering either partially or completely, any openings 2 in the vicinity. The PIG apparatus 4 is able to slide longitudinally 13 in the conduit while continually prizing the membrane away from the conduit wall 7 along its longitudinal edge 11 in its vicinity without interference by membrane fastening 12 as the protrusion 6 remains wedged between the membrane and conduit wall as it slides longitudinally 13 along the conduit.

In the first embodiment as illustrated in FIG. 4, the membrane emanates from both sides 3 of the longitudinal line of attachment 12, around the cross section of the conduit and covering emitter holes 2 spaced longitudinally on either side of the attachment line. In the first embodiment, the membrane is made of a resilient material such as rubber or polyurethane.

In another embodiment, FIG. 6 the membrane encompasses the conduit interior and overlaps the opposite longitudinal edge 11. In another embodiment, FIG. 7, the membrane emanates and covers emitter openings on only one side of the line of fastening. In another embodiment, FIG. 8, the membrane has a high degree of stiffness. The membrane can be fabricated from similar material to the conduit such as Poly Vinyl Chloride (PVC). In another embodiment, FIG. 10, the membrane is fastened along one edge by being wedged in the seam of the conduit during manufacture.

In another embodiment, FIG. 11 the membrane is integral to the construction of the cross section of the conduit, and predominantly of the same material, where the membrane 3 is an inward substantially tangential protrusion to the conduit wall 1, and where the conduit wall can be recessed to allow the protruding membrane to form part of the wall of the conduit when in the relaxed or closed position, and where the conduit cross section can be adapted for manufacture in an extrusion type fabrication process. Alternatively the membrane can be welded to the conduit to create the integral cross section.

In other embodiments shown in FIGS. 12, 13, 14, the conduit can be constructed as a two part section with opposing interlocking hook-like longitudinal edges which can snap and lock together to form a complete conduit, and the membrane is wedged along one longitudinal side into the conduit snap hook seam. The membrane can be treated or shaped along the long edge to provide improved sealing when locked in the conduit seam, by way of shaped barbs 14 (FIG. 14), or resilient sealing compound or strip material.

An enhancement to the first embodiment shown in FIG. 15, is the additional attachment of a membrane external to the conduit 15, extending from the attachment line 12 around the outside of the conduit 1 and over the openings 2, biased to normally cover the openings to prevent backflow of fluid into the conduit. The membrane can be attached along a longitudinal edge by the same attachment holding the internal membrane 12. Such a membrane external to the conduit can be adapted to provide a desirable fluid dispersion characteristic where at lower pressure and the emission from a conduit hole is widely dispersed, and for higher pressure the emission plume is able to push the outer membrane away from the conduit resulting in reduced impingement to the flow, enabling a system with the ability to modulate the fluid delivery pressure to be adapted to producing an even distribution and application of fluid to an expanse of region in the vicinity of the conduit.

In another embodiment shown in FIG. 16, a membrane internal to the conduit has a means of releasable attachment to the conduit along the unrestrained longitudinal edge in the form of an overhanging latch or catch, which can be released and engaged in response to force by apparatus moving internal to the conduit. The means of releasable attachment is a resilient hook-like protrusion from the conduit wall 16, overhanging the releasable longitudinal edge 11 of the membrane 3. The hook-like protrusion is continuous along the length of the conduit, and can be formed as part of an extrusion type process of the conduit fabrication. In another embodiment, there is a plurality of hook-like protrusions along the length of conduit, or there are breaks in the otherwise continuous hook-like protrusion (not shown). In another embodiment the hook like protrusions are separate attachments to the conduit.

In another embodiment as shown in FIG. 17, the membrane 3, has an integral lever protrusion 17 for responding to outward force by apparatus internal to the conduit, the protrusion extending from the unrestrained longitudinal edge 11 back over the membrane, and extending past the point of attachment 12. When force is applied to the lever protrusion in an outwardly direction toward the conduit wall, for example by apparatus internal to the conduit 4, results in the leading edge 11 being lifted away from the conduit wall resulting in a fluid path 8 under the membrane 7, through to conduit openings 2. In another embodiment shown in FIG. 18, the membrane 3 has an integral lever protrusion 17 extending from the point of attachment of the membrane 12 in a direction away from the membrane and toward the conduit interior. The membrane point of attachment to the conduit is narrow and resilient such that it acts to hinge the membrane and lever assembly. When force is applied to the lever in a direction toward the conduit wall, the lever and membrane rotate as one unit about the hinge-like attachment point, moving the membrane longitudinal edge 11 away from the conduit wall 7 and allowing a fluid path 8 out of the conduit from the conduit interior via one or more conduit openings 2. The resilient nature of the attachment can serve to spring bias the membrane such that it returns to cover the conduit openings in the absence of manipulation force.

In another embodiment shown in FIG. 19, multiple independent membranes 3 are disposed around the perimeter of a conduit 1. Each membrane can be prized away from the wall of the conduit to uncover respective openings 2 in the conduit wall. With suitably shaped conduit openings adapted to provide a wide angle dispersion, and with multiple openings spaced around the cross section of the conduit, a 360 degree plume of fluid from the conduit can be produced, with all membranes manipulated away from the conduit wall at a particular location simultaneously. It is a benefit of the embodiments shown in FIGS. 4,5,6,19 for the membranes 3 to be disposed as opposing diametrically mirrored pairs to balance and neutralize the rotational torque experienced by apparatus 4 with protruding members 6 in peeling back an unrestrained membrane edge 11 from the wall of the conduit.

In another embodiment shown in FIG. 20, the membrane is attached to the conduit 12 by a rotatable hinge joint disposed longitudinally within the conduit, allowing a substantially rigid membrane to rotate axially about the hinge point of attachment.

Figure 3:
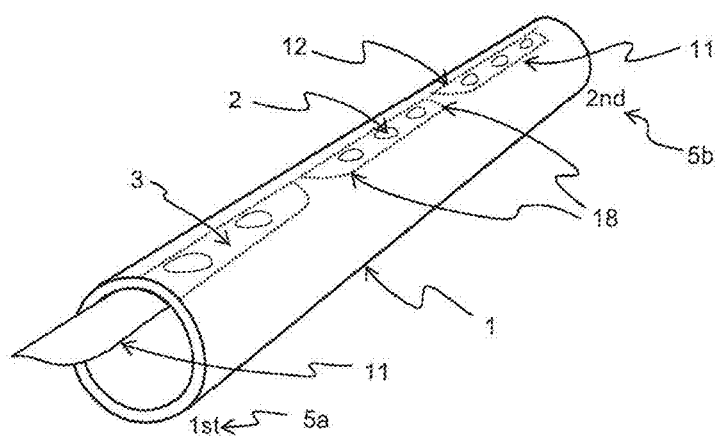

In another embodiment as shown in FIG. 3, the membrane is divided into segments in the longitudinal direction of the conduit, with each segment able to cover one or more openings 2 in the conduit wall. The membrane being discontinuous along the length of conduit reduces the degree of longitudinal stretch that the longitudinal edge 11 must undergo when being prized away from the conduit wall, thereby also reducing the force required by any apparatus in manipulating the membrane in the presence of conduit fluid pressure. A segmented membrane as such can be fabricated from a continuous membrane piece with periodic cutouts along the longitudinal edge, thereby enabling the membrane to perform as described with the characteristics of a segmented membrane longitudinal edge but with the advantage of the membrane being a single component for handling and assembly purposes.

Figure 35:
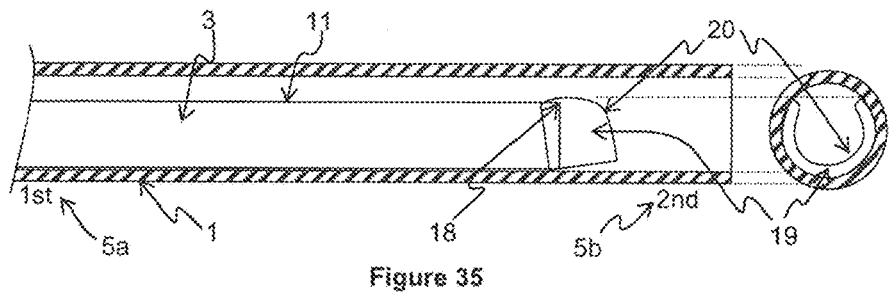
Figure 36:
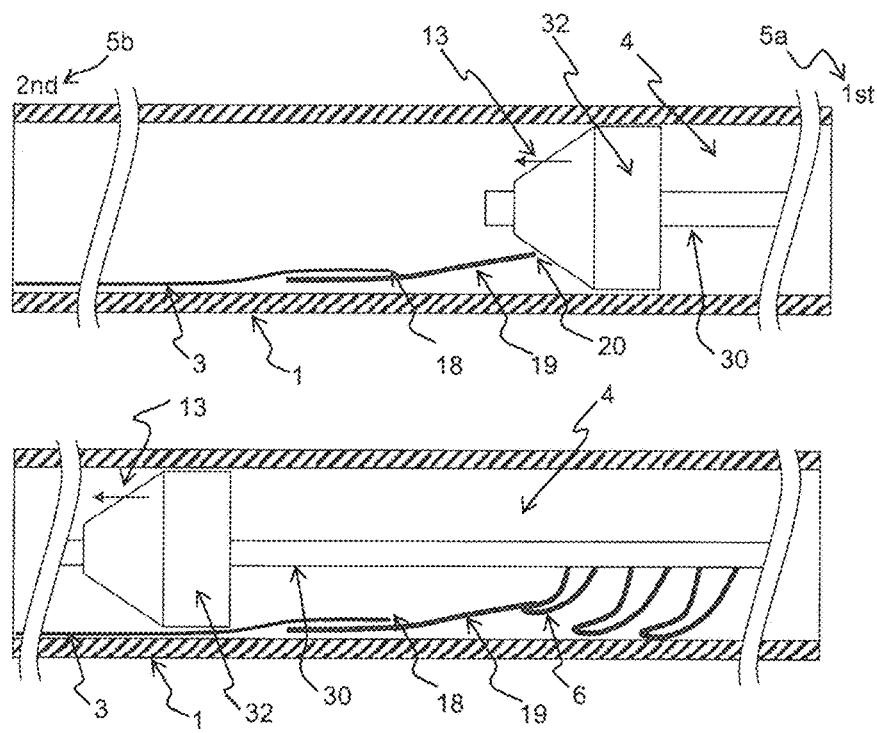

A further enhancement to the multiple segment membrane 3 in the conduit longitudinal direction as shown in FIG. 3, is the treatment of the ends and unrestrained corners 18 to be non-perpendicular to the longitudinal edge 11. This is to facilitate and reduce the abruptness of the entry of members of apparatus moving longitudinally in the conduit for manipulating the membrane, to gain access under the membrane as it slides longitudinally into the region of conduit where the membrane resides. In FIG. 3, the corners 18 are trimmed such that the leading edge is slanted and the corners rounded. In another embodiment as shown in FIGS. 35, 36, the end treatment of the membrane 3 is by way of the addition of a resilient extension 19, adapted to seat between the membrane 3 and the conduit 1 and extend longitudinally in the conduit to effectively extend the membrane in the longitudinal direction, with the outer edge 20 normally separated from the conduit wall. When PIG apparatus 4 of FIG. 36 approaches the end treatment leading edge 20, the acute angle of incidence pushes the membrane against the conduit wall to enable the apparatus to float over the membrane, then as membrane manipulation protrusion members 6 approach, they slide underneath the raised front edge 20 and continue under the membrane, separating the longitudinal edge 11 from the conduit wall thereby providing a path for conduit fluid to reach and escape via conduit openings 2.

In another embodiment (not shown) the membrane has disposed bracing material in the form of fibers or bracing bars disposed longitudinally to increase its lateral stiffness, while maintaining flexible resilience in the direction tangential to the conduit perimeter still allowing it to bend when peeled away from the conduit wall. The additional longitudinal rigidity reduces or eliminates the tendency for the resilient membrane to bubble out of the conduit openings in response to conduit fluid pressure, and is especially beneficial where the membrane is segmented or is short longitudinally, and where it is practical to prize from the conduit wall, the entire longitudinal edge of the membrane evenly along its length thereby avoiding any need to for the membrane to stretch.

In another embodiment FIG. 85, as suitable to a continuous longitudinal membrane system in which the longitudinal edge is required to stretch in order for it to be prized from the conduit wall in order to uncover conduit openings, the conduit has disposed a plurality of substantially radial, semi rigid bracing ribs disposed longitudinally between the conduit and membrane, each rib covering a radial arc section of the conduit cross section including all or part of a conduit opening thereby reducing or eliminating the exposure of the membrane material to the full pressure differential experienced in covering and sealing a conduit opening. The ribs can be attached to a longitudinal backbone and manufactured as a single piece such as a cutout from similar conduit, with the ribbing backbone fastened to the membrane or to the conduit wall such as at the ends of the conduit, enabling each of the ribs to be separately prized from the conduit wall in combination with the membrane by movable apparatus residing internal to the conduit. The rib ends can be progressively narrower toward the radial ends allowing for a sufficient radial expanse of membrane material beyond the tip of the rib to the membrane longitudinal edge 11 for sealing against the conduit wall.

The ribs can also be in the form of individual stiffening patches attached to the membrane at positions corresponding to the conduit holes, patches of fabric embedded in a laminated membrane, or radial fibres in the membrane allowing the membrane to stretch longitudinally.

In another embodiment relatively stiff circular shaped patches are incorporated within an inner membrane laminate at positions corresponding to conduit openings.

In another embodiment the ribbed component is fabricated from the same or similar conduit as used for the outer conduit (eg PVC pipe), with an arc section removed to form longitudinal edges along which sections between successive corresponding conduit openings are removed leaving protruding ribs.

The cutouts are made with substantial curvature such that longitudinally moving apparatus encounters a gradual rise and fall on encountering ribs edges. The ribbed component as described can reside between the membrane and conduit wall, or alternatively can reside to the inboard side of the membrane to both reduce the strain that the membrane experiences in sealing the conduit hole against fluid pressure as well as doubling to retain the membrane position, or alternatively be embedded in the membrane, where an internal lamination layer of similar thickness to the ribbing layer a cutaway section which is replaced by the ribbing profile. To achieve its intent of providing strength and reinforcement to the membrane in the region of the conduit openings the ribbing material requires a degree of strength and rigidity to prevent the membrane from protruding out through the conduit openings to mitigate stress and possibly damage to the membrane in being pressed against the low radius edges of the conduit openings in response to conduit fluid pressure.

In another embodiment shown in FIG. 21, the membrane 3 is not fastened to the conduit but is instead retained or caged by hook shaped protrusions 21 extending inward from the conduit wall forming a retaining chamber with the hook ends facing toward each other, the hooks being elongate and extending the length of the conduit. The hook ends passing partially over the inner surface of the membrane acts to retain the membrane within the retaining chamber in proximity of the conduit wall and covering emitter holes 2, the membrane being sufficiently resilient remains encaged by the hooks enclosing the longitudinal edges. The membrane is able to be forcibly peeled from the cage by membrane manipulating apparatus 4 as it traverses longitudinally within the conduit, the peeled out portion of membrane 7 then residing in the conduit interior and away from the conduit wall, thereby allowing fluid to escape 8 past the hooks 21 and out through the emitter holes in the conduit wall in the vicinity of the removed membrane. The membrane is able to be replaced back underneath the hooks and against the conduit wall by internally traversable sliding apparatus 4 adapted to apply force to the membrane and the hooks in its trail as it moves longitudinally within the conduit, the sliding apparatus guiding the membrane into the hook caged area such that it is retained behind the hooks thereby covering the openings in the conduit in its trail.

In releasing the membrane from the cage, either the membrane or the hooks or both must be resilient and distort under force of apparatus performing the membrane manipulation. The membrane described can have a rectangular cross section or can be manufactured as a circular cross section as shown in FIG. 22, in which case the membrane is a compression fit against the retaining cage side walls. In another embodiment, where the membrane is rectangular in cross section, the hooks protrude inward substantially further than the membrane thickness resulting in a loose fit to the membrane in the hooked retaining cage, and where the hooks are a plurality of hooks (not shown) suitably separated along the conduit length (instead of a continuous elongate section along the conduit's longitudinal axis), the membrane on being manipulated inward toward the conduit interior becomes seated against the hooks, enabling fluid to flow through the space between adjacent hook protrusions and under the membrane to the openings in the conduit wall allowing fluid to be released from the conduit.

In another embodiment show in FIG. 57, a conduit 1 has a membrane 3 on which are disposed magnetically responsive elements 24 enabling it to be peeled away from and subsequently replaced against conduit openings 2 by apparatus residing internal to the conduit (not shown) or by apparatus residing external to the conduit (not shown) and having magnetically responsive materials or components, and being adapted to engage magnetically with the membrane to apply force directed radially inward toward the conduit interior to force the membrane away from the conduit wall, and/or conversely to apply force by magnetic field in a direction outward from the conduit interior to replace the membrane against the conduit wall such that it covers the conduit openings. The membrane could also comprise or contain magnetically responsive material.

In another embodiment, shown in FIG. 58 a main conduit 1 is attached to a second independent control conduit 25 running parallel and adjacent to the main conduit. A membrane 3 disposed within the main conduit for normally covering conduit openings 2, has magnetically responsive material or components 24 such as molybdenum permanent magnet elements embedded along its unrestrained longitudinal edge 11. Apparatus 4 resides and is movable longitudinally inside the control conduit 25, and contains magnetically responsive elements 26. The apparatus 4 plugs and slides in the control conduit, and can be accurately positioned longitudinally by independently controlling fluid transfer into and out of the control conduit. The magnetic elements 26 disposed to the apparatus 4 are arranged such that the polar alignment relative to the elements on the conduit membrane 24 produce a force of magnetic repulsion 27. When the apparatus 4 is moved along the control conduit, the magnetic force pushes the membrane away from the conduit wall 7 uncovering openings 2 and allowing fluid to escape the conduit 8 in the vicinity of the apparatus. It shall be noted that the position of the control conduit relative to the magnetic elements 24 of the membrane, could alternatively be aligned such that a force of attraction would result in the membrane being prized from the conduit wall, (instead of a force of repulsion). As common knowledge to a person skilled in the art, a suitable combination of magnets, their polarization and relative orientation can produce a force of attraction or repulsion as desired. It may be preferable and less expensive to use as the magnetically responsive elements in the membrane, a magnetically attractable but non-magnetic material such as non-magnetized iron or metal along the length of membrane, which will communicate with either a permanent magnet or electromagnet 26 of the apparatus 4 in the second conduit. The apparatus 4 could also optionally include an opposite polarity magnetic element at its trailing end to assist with returning the membrane to its closed position. It should also be noted that the second being the control conduit, lying adjacent to the main conduit can be joined at time of fabrication or manufactured as a single cross section for example by an extrusion, pultrusion or pultruding process.

In another embodiment shown in FIG. 59, a membrane 3 is attached to a main conduit 1 at a narrow point 12 as viewed from the perspective of the conduit cross section, resulting in a longitudinal line of attachment along the conduit, the attachment being narrow and resilient allows the membrane to be effectively hinged along the line of attachment. The membrane protrudes back beyond the line of attachment and into the conduit interior forming a lever 17 onto which is disposed magnetically responsive material or elements 24. A second independent control conduit 25 running parallel to the main conduit has disposed longitudinally slidable apparatus 4 comprising magnetically responsive material and/or elements 26 able to provide a force of attraction to the magnetic elements 24 on the membrane lever 17. When the apparatus is present in the adjacent control conduit 25, the membrane lever 17 is urged toward the main conduit wall, thereby levering the membrane 7 away from the conduit wall and uncovering openings 2 for fluid to flow 8 from the main conduit 1 resulting in an emission plume in the vicinity of the location of the apparatus 4.

In the first embodiment, the conduit openings are substantially angled, irregular shaped slits with rounded ends and spaced evenly along the conduit length, to produce a dynamically waving plume as shown in FIG. 55, when apparatus 4 moves longitudinally within the conduit. The shape of the openings along with their distribution as rows, arrays, groups or patterns can be adapted to produce a desired emission plume pattern.

In the first embodiment, FIGS. 1, 2, 3, 4, 6, 26, the membrane 3 is a thin substantially flat rectangular strip of resilient material such as rubber or polyurethane, and can be reinforced with fibrous additives or woven fabric. In other embodiments shown in FIG. 17, 18, 19, 20, 63 the membrane cross section has treatment along the unrestrained longitudinal edge 11 in the form of shaping where the longitudinal tip edge is progressively tapered and thinner toward a distinct edge making contact with the conduit wall, adapted to optimizing the sealing capability. In another embodiment shown in FIG. 63, 64, 65, a membrane retainer former 100 is fabricated from a half section of the same or similar construction as the outer conduit, and serves to retain the membrane position, provide rotational constraint to internally moving apparatus, and also aid the assembly process whereby the membrane is first attached to the former with a fastener 23 at each end prior to being inserting into the conduit.

In another embodiment as illustrated in FIG. 5, the membrane cross section is shaped to provide lowest stiffness close to the unrestrained longitudinal edge, and progressively higher stiffness closer to the line of restraint or attachment to the conduit by a progressive increase in membrane thickness toward the restrained longitudinal line of attachment, adapted to require a continuous and progressive force in peeling the membrane from the conduit wall. This is especially useful in circumstances where the force is only able to be applied close to the unrestrained longitudinal edge of the membrane, and also for the benefit of providing improved transfer of the closing bias force from the fastening longitudinal line 12 across the membrane in returning the membrane to the conduit wall when the prizing force is no longer present.

In another embodiment shown in FIG. 56 the membrane longitudinal line of permanent attachment includes only attachment to the conduit at each of the far ends 23, with the membrane being under sufficient tension by the ends of attachment to simulate the function of being continuously fastened down the entire length of at least one longitudinal edge, the membrane can be prized away from the conduit wall along an unrestrained longitudinal edge, allowing fluid to flow under the membrane and out through the holes in the conduit wall, and when no longer prized away from the wall, the membrane can return under bias from the fastening restraint and conduit internal fluid pressure to cover the holes in the conduit wall. Where the conduit is a single piece and any apparatus moving internal to the conduit can remain permanently engaged, the end edge of the membrane as shown in FIG. 56 can be completely fastened to the conduit across its end, 23 and not just confined to a narrow longitudinal line, to thereby also assist in biasing the longitudinal edges toward the conduit wall.

In another embodiment, individual nozzles (not shown) can be attached to the outside of the conduit at each of the openings, each nozzle can include a jutting pipe section to penetrate into and be retained in the wall of the conduit by way of an integral barb at the circumference of the end of the jutting pipe, the end of the jutting pipe residing inside the conduit which can be shaped as an outward facing flange adapted to both optimally seal against the membrane and to prevent damage to the membrane when it is pressed against the nozzle flange by the conduit internal fluid pressure.

In the first embodiment, the conduit wall is relatively stiff pipeline of Poly Vinyl Chloride (PVC), however it can be fabricated from any material such as Polyethylene, Aluminium, Steel, Stainless Steel, or metal alloy. In another embodiment, the conduit is thin, soft, flexible material such as reinforced PVC, Polyethylene or Polythene, which when in the form of a conduit can expand in the presence of internal fluid pressure, and which can be flattened and rolled up when not in use. In another embodiment, the conduit is flexible and includes polyvinyl chloride (PVC) polyethylene, polypropylene, very low-density polyethylene (VLDPE), linear low-density polyethylene (LLDPE), flexible polypropylene (FPP), ethylene interpolymer alloy (EIA), ethylene propylene diene monomer (EPDM), or other flexible composite materials suitable for medical applications, where the system may be used in applications such as in repeated or periodic flushing or irrigation of wounds, organs and internal ducts.

Deflector types;

There are various types of deflectors which can be propelled down the conduit.

Firstly the arrangement of travel dictates a substantial number of characteristics. The propelling of the deflector can be in:

a. a linear arrangement.
b. a rotational arrangement.
c. a spiraling arrangement.

PIG Apparatus for Manipulating a Conduit Membrane

In this section of the description, where various embodiments of the PIG apparatus are described, it shall be assumed unless otherwise stated that PIG apparatus 4, resides and is movable longitudinally internal to a conduit 1, having a membrane 3 disposed therein, covering one or more openings 2 in the conduit wall, the PIG apparatus having the ability to manipulate the membrane and/or elements of the conduit to affect fluid release from the conduit.

The first embodiment of the PIG apparatus 4 shown in FIG. 23, has a first and second end for descriptive purposes, the first end being closest to the first end of the conduit 5a in which it can reside, and the second end being closest to the second end of the conduit 5b, the body comprising a backbone in the form of a semi rigid rod 30, with a first and second end, the backbone aligned such that the first end is the first end of the body and the second end of the backbone rod is the second end of the body, the backbone rod being substantially smaller than the cross section of the conduit, and substantially longer than the width of cross section of the conduit;

a. a locating means to hold the backbone at a fixed location within the conduit cross section by way of guide prongs or loops 31 radiating from the backbone rod to the conduit wall from at least three angular positions at the first end, and a piston, (plug or slug) 32 disposed at the second end of the rod, sealable and slidable against the internal walls of the conduit 1;

b. and a membrane engaging means, as a shaped protrusion 6 emanating from the backbone rod upward as drawn in FIG. 23, toward the internal wall of said conduit, and then protruding separately left and right around both sides of the conduit cross section, each protrusion wrapping partly around the internal perimeter of the cross section of the conduit in a finger-like manner for penetrating underneath separate unrestrained longitudinal edges 11 of the membrane on left and right hand side of a conduit, and also the protrusion extending longitudinally along the upper wall of the conduit as drawn in FIG. 23, and narrowing at the leading and trailing ends 33 for the purpose of a gradual entry of the protrusion underneath the membrane as it is prized away from the conduit wall 7 and allowing fluid within the conduit to pass out through conduit openings 2 which as a result are uncovered in the vicinity of the location where it is prized away from the wall, resulting in emission 8 of any pressurized fluid from the conduit in the vicinity of the longitudinal position of the PIG apparatus in the conduit. In the first embodiment, the protrusion also has embedded cutouts 34 creating paths for fluid to flow from the conduit interior to the location of the openings in the conduit wall.

In another embodiment of the PIG apparatus illustrated in FIG. 24, the finger like protrusion 6, adapted to displacing a longitudinal edge of substantial length of membrane, has a large extent in the conduit longitudinal axis compared with the conduit cross sectional dimension, and a plurality of cutouts 35 in the form of slits, grooves or holes, each providing a passage through the body from the conduit interior to the region of the openings at the wall of the conduit for fluid to pass 8 from inside to outside of the conduit.

A further feature of the embodiment of the PIG apparatus 4 illustrated in FIG. 25, 26, 27 is that the entire moving unit is fabricated as a single piece adapted for manufacture using a molding process, the body in cross section comprising two arcuate protrusions extending symmetrically away from each other and narrowing as they extend partially around a conduit interior, the respective ends representing two finger-like protrusions 6 which can each separately prize two longitudinal edges 11 of a membrane 3 away from openings 2 in the wall of a conduit 1. The PIG apparatus in the conduit longitudinal direction extends the range of intended conduit openings, and is typically longer than the cross sectional diameter of the conduit. One or more cutouts 35 perpendicular to the conduit longitudinal direction provide paths for fluid to flow from a conduit interior to conduit openings near the tips of the finger-like protrusions. Where the cutouts 35 are a plurality of shaped slits, the body resembles a rib cage connected along the tips of the protrusion as ridge lines 38. Where the conduit is fabricated from resilient material the narrow ridges forming the backbone allow a degree of flex to enable the PIG apparatus to traverse conduits which are not completely straight and have a degree of bend. A further feature of the PIG apparatus illustrated in FIGS. 25, 26, 27 is that the body has attachment points at first and/or second ends for the attachment of cable, chain, piston, plug or slug for use in propulsion of the PIG apparatus.

With further reference to the PIG apparatus 4 of FIG. 25, the first and/or second ends of the finger-like protrusion 6, are progressively narrowed and thinnest nearest the conduit wall, forming bladed edges 36, adapted to sliding close to the conduit wall for peeling the end edge of a membrane laying tightly against a conduit wall away so that the remainder of protrusion 6 can progress between the membrane and conduit as the apparatus moves longitudinally in the conduit. A further feature of the bladed edge of the protrusion is a profile slanting at an angle away from perpendicular to the conduit longitudinal axis, adapted to make for a smooth and progressive engagement of the protrusion members 6 as the apparatus 4 moves along the conduit from a region of conduit wall with no membrane, to sliding into a section where membrane is present and for engaging gradually with the membrane at the membrane narrow end, which is normally seated against the conduit wall, thus avoiding any sudden shudder as the PIG apparatus encounters a leading edge of new section of membrane.

In another embodiment of the PIG apparatus as shown in FIG. 28, there is a plurality of finger-like protrusions 6 each in the form of solid, semi rigid wire loops emanating from and terminating on a backbone rod 30 of the body 4, their shape adapted to prizing a membrane 3 away from the inner wall of a conduit as the PIG apparatus moves longitudinally within the conduit. The wire loops emanating from the backbone rod, protrude toward and along the internal perimeter of a conduit wall with the tip of the loop reaching furthest behind a membrane being closest to the wall to impart progressively less lift to a membrane, the loop therefore having an inward bend 39 as viewed from the perspective of the conduit cross section. The connection of each loop can be angled away from perpendicular to the conduit longitudinal direction to improve resistance to bending when moving longitudinally in a conduit. The loops closer to the leading and trailing loops 40 at the first and second ends can be progressively smaller and lay closer to the conduit wall to provide a progressive take-up of the membrane and to distribute the stretch that the membrane unrestrained edge 11 experiences in being prized away from a conduit wall over a longer expanse of membrane. A further enhancement of the loop topology for the PIG apparatus is the inclusion of one or more longitudinal strips or wires crossing adjacent loops in the conduit longitudinal direction (not shown) to aid in lifting and guiding the membrane over the loops as the apparatus moves longitudinally in a conduit. Another variation to the embodiment is use of a mesh structure in forming the profile described for the multiple loops.

In another embodiment of the PIG apparatus as shown in FIG. 29, rollers 41 are disposed on individual membrane manipulating finger sections 6 to reduce the resistance to longitudinal movement of the PIG apparatus along the conduit due to friction of prised back membrane 7 and conduit 1 against the finger sections, the membrane being under fluid pressure against the finger sections which experience substantial compression force as they move along the conduit. Such rollers can be arranged to roll against the membrane and/or against the conduit wall. Rollers can also be disposed to the PIG body to roll against a counterpoise rail in the conduit. Such a counterpoise can be in the opposite membrane edge, or a longitudinal ridge along a membrane retaining element within the conduit.

A method of keeping a PIG apparatus 4 in rotational alignment within a conduit in some embodiments is by way of guide prongs used for centering or locating the apparatus at a set location within a conduit cross section, also being adapted to control and prevent rotation of the PIG apparatus about the longitudinal axial of the conduit, by aligning against one or more specific irregularities in the conduit cross section (not shown), such as a protrusion, inner corner, recess or plurality of inline conduit fastening studs, with any rotational force, resulting typically from the action of a finger like protrusion on the PIG apparatus in engaging with the membrane, being countered by the force of the guide prongs pressing against one side of one or more irregularities in the cross section. The conduit can be purpose manufactured to include integral irregularities in its cross section for this purpose, such as a sharp inside corner in a rectangular conduit FIG. 12, 16, or in FIG. 11, an inward rectangular protrusion 22 in a circular conduit.

Another embodiment of the PIG apparatus 4 has disposed material or components responsive to, or which can generate magnetic fields to engage with magnetically responsive material or elements for the purpose of imparting a force to manipulate or assist in manipulating a membrane within a conduit (not shown). The use of magnetically responsive materials and components for manipulating the membrane instead of protruding members needing to physically contact the membrane, eliminates or reduces the force of contact of the PIG apparatus against the membrane, thereby reducing if not eliminating friction and wear. The magnetic components on the PIG apparatus for generating magnetic fields can be permanent magnets or electro-magnets (not shown).

It should be understood that there are other means of controlling the release of fluid from a conduit, such as traditional valves which can be adapted to be responsive to the presence of a magnetic field, such that when a PIG apparatus 4 is in the vicinity of such a valve will enable fluid to be emitted from the conduit.

In another embodiment of the PIG apparatus 4 as shown in FIG. 31, the rotational position of the membrane engaging member(s) 6 is actively controlled by electronic or fluid activated rotational servo mechanism 50 comprising motor 51, and control system (not shown), which is able to determine, change and control the rotation and thus the level of engagement with the membrane 3 and hence the degree of membrane manipulation and displacement away from the conduit wall.

The PIG apparatus comprises separate sections, a first section having a body from which protruding guide prongs or loops 31 radiate outward toward the conduit wall for locating its position within the conduit, and at least one guide prong in communication with a longitudinal irregularity 22 in the conduit wall for resisting rotation relative to the conduit longitudinal axis, and a rotational servo actuator 50 disposed thereon, for controlling the rotational position of a shaft extending out and along the conduit longitudinal axis forming the backbone rod 30 of the PIG apparatus, which in turn has disposed finger-like protruding members 6 along its length, each extending radially outward and then around the conduit wall for protruding under a membrane 3.

A PIG's fingers may not need to protrude between conduit and membrane if membrane is fitted with inboard rail for PIG in the fluid delivery conduit to communicate and apply direct inboard pull force in prizing or levering membrane away from conduit wall. (ie PIG fingers then not having to protrude underneath the membrane). Such a rail along the membrane could be in the form of a thin laminate attached along longitudinal edge and normally laying against rest of the membrane, providing an longitudinal pocket acting as an inward rail or to enable an adapted member of ACTIVATOR/DEFLECTOR apparatus to engage and apply force in pulling the membrane from the conduit wall (applicable to both membrane with longitudinal edge and especially to full encircling type membrane with holes offset from conduit holes).

When the actuator is powered to impart rotational force, the first section remains stationary due to the conduit irregularity 22 acting as a rotational counterpoise to resist rotation, whereas the backbone rod 30 of the PIG apparatus rotates relative to the conduit, moving the membrane manipulating member(s) 6 either into or out of engagement with the membrane and controlling the degree of manipulation and displacement of the membrane away from the openings 2 in the conduit wall. In changing the degree of membrane manipulation, the actuator control system is thereby able to control the rate of flow of fluid from the conduit 8.

Multiple separate actuation systems could be deployed to control separate tandem banks (not shown) of membrane manipulating members to enable active control of the emission plume width and directional characteristics. Alternatively or in addition to rotation about the conduit longitudinal axis, an actuation mechanism can be adapted to impart a motion of the membrane manipulating member(s) 6, radially toward or away from the conduit wall (not shown) to thereby control the degree of membrane manipulation.

A further alternative or additional method of adjusting the membrane manipulation (not shown) is for an actuation mechanism to manipulate a member 6 of irregular cross sectional shape, by imparting a rotation or twist on an axis substantially perpendicular to the longitudinal axis of the conduit, to change the degree of displacement of the membrane from the wall of the conduit. As such, multiple degrees of adjustment of membrane manipulating members, can produce a broad spectrum of variation of possibilities for adjustment in fluid emission characteristics from the conduit.

In another embodiment of the PIG apparatus 4 shown in FIG. 32, the protrusions 6 performing the displacement of the membrane 3 (not shown) away from conduit openings 2 (not shown) are flexible, and are each attached to a linkage member 56 at a distance from the point of attachment to the PIG apparatus backbone rod 30. The linkage member is in turn attached to a servo actuator and control system 51 mounted on the PIG apparatus. When the actuator is driven, the linkage member 56 urges the protrusions 6 to flex and bend. The distorted surfaces of the protrusions 6 then change the direction of fluid flow while also performing their primary function of interacting with fluid exit control apparatus of the conduit such as the prizing of a membrane away from conduit openings to allow fluid to flow from the conduit. By controlling the actuation mechanism the angle and/or position of surfaces located in the vicinity of the exiting fluid stream from the conduit alters the direction of fluid flow 8 as it exits the conduit, thereby affecting the dispersion pattern of the fluid plume emitted from the conduit, and can be used to modulate or adjust the emission plume for example to compensate for environmental influences such as wind.

In a further enhancement, the PIG apparatus 4 as shown in FIG. 33, has disposed separate dedicated fluid directing elements 52 such as fins, blades or nozzles, disposed in the vicinity of the location of PIG apparatus members 6 controlling the release of fluid from the conduit in their vicinity. The fluid directing elements are adapted to change the direction of fluid flow to emitter holes 2 in the conduit, to vary or adjust the emission plume from the conduit. The fluid deflecting elements 52 can be fixed to the PIG apparatus, or connected by flexible or mechanical joint 53 to enable adjustment of for-aft angle, and axially rotatable joint 54 to allow adjustment of twist angle. Further degrees of angle and position adjustment can be added to the directing elements as desired. The moveable elements jointed at 53 and/or 54 can be connected to an actuator, example 51, to provide automated control of the fluid directing elements for adjusting and modulating the fluid plume from the conduit. The fluid directing elements can also be modulated through communication with irregularities along the conduit wall, such as the conduit openings 2, membrane fastenings 12, and treatment of membrane longitudinal edges in the form of dedicated outer edge profiling/shaping or ripples (not shown). In operation, as the PIG apparatus moves along inside the conduit, one or more members in communication between the movable fluid directing surfaces 52 deployed on the PIG apparatus and the irregularities in the conduit wall imparts a modulating adjustment to the fluid directing elements as the apparatus moves, which may be desirable for improved fluid dispersion control.

In one embodiment of the control of the PIG apparatus shown in FIG. 34, movable control surfaces or nozzles 55 for deflecting or redirecting the fluid flow have a modulating member attached 57, which is in communication with repeating irregularities in the conduit, in this case, the openings 2 in the conduit wall. As the PIG apparatus moves along the conduit, the modulating member is able to recess into and out of the openings, causing the modulating member to rotate about the hinge point at which the control surfaces or nozzles 53 are attached, thereby also changing the angle of the nozzles relative to the conduit wall, and modulating the velocity of the fluid plume from the conduit in a repeating pattern as the PIG apparatus progresses along the conduit. By linking fluid deflecting or directing surfaces to members in communication with repeating irregularities in the conduit wall such as openings, fastening points or edge treatment of a membrane such as a rippling longitudinal edge line, enables a dynamically repeating pattern of changing emission plume from the conduit, without the need for complex automation control and actuation mechanisms.

As with conduit configurations explained earlier with reference to FIGS. 4,5,6,19, where there are disposed around the conduit perimeter multiple separate membrane longitudinal edges to be manipulated, so to the PIG apparatus 4 is suitably adapted to act on each of the individual membranes disposed around the conduit perimeter. As such the PIG apparatus 4 has multiple membrane manipulating members 6 disposed around the cross section of the apparatus (not shown) for manipulating each of the membranes as required. The separate manipulating members deployed around the cross section of the PIG apparatus can be in line or staggered longitudinally and can be adapted to produce a twist shaped fluid plume which when moving longitudinally in concert with a moving PIG apparatus, can impart a rotation to any fluid or debris outside the conduit.

In another embodiment of the PIG apparatus as shown in FIG. 30, the region of conduit 1 in the vicinity of a protruding member performing the membrane manipulation is isolated by pistons 32 disposed at each end of the apparatus, and a fluid path is provided through a piston from at least one end, and into the region where the membrane is being manipulated 7, the path leading directly to the conduit wall underneath the membrane where there are conduit openings 2 for fluid to escape the conduit. The fluid path is terminated in a sealed and slidable connection with the conduit wall 28, allowing high pressure fluid to reach the conduit openings form the first end of the conduit 5*a*, while leaving the region between the pistons where the membrane is being manipulated, at low pressure, thereby reducing the stress on the membrane and membrane manipulating members, this reducing the effort in manipulating the membrane.

It should be noted that the membrane manipulating apparatus described herein works also with other variants of conduit, such as the type with a single slot opening down its length, in addition to the type disclosed herein with multiple individual openings.

Membrane Manipulation Assisted by Fluid Momentum Other embodiments of fluid distributed system which provide the ability to selectively control fluid emission from regions along a conduit utilizing a membrane or the like located internal to the conduit, take advantage of fluid momentum in the conduit to actively manipulate the membrane away from conduit openings by arranging an interception of the fluid path.

In one such embodiment, with reference to FIG. 70, a conduit 1, with openings 2, has a plurality of membrane sections 130 laying against the inside wall of the conduit covering openings thereby preventing fluid in the conduit from escaping. The membrane sections can be separate individual sections or can be the result of a formation resulting from periodic cutouts in the longitudinal edge of a continuous length of membrane where the longitudinal line passing through the deepest points of the cutouts forms an effective or apparent longitudinal line of attachment 12 of the membrane segments and as previously described and with reference to FIG. 3.

The membrane being in sections, limits the force required to peel it from the wall as the section is essentially decoupled from the full expanse of the membrane over the length of the conduit which is held in place by fluid pressure acting against the membrane especially in the region of the conduit openings. In this embodiment, each membrane section has a leading edge 132 in the form of a protruding extension to the end of the membrane section which, while at rest, lays against the conduit wall, the leading edge being tapered and thinner toward the conduit wall such that passing fluid in the forward direction normally results in an outward force being applied to the leading edge thereby holding the front edge of the membrane section against the conduit wall. The membrane section leading edge 132 also comprises a magnetically responsive element 134, configured to respond to the presence of a controlling magnetic element 135 located outside the conduit by urging the outermost tip of the leading edge into the path of fluid flow.

The magnetic configuration shown FIG. 70, requires a force of repulsion to perform the intended action of pushing the leading edge away from the conduit wall, necessitating opposing magnetic polarities between the controlling magnet element and the magnetically responsive element in the membrane edge. In operation, fluid can initially pass through the conduit unhindered, with all membrane sections at rest against the conduit wall blocking any fluid emission from conduit openings FIG. 70 "A".

When a magnet 135 is placed (appropriately oriented) in the vicinity of the magnetically responsive element of the leading edge of a membrane section end, the leading edge is repelled away from the conduit wall and into the path of oncoming fluid FIG. 70 "B".

With sufficient speed of fluid flow the repelled leading edge receives an additional force from the incident fluid which further separates the leading edge from the conduit wall, progressively peeling the longitudinal edge of the membrane section from the leading to the trailing end, exposing conduit holes and allowing fluid to be emitted from the conduit, FIG. 70 "C".

In practice the supply fluid pressure can be reduced momentarily to reduce the retaining force of the fluid differential pressure in the vicinity of the conduit openings to allow the membrane to be released from the conduit wall, a useful technique where it is impractical to provide a high fluid flow rate relative to the geometry, physique and resilience of the leading edge and membrane structure and relative size of conduit openings. The membrane sections are returned to the conduit wall to close the openings by reducing or terminating the fluid flow reduce or removing the force on the leading edge allowing it and the membrane section to return to rest against the conduit wall, FIG. 70 "D".

Depending on the orientation of the conduit, the effect of gravity may prevent the membrane from resting against the conduit wall in its natural state, in which case a reverse flow can be applied to act against suitably formed membrane section end trailing edges 133 which become the leading edges under reverse flow conditions. A membrane section end trailing edge 133 is attached to or is part of the end edge of the membrane, and forms a tapering end at an angle sufficient to ensure that for a membrane which is displaced from the conduit wall, that a reverse flow in the conduit is incident on the tapering surface resulting in a returning force being applied to the membrane edge thereby moving the edge toward the conduit wall followed progressively by the entire membrane section from one longitudinal end to the other. It should be noted that the detailed shaping of the membrane section end leading and trailing edge members would ideally be adapted by design to minimize the propensity to of the membrane edges to impart fluid rotation, and may necessitate integral stator fins deployed to the conduit and/or membrane to counteract parasitic or in fact encourage fluid rotation depending on any membrane manipulating influence required to counteract the effect of gravity on the membrane.

This embodiment has the advantage of being able to control each membrane individually or simultaneously by the use of one or more controlling magnets from inside or outside of the conduit, the controlling magnets also able to be transported in the form of a PIG in a separate control tube situated adjacent to or integral to, internal to or wrapping in a spiral manner around the conduit. The magnet can also be delivered to a required location by autonomous or remotely controlled vehicle such as Unmanned Aerial Vehicle (UAV) or conduit traversing robot, or semi permanently fixed in place by strap or fastener.

Another advantage of this embodiment is the simplicity of manufacture, where the membrane section end leading and trailing edge formations can be fashioned entirely by the cutting profile in an otherwise continuous membrane.

Another advantage of this embodiment is its resilience to failure of any one membrane section which can be easily decommissioned by simply plugging the relevant opening(s), and allowing the remainder of the conduit system to operate as normal.

In this embodiment various combinations of magnetic arrangement are possible. Where the control magnetic element would be deployed external to the conduit, the membrane end leading edge needing to be separated from the internal conduit wall as the first step in the control action to uncover conduit opening(s) requires an effective force of repulsion. A lower cost alternative to using a statically polarized magnet deployed on each membrane leading end edge, is the deployment of low cost magnetically responsive material such as iron in conjunction with a fulcrum mechanism to the membrane section end leading edge.

In FIG. 89 the membrane section end leading edge is shaped to provide an effective fulcrum point 137, and the magnetically responsive material deployed to the membrane section end leading edge to the opposite side of the fulcrum point relative to the leading edge extremity. When a Controlling magnetic element is deployed externally in the vicinity of the magnetically responsive element of the Membrane section end, a force of attraction urges the magnetically responsive element toward the conduit wall, resisted by the effective fulcrum point 137 against the conduit, distorting he body of the section end leading edge by and separating the leading edge from the conduit wall.

Figure 89:
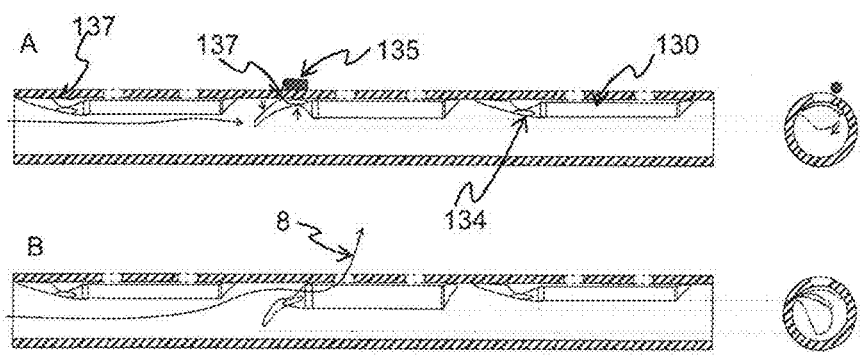
Figure 90:
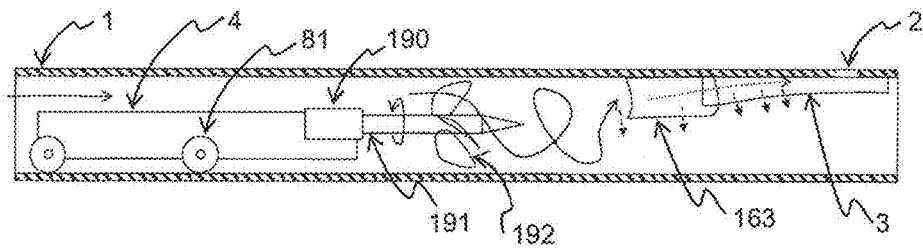
Figure 91:
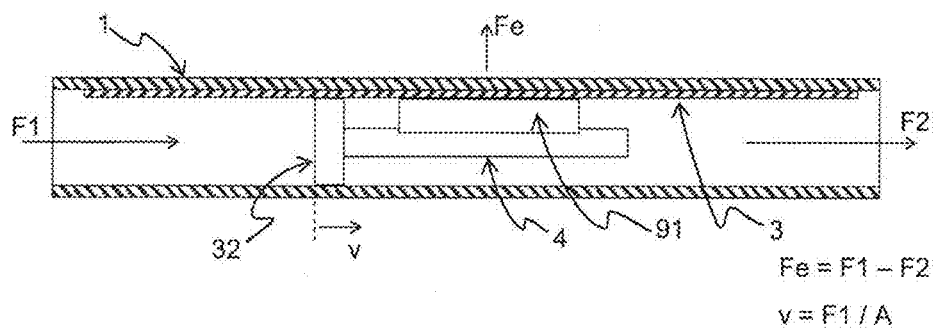

In another embodiment, with reference to FIG. 90, a variation to that explained in relation to FIG. 70 and FIG. 89, the indirect activation by magnetic interaction instead replaced by indirect action by fluid connection from an active PIG 4 with propulsion for movement along the conduit, with powered rotating surfaces such as fins, blades, rotors, propellers for producing fluid flow local to the region of the conduit where membrane manipulation is intended.

A PIG 4, has an internal computerised control system, a motor 190, a shaft 191 protruding from and receiving rotational power from the motor, the shaft having attached fins/propeller/rotor/impeller for converting rotational energy from the motor into fluid motion local to the PIG, the PIG also having a traction wheel 81 attached to a traction motor within the PIG body, and an internal power source and control system, the control system also in having communication with the motor 190.

Under the management to the internal computerised control system the PIG is able to impart kinetic energy to the fluid in its vicinity in a direction resulting in fluid being incident on an inward protruding surface of membrane, the direction, position and angle of the shaft, in the conduit and attitude of attached fins being adapted to produce deflection and manipulation of the membrane in its vicinity whereby on activation of the motor 190 on the PIG the membrane is able to be manipulated to uncover openings and allow fluid to escape the conduit. Further, on reversing the motor direction, and/or changing the shaft angle and/or by way of a separate motor the membrane manipulation is able to be reversed to again cover the openings. The advantage of such a system of control is the means of activation without making contact with the closure means. Such a PIG can be intelligent and autonomous or under control via computerised control and wireless communication to a central management system or in the other extreme can be a simple as a the motor, shaft and attached fins, powered through a cable which also provides propulsion by pulling from the end of the conduit.

In another embodiment shown in FIG. 71, a conduit opening or hole 2 is a substantial proportion of the conduit diameter. A formed membrane section 140 being substantially rigid and shaped to the internal profile of the conduit is located interior to the conduit and covers the conduit hole providing a substantial seal to the conduit hole.

A hinge member 141 being a resilient, pliable elongate piece attached to the conduit downstream of the conduit opening at one end and to the formed membrane section at the other, allows the formed membrane section to lift away from and open the conduit hole. In the fully open position the shape of the formed membrane section is such that it forms a substantial seal against the conduit, restricting or blocking continued fluid flow and forcing fluid to be diverted out of the conduit opening.

A leading edge member 142 is an elongated body with a hinged attachment to the leading end of the formed membrane section. The hinge having a limited range of movement to ensure that the leading edge member cannot fold back over or under the formed membrane section, while ensuring that at one rotation extremity, incident forward path fluid would produce a force to the leading edge acting in the direction away from the conduit wall. At the other extreme of hinged rotation the leading edge is able to lay flat against the conduit wall along with the formed membrane section and at least out of influence of the fluid path. A magnetically responsive element 143 is attached to or embedded in the leading edge member, the element being magnetically polarized to produce a force of repulsion in the presence of a magnetic field. A control tube 144 being a continuous conduit laying adjacent to conduit 1 passing in the vicinity of the magnetically responsive element carries a controlling magnetic element 135 in the form of a PIG, which can be propelled by a separate fluid.

In operation, the leading edge. In operation, fluid can initially pass through the conduit unhindered, with all formed membrane sections at rest against the conduit wall blocking any fluid emission from conduit openings FIG. 71 "A".

When a Controlling magnetic element 135 in the control tube moves into the vicinity of the magnetically responsive element 143 of the a leading edge member the magnetic repulsive force urges the leading edge of the leading edge member away from the conduit wall and into the path of oncoming fluid FIG. 71 "B".

With sufficient speed of fluid flow the raised leading edge now intercepting the oncoming fluid path moves to the full extent of hinged rotation and thereby transfers the force to the leading end of the formed membrane section 140 separating it from the conduit wall. The formed membrane section then rapidly rotates about its hinged point provided the by hinge member 141 and progressing to its fully open position resting against the opposite conduit wall exposing the conduit hole and allowing fluid to be emitted from the conduit, FIG. 71 "C".

In practice the supply fluid pressure can be reduced momentarily to reduce the retaining force of the fluid differential pressure in the vicinity of the conduit opening to allow the formed membrane section to be released from the conduit wall. The membrane sections are returned to the conduit wall to close the openings by reducing or terminating the fluid flow to reduce or remove the force on the leading edge allowing it and the membrane section to return to rest against the conduit wall FIG. 71 "D".

Depending on the orientation of the conduit, the effect of gravity may prevent the formed membrane section from resting against the conduit wall in its natural state, in which case a reverse flow can be applied to forcefully return the formed membrane section to the closed position covering the conduit opening.

The formed membrane section can have directional reinforcement to prevent it falling through the hole but allowing the leading edge to gradually peel from the front end, reducing the force required to lift the front edge. A directional reinforcement to an otherwise resilient, pliable formed membrane section can provide a progressive hinge whereby the effective hinge point propagates perpendicular to its effective axis of rotation, along the membrane section. It should also be noted that the configuration of formed membrane section can be such the leading edge and hinge axis is not completely perpendicular to conduit longitudinal axis, but at an offset angle to allow the leading edge and optionally directionally reinforced formed membrane section to peel back and to the side both reducing the abrupt nature of the final opening stage and also allowing the directional reinforcement to also be at an angle to the perpendicular to thereby provide a component of rigidity in the peeled back formation for diverting and blocking further fluid flow past the open section and preventing the formed membrane section from merely folding over to the direction of the fluid path.

An alternative configuration of the leading edge means, involves the use of a fulcrum to translate a force of magnetic attraction to an external controlling magnetic element into an inward force at the leading edge of the internal membrane through utilization of a non-polarized magnetically responsive element (for lower cost). The magnetically responsive element can provide a bulk section to which an attractive force is exerted, the bulk section being normally separated from the conduit and adjoining a section which is in contact with the conduit forming a fulcrum, followed by an adjoining section forming a lever which can rest against a section of the formed membrane section or leading edge. In the presence of the magnetic field of an external controlling magnetic element the bulk section of the magnetically responsive element is urged away from the conduit interior, opposed by the fulcrum point against the conduit, in turn causing the lever to apply a force to the leading edge separating it from the conduit wall.

Such a fulcrum based magnetically responsive element can be deployed inside the conduit, or can be attached at the leading edge of the formed membrane section replacing the need for a leading edge member.

Such a magnetically responsive element can be configured to be deployed to the outside of the formed membrane section, where the bulk section is a length of sheet metal extending from under the membrane and jutting out of the conduit hole along the outside of the formed membrane section, the conduit hole edge against the sheet metal acting as the fulcrum point, and extension beyond the conduit hole toward the membrane leading edge acting as the lever. In operation, the sheet metal is at rests in the conduit hole along or against the outside of the formed membrane section. In the presence of an external controlling magnetic element, the bulk of the sheet metal section is pulled outward from the conduit and membrane, with the conduit hole edge being the lever pivot point, and the section of sheet metal protruding between the membrane and conduit wall then acting to separate the leading edge of the membrane from the conduit wall for the fluid flow to then intercept and complete the process. Such a sheet metal section could be fastened to the leading edge of the membrane at the end of the lever, or pivotally fastened to the conduit.

It should also be noted that the hinge member can alternatively be a similar but larger profile extending past the edges of the more rigid formed membrane section to enhance the sealing capacity of the membrane section. The hinge member can also be a cutout from a large expanse continuous membrane within the conduit, and the more rigid formed membrane section then acting as a bone or could be considered as reinforcement to the large expanse continuous membrane, which also acts as the hinge. The hinge member can provide spring loading for self-return to the resting position against the conduit wall. The hinge can additionally or alternatively be an amalgamation of pliable material and a metal spring clip designed to slip over and clamp to the downstream edge of the conduit opening, the clip optionally being fastened or riveted to the conduit to prevent it slipping off.

The formed membrane section (pre-prepared) can be assembled simply by forcefully inserting it into the conduit opening forcing the sides to fold inward under spring force to allow entry into the conduit followed by attaching the hinged end to the conduit.

FIG. 72 shows a varied implementation of the conduit system (as described previously with reference to FIG. 71), where the conduit section with the opening and membrane section is isolated into a separate component, and a conduit system is assembled by joining separate pipe sections between successive such components. The component comprises a rounded edge rectangular extrusion as the conduit 1 and has molded inserts at each end for connection of Polythene pipe which becomes a continuation of the conduit. At one end, the molded insert has a hinge pin 146 for hinged attachment to a formed membrane section or flap 140. The formed membrane section or flap is rotatable about the hinge point in one direction to cover an opening in the conduit wall to a nozzled outlet 145 while providing an unrestricted fluid path through the conduit section, and in the other direction to uncover the opening to the outlet nozzle while closing off the forward fluid path in the conduit to thereby force diversion of all fluid to the nozzle. The leading end of the formed membrane section has a leading edge hinge pin 147 for attachment of a leading edge member 143. A leading edge member of semi rigid material is a substantial width of the conduit section, and extends upstream in the conduit and attached rotatable about the leading edge hinge pin 147 to the formed membrane section. The length of the leading edge is at least sufficient to ensure that with the formed membrane section resting against the conduit wall to cover to opening, the leading edge member can rotate a maximum of approximately 45 degrees to the point where the leading edge rests on the opposite conduit wall or an angle to which it can be guaranteed that fluid incident on the front end of the ramping leading edge is able to cause the formed membrane section to separate from the opening while under maximum fluid pressure and rotate to the fully open position, requiring that the leading edge of the leading edge member is able to slide along the conduit wall and not jam as a result of excessive friction angle. With the formed membrane section covering the opening and the leading edge member against the same wall, the leading edge of the leading edge member is shadowed from forward path fluid by the upstream end molding pipe end attachment such that when closed it is out of the direct fluid path through the conduit section. The leading edge member also has embedded a magnetically responsive element 143 in the form of a polarized magnetic disc, positioned to align with the path of a control tube 144, such that in the presence of a controlling magnetic element in the form of a magnetic PIG being transported in the control tube, a repulsive force is applied to the leading edge member urging it's leading edge into the path of the oncoming fluid. A coil spring located axial to and central the membrane hinge pin is biased to urge the formed membrane section against the conduit wall. Similarly a coil spring located axial to and central to the leading edge hinge pin is biased to also urge the leading edge member against the conduit wall. In operation, and with reference to FIG. 73 "A", the formed membrane section 140 and the leading edge member 142 are at rest and urged against the conduit wall by the coil springs, covering the opening and allowing fluid to pass through the conduit section unhindered. When a controlling magnetic element is present in the control tube FIG. 73 "B", in the vicinity of the magnetically responsive element of the leading edge member a repulsive force urges the leading edge away from the edge and into the flow path, the fluid then forcing the leading edge member to rotate to its full extent and substantially block the flow of fluid in the conduit, the fluid momentum and pressure then acting to in turn pull the formed membrane section from the conduit wall to uncover the conduit opening and allow fluid to pass out through the nozzle FIG. 73 "C". The fluid flow is simply ceased to allow the formed membrane and leading edge members to return to the closed position. The leading edge of the leading edge member can be narrowed at the inboard side of the leading edge where it is may be an advantage to minimize the effort in moving it into the fluid path.

The valve section depicted in FIG. 73 has been adapted to the task of starting multiple siphons in an agricultural row cropping irrigation application FIG. 74, where typically many siphon tubes pass over a supply channel bank to feed irrigation water to individual cropping rows. The act of initiating the siphon action in a siphon tube is typically a manual process and becomes labor intensive where many such tubes are in use.

In FIG. 73, a stem emanates perpendicular from the conduit section in line with the nozzle, holds a saddle 148 formed as a pair of spaced rings into which the end of a siphon tube can be placed such that the end of the siphon tube is held a fixed distance from the nozzle to directly receive fluid from the nozzle.

A retainer 149, is in the form of a flat rigid member with a hole greater than the size of the siphon tube, and attached at one side to a non-stretch strap substantially perpendicular to the ring which in turn is connected to the stem a substantial distance from the ring, the strap providing a spring bias to hold the unattached side of the ring away from the assembly. When the end of a siphon tube is pushed toward the ring, the ring allows the tube to pass through and to be seated against an internal flange in the saddle. A force applied to remove the siphon tube from the saddle is results in the ring gripping the tube and resisting its removal from the saddle, while allowing it to rotate if necessary. The tube can be easily removed from the saddle by simply pushing the unattached end of the ring to make it perpendicular to the tube. The same ring retainer system can be employed at each end pipe end entry of the conduit for ease of assembly and disassembly.

In operation, an array of siphon tubes are each separated started by causing one valve section to open at a time to feed high velocity water up into the siphon tube, forcefully replacing any trapped air with water, thereby priming the siphon.

A magnetic PIG in the control tube is then propelled to the next valve in the sequence, which on opening, prevents further flow to previously operated valves. The previously primed siphons tubes are able to continue to draw water from the supply channel up into the submerged tube held in the saddle, allowing it to pass over the channel bank to supply the crop.

To stop the siphons, repeat the starting process but with the main supply line fed with air instead of water, which can achieved with the inclusion of a one way air intake valve in the conduit close to the pump or supply, the valve allowing air to enter the conduit when under vacuum. Then repeatedly enabling and disabling the water supply in a burst like manner, allows air to be drawn into the conduit, the conduit effectively then pressurized with air and small plugs of water, which when emitted and directed into a siphon tube can effectively perform the reverse of the siphon starting process.

The system lends itself to ease of deployment and maintenance by simple replacement of an individual such component.

The advantage of this conduit system is the ability to support high flow rates, at high or low pressure, with lower restriction to diverting fluid than a diaphragm type valve and with little or no restriction to normal non diverting fluid, and less bulky than equivalent performance diaphragm valve, and less prone to fouling by debris in the fluid.

In another embodiment, with reference to FIGS. 86, 87, a conduit, membrane system is adapted to performing a sequential valve action with only one conduit opening able to release fluid at any one time, the position of fluid release being propagated to the next opening in the conduit when fluid pressure is released and then re-applied.

A conduit 1 comprising a plurality of conduit segments 180, each segment having an opening 2 and membrane segment 181 for covering the opening, the membrane segment being resilient, pliable and elastic, the membrane segment attached to the conduit 183 by passing through a slot in the conduit wall where it is retained by barbed clips or the like preventing it from being pulled into the conduit.

A membrane reinforcement member 182 being resilient and semi rigid, is a substantially flat elongate piece with a tapered leading edge, is entangled with the membrane such that the membrane lays between the membrane reinforcement member and the conduit wall, the membrane reinforcement member thereby able to transfer fluid pressure against its inboard face to the membrane in the surrounding vicinity of the opening, thereby both enhancing the sealing capacity of the membrane, while relieving pressure from the membrane directly over the opening. The membrane reinforcement member 182, has a slit near and parallel to the tapered edge, and a pair of adjacent slits along the opposite edge. The membrane emanating from the conduit wall at its attachment 183, passes through the first of the double slits in the membrane reinforcement member forming an effective point of attachment 184, then back through the adjacent slit, then across the surface and through the slit nearest the tapered edge of membrane reinforcement member, where it is fastened by similar retaining clips or barbs 187. The barbs can be integral to the membrane or membrane reinforcement member.

The conduit wall is provided with a protruding fulcrum point 186, as a protrusion emanating from the inside wall of the conduit, a short distance from the membrane attachment to the conduit such that the attachment point 183 is located between the conduit opening 2 and the protruding fulcrum point 186. When the end edge of the membrane reinforcement member which extends beyond the end closest to where the membrane emanating from the conduit wall is entangled 184 into the pair of slits, becomes seated on the protruding fulcrum point of the conduit, the membrane segment from the conduit wall is under tension and thereby urges the membrane reinforcement member and entangled membrane to seat against the conduit opening.

A releaser flap 185 being substantially flat and elongate is hinged along one edge to the protruding fulcrum 186 with a hinge axis perpendicular to the longitudinal direction of the conduit, and the opposite edge of the releaser flap having an inward bend such that it forms a raised lip when lying against the conduit wall in the direction of the hinge being fully rotated away from the reinforcement member. The raised lip is adapted to intercepting oncoming fluid, for conduit fluid flow in the reverse direction, and conversely providing minimal restriction to fluid flow in the forward direction. The releaser flap when rotated away from the conduit wall comes in contact with the end of the membrane reinforcement member close to the hinge axis and able to provide leverage to the membrane reinforcement member.

The releaser flap when raised from the conduit wall, provides a substantial interruption to conduit reverse fluid flow and thereby transfers force from the fluid momentum incident on the flap face urging the membrane reinforcement member along the conduit thereby unseating it from the protruding fulcrum. When not seated on the protruding fulcrum, the membrane reinforcement member dangles under gravity from its membrane attachment with the conduit, leaving the conduit opening uncovered while substantially blocking forward path flow in the conduit past the conduit opening. The dangling membrane reinforcement member, floats up to allow fluid to pass in the reverse direction, whereas fluid flow in the forward direction is substantially all diverted to the opening, the incident fluid against the membrane reinforcement member urges it both downward and along the direction of fluid flow such that the upper edge of the membrane reinforcement member moves over the protruding fulcrum point causing the membrane section connecting the conduit wall to stretch under tension. Subsequent cessation of forward fluid flow allows the membrane tension to the lift the membrane reinforcement member against the protruding fulcrum and up against the conduit opening and away from conduit fluid flow such that when fluid flow is resumed in the forward direction, fluid passes freely through the conduit section, while fluid pressure acting against the membrane reinforcement member pushes it against the conduit wall further sealing the conduit opening.

In operation, with reference to FIG. 87 "A", a conduit system comprising a plurality of joined conduit segments 180, is supplied with fluid at the first end 5a resulting in fluid flowing in the forward direction in the conduit which passes through any segments where the flap is seated against the conduit wall, but is diverted to the opening of the first segment encountered where the corresponding membrane reinforcement member is dangling into the conduit, resulting in fluid being emitted from the conduit 8.

The pressure of the diverting fluid against the membrane reinforcement member urges it to retreat back and overlap the fulcrum point also pushing the releaser flap back such that it becomes seated against the conduit wall, the membrane section attaching the conduit acting as a spring under tension. When fluid flow is stopped, sufficient tension in the membrane is able to lift the membrane reinforcement section up against the fulcrum point such that it lays against the conduit wall where it then rests covering the opening.

On fluid being re-applied, FIG. 87 "B", fluid is emitted from the next opening. Each time the flow and cessation cycle is repeated the point of emission is moved to the next opening along the conduit.

On applying fluid from the opposite end (second end 5b) of the conduit FIG. 87 "C", the fluid becomes incident on the lip of each of the releaser flaps, causing them to separate from the conduit wall and rotate into the reversed fluid flow where they each forcefully lever their respective membrane reinforcing members to become unseated from their fulcrum points and to thereby dangle in the conduit. Fluid can again then be applied in the forward direction to once again begin emission from the first segment.

The conduit system thereby provides a fluid application and distribution system enabling high flow rates and optionally high pressure, with individual control over each outlet, simply by way of on-off control and reversal of the fluid supply. Such control can be achieved in a simple form by the conduit making a complete loop back to the fluid source or pump, the fluid source being connected to the second end 5b via simple inline control valve, and to the first end 5a also by simple inline control valve, end 5a having in addition, a release valve to vent fluid from the conduit at the first end when fluid is supplied to the second end to enable reverse flow in the conduit. In operation, to reset all valves, the inline valve at the first end is initially closed, the release valve open, the inline valve at the second end 5b is then opened momentarily allowing fluid to flow from the source/pump through the conduit in the reverse direction and out through the release valve, the fluid flowing in the conduit acting on each of the releaser flaps to resetting or unseat all valves. The release valve is then closed, and the inline valve at the second end closed, while the inline valve at the first end is open, allowing fluid to flow in the forward direction and be emitted from the first opening. As desired, the inline valve at the first end (or pump) is cycled off then on in order to transfer the emission point to the next opening of the conduit.

For improved sealing, the conduit wall or membrane reinforcement member 182 can optionally provide a protruding ridge in the surround of the opening, to concentrate and guarantee a minimum force to the membrane through a full 360 degrees of the opening. The protruding fulcrum point 186 from the conduit can alternatively be provided as a raised section or ridge at the end of the releaser flap, such that when the releaser flap lays against the conduit wall, the membrane reinforcement member edge is able to seat on the raised section or ridge of the releaser flap, which then acts as the fulcrum point to the membrane reinforcement member holding it seated against the conduit wall under the tension of the membrane.

A further simplification may be achieved by hinging the releaser flap to the membrane reinforcement member via an intermediate short link. The short link being hinged to the releaser flap substantially close to its raised section or ridge, and in turn to the end edge of the membrane reinforcement member, the length of the short link sufficient to allow rotation such that the end of the releaser flap raised section or ridge can seat under the membrane reinforcement member when the releaser flap lays against the conduit wall, while allowing the releaser flap to lift and be rotated under and the influence of oncoming fluid flow levering the raised section/ridge out from under the membrane reinforcement member, releasing the membrane tension and allowing the membrane reinforcement section to be released from the conduit wall and dangle in the conduit.

A further simplification may involve the entanglement of the releaser flap in the membrane section attaching the conduit wall via a slit in the end of the releaser flap, providing hinge like functionality as previously described.

The conduit system as described relies on the force of gravity to ensure that a dangling membrane reinforcement member lays across the conduit substantially preventing forward fluid flow, however an additional spring member could be employed to act between the membrane reinforcement member and the conduit, to work in place of the force of gravity for conduit systems having an arbitrary orientation.

The releaser flap, hinge and membrane reinforcing member could be an integral mechanism enabling a simple assembly to the conduit. A groove provided on the mechanism could allow the wall of the conduit on the downstream side of the opening to slide into and thereby retain the mechanism in place. The assembly process to the conduit could then involve insertion of the integral mechanism through the conduit opening, followed by a push of the mechanism in the downstream direction to engage the groove with the conduit wall. The membrane reinforcement member alternatively could be recessed inside a "T" section off-take from the conduit opening. The releaser flap can be hinged to the membrane reinforcement member approximately midway along the membrane reinforcement member, allowing it also to recess into the "T" section while maintaining a full range of hinge rotation. As such the releaser flap being hinged offset at a distance from the effective hinge point of the membrane reinforcement member requires the addition of a mechanical linkage arm attached to the releaser flap close to but offset from its hinge point, the linkage arm in turn in communication with and able to unseat or release the membrane reinforcement member from its fulcrum point in response to reverse fluid flow in the conduit acting to rotate the releaser flap.

The conduit could also be of circular or irregular shaped cross section.

The system described can provide an alternative low cost method of control for "Pipe and Riser" type irrigation systems which otherwise require elaborate and expensive externally powered actuation mechanisms to perform the controlling operation.

The method of releasing or unseating the membrane reinforcement member can alternatively be achieved by an actuation means such as an electric solenoid or by magnetic interaction from an external magnet means to provide individual control over each valve where more versatility of control is required.

The hinged membrane arrangement in the assembly performing the valve action could be replaced by a valve of the pilot driven diaphragm type valve, to control the release of fluid from the conduit, where a bolt for blocking a pressure equalizing pilot hole in the diaphragm, is driven away from the pilot hole to allow pressure equalization as in standard diaphragm valves, in response to magnetic interaction with a magnetically responsive control element in an adjacent control tube (instead of an electric solenoid as typically performing the action).

Another embodiment shown in FIG. 75 a conduit 1 has openings or holes 2 in the side wall and a membrane section 3 residing internally and able to cover the openings, the membrane 3 having an effective line of attachment longitudinal in the conduit 12, and a formed lip 160 along the opposite longitudinal edge which is able to be urged by a separate force to displace it from the conduit wall and uncover conduit openings 2 allowing conduit fluid to be emitted from the conduit. The formed lip 160 as viewed from the cross section of the conduit, is in the form of a protrusion extending from the longitudinal edge and toward the conduit interior. The formed lip being continuous along the edge of the membrane in the longitudinal direction, results in little or no impedance to fluid flowing through the conduit.

For fluid flow in the conduit with any transverse circular component, such as in a spiraling path through the conduit, the formed lip presents as interference, and causes fluid to be diverted, resulting in a force being applied to the lip.

For fluid flowing clockwise in the conduit of FIG. 75 (Right hand diagram), fluid flow being incident on the side of the lip closer to the conduit call results in the lip incurring a force tending to separate the lip and subsequently the connected leading edge of the membrane, from the conduit wall.

Conversely, fluid flow in the opposite direction becomes incident on the inboard side of the formed lip of FIG. 75 (Left hand diagram), deflecting fluid toward the conduit interior, forcing the lip and membrane toward the conduit wall.

The conduit has a flap/fin 161, hinged at the conduit wall 162 with an axis of rotation at an angle in the order of midway between the longitudinal line of the conduit and perpendicular to the conduit allowing the flap/fin at one extreme of rotation to lay down in the conduit with its unhinged edges facing head-on to the oncoming fluid path, the fin laying close to the conduit wall to minimize disruption to conduit fluid flow. In the other extreme of rotation the flap/fin is raised up in the conduit, presenting as interference to longitudinal fluid flow, causing incident fluid to divert toward the conduit wall and around the interior of the conduit resulting in a vortex or spiraling fluid flow downstream of the flap/fin. The flap is located upstream or in line with the membrane section such that it is able to experience spiraling fluid resulting from the flap/fin. The flap/fin comprises magnetically responsive material and is polarized so that it can be repelled from a similarly polarized magnetic body.

A control tube 144 being a separate tube or conduit is positioned such that it passes in the vicinity of the flap/fin in the conduit PIG. A controlling magnetic element 135 in the form of a PIG and comprising a polarized magnet is propelled in the control tube by a separate fluid. In operation, the conduit 1 has a fluid flowing longitudinally in the conduit, the flap/fin is laying close to the conduit and the membrane is covering the conduit openings such that fluid is retained within the conduit.

Another fluid on being driven into the control tube, propels the controlling magnetic element through the interior of the control tube and into range of the flap/fin, repelling the flap/fin away from the control magnetic element causing it to rotate about its hinge axis and presenting the unhinged leading edge of the flap/fin to the oncoming fluid flow, causing some fluid to divert under the flap fin, driving it further into the interior of the conduit causing the hinge to rotate to the end of its travel. A continuing stream of longitudinal fluid flow in the conduit on being diverted around the conduit interior by the standing fin results in fluid becoming incident on the formed lip of the membrane, urging it and subsequently the entire membrane section from the conduit wall, uncovering the openings and allowing fluid to be emitted from the conduit. The control magnetic element can be propelled in the control tube to another location with a similar such flap/fin and membrane arrangement and thereby cause fluid to be simultaneously emitted from the second, or multiple such locations.

When fluid flow in the conduit is reduced or ceased, the flap/fin retreats due to gravity or by suitably adapted spring loading between the flap and conduit, and the membrane retreats to its resting state against the conduit wall, effectively closing all conduit openings.

A fixed stator fin or fins can be attached to a location in the conduit in line with or downstream of the membrane section, adapted to neutralize fluid rotation downstream of the flap/fin and membrane combination to prevent similar such downstream combinations from being manipulated unintentionally.

As an alternative to the a formed lip along the full length of the longitudinal edge of a membrane section of FIG. 76, the formed lip can be applied only to a finite length of the membrane section toward the upstream end as in FIG. 77. This can be implemented as a formed lip attachment 163 to the upstream end of the membrane, where the bulk of a membrane section can be a simple flat formation such as flat rubber sheet for reduced cost. In operation, an upstream flap diverts longitudinal fluid around the conduit perimeter becoming incident on the lip of the formed lip attachment, which lifts separates from the conduit wall and in turn separating the membrane end, peeling it toward the interior of the conduit and into the oncoming fluid path, causing the membrane section to peel progressively in a longitudinal direction from the upstream end to the downstream end.

An alternative implementation of the flap/fin utilizes a cantilever to enable non-polarized lower cost magnetic material to be used. With reference to FIG. 78, 79, the flap/fin has a protrusion beyond the hinge to act as a cantilever, the cantilever comprising or having disposed non-polarized magnetically responsive material such as iron. When the control magnetic element in the control tube is in the vicinity of the flap/fin, a force of attraction urges the cantilever of the flap fin toward the conduit wall causing the flap to rotate about the hinged axis thereby moving the flap/fin away from the conduit wall and into the oncoming fluid.

In a fluid distribution system comprising a conduit with a plurality of such flap/fin membrane combinations as described, a pump supplies fluid to the upstream end of the conduit. The downstream end of the conduit being connected to the intake of the pump via a pressure and flow control valve to form a closed loop. With fluid initially passing through the conduit and returning to the pump, a control magnetic element is propelled at a constant speed in the control tube by a separate fluid being injected at one end. As the control magnetic element passes through the vicinity of a flap/fin, the corresponding membrane section is separated from the conduit wall causing the conduit to emit fluid from the corresponding openings. As the control magnetic element continues along the conduit successive sections begin to emit fluid. The control valve can be closed to increase the pressure in the conduit to maximize the emission. The pump can be stopped and started periodically to terminate the flow and allow all flap/fin membrane combinations to reset. The pump is again started and with the control magnetic element continuing to move, emission from the conduit resumes again from the next successive flap/fin membrane combination, thereby providing a system with an apparent moving point of emission.

In another embodiment, an enhancement to flap/fin membrane combination described above, and with reference to FIGS. 80, 81, 82, 83, an additional flap/fin similar to that described above, but of mirror image, is located upstream of the first flap and hinged in the conduit at an opposite angle to the first such that when the flap/fin is separated from the conduit wall it causes fluid to divert in the opposite direction to the first flap, and thereby return the membrane to the conduit wall. In FIG. 80, a conduit 1 having openings 2, a membrane 3 with formed lip 160 at its leading edge, attached or retained in the conduit such that it covers conduit openings, has a flap/fin with a hinge axis at one side, with a separate protrusion extending from the hinge axis to form a cantilever, the cantilever comprising or having disposed magnetically responsive material. The flap/fin having tabs protruding from either ends of the hinge axis for providing the hinging operation. A mounting former 167 residing in the conduit is an elongate section extending the length of the conduit shaped to provide a raised floor when seated against the conduit wall. The mounting former has a plurality of cutouts in the shape of the flap/fin and tab points to define a hinge axis for each flap/fin. The flap/fin is mounted such that its tabs coincide with the corresponding opposing tab points in the former, thereby retaining the flap fin while allowing it to rotate about the hinge axis, where at one extreme the flap/fin lays against the conduit and recessed in the cutout provided by the mounting former, and at the other extreme of rotation the flap stands substantially perpendicular to the mounting former, the axis of rotation being diagonal to the conduit longitudinal direction presents the face of the fin when standing perpendicular, at an angle to the fluid path to deflect fluid to the side and ultimately around the conduit. A second flap of substantially mirror image to the first has a corresponding cutout in the mounting former with an effective hinge axis at the opposite angle to the longitudinal direction to the first flap. The first flap upstream closest to the membrane, is hinged to divert fluid around the conduit such that it is incident with the face of the formed lip of the membrane closest to the conduit wall for separating the membrane from the conduit wall. The second flap is located further upstream and hinged to the angle opposite of the longitudinal line relative to the first flap/fin to divert fluid in the opposite direction and thus return the membrane to the conduit wall and close the conduit openings. A control tube for transporting a controlling magnetic element runs adjacent to the conduit.

In operation with reference to FIG. 80, the membrane section is initially at rest against the conduit wall an covering conduit openings, and both the first and second flap/fin are laying recessed in the respective cutout in the mounting former, enabling fluid to flow unhindered through the conduit with all fluid being retained. With reference to FIG. 81, a fluid is supplied to the control tube from the downstream end, propelling the controlling magnetic element in upstream direction of fluid flow in the conduit, where it moves into the vicinity of the first flap producing a force of attraction between the controlling magnetic element and the magnetically responsive material of the flap cantilever, urging the cantilever toward the conduit wall and conversely the flap/fin leading edge into the oncoming fluid. With reference to FIG. 82, some fluid then diverting under the flap results in a change in fluid momentum thereby applying further force to the fin driving it to its full hinge extent, where it juts into the conduit interior and deflects oncoming fluid around the conduit to be incident on the formed lip of the membrane thereby separating the membrane from the conduit wall, uncovering openings and allowing fluid to be emitted from the conduit. With reference to FIG. 83, the controlling magnetic element still proceeding steadily in the opposite direction to conduit flow, moves into the vicinity of the second flap/fin, where it similarly flips up unto the fluid flow, causing a diversion of fluid around to the side and around the conduit wall but in this case the diverting fluid rotating in the conduit in the opposite direction and acting to return membrane to the conduit wall, covering the previously uncovered openings thereby terminating fluid emission. The second flap performing the cessation of emission is adapted to shadow the first flap/fin. A fluid distribution system comprising a conduit and a plurality of combinations of first and second flap/fin and membrane sections as described, is connected to a pump for supplying fluid to the conduit in the forward direction with the other end of the conduit returning to the fluid source or reservoir via a control valve. With fluid initially passing through the conduit and returning to the pump, a control magnetic element is propelled at a constant speed in the control tube toward the conduit upstream end by a separate fluid. As the control magnetic element passes through the vicinity of a first flap/fin, the corresponding membrane section is separated from the conduit wall causing the conduit to emit fluid from the corresponding opening(s). When fluid is being emitted, the control valve can be closed or reduced to increase the pressure in the conduit to maximize the emission, and can be open again to increase the flow as required for performing the membrane state changes. As the control magnetic element continues along the conduit it encounters the second flap causing fluid emission from the combination to cease.

The control magnetic element continues to progress past successive combinations, uncovering conduit openings for emission and subsequently closing them. On reaching the end, the PIG in the control tube can be returned to the starting position by reversal of the flow in the control tube.

The pump can be stopped and started to terminate the flow and allow all flap/fin membrane combinations to reset. The process can then be repeated.

The second flap/fins can be marginally offset to be out of longitudinal alignment with the first flap/fins such that the magnetic responsive material is unresponsive to a magnetic PIG in first control line, but a second control tube positioned adjacent to the conduit and optimally aligned with the magnetically responsive material of the second flap/fins can transport a second magnetic PIG to interact with separately with the second flap/fins which when activated results in emission from respective conduit opening being terminated, thereby enables control of the number of openings and thus the expanse of conduit emitting fluid at any one time. The expanse of emission can be dynamically changed, by controlling where the distance between the PIG performing the opening action to that of the PIG in the other control tube performing the closing action.

The control tube(s) can be deployed internal to the conduit cross section, or integral to the mounting former internal to the conduit.

For cost and simplicity, the mounting former and flaps can be manufactured as a layered composite of laser-cut cutouts, utilizing integral hinges formed by of compression or pinching lines in continuous polymer sections, and/or integrated with the membrane material, which has conforming properties provide a hinging effect.

Fins can be restricted in their hinged range of motion by the fin edge making contact with the conduit wall.

The membrane section doesn't need to be rectangular, but can be short with a rounded edge instead of a straight edge.

Membrane(s) can be deployed to cover openings around the interior of the conduit and not necessarily restricted to a longitudinal line in the conduit, and longitudinal edges need not be parallel to the longitudinal line of the conduit, and in fact the longitudinal edge as described need not be longitudinal as there is no need for sliding apparatus to contact he membrane. The hinged flaps/fins for performing the deflection of fluid also need not be restricted to a longitudinal line in the conduit but could be deployed arbitrarily or otherwise, such as in a spiraling manner. The hinged flaps fins can benefit from an offset and cascading positioning of deployment around the conduit, whereby a leading flap/fin responds to activation by an activator, and subsequent flap fins downstream, and offset on different longitudinal lines in the conduit act as slaves and activate in response to diverting fluid from the first activated fin to result in a larger total deflecting surface for diverting fluid to membranes which may be required where relative flow rates in the conduit are limiting and the total fluid deflection effect needs to be optimized.

NOTE: In this description, use of the terminology "Unrestrained longitudinal edge" implies that the membrane longitudinal edge can be released through urging, but does not preclude having a natural built in tendency to be urged against the conduit wall due to its own formation.

NOTE: The meaning of "Longitudinal line of attachment" of the membrane should be construed as an effective hinging point as the membrane can be held in place by an internal retainer and not physically attached or fastened to the conduit.

Where the conduit is not linear, for example has a continuous or short bend the longitudinal line should be considered as along an equivalent line, not necessarily linear.

A linear substantially flat membrane can be disposed or laid inside a conduit in a spiraling manner, with the advantage that the longitudinal edge can abut itself on successive turns in the spiral the gap between successive turns able to be controlled at the time of assembly.

The advantage of using a field coupled PIG in a separate conduit in this manner enables operation to continue in case of a failure of any one element, where a failing element can be disabled by simply plugging the corresponding hole/opening from the outside the conduit allowing the remainder of the system to continue operation.

In another embodiment, with reference to FIG. 84, a conduit of FIG. 80, 81, 82, 83, includes linkages between successive control flaps/fins in order to communicate and propagate the control state to the next successive control element in the conduit to thereby produce an apparent travelling emission plume from the conduit without the need for travelling apparatus.

Option 1: Communication by Mechanical Linkage.

The communicating linkage between successive flap/fins is an interconnecting rod or lever attached pivotal at one end to the downstream flap/fin a short distance along the cantilever from the downstream flap/fin effective hinge point to the conduit such that the rod or lever produces a relatively longitudinal movement in response to the flap/fin rotating about its hinge axis. The other end of the linkage lever extending longitudinally upstream along the conduit is able to impart a corresponding hinged rotation to the next flap/fin in response to hinged rotation of the driving flap/fin due to oncoming fluid momentum acting against its leading edge and face as it opens into the oncoming fluid flow.

A simple mechanism is fashioned to produce state based behavior, whereby the first action of the driving flap/fin is a preparation stroke only, such that when flow is ceased, the driving flap/fin is prevented from fully retreating but a subsequent resumption of flow resulting in another stroke of the driving flap/fin then lifts the subsequent flap/fin into the oncoming fluid, where it in turn responds to fluid flow to produce a full stroke of the driven flap/fin then resetting the mechanism to allow the process to be repeated. The driven flap/fin also then in turn becomes the diving flap/fin and imparts the corresponding action to the next upstream flap/fin via another such mechanism and so on. Thus a cyclic action of flow cessation and resumption acts to progress the effective point of emission from the conduit.

The said mechanism in one implementation comprises a channeled guide path in the flap/fin mounting former. The rod or lever has a protruding pin adapted to traversing the channeled guide path, which is able to move the rod end sideways in response to repeated fore and aft movement. With sufficient sideways movement the rod becomes aligned with the communicating contact point of the driven flap/fin.

At the initial starting point, the pin in the channel results in the rod being furthest sideways and out of alignment with the driven flap/fin, the channel progressing diagonally sideways forward and back in a saw-tooth zigzag pattern, the rod end moving sideways and returning on the first saw tooth is prevented from retreating completely after the first cycle, thus holding the driving flap/fin slightly open on the first flow cessation. The channel making a continued path with a further saw tooth, moves the rod end further sideways on the next forward movement of the driving flap/fin rotation due to flow resumption, the rod end then in communication alignment with the driven flap/fin, causes it to fully rotate on its hinged axis, were a protruding member on the driven flap/fin lifts the rod end to unseat the pin from the guide path while also forcing the rod to retreat sideways to its initial starting position in wait for the next time the driving flap/fin is activated.

Option 2: Communication by Fluid Linkage.

The communicating linkage between successive flap/fins is a fluid path in a dedicated miniature fluid channel passing internal to the conduit between the driven flap and the driving flap, terminated at each end in a container with a flexible surface to enable its volume to compress and expand, the flexible surface in communication with the driving and driven flaps thereby acting as actuation points. The cantilever of the driving flap/fin is in communication with the surface of the first container, resulting in compression against the flexible surface as the driving flap rotates about its hinge axis into the fluid flow due to bulk fluid momentum in the conduit, resulting in the channel becoming pressurized and causing a corresponding change in volume of the corresponding container at the driven flap/fin, where the flexible surface acts directly against the flap face to separate it from the conduit wall and in turn enable the momentum of bulk fluid in the conduit to complete the action in rotating the flap/fin to its full extent where it acts to divert bulk fluid in the conduit and thereby perform its membrane manipulating function as required.

The rate of propagation of the control state from one flap to the next, can be reduced by restricting or narrowing the fluid channel, and/or increasing the distance between the driven flap and the flexible surface of the corresponding container, thereby reducing the rate of fluid flow in addition to increasing the displacement volume required before making contact with the driven flap, thus lengthening the delay in the propagation process. The system thereby provides a natural propagation of the emission point from the conduit, with the speed of propagation determined largely by the overall inherent conduit system topology and design.

The flaps/fins can be cutouts in a continuous former which resides against the conduit wall, and the communication channels provided as cutout or slits in a thin dedicated layer immediately adjacent to the conduit wall, covered by a continuation of membrane material followed by the former covering the membrane, the actuation points being openings in the former with exposure of flexible membrane to form the said actuation points acting against the flaps/fins.

Resilience to failure of any one flap can be achieved by the simultaneous communication to and operation of two or more subsequent sections, such that each flap interacts with and effectively propagates its control state to two or more subsequent flaps.

This could be implemented on a micro or nano scale as in micro-fluidics eg for biomedical purposes.

Propulsion means;

There are various types of propulsion means for the deflector is propelled down the conduit.

The system can be passive in the sense that direct flow of the fluid to be distributed out the outlets propels the deflector down the conduit in one longitudinal direction along the conduit. However the propulsion of the deflector can be by travel of the fluid in both longitudinal directions along the conduit.

The system can be passive in the sense that the propulsion of the deflector is by a propulsion means to selectively propel the deflector in the conduit. Examples of this are:

a. the propulsion means effecting propulsion of the deflector is by a secondary fluid.
b. the propulsion means effecting propulsion of the deflector is by a moving magnetic means.
c. the propulsion means effecting propulsion of the deflector is by a pulling means.

Control of propulsion means;

A fluid distribution system control can use the control of relative fluid flow in both longitudinal directions along the conduit to control the direction and displacement of the deflector along the conduit.

A fluid distribution system control can use the pulling means causing propulsion of the deflector in both longitudinal directions along the conduit to control the direction and displacement of the deflector along the conduit.

However more detail control is used in order to obtain a fluid distribution effect.

Propulsion of Pig Apparatus

A significant aspect of the system is the provision of means for propelling a PIG apparatus 4 along inside a conduit, where the conduit and PIG apparatus have the additional characteristic of enabling fluid emission from the conduit in the vicinity of the PIG apparatus. The capacity of a conduit to emit fluid in response to internal manipulation by PIG apparatus provides varied characteristics, and opportunities for propulsion methods compared with traditional PIG and pipeline systems as will become apparent in the discussion of the following embodiments.

Figure 37:
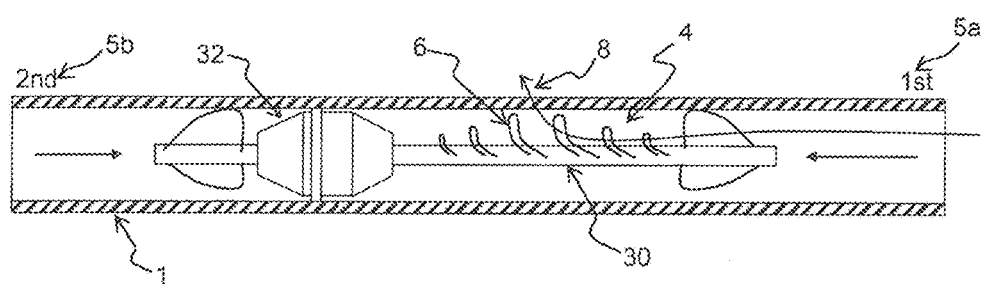

In one topology of PIG apparatus 4 as shown in FIG. 23 and FIG. 24, propulsion force is generated by fluid pressure against a piston, slug or plug 32 disposed at one end of the body or backbone 30 of the apparatus, substantially sealing against the internal perimeter of the conduit while being able to slide longitudinally within the conduit. The piston 32 is deployed on the apparatus close to the second end 5b of the conduit, and able to impart a propulsive force to the apparatus dependent on the difference in fluid pressure between the first end 5a and second end 5b of the conduit. With fluid pressure supplied to the conduit at the first end 5a for emission from the conduit 8 in the vicinity of the PIG apparatus 4, the position of the PIG apparatus in the conduit is determined and controlled by the volume of fluid (where the fluid is a liquid) in the conduit supplied at the second end 5b, where an increase in volume under pressure applies propulsive force to the piston 32 and moves the apparatus toward the conduit first end 5a against the incoming bulk fluid supply, and a decrease in volume at the second end 5b, allows fluid pressure from the conduit first end 5a to propel the apparatus toward the conduit second end 5b. It should be realized that the emission characteristics of the conduit in the vicinity of the PIG apparatus provide the characteristic for this operating mode in which position is determined solely and precisely by the control of fluid delivered from the second end 5b while a continuous pressurized delivery of fluid which is released via conduit openings in the vicinity of the apparatus is delivered from the first end for emission from the conduit. The piston, plug or slug 32 can be further enhanced to have ends of a tapered profile shown in FIG. 36, and FIG. 37 to enable it to transition through conduit into areas with membrane sections without fouling on the leading edge of the membrane as it travels through the conduit.

Figure 38:
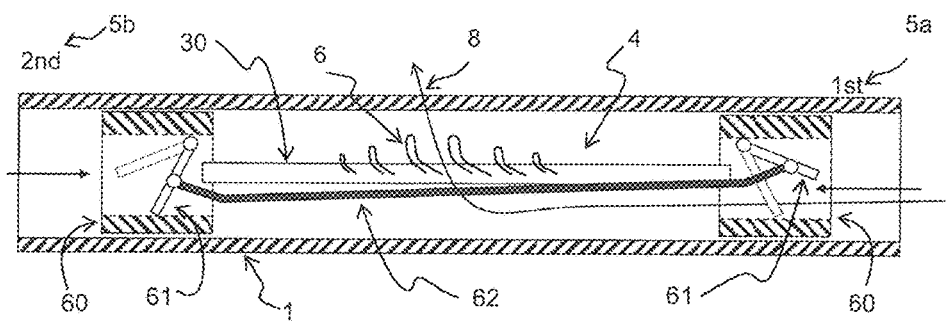

In another embodiment of PIG apparatus 4 as shown in FIG. 38, the PIG apparatus is adapted for symmetric operation in both directions, having a valve body 60 disposed at the first end 5a which plugs the conduit while being able to slide in the conduit and having a passage through the valve body from the conduit first end 5a into the PIG body area 4 with a hinged flap valve 61 disposed therein, the valve flap opening toward the conduit first end 5a, and biased to close when fluid flows from the first end of the conduit toward the flap and into the valve body of the first end, The PIG having an identical valve body 60 disposed at the second end 5b which plugs the conduit while being able to slide in the conduit, but having a passage through the valve body from the conduit second end 5b into the PIG body area 4 with a hinged flap valve 61 disposed therein, the valve flap opening toward the conduit second end 5b, and biased to close when fluid flows from the second end 5b of the conduit toward the flap and into the valve body of the second end, The valves at first and second ends of the apparatus being in communication by linkage rod 62 connecting the valves together such that when one is forced closed the other is driven open and vice versa, Fluid being injected at the first end 5a of the conduit forces the first end 5a valve closed, and opens the valve at the second end 5b, the first end of the conduit can then be locked closed by maintaining fluid pressure against the valve when it is in the closed state. Any fluid then injected at the conduit second end 5b flows into the valve at the second end of the apparatus which is held open by the pressure against the flap at the first end which applies continuous force via the connecting rod 62 to keep the flap at the second end open while fluid continues to flow through the valve body at the second end and into the PIG body area where it is able to flow out the uncovered openings in the conduit where the membrane (not shown) is peeled away from the conduit wall. Fluid can then be injected at the first end to drive the PIG toward the second end applying propulsive force against the closed flap at the first end, while fluid continues to be delivered from the conduit second end 5b which continues to flow out of the uncovered conduit openings in the vicinity of the PIG body as it moves toward the second end, The system being symmetrical allows the process to be reversed and the PIG to move toward the first end 5a of the conduit 1 in response to fluid being injected at the second end, while fluid is being delivered from the first end to flow out of the conduit emitter holes 8 in the vicinity of the PIG body.

It should be noted that other types of one-way valve can also be used including a sliding type valve.

Figure 39:
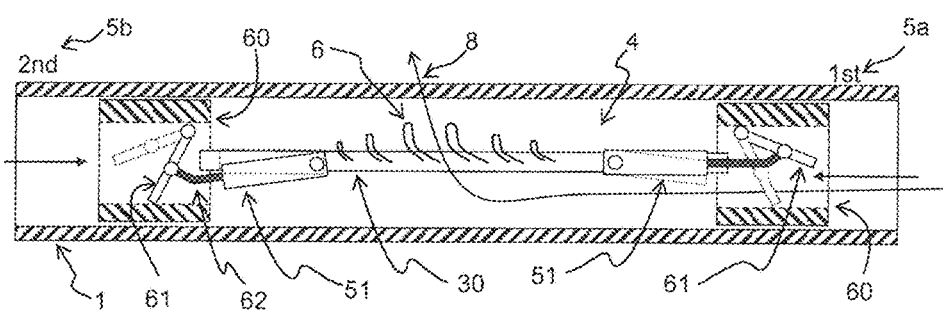

In one embodiment of PIG apparatus as shown in FIG. 39, the PIG apparatus 4 is symmetrical with a valve body 60 sealed and slidable in a conduit 1, disposed at each end of a backbone rod 30, each valve body with a valve 61 disposed therein and connected separately to individual servo actuators 51 also disposed on the apparatus, each connected and operated separately by single control system on the PIG apparatus (not shown). The backbone rod 30 has disposed apparatus 6 for interacting with and manipulating emission regulating apparatus disposed to the conduit 1 within which the PIG apparatus resides, for controlling the fluid emission 8 from the conduit in the vicinity of the PIG apparatus. With fluid being delivered simultaneously at both the first end 5a, and second end 5b of the conduit 1, the PIG apparatus has complete autonomy of control of both its position and movement along the conduit in addition to the rate of emission of fluid from the conduit, where closing a valve at one end engages fluid pressure from that end, urging the PIG apparatus toward the end with the open valve which allows fluid to pass into the apparatus and out through the conduit 8, resulting in a lower pressure against which the PIG apparatus can move. Closing both valves results in no fluid being emitted from the conduit and no movement. As such it can be seen that by modulating both valves, the control system on the PIG apparatus has complete control of the speed of movement in either direction as well as complete control of fluid flow out of the conduit.

In another embodiment, PIG apparatus shown in FIG. 66 is suited for to use in a conduit configuration depicted in FIGS. 63, 64, 65, resulting in a system which is able to deliver pressurized fluid from a region local to the position of the moving PIG in the conduit, and with an animated emission plume which can be altered or customized by replacing a fluid directing insert on the PIG. In FIGS. 63, 64, a conduit of circular cross section 1, having a plurality of openings 2 distributed longitudinally, has placed internally a membrane 3 partially encircling the internal perimeter of the conduit such that the position of one longitudinal edge is optimized such that it extends sufficiently to normally cover and seal all openings, while on being prized away from the internal wall of the conduit provides maximum exposure for fluid to escape from the openings. A resilient former 100 (optional) extends approximately the length of the membrane in the conduit and through an sufficient arc section (approximately semi-circular) to enable it to impart a retaining force to the membrane, while also acting to maintain the membrane position which is especially beneficial for conduit of substantial length with a relatively thin membrane(s) of low structural resilience. The former 100 also acts to guide and maintain the rotational position of PIG apparatus as it traverses the conduit, The former 100 can also act as an assembly aid, where the assembly process depicted in FIG. 65 involves first attaching the former to the membrane near the ends 23 prior to insertion in the conduit. The membrane and former can also optionally be fastened to the conduit 12.

The PIG depicted in FIG. 66 for use in this conduit is an adapted implementation of that described in relation to FIG. 38, where the PIG consists predominantly of an assembly of moldable components, comprising a long core body 4 with hollow threaded end for fastening of end components, tapering from each of the ends toward a thinner inner region, and having a hollow path for fluid to flow from each end to a fluid off-take 102 located midway along the body, the external area of the off-take being shaped to receive a range of interchangeable fluid directing inserts 101, each having a hollow fluid path corresponding to the fluid off-take 102 of the PIG body and being suitably shaped to mate with and attach to the PIG the body, the fluid directing insert provided with end tabs 103 for position retention.

This provides the main membrane manipulating element in the form of a finger like protrusion radiating symmetrically from the center outward and circumferentially with respect to the PIG center and gradually tapering to outer side edges and also tapering smoothly at the longitudinal ends, with the outer surface shaped to mate substantially sealably against a conduit inner perimeter and providing a hollow fluid path from the PIG body off-take to the outer surface to be in contact with a conduit, the overall shape of the fluid directing insert adapted to separating the membrane longitudinal edges from the conduit wall while minimizing the stretch experienced at all points of the membrane under manipulation, while also providing a close contact low leakage interface for fluid to the conduit wall, and where the region of the fluid path from the fluid off-take to the outer surface can be fitted with fluid directing elements in the form of vanes, nozzles and moveable elements to produce fluid emission characteristics from the conduit as suited to a particular end use application.

The PIG ends comprise a valve body inner, having a hollow center for fluid to pass, threaded at one end for attachment to the PIG body, and outwardly flanged at the other for retaining a resilient conduit sealing member, the end of the flange providing a surface against which an end plug can seal, and a center guide ring for guiding a longitudinal push rod, the guide ring held central to the hollow center by radial spokes. The PIG ends also comprising an outer flange piece slidable on the valve body inner, with an outward flange at one end for compressing against the resilient conduit sealing member and flat at the other end to receive a compression force while able to be rotated during fastening.

The PIG ends also comprise an intermediate piece, hollow and slidable on the valve body inner, and with an end surface for providing compression force to the outer flange piece while allowing rotation, and with the other end providing a tabbed interface for simultaneously mating against both the PIG body and the fluid directing insert, and an outwardly protrusion in a form of a shaped horn projecting outward away from the tabbed end in the longitudinal direction, the horn projection forming a tidy extension to the fluid directing insert, which in combination with fluid directing insert provide the PIG membrane manipulating function, with leading/trailing end edges 36 provided on the horn shape of the intermediate piece.

The PIG ends also comprise a resilient conduit sealing member constructed as a shape resembling a hollow elongated sphere of approximately constant wall thickness, and with a circular hole cut through the center forming a path through which fluid can pass and of sufficient diameter to enable it to be slidable on the outer surface of the valve body inner. The outer perimeter of the resilient conduit sealing member also optionally having one or more raised circumferential ridges on the outermost profile shaped to both reduce friction while optimizing fluid sealing capacity when moving while in contact with a conduit internal perimeter. The cross sectional shape of the resilient conduit sealing member effectively provides an inward taper at the leading edges of the PIG so as to not foul or catch on irregularities of a conduit wall when moving through a conduit.

The PIG is assembled by sliding the valve body inner through the resilient conduit sealing member such that the flanged end resides inside the resilient conduit sealing member, then sliding the outer flange piece over the valve body inner such that its flange opposes that of the valve body inner. The intermediate piece is then slid onto valve body inner which is then screwed into the PIG body. The appropriate insert is placed in position and the end pieces tightened, thereby clamping the resilient conduit sealing member in place, whilst also compressing and mating the interlocking tabs of the intermediate piece with the fluid directing insert.

The PIG also comprises a valve component comprising a rod extending through the center of the PIG slidable in the guide rings of the PIG end pieces, and with resilient discs mounted axially at each of the rod ends, the discs having a suitable diameter to provide a fluid seal when seated against the outer flange of the valve body inner, the rod length sufficient to ensure that when one disc is seated against the flange of one end of the PIG, the other disc is separated from the corresponding flange of the valve body inner at the other end of the PIG providing a substantial fluid path into the PIG body and vice versa.

In operation, the PIG is inserted into a conduit of the type described, with initial rotational orientation such that the PIG leading edges 36 are approximately consistent with the alignment of the longitudinal edges of the conduit membrane. Fluid pressure is applied at the end of the conduit with sufficient flow to propel the valve disc and rod against the flange of the valve body, thereby blocking further fluid from entering the PIG and propelling the PIG along the conduit. As the PIG moves in the conduit the membrane is prized from the conduit wall by the membrane manipulating elements, beginning with the leading edges of the intermediate piece and continuing with the finger like protrusions of the fluid directing insert. The PIG is held in rotational alignment by the opposing forces of the longitudinal prized back edges of the membrane against the finger like protrusions of the fluid directing insert. When fluid pressure is then also applied to the opposite end of the conduit while retaining fluid pressure at the first end, fluid passes through the open valve into the PIG body, through the off-take into the fluid path of the fluid directing insert to the conduit perimeter and out through any aligned conduit openings in range of the fluid path interface of the PIG to the conduit wall.

It should be noted that in the described system, conduit holes in FIGS. 63, 64, 65 are shown provided along one line only but, but with a symmetrical membrane configuration which could support duplication of the openings on the corresponding opposite side. In this case the symmetry of the membrane configuration serves to more elegantly maintain the membrane alignment. For a system with only one row of conduit outlets, the fluid directing insert and conduit construction could be non-symmetrical to maximize clearance for a more optimal fluid path to the region of the conduit holes. Further, the pattern and arrangement of conduit holes need not be restricted to a linear arrangement, where in fact any arrangement of holes which can be covered by membrane provide further possibilities for varied characteristics of the emission plume.

Figure 88:
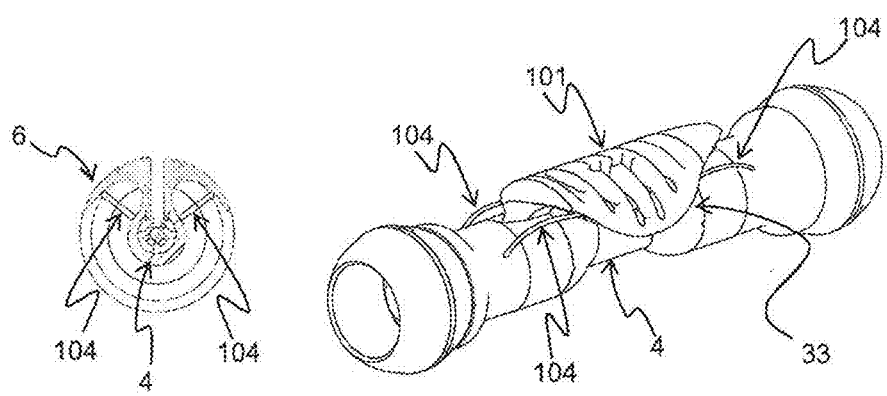

An enhancement to the PIG previously described in relation to FIGS. 66, 67 is shown in FIG. 88 in which a membrane replacing member 104 consisting of a resilient protrusion emanating from the PIG body toward the region of membrane manipulating member(s), and can be looped back to another attachment point on the PIG body, and able to apply outward force to the membrane, to ensure that it its longitudinal edge is returned to the conduit wall as the PIG moves away from a location, especially in the region following entry of the PIG to a membrane section, where the end of the membrane provides a reduced returning force to the conduit wall compared with a region midway along a membrane/conduit which benefits from the additional returning force of the adjacent expanse of membrane which is retained against the conduit wall in part by the conduit fluid pressure.

The membrane replacing member can be in the form of a spring wire loop extending longitudinally and away from the PIG body toward the membrane manipulating member, and returning to another attachment point on the PIG, the longitudinal disposition reducing possibility for entanglement with conduit irregularities. The attachment point closer to the end of the PIG can be in the form of a sliding guide hole into which the spring wire can recede to accommodate the approach of a membrane edge. A membrane replacing member can be positioned at each end of the PIG for bidirectional operation, and could alternatively be in the form of a solid protrusion or cutout (not shown) in a membrane manipulating member 6 to provide a defined pathway for the longitudinal edge of a membrane to pass.

As it is the intention of to provide options for changed characteristics of emission plume, the following are examples of enhancements and variations to the fluid directing insert for producing various emission characteristics, where;

In one example shown in FIG. 67 diagram "A", the fluid path from the off-take opening to the outer surface is provided as a series of separate parallel deep channels across the surface to be in contact with the conduit internal perimeter, effectively providing a series of separate fluid paths to conduit openings. As a channel moves into alignment with a conduit hole/opening fluid begins to flow through a widening gap pinched between the hole edge and the channel edge, resulting in a fluid spray directed at an acute angle to the conduit in the opposite direction to the movement of the PIG, the spray angle changing and becoming perpendicular to the conduit as the PIG moves and the channel aligns with the conduit opening, followed by the spray angle moving toward the opposite acute angle as the channel and hole subsequently move out of alignment and the gap pinches off as the pig progresses longitudinally. In FIG. 67 diagram A's depiction of parallel multiple cross channels, and where the conduit openings are of similar diameter to the channel width, and separated by a distance of similar magnitude to the length of the fluid directing insert, the fluid directing insert therefore results in an animating effect as it moves in the conduit, where each individual conduit opening emits a spray plume moving from fore to aft of the conduit perpendicular as each cross channel progresses into and out of alignment with the conduit opening. The insert described can produce a spray plume with seemingly rapidly changing direction and dispersion, whilst the general region of emission progresses at a moderate rate along the conduit, In another example shown in FIG. 67 "B", a large fluid path and single laterally radiating channel with a large longitudinal dimension relative to the size of conduit openings, results in a more sustained and perpendicular emission plume from each conduit opening with a reduced animation vibrancy as compared with the fluid directing insert of FIG. 67 "A", In another example shown in FIG. 67 "C", the fluid is directed across the surface of the fluid directing insert by a series of vanes, where the vanes at one longitudinal end of the fluid directing insert are substantially perpendicular to the longitudinal direction of the PIG, with the angle being progressively more slanted from the perpendicular for vanes closer to the opposite longitudinal end, such that the emission plume from a conduit opening in alignment with the fluid directing insert undergoes a subtle graduating change of direction as the PIG progresses longitudinally with successive vanes channeling fluid at a progressively changed angle of flow to the conduit opening, resulting in the emission plume from each opening performing an individual sweeping action for adding a longitudinal component to the movement of debris or foreign matter, with the intention of progressing it to within range of the next conduit opening to in effect perform a progressive long range sweeping action in the direction of movement of the PIG in the conduit such as illustrated in FIGS. 49 and 50, in another example shown in FIG. 67 "D", parallel fluid channels are provided across the surface of the fluid directing insert similar to as described in relation to FIG. 67 "A", but cut in at a constant slant to the longitudinal surface, providing an angled fluid path and resulting in fluid emission from the conduit with a consistent longitudinal component to the plume direction, useful in applications where it is advantageous to displace foreign matter or gases in the direction of movement of the PIG in the conduit, such as for use in displacing smoke from a long corridor by the emission of fluid such as water or air from a conduit system as herein described, residing longitudinally in the corridor.

Such a system can be adapted to perform a range of tasks involving the application of chemicals such as in crop fertigation and chemigation processes, (fertilizer, herbicide, insecticides etc), or for applying surface treatments such as the application of sealers, anticorrosion, and colored coatings to arbitrary bodies such as in a manufacturing process.

While it is evident from the above that there is an infinitum of combinations of conduit opening shape, size and formation of fluid direction insert, each producing a unique fluid plume characteristic, in some cases it is desirable to achieve even tighter control of the emission characteristics, one such example application is in a high performance large expanse surface area washing system, where optimized fine nozzle control is required to maximize the effective working span. In a PIG topology similar to that depicted in FIG. 68 and similar to FIGS. 30 and 66, additional provision is made for mounting a nozzle assembly 110 embedded in the fluid path for alignment with conduit openings.

The nozzle assembly 110 comprises a Nozzle frame 111 having parallel side walls and enclosed at the ends forming a single slotted frame, the frame having cutouts into the side walls from the top of the slot creating a pair of opposing recessed inclines 117 at each end. The nozzle assembly also comprising a nozzle carriage 114 with an elongated body loosely slidable in the slot of the Nozzle frame, the carriage having pointed locating pins 113 protruding downward from the base, the locating pins being sized and positioned for a neat fit into conduit openings. The nozzle carriage also having an extraction pin located at each of the lower extremities, extending across the body and protruding on either side, the pins slidable on the surface of the base of respective recessed cutouts of the nozzle frame, such that when sliding to either extreme, results in the extraction pins riding up an incline 117 and lifting the nozzle carriage.

The nozzle frame also has fitted near the center of the carriage a nozzle 112 extending through the carriage to provide a fluid path there through, the nozzle being mounted at an angle away from perpendicular and somewhat toward the direction of travel of the PIG apparatus. The nozzle has a nozzle head 119 hollow in the center and attached to the nozzle, rotatable about the nozzle axis and spring loaded with a bias such that it returns to one rotational extreme, also has an attachment point such as a grooved recess on the outer circumference for the attachment of a strap. A nozzle suitable for this application is one of the type which provides a variable focus, variable dispersion, and optionally variable direction dependent on the rotational position of the nozzle head. The details of nozzle design are not covered in this description as this is considered standard knowledge of a person skilled in the art of nozzle design. The nozzle assembly also comprises a return spring 115 such as a coiled wire spring attached at one end to the center of one of the end walls of the nozzle frame, and the other to the closest end of the nozzle carriage and biased to be in tension such that it urges the nozzle carriage to rest toward the end of its travel in the slot. The nozzle assembly also optionally comprising a non-elastic but flexible modulating strap 116 such as a thin metal strip with attachment points at the ends, with one end attached to the nozzle frame and the other wrapped partially around and attached to the nozzle head 119.

In operation and with reference to drawings, in FIG. 69, drawing "A" the nozzle frame is supported by the PIG framework longitudinally against the internal wall of a conduit and in line with conduit openings, the nozzle carriage residing in the nozzle carriage slot, with the locating studs able to slide against the conduit as the PIG moves longitudinally, fluid in the conduit is able to pass around the nozzle carriage and escape through the conduit openings, In "B" the conduit has progressed to align with the locating studs allowing the studs to lower into the openings and the nozzle carriage to seat against the conduit wall, urged outward by the flow and pressure of the conduit internal fluid, and once seated in place, blocks fluid from the opening stud filled openings, but provides a fluid path through the nozzle and out through the opening which is currently in alignment the nozzle, the nozzle able to project fluid at an angle away from perpendicular to the conduit.

In "C" the conduit has progressed relative to the PIG with the nozzle carriage still in alignment with the conduit openings, but nearing the end of its travel in the nozzle frame slot, with the nozzle carriage extraction pins approaching the nozzle frame extraction ramp. The nozzle carriage, in moving relative to the nozzle frame causes the modulating strap to impart a rotation to the nozzle head 119 thereby able to progressively change the focus, dispersion and/or direction of the plume while providing a period of sustained emission from a fixed location.

In "D", the conduit has progressed further causing the extraction pins of the nozzle carriage to ride up the extraction ramp, thereby removing the locating studs from the conduit holes and allowing the tensioned return spring 115 to drive the nozzle carriage back to the starting end in the nozzle frame slot as shown in “A”, with the nozzle head rotation also retreating to the initial starting point of rotation.

Optionally, especially for circular conduits, the nozzle frame 111 includes a tapering 131 toward the rearward end, against which extraction pins 118 of the nozzle carriage impart force if out of alignment as the carriage slides rearward toward the end of travel in the slot of the nozzle frame, urging the PIG body housing the nozzle carriage to move or rotate and realign with the line of the conduit openings or pattern of conduit openings.

The reciprocation cycle of the nozzle carriage repeating continuously while the PIG progresses in the conduit. It should also be noted that the nozzle assembly in providing a loose guide to the nozzle carriage enables the system a degree of tolerance in the positioning of the conduit holes relative to the rotational alignment of the PIG, the nozzle carriage studs also being tapered are able to engage the conduit holes without necessarily being accurately in rotational alignment.

In summary, the nozzle assembly described, provides a high level of control of a modulated fluid plume from a conduit system, and can be adapted to performing the task of sweeping unwanted debris from a large surface area such as depicted in FIG. 49 for a yard washing system such as an animal yard, utilizing water as a wash fluid where the conduit system described is deployed along the side of a yard area, the yard ideally having a gradual slope, the conduit being generally parallel to the direction of the slope, the conduit openings facing toward the yard to project a fluid plume across the yard. The yard washing system comprising a conduit 1, with membrane and PIG 4 with a nozzle assembly 110 as described (not shown), a pump 84, individually controllable valves 85 for separately controlling fluid directed to each end of the conduit, the valves each connected to a control system (not shown), the nozzle assembly of the PIG configured to direct fluid across the yard with an angle component in the direction of the slope. With the pump supplying fluid pressure, the valve directing fluid to the downhill end of the conduit is opened, propelling the PIG toward the uphill side of the yard, projecting water as across the yard, wetting and breaking up any heavy debris such as animal manure mounds. On reaching the end of its travel the valve is closed, and the other valve directing fluid to the uphill end of the conduit is opened forcing the uphill end valve of the PIG to close and thereby forcing the PIG to move along the conduit in the downhill direction. The control system then also opens the valve supplying fluid to the downhill side of the conduit, thereby supplying fluid to the downhill side of the PIG, the end valve of which being open allows water to flow to the nozzle assembly in the PIG which thereby directs a fluid plume across the yard. The reciprocation action of the nozzle assembly previously described is adapted to shifting debris both across and down the slope, whereby at the beginning of the cycle when the nozzle carriage first engages with the conduit the nozzle is to provides a substantial dispersion to the fluid plume and directed slightly downward a downward pushing debris away from the conduit, across the yard and angled somewhat in the downhill direction, as the PIG moves relative to the conduit, the nozzle head is rotated as previously described, reducing the dispersion by narrowing the plume, while also marginally adjusting the direction in lifting the plume thereby gradually increasing the reach across the yard. With each reciprocation cycle producing a sweeping action across the yard area, the system is further improved through careful control of the rate of the sweep, whereby a head of washing fluid is encouraged to build up ahead of the plume, gathering and floating debris across the yard with increasing momentum and volume, keeping debris which has broken free of the surface in flotation in a pooling wave which then continues to form a stream and flow toward the lowest point of the yard, the repeated pooling action producing a substantial improvement in performance and effectiveness of the yard washing system.

By regulating the flow rate to the uphill end of the conduit the control system can control the speed of the PIG in the conduit. Further refinement can be made in more finely modulating the PIG speed during the nozzle reciprocation cycle. The start and end of the nozzle reciprocation cycle can be easily detected remotely by the control system comprising a pressure and flow meter. The detection of periodic changes in pressure and or flow as the nozzle carriage engages and disengages with the conduit can be used by the control system to determine the beginning and end of the reciprocating cycle, to which such a predefined modulation profile must be synchronized. With knowledge of the reciprocation cycle, the control system can deduce the precise position of the PIG in the conduit, by counting the number of cycles from since being in a known position such as at the end of the conduit where the flow ceases.

In a dual conduit yard washing system of FIG. 50, opposing washing plumes from the respective conduits along the side of the yard, can be deliberately staggered in operation, with the position of the each PIG precisely known by the control system, the control system can produce a herringbone action whereby one plume is moved ahead of the other then stopped followed by the opposite side then cleaning up any missed debris and pushing it back to the other side before stopping and repeating from the other side, where in effect, the alternating, overlapping action can result in a more complete cleaning process. In consideration of alternative techniques for imparting a change to, or modulating the nozzle setting synchronous with or dependent on the position of the PIG relative to the position of conduit openings, described previously in relation to the mechanism involving the modulating strap 116, it should be noted that the strap 116 could be replaced by a chain or belt, or further, the PIG body or nozzle frame could provide a linear gear rack, and the nozzle head provide gear teeth to act as a pinion for engaging with the linear gear rack as in a rack and pinion mechanism (not shown), thereby able to impart rotation to the nozzle head when the nozzle carriage moves relative to the PIG body. Another alternative is by way of a simple lever pivotally attached at the ends to the nozzle assembly/PIG and to the nozzle, imparting rotation to the nozzle and directly changing the nozzle direction, where the nozzle has a pivotal attachment to the nozzle carriage. The advantage of these techniques of modulating the fluid plume as a function of displacement, is that the modulating profile can be intricately managed remotely by a control system able to detect the engagement/disengagement of the nozzle carriage by sensing flow and pressure changes, and able to deduce and control the position of the nozzle carriage relative to the PIG and hence the degree of nozzle modulation by metering the flow to the end of the conduit propelling the PIG to determine the displacement from the starting point in the reciprocation cycle where the nozzle carriage first engaged.

In another embodiment a wheel on the PIG, rides against the surface of the conduit inner and rotates when the PIG moves relative to the conduit, the wheel axle attached by linkage or gearing to a nozzle member to impart a cyclic change to the nozzle characteristic as the PIG moves in the conduit.

Another technique for producing an animating variation to the nozzle characteristics in producing a modulating fluid plume, is by the imparting of rotation of one or more nozzle members in response to fluid flow in the vicinity of the nozzle, for example by way of the nozzle assembly also comprising a turbine and geared fluid directing mechanism. Detailed design examples of such self-animating nozzles typically by the use of integrated turbine can be readily found in prior art, the finer details of which are therefore considered out of scope in this patent.

Figure 40:
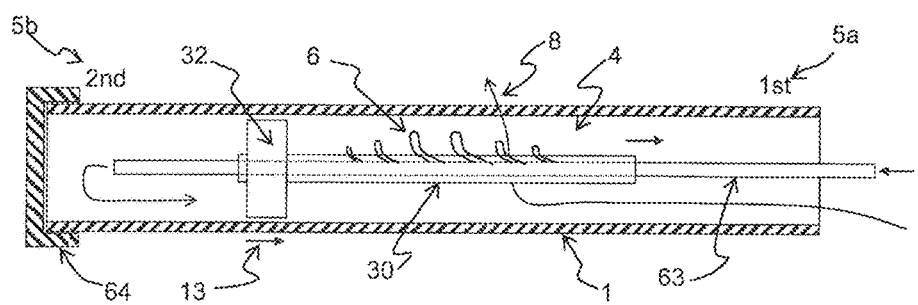

In another embodiment of PIG apparatus as shown in FIG. 40 a control tube 63 is disposed inside, and extending substantially the length of the conduit 1, and to passes through the body of the PIG apparatus 4. The PIG apparatus having a piston, plug or slug 32 sealed and slidable in the conduit, the PIG apparatus having a hole therethrough for the control tube 63 to pass, the PIG apparatus hole being sealed and slidable on the control tube, preventing fluid transfer between the conduit first end 5a and second end 5b past the PIG apparatus. The conduit second end 5b being sealed closed by end cap 64, and the control tube reaching the vicinity of the end of the conduit and being tethered in place (not shown) with a gap to allow fluid to transfer between the control tube and conduit end cap 64. The control tube can be connected to an independent fluid control source at the first end of the conduit 5a, for supplying pressurized fluid via the tube to the conduit second end 5b to apply fluid pressure against the piston, plug or slug 32 of the PIG apparatus 4 for propelling it toward the first end 5a of the conduit, while bulk fluid is delivered via the conduit first end and expelled from the conduit 8 via openings (not shown) in the vicinity of where conduit membrane 3 is displaced by members 6 of the PIG apparatus. The PIG apparatus and hence location of fluid emission from the conduit can be moved toward the second end 5b of the conduit by releasing fluid from the control tube at the first end 5a to release pressure from the second end of the conduit enabling the PIG to move toward the second end 5b under the pressure of the bulk fluid being injected to the conduit at the first end 5a.

Figure 41:
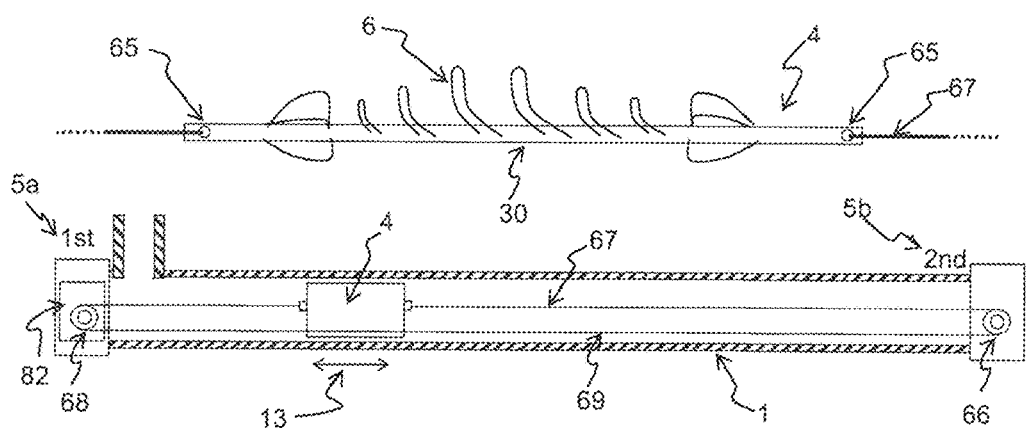

In another embodiment of PIG apparatus as shown in FIG. 41, attachment points 65 are provided at each end of the PIG apparatus body 4 for connection of a cable or chain. The PIG apparatus can also provide a dedicated through path for the returning cable 69 of a Capstan pulley 66 and drive cog/winch arrangement in which a drive cog 68 with an actuation motor 82 is disposed at the first end 5a of the conduit for pulling a cable or chain running through the conduit and attaching to the PIG apparatus at its first end, the other end of the cable 69 passing from the other side of the drive cog along inside the conduit, through the PIG and around the sheave or pulley 66 inside the second end of the conduit and returning to connect to the PIG apparatus at the second end, The PIG can be propelled to the second end 5b of the conduit by rotating the drive cog 67 in one direction, and back to the first end of the conduit 5a by rotating in the other direction.

Figure 42:
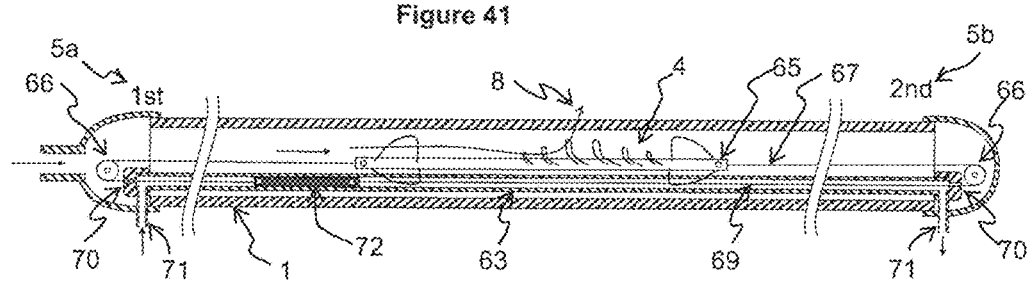

In another embodiment of the propulsion of PIG apparatus as shown in FIG. 42, the PIG apparatus 4 has attachments predominantly as described previously in reference to FIG. 41, for cord attachment 65 at both ends. Disposed within the conduit is an internal control tube 63 extending the length of a conduit 1 and plugged at each end by attachment 70, the attachment 70 having a hole for a cord to pass sealable therethrough, and a connection to external fluid supply 71. Also disposed within the conduit is a pulley or sheave 66 mounted with rotational axis perpendicular the conduit longitudinal axis, and positioned relative to the tube attachment 70 such that a cord connected to the PIG apparatus at the first end 5a in the conduit can pass around the pulley and enter the hole in the control tube attachment and pass into the control tube, where it is connected to a piston, slug or plug 72 disposed sealed and slidable within the control tube. The opposite end 5b of the conduit 1 having an identical cord connection arrangement at the opposite end of the PIG apparatus and around a pulley 66 at the second end 5b, into the control tube and connected to the other side of the piston 72 inside the control tube. The PIG apparatus is moved for example toward the conduit first end 5a by injecting Fluid into the control tube 71 at the first end 5a, and allowing fluid to vent from the control tube 71 at the second end 5b, while delivering bulk fluid for emission 8 from conduit openings (not shown) in the vicinity if the PIG apparatus. Conversely the PIG apparatus is moved toward the conduit second end 5b by injecting fluid to the control tube 71 at the second end 5b and venting the control tube 71 at the first end 5a.

A variation in the topology to that described previously in relation to FIG. 42 is shown in FIG. 43, where there is a control tube 63 shown below the main conduit 1 and Piston 72 for propelling the PIG toward the first end, and a second control tube 63 shown above the main conduit 1, and second piston 72 for propelling the PIG apparatus toward the second end 5b. The control tubes 63 (upper and lower for illustration purposes only) are external to and typically adjacent to the conduit 1, and pulley/sheaves 66 for redirecting and returning the cord interconnecting the respective ends of the PIG apparatus to the respective pistons in respective control tubes, are positioned external to the conduit, with the cord sliding sealably through a hole in the conduit 1 end cap, and similarly through a hole in the end attachment 70 of the respective control tube. To move the PIG apparatus toward the first end of the conduit 5a, fluid pressure is applied to the first end of the lower control tube as drawn in FIG. 43, and vented at a controlled rate from the second end 5b of the control tube 73. More precise position control of the PIG apparatus can be achieved by controlling the fluid vented volume at the second end 5b of the lower control tube compared with controlling the volume of fluid injection to the control tube at the first end 5a which may be subject to onerous sealing and potential leakage around the tube cord entry seal in the control tube end attachment 70. Conversely, the PIG apparatus is moved toward the second end of the conduit 5b, by injecting fluid to the upper control tube 71 at the second end 5b, and precisely controlling the volume of fluid released 73 at the first end 5*a* to control the distance of movement of the PIG apparatus toward the second end 5*b*. It should be noted that the separate control tubes and pulleys could be integrated within the conduit 1, as in FIG. 42, and likewise the single control tube depiction of FIG. 42 could be placed external to the main conduit 1.

In one embodiment of PIG apparatus 4 as shown in FIG. 44 the PIG apparatus is adapted to crawling by reciprocating action, upstream of the fluid flow delivered from the first end of the conduit 5*a*, the second end of the conduit 5*b* being capped 64 to prevent fluid from escaping from the conduit; The PIG comprises a hollow center rod 30 providing a passage for fluid to pass from first end 5*a* to the second end 5*b* of the conduit, the rod at its first end has disposed a valve body 60, the valve body plugging the conduit 1 while being slideable in the conduit and also being sealed and slidable on the rod 30 and a spring 43 disposed on the rod urging the valve body toward the first end 5*a* the valve body having a passage to allow fluid to pass from the conduit first end 5*a* into the body area 4 of the PIG apparatus, the passage having disposed internally a valve 61 with a mechanism to toggle it cyclically open and close (not shown), With reference to the top diagram of FIG. 44, in the first phase of the reciprocating cycle the valve 61 is in the closed position and fluid pressure from the first end of the conduit pushes the valve body along the rod 30 toward the second end 5*b* compressing the spring 43. In the second phase of reciprocation, the valve 61 cycles open as shown in the middle diagram, fluid flows through the valve body 60 into the PIG body area and escapes from the conduit 8 via conduit emitter holes (not shown), allowing the spring to then decompress as the valve body moves towards the first end of the conduit. In the third phase as shown in the bottom diagram, the valve cycles closed again, fluid pressure against the valve body from the first end of the conduit urges the valve body toward the second end 5*b*, fluid also passing through the rod to the second end of the conduit, resulting in both the valve body 60 and the piston 32 being urged toward each other, until the spring is fully compressed. The reciprocation cycle repeats, with each cycle moving the PIG apparatus incrementally upstream toward the first end of the conduit. In this topology the valve body requires equal or greater resistance to sliding in the conduit as compared with that of the remainder of the PIG apparatus, as such, a one-way acting brake 59 can be fitted to the valve body to increase the resistance of the valve body to sliding in the conduit toward the second end 5*b*, to ensure that fluid pressure against the valve body and Piston assembly results in the piston moving toward the first end 5*a*, and the valve body remaining stationary during this phase of the reciprocating cycle.

In another embodiment of PIG apparatus as shown in FIG. 45, the method of propulsion is by way of a worm-like action and able to derive propulsive motion in both directions in the conduit from fluid pressure being supplied only to the conduit at the first end 5*a* with the second end 5*b* open, The PIG apparatus 4 has a hollow backbone 30 residing longitudinally inside a conduit 1, conduit fluid control apparatus 6 disposed toward the center of the rod, a piston 32 sealed and slidable in the conduit is fixed to the rod at the second end 5*b*, the rod extending through and beyond the piston toward the second end 5*b* and having a slave piston 42 sealed and slidable on the extended end rod, the second end 5*b* of the rod being capped to both provide a fluid seal and also to retain the piston 42 from sliding off the second end of the rod, a coil spring 43 is disposed concentric to the rod between the end cap and the slave piston 42, urging the slave piston along the rod toward the fixed piston 32.

The fixed piston 32 has a fluid path from the rod center, out to the second end of the piston, and also a fluid path through the piston from the second end 5*b* to the region of the conduit fluid control apparatus 6. A valve 61 disposed in the fluid path of the piston 32 is controllable to provide two states, the first state blocks the flow of fluid through the piston while enabling a path form the rod first end 5*a* to the second end 5*b* of the piston, and the second state enables the flow of fluid through the piston while blocking the flow of fluid through the rod from the first end 5*a*. A valve body 60 is sealed and slidable on the rod at the first end 5*a*, and sealed and slidable in the conduit. A coil spring 43 is disposed to the rod between a stop on the rod and the valve body to urge the valve body toward the first end 5*a* of the rod. The valve body has a fluid path from the first end of the conduit 5*a* through to the region of the conduit fluid control apparatus 6. A valve 61 is disposed in the fluid path of the valve body to prevent fluid from passing when closed, or allowing fluid to flow freely from the conduit first end 5*a* to the region of the fluid control apparatus 6 when open. The valve body 60, piston 32, and slave piston 42 have each disposed a one-way brake 59 acting against the conduit wall to resist movement of the respective components in the conduit toward the second end 5*b*. The valve 61 in the valve body 60 and the valve 61 in the piston 32 are each controlled cyclically and autonomously by control apparatus (not shown) to produce a reciprocating action, as shown in FIG. 45, the top diagram shows the first phase of the reciprocating cycle with the valve body open allowing fluid flow into the area of the conduit fluid control apparatus 6 and allowing fluid to be released from the conduit 8, while allowing the valve body spring 43 to relax and the valve body 60 to retreat toward the first end 5*a* against the bulk fluid flow, The second phase of the reciprocation cycle shown in the middle diagram of FIG. 45, the valve 61 in the valve body 60 is closed, blocking the fluid flow through the valve body. The valve 61 in piston 32 is open to fluid flow from the first end of the conduit 5*a* via the rod 30, applying fluid pressure from the conduit first end 5*a* to the region between the slave piston 42 and the piston 32, resulting in the assembly of the piston 32, rod 30, and conduit fluid emission control apparatus 6 moving toward the first end of the conduit against the resistance of the one way brake of the slave piston 42, compressing both the spring 43 acting against the slave piston and also the spring 43 acting against the valve body, The third phase of the reciprocation cycle is shown in the lower diagram of FIG. 45, where the valve 61 in the piston 32 is closed to fluid from the first end of the conduit 5*a* via the rod 30, but has an open fluid path through the piston from the region between the slave and fixed pistons, into the region of the conduit fluid emission control apparatus 6 which is at low pressure with the valve in the valve body being closed to bulk fluid from the first end of the conduit, thereby allowing the slave piston 42 to retreat toward the piston 32 under spring force as fluid bleeds form the area between the pistons and into the region of conduit fluid emission control apparatus 6, where fluid can escape the conduit, The cycle then repeats with the first phase of the reciprocation cycle, with the PIG apparatus moving toward the first end 5*a* of the conduit against the bulk fluid supply, while the second end of the conduit is open, and never receiving or venting any fluid.

The PIG apparatus can also move toward the conduit second end 5b in the direction of the bulk fluid flow, by releasing the respective one-way brakes 51 of the valve body 60, piston 32 and slave piston 42 and closing the valve 61 in the valve body 60 thereby engaging the fluid pressure of the supply fluid against the valve body to move the PIG apparatus toward the second end.

Propulsion by Percussion

In another embodiment of PIG apparatus as shown in FIG. 46, the PIG apparatus 4 residing in a conduit 1, is adapted to moving by percussive reciprocating action against the flow of bulk fluid fed into the conduit from the first end 5a, The PIG apparatus has a backbone rod 30, with conduit fluid emission control members 6 disposed toward the center thereon, a piston plug or slug 32 disposed at the second end 5b of the rod being also sealable and slidable in the conduit, the piston optionally having attached a one way brake 59 acting against the conduit wall for resisting motion toward the second end 5b of the conduit, and a valve body 60 sealed and slidable on the rod 30, and sealed and slidable in the conduit, the valve body having a path for fluid to pass from the first end 5a of the conduit through the valve body into the region of the conduit fluid emission control members 6, where it can be released from the conduit 8 in accordance with methods (not shown) explained earlier in this description.

A valve 61 is disposed in the fluid path of the valve body for blocking fluid flowing through the valve body when closed, and allowing it to flow freely when opened, the valve being cyclically controlled (not shown) to oscillate between open and closed states. The valve body being slidable on the backbone rod 30, is limited in its range of sliding movement by end stops disposed to the rod on either side of the valve body, a spring 43 disposed between the second end 5b of the valve body and end stop, urges the valve body to be pressed hard up against the end stop at the first end 5a of the valve body, The first phase of the reciprocating action shown as the top diagram in FIG. 46, the valve 61 is in the open state, allowing fluid to pass freely through the valve body and out through the conduit wall 8 in the region of the fluid emission control members 6, the valve body being pressed against the end stop by the spring 43, The second phase of the reciprocating action shown as the middle diagram in FIG. 46, the valve 61 has cycled to the closed state, resulting in fluid pressure from the conduit first end 5a pushing the valve body toward the second end 5b, compressing the spring against the action of the one-way brake 59 at the piston 32, The third phase of the reciprocating action shown as the bottom diagram in FIG. 46, the valve 61 has cycled to the open state, relieving the pressure against the valve body and allowing it to retreat toward the conduit first end 5a as the spring energy generates momentum in the valve body, the valve body then colliding against the end stop on the rod where the momentum is then shared in a percussive action with the entire PIG apparatus 4 which then moves incrementally toward the conduit first end upstream to the bulk fluid flow, The reciprocation cycle repeats continually, the PIG apparatus thereby crawling toward the first end of the conduit against the bulk fluid supply, while the second end of the conduit remains open, and never receiving or venting any fluid. Downstream motion can be achieved by releasing the brake 59 and closing the valve 61.

It should be noted that variations in types of valves, springing techniques such as pneumatic springs and connecting rods, for example a plurality of rods, or even an arbitrarily shaped body with a through-path can achieve the same working principles disclosed herein. It should also be noted that the movable valve body described in relation to FIGS. 44, 45, 46 could also be implemented as a combination of a valve body which is fixed to the apparatus, and a separate piston, plug or slug able to move relative to the apparatus and respond to upstream fluid pressure by moving relative to the apparatus. The components of the apparatus described in relation to FIGS. 44, 45, 46 namely the slidable pistons, one way brakes, movable valve body, and springs, shall also be known collectively as providing a reciprocating locomotion means.

The advantage of being able to crawl in both directions of a conduit which is supplied by fluid from one end only as described, greatly reduces the cost and complexity of conduit network installation, virtually eliminating the need for control valves and conduit return paths to achieve bidirectional motion of the PIG apparatus in producing a fluid emission plume from a conduit.

In another embodiment of PIG apparatus as shown in FIG. 48, motion is produced by on-board battery driven electric traction motor driving a traction wheel, caterpillar tracks or vibrating ratchet mechanism. The PIG apparatus has disposed a fluid turbine 80, connected to an electrical energy storage and control module 83, and a traction motor 82 with traction members, in this case wheels 81 in communication with the conduit wall in which the apparatus resides, and mechanisms for manipulating apparatus 91 of the conduit for controlling fluid emission 8 from the conduit. Fluid passing into the region of the PIG apparatus and exiting 8 from the conduit, also passes through turbine 80 generating electric energy, which in turn is either stored on board 83, or used to generate motion of the PIG apparatus in the conduit by the traction members in communication with the conduit wall.

In another embodiment of PIG apparatus also as shown in FIG. 48, electric power to charge the battery is generated by energy extracted from the bulk fluid flow in the conduit by turbine, rotating piston or reciprocating piston type electric generator integral to the PIG system 80, and being in the fluid path to intercept the flow of fluid as it transfers either to the conduit second end or out past the conduit membrane 92 and out through the holes in the conduit in the vicinity of the PIG (not shown). The electric power for propulsion can alternatively be delivered via a low voltage AC inductive loop as shown in FIG. 62 formed by a single insulated wire 87 running the length of and concentric to the conduit, passing through inductive transformer 89 in the PIG, the loop circuit being closed by earth or conductive fluid connection at each end of the conduit. In another embodiment, electric power for propulsion as shown in FIG. 47 is delivered to the PIG apparatus via an insulated lead 87, which can be fed from a recoiling spool 86 at one end of the conduit through which electrical power is supplied. The lead can be a single insulated wire, with the return path via the conductive capacity of the fluid residing or flowing in the conduit.

It should be realized that the propulsion methods described herein are particular to a general method of selective release of fluid from the conduit in the vicinity of the PIG apparatus for venting and releasing fluid as part of the propulsion methodology. Although this description is typically with reference to the methods outlines in this description for producing a selective release of fluid from a conduit, it shall be understood that the methods of propulsion described here are applicable to any method for causing a selective release of fluid from a conduit in the presence of movable apparatus being propelled, and not limited to only those methods of fluid release described herein.

Control Over Fluid Distribution System for Selectively Distributing Fluid from Multiple Locations.

PIG Apparatus—Control, Communications and Sensing

In the following section of the description apparatus in the form of a device known in prior art as a Pipeline Inspection Gauge (PIG) 4, for traversing internal to a fluid carrying conduit 1 has the additional capability of being able to interact with fluid emission control apparatus disposed along the conduit for controlling individual or continuous fluid emission points, holes or valves along its length, the Pipeline Inspection Gauge (PIG) apparatus able to interactively controlled and monitored by central computer management system, to adjust and assist the emission apparatus of the conduit in its vicinity for the selective control of fluid release at any point along the conduit traversable by the apparatus, the PIG apparatus comprising in combination;

a. a body which can fit internal to a conduit comprising a means of propulsion within the conduit, a means of selectively engaging and applying force to emission control apparatus disposed along and integral to the conduit, a means of communicating information such to and from a central computer management system.

In one embodiment shown in FIG. 61, a computerized management system 90 located external to a conduit 1 is in communication with PIG apparatus 4 by way of sonic signaling via the fluid in the conduit, the conduit wall serving as a wave guide. A sonic transducer 88 (transmitter and/or receiver) is disposed on or in the conduit typically at one end thereof, to transmit and/or receive sonic signals to and from conduit fluid, and similarly the PIG apparatus has disposed sonic transmitter and/or receiving apparatus 88 for corresponding with the signal messages transferred via the fluid in the conduit.

In one embodiment shown in FIG. 62, communication signaling and power transfer is along the conduit to the PIG apparatus by single conductor alternating current (AC) inductive loop. A single insulated conductor 87 disposed internal to the conduit 1 and running the length of the conduit and passing through the PIG body 4, the PIG able to slide freely on the conductor, the PIG having disposed therein an inductive transformer 89 encompassing said conductor to extract energy and transmit and receive electrical signal messages, the conductor being attached to a probe at the far end of the conduit, the probe being in contact with the conduit fluid and/or in contact with the earth, the near end of the conduit having Alternating Current (AC) generation apparatus, is attached to the conductor and to a probe which is in contact with the conduit fluid and/or the earth, such that the return path for AC electric current is via the conduit fluid and/or external earth.

A variation to this embodiment for use where the fluid return path is non-conductive includes a second separate conductor (not shown) consisting of an insulated or non-insulated conductive wire connected to the first conductor at the conduit far end and returning outside of the transformer on the PIG, which can be either inside or outside of the conduit. As such the dual conductor forms a single loop from an AC generation source through the inductive transformer, thereby providing a means of signal and energy transfer to and from the PIG apparatus, without the need for a high maintenance galvanic connection to the PIG apparatus.

In another embodiment, the communication with the PIG apparatus is by way of electromagnetic radio signals, the PIG apparatus having disposed therein a radio transmitter and/or receiver for transmitting and receiving radio signals.

In one embodiment of the control of the PIG apparatus the speed of movement is controlled by modulating the bleed of fluid from one side of the PIG through to the other, the PIG apparatus having disposed a plug, piston or slug, substantially sealed around the conduit perimeter for blocking fluid flow past the PIG in the conduit, a passage through said piston, plug or slug for fluid to pass, a valve disposed within said passage which blocks the flow of fluid when closed, and electronic program control circuitry and electronic program control circuitry driving a servo actuator in communication with the valve. When the valve is open fluid flows in the PIG apparatus and out through openings in the conduit wall, and when closed the fluid pressure imparts propulsive force to the PIG apparatus. The electronic control circuitry on the PIG apparatus can control the speed of movement in the conduit by modulating the valve and hence the amount of propulsive force derived from the fluid.

In one embodiment of shown in FIG. 48, the control of the PIG apparatus 4 the means of selectively engaging with fluid emission control elements disposed along the conduit is controlled by electronic program controlled circuitry 83 disposed on the PIG apparatus connected to actuators to manipulate elements of the conduit which are able to affect the release of fluid from the conduit in the PIG vicinity, The PIG having disposed thereon, electronic control circuitry, one or more actuators in communication with the electronic control circuitry, rigid or resilient protrusions connected hingeably, slideably or flexibly to the PIG apparatus, said protrusions being in mechanical communication with the actuation means and able to move in response to electronic control programming to engage physically with said conduit emission control elements of the conduit to adjust and modulate the emissions from the conduit in the vicinity of the PIG apparatus.

In one embodiment of the control of the PIG apparatus shown in FIG. 48 the means of selectively engaging with fluid emission control apparatus disposed along the conduit is by way of electromagnetic field generated on the PIG apparatus which is able to engage with magnetically responsive elements on the conduit fluid emission control apparatus in the vicinity, The PIG having disposed thereon, electronic control circuitry 83 and one or more components for generating a magnetic field 91 in communication with the electronic control circuitry and able to manipulate conduit emission control apparatus 92 disposed on the conduit 1.

In one embodiment of the control of the PIG apparatus also shown in FIG. 48 the control surfaces for directing the flow of fluid in its path to the conduit emission points are able to be actively moved under electronic program control, to vary and modulate the emission plume from the conduit, In the PIG apparatus 4 is disposed one or more vanes or fluid deflecting elements 52 adapted to redirecting the fluid to produce a desired emission plume, each connected to the PIG body by movable joint 93 and located in the passage of fluid flow within the conduit and in the vicinity of conduit fluid emission 8, electronic program control circuitry 83 connected to one or more actuators 51 disposed on the PIG body, the actuator(s) being in physical communication with the fluid deflecting elements 52 for the purpose of forcibly setting and varying the position and angle of the deflecting elements in the path close to the point of emission from the conduit.

In one embodiment of the control of the PIG apparatus as shown in the combination of FIG. 48, and FIG. 61, the PIG has disposed electronic program control circuitry 83, and communications transceiver 88, electronic pressure and flow sensors 94 disposed in the vicinity of the controlled emission points of the conduit and also in the conduit at either ends substantially away from the vicinity of controlled fluid emission from the conduit for deducing flow volumes, rates and conditions of the fluid entering and leaving the conduit including for deducing the transverse speed of the PIG in the conduit, one or more cameras disposed thereon (not shown) for visually inspecting the inside of the conduit and one or more electronic actuators disposed thereon and able to physically or magnetically engage with emission control elements 92 disposed on the conduit in its vicinity, and also disposed within the PIG body area in the fluid path in the vicinity of the conduit emission, fluid deflecting elements 52 attached by movable joint 93 to one or more actuators 51 connected and controlled by the electronic program control circuitry 83, a propulsion mechanism 82 connected to and controlled by the electronic control circuitry, the program thereby able to control the speed of movement of the PIG apparatus, the shape and intensity of the fluid dispersion from the conduit, both autonomously and in response to commands from a central management system and to report status and all sensed data via the communication back to a central computer management system 90.

Shaping Device

With reference to FIGS. 92 to 111, there is shown a means of imparting mechanical actuation to a physical member in communication with a control tube or conduit at any location along its length. This can be derived from the displacement of its outer surface resulting from the influence of an internal shaping device, able to traverse internally and be propelled in the control tube or conduit, such as by a. the influence of fluid pressure in the control tube, or b. by cable/chain attachment to a winch, the shaping device having a characteristic shape in the longitudinal and/or lateral directions different to the natural or predetermined shape of the control tube, thereby imposing a displacement to the internal surface and subsequently indirectly to the external surface of the control tube in the vicinity of the internal shaping device.

Any physical member in communication with the external surface of the control tube is actuated in response to surface movement or displacement of the control tube resulting from the shaping device transitioning into and then out of the vicinity of the physical member under actuation, as the shaping device proceeds along the control tube.

Such a method of actuation is particularly useful in the task of remotely managing the manipulating of control elements such as membranes which gate the flow of fluid through openings in a conduit system, and especially where there are multiple such elements deployed in a distributed manner along a conduit system for managing the application and distribution of fluid from the conduit where an element or sub group of elements is expected to be in operation at any one time, and where the control process benefits from an inherent sequential operation or effective managed travelling point of operation.

The actuation method need not be confined to the control of fluids in a conduit system but can be used in any application requiring managed sequential control such as in the control of distributed gating in feed delivery to animal yards.

In an embodiment of a conduit system for controlling fluid distribution from along its length, a conduit has openings or holes in the side wall along its length, a membrane or membranes disposed internally normally covering the conduit openings to prevent fluid from being released from the conduit, and also disposed internal to the conduit along its length, a control tube, which itself is a smaller diameter conduit for transporting a shaping device, the control tube outer surface being in communication either directly or indirectly with both the conduit wall and membrane(s).

A shaping device able to slide inside the control tube includes one or more slide-able pistons, plugs or slugs for sealing against the internal walls of the control tube and preventing fluid from moving past the shaping device in the control tube, the shaping device having a body shape which is irregular along its length adapted to distorting the external profile of the control tube in such a way that the control tube external surface traverses a particular route, path or trajectory in the lateral plane of the conduit as the shaping device moves past a particular point, such that a communicating member present at a particular location in the conduit which is in communication with the control tube external surface becomes actuated in a manner adapted to cause manipulation of the membrane such that conduit openings become exposed when the shaping device is in the vicinity, and subsequently covered as the shaping device retreats.

With bulk fluid being supplied to the conduit at one or both ends, the conduit emits fluid from openings in the region of the vicinity of the shaping device where the membrane is under manipulation and conduit openings are uncovered. A separate fluid supplied to the control tube at one end propels the shaping device toward the other end of the conduit, therefore causing the region of fluid release to propagate along the conduit as desired.

In another embodiment, with reference to FIG. 94, a conduit system comprising a conduit of substantially circular cross section 1, with openings 2 along its length, a membrane 3 disposed internally to cover the openings and normally preventing fluid from being released from the conduit, the membrane being of resilient semi stiff material, and of a narrow profile in cross section encircles at least half of the internal perimeter of the conduit thereby providing two longitudinal edges in the conduit, the membrane natural outside diameter sized larger than the internal diameter of the conduit so as to provide a built in continuous outward force to the conduit.

The membrane is positioned in the conduit such that the unrestrained longitudinal edge 11 is as close as practicable to the conduit openings while affording adequate sealing of the openings. The unrestrained longitudinal edge 11 in cross section includes an inward protrusion, hollowed to house a control tube longitudinally in the conduit, a control tube then able to be slid into the membrane from one end during assembly. The membrane can be fastened to the conduit in one or more places to ensure stable alignment of the leading edge 11 with the conduit openings.

A shaping device 200 comprising a shaping element 201, the shaping element consisting of a stiff, smooth rod with an arched bend, the rod diameter being a significant portion of the control tube diameter is able to slide in the control tube, the arch bend radius being large compared with the rod diameter, the shaping element having disposed a piston, plug or slug 202 at each end, the piston, plug or slug adapted to sealing against the control tube interior to enable fluid pressure applied to the control tube to urge and propel the shaping device longitudinally in the control tube.

The shaping device in the control tube imposes the form of the shaping element to the control tube outer surface which in turn manipulates the membrane by directly communicating the distorted shape profile to the membrane leading edge which is thereby urged away from the conduit wall, uncovering conduit openings and allowing fluid to be emitted from the conduit. On applying sufficient fluid pressure to the control tube, the shaping device is propelled along the control tube, thereby moving the location of membrane manipulation and hence the region of conduit emission.

For a suitably adapted shaping device the degree of membrane manipulation and hence the restriction to emission flow from the conduit can be adjusted or modulated by applying and modulating fluid pressure to the control tube from both ends of the conduit, whereby applying pressure to both ends directs an inward force to the ends of the arch of the shaping element as depicted in FIG. 93, causing the shaping device to distort and exacerbate the shape profile and hence increase the degree of membrane manipulation and thereby reduce the restriction to the fluid emission from the conduit at the location of the shaping device. The membrane protrusion forming the housing for the control tube is a source of structural rigidity and resistance to membrane manipulation which can be reduced by treatment in the form of periodic slits in the longitudinal direction of the conduit, each slit penetrating from inboard the conduit, partly through the protrusion forming the control tube housing, but leaving the membrane layer adjacent to the conduit intact and continuous.

In another embodiment with reference to FIG. 95, a conduit system comprising a conduit of substantially circular cross section 1, with openings 2 along its length, a membrane 3 disposed internally to cover the openings and normally prevent fluid from being released from the conduit, the membrane being of resilient flexible material, and of a narrow profile in cross section encircles approximately half of the internal perimeter of the conduit thereby providing two longitudinal edges in the conduit.

The membrane is positioned in the conduit such that the unrestrained longitudinal edge 11 is as close as practicable to the conduit openings while affording adequate sealing of the openings. A control tube of approximately circular cross section lies between the membrane and the conduit with sufficient distance from the longitudinal edge 11 to be inboard of the conduit openings such that the membrane can lay flat over the openings, the control tube being longitudinal in the conduit. The membrane can be fastened to the conduit in one or more places to ensure stable alignment of the leading edge 11 with the conduit openings.

A shaping device 200 comprising a shaping element 201, the shaping element consisting of a stiff, smooth rod bent in the shape of a spiral with the ends protruding offset from the spiral central axis, the rod diameter being a significant portion of the control tube diameter is able to slide in the control tube, the spiral bend radius being large compared with the rod diameter, the shaping element having disposed a piston, plug or slug 202 at each end, the piston, plug or slug adapted to sealing against the control tube interior to enable fluid pressure applied to the control tube to urge and propel the shaping device longitudinally in the control tube.

The shaping device in the control tube imposes the form of the shaping element to the control tube outer surface in this case a spiral which produces a circular motion of any point on the surface of the control tube, the circular motion lifting the membrane and ensuring membrane is displaced from the conduit wall for any rotational alignment of the shaping device. The control tube can be glued or welded to the membrane and/or a groove can be added to the conduit to prevent it slipping out from under the membrane. The membrane can be attached to the conduit to the opposite side of the control tube.

In another embodiment, with reference to FIG. 96, a conduit system comprising a conduit 1 with openings 2 and a membrane 3 disposed internally against the conduit wall for covering the openings, the membrane being resilient but semi rigid encircles the conduit cross section leaving a longitudinal gap between the longitudinal edges.

A control tube 144 is disposed internal to the conduit and resides between the conduit and membrane in the gap between the membrane longitudinal edges and is held in position by the natural retaining spring force of the membrane, the longitudinal edges of which are held away from the conduit wall by the presence of the control tube, the conduit openings positioned a short distance under the membrane away from the control tube beyond where the membrane first makes sealable contact with conduit. The membrane being of simple form can be manufactured by cutting a longitudinal slit in a pipe.

A shaping device 200 with a shaping element 201 in the form of a strategic snake-like profile comprising a longitudinal arch bend extending from one end in an approximately horizontal plane followed by a bend toward the opposing side of center when viewed end on, then a bend in an angular direction both upward and back toward the center, the shaping device being symmetrical has a mirror image of the bend profile extending between the middle of the device and the opposite end.

The presence of the shaping device inside the control tube imposes its profile on the outer surface of the control tube which thus appears to have a series of snake like bends at the location of the shaping device, the control tube being substantially straight elsewhere. The first bend from the end of the shaping device being in the horizontal plane pushes under the membrane to the left hand side when viewed end on in the diagram, causing the membrane to lift under increased strain thereby exerting an opposing force to be used by the next bend which is to the opposite side (right hand side in the diagram) which causes the control tube to penetrate under the other membrane edge, the control tube then having increased pressure from both sides of the snake like bend in having penetrated under the respective opposite edges of the membrane on successive bends is thereby locked or at least restrained from rotation, the subsequent bend toward the middle of the shaping device forces the control tube inboard in the main conduit, separating the control tube from the conduit wall and further separating the membrane to uncover openings, thereby providing a fluid path between the conduit wall and the control tube to the conduit openings allowing fluid in the main conduit to escape. The symmetry of the shaping device results in a finite length of membrane under manipulation. On fluid pressure being applied to one end of the control tube, the shaping device is urged and becomes propelled toward the opposite end, the location of membrane manipulation and hence fluid emission thereby also being moved along the conduit.

The control tube can be shaped with a flatter profile and/or the shape of the membrane edges can include an inward bend for improved tolerance in retention of the control tube.

In another embodiment, with reference to FIG. 97, A conduit system comprising a conduit 1 with openings 2, and a membrane 3 disposed internally, the membrane having a cross sectional profile formed such as by way of an extrusion process, the profile having a first side extending as a narrowing protrusion around the perimeter to one side the conduit encompassing more than half of the conduit interior circumference and sized to apply continuous outward force to the conduit to thereby act as the retained or fixed section of the membrane, the thicker end providing a rectangular cutout inward from the conduit wall to form a groove in which to house a control tube to be disposed longitudinally in the conduit, the membrane 3 extending on its second side around the conduit interior beyond and to the opposite side of the cutout as a narrowing protrusion to cover conduit openings before terminating prior to reaching the opposing narrowing end of the first side of the membrane.

The interconnection of first and second sides of the membrane inboard of the rectangular cutout is by a narrowed bendable section, formed as a curve extending back into and then out of the rectangular cutout or groove, the interconnection being thinnest close to the control tube and thereby forming an effecting hinge axis about which the second side of the membrane can rotate to allow the thinnest end to separate from the conduit wall and uncover conduit openings enabling fluid to escape from the conduit 8. To reduce the effort in rotating the second side of the membrane in separating it from the conduit wall, the second side can be cut into sections in the longitudinal direction, by making periodic cross cuts or slits through the second half of the extrusion and also through to and including the interconnecting hinge, leaving the first side as the backbone.

A shaping device 200 present in the control tube, having a shaping element 201 in the form of a simple arched curve in the longitudinal direction and piston, plug or slug 202 at one or both ends distorts the control tube and imposes the arch shape of the shaping element to the outer surface of the control tube at its location which has the effect of expanding the slot or groove in the membrane at its location, causing the second side of the membrane to rotate about its effective hinge point and uncover openings in the conduit thereby allowing fluid to be emitted from the conduit. On applying fluid pressure to the control tube, the shaping device is urged and ultimately propelled in the longitudinal direction, moving the point of fluid release in the conduit, with previously open membrane sections returning to rest against the conduit wall as the shaping device retreats, to again cover conduit openings and prevent further fluid release.

Optionally the slits in the membrane can be confined to the region of the groove and interconnecting hinge leaving the longitudinal edge and region covering conduit openings continuous and able to cover conduit openings irrespective of longitudinal alignment in the conduit.

In another embodiment, with reference to FIG. 98, a conduit system comprising a conduit 1 with openings 2, and a membrane 3 disposed internally being similar to that as described previously with reference to FIG. 97, where the membrane in cross section is formed as a first and second side, the first side providing a built in outward force to retain the membrane position in the conduit, achieved by encompassing a substantial half of the conduit interior in circular conduits, and with an effective hinge connection between the first and second sides by way of a narrowing of the profile interconnecting the two sides close to the conduit wall.

The effective hinge axis formed by the narrowed profile interconnecting the two sides near the conduit wall enables the second side to rotate under external influence and thereby become separated from the conduit wall to uncover conduit openings, the narrowed interconnection providing a built in force to normally urge the second side to lay against the conduit wall and cover openings. The second side of the membrane provides a recess jutting inward from the conduit wall located between the effective hinge point and the region of conduit openings, the recess providing a groove for a control tube to reside longitudinally in the conduit and to be loosely retained against the conduit wall. The second side of the membrane can be cut into sections in the longitudinal direction by way of periodic slits parallel to the cross section of the conduit, with each section then attached only by the hinge formation to the first side, the first side remaining continuous without slits longitudinally and thereby providing a backbone to the membrane.

Optionally the slits can confined to the region of the groove formation which is a major contributor to rigidity, leaving the region of the longitudinal edge which covers conduit openings continuous in the longitudinal direction, the membrane thereby only requiring rotational alignment in the conduit to ensure conduit openings are covered.

A shaping device 200 present in the control tube, having a shaping element 201 in the form of a simple arched curve in the longitudinal direction and piston, plug or slug 202 at one or both ends, distorts the control tube and imposes its arch shape to the outer surface of the control tube which at its location has the effect of separating the membrane groove away from the conduit wall causing the second side of the membrane to rotate about its effective hinge point and to uncover openings in the conduit thereby allowing fluid to be emitted from the conduit. On applying fluid pressure to the control tube, the shaping device is urged and ultimately propelled in the longitudinal direction, moving the point of fluid release in the conduit with previously open membrane sections returning to the conduit wall as the shaping device retreats, to again cover openings and prevent further fluid release.

The region of the membrane in the vicinity of the conduit openings can include a soft laminate or coating to enhance sealing.

In another embodiment and with reference to FIG. 101, Diagram 'A' a conduit system comprising a conduit 1 with openings 2, and a membrane 3 disposed internally, the membrane comprising a thin former 198 partially encircling the conduit interior and terminating in opposing but separated longitudinal edges, the center of the former having a smooth bend inboard to the conduit to provide a recess space for a semi rigid control tube 144 to reside longitudinally in between the conduit wall and membrane, the former in its relaxed state applying continuous, even outward pressure to the conduit wall. An optional lining or softer laminate or coating to the outside of the membrane former provides enhanced sealing capability against the conduit wall. The membrane and lining have cutouts or holes 199 adjacent to the region of the control tube recess, but are of sufficient distance beyond where the membrane first makes contact with the conduit wall, such that in its relaxed state the membrane holes are sealed by the conduit wall. The conduit openings are positioned in the region of the recess for the control tube and out of alignment with the holes in the membrane.

A shaping device 200 with a shaping member 201 in the form of a simple arched bend is able to reside and be propelled longitudinally internal to the control tube. In the presence of the arched shaping device the control tube is pushed inboard to the conduit interior, bending the membrane and separating it progressively from the conduit including the location of the membrane holes which then allow fluid to pass through to the conduit openings and be emitted from the conduit.

In another embodiment and with reference to FIG. 101, Diagram 'B', being a variation to that as explained with reference to diagram 'A', where the control tube 144 is a soft material such as a woven fabric or flexible PVC tubing, allowing it to compress and flatten in the absence of or a reduction of fluid pressure increasing its contact area with the conduit interior such that it covers the conduit openings, while the membrane openings are also sealed by the conduit wall thereby producing a double stage seal.

In the presence of a shaping device 200 in the control tube such as a simple sphere or cylinder, the shaping device dictates the outer surface of the control tube instead of being flattened or distorted against the conduit inner surface, thereby uncovering openings in the conduit, while also separating the membrane from the conduit wall in the vicinity, and uncovering holes 199 in the membrane to create a fluid path from the conduit interior to exterior. Fluid pressure in the control tube can be released to localize conduit emissions to only the vicinity of the shaping device, or increased to expand the control tube and produce emission from the entire conduit simultaneously.

In another embodiment with reference to FIG. 102, diagram 'A', a conduit system comprising a conduit 1 with openings 2, and a membrane 3 disposed internally is manufactured from soft materials such as flexible PVC, where the membrane consists of a hose with holes 199 along its length, the control tube also being a flexible hose and the conduit being formed from a sheet of flexible material such as PVC, with holes along its length, wrapping around both membrane hose and control tube hose and being compression welded, glued or sewn along one or more seams to form an enclosed conduit.

Since the orientation and alignment of the holes is critical to the operation of the conduit system, the control tube hose and membrane hose can be first attached to the sheet forming the conduit, by fastening, gluing or spot welding, prior to the final wrapping and fastening of the sheet as the conduit outer. In other variations in the manufacturing process, FIG. 102 diagram 'B' shows the membrane hose being also formed from an open sheet, with all hoses welded in the same seam. FIG. 102, diagram 'C' depicts all components of the conduit system to be manufactured from a to single sheet of material and welded in an individual seam, the seam ensuring correct alignment between conduit membrane and control tube as well as the correct relative misalignment of conduit and membrane holes. In diagram C, the formation of the control tube by the use of the seam results in a non-circular internal cross section, which can benefit from a correspondingly irregular shaping device and thereby able to maintain a consistent rotational alignment, the shaping device can utilize a changing cross sectional profile in being adapted to optimizing the task of membrane manipulation.

In operation, the control tube can be reduced in pressure to allow the soft material to collapse and thereby close emission along the conduit except for the vicinity of the shaping device. The ability to simply pressurize and thereby expand the entire control tube can cause manipulation of the entire length of membrane enabling fluid to be emitted from all openings simultaneously. A method of operation where the control tube is momentarily pressurized to move the shaping device a short distance and then depressurized to confine conduit emission from only the location of the shaping device, can be repeated in a cyclic manner.

In another embodiment with reference to FIG. 103, a conduit 1 having openings 2 and a membrane disposed internally 3, the membrane being thin and uniform, completely encompasses the conduit interior, itself a stretchable material, the membrane as viewed from the end of the conduit, having an integral housing for a control tube to be effectively retained or attached longitudinally along the membrane interior, the membrane having holes 199 or openings adjacent to the line of the control tube housing, the membrane holes being misaligned from the conduit openings by being on different arc sections of the conduit, the conduit openings can be located in line with the control tube where the membrane affords additional rigidity resulting from the structure of the control tube housing to better withstand the full pressure differential at the conduit opening.

A shaping device 200 present in the control tube, having a shaping element 201 in the form of a simple arched curve in the longitudinal direction and piston, plug or slug 202 at one or both ends, distorts the control tube and imposes its arch shape to the outer surface of the control tube which at its location has the effect of directly separating the membrane control tube housing and thus membrane away from the conduit wall uncovering both membrane and conduit openings allowing fluid to be to emitted from the conduit. On applying fluid pressure to the control tube, the shaping device is urged and ultimately propelled in the longitudinal direction, moving the point of fluid release in the conduit. An implementation and simplification of this topology uses a simple enclosed rubber tube as a membrane, with the control tube attached, fastened, glued or sewn to the outside.

Figure 104:
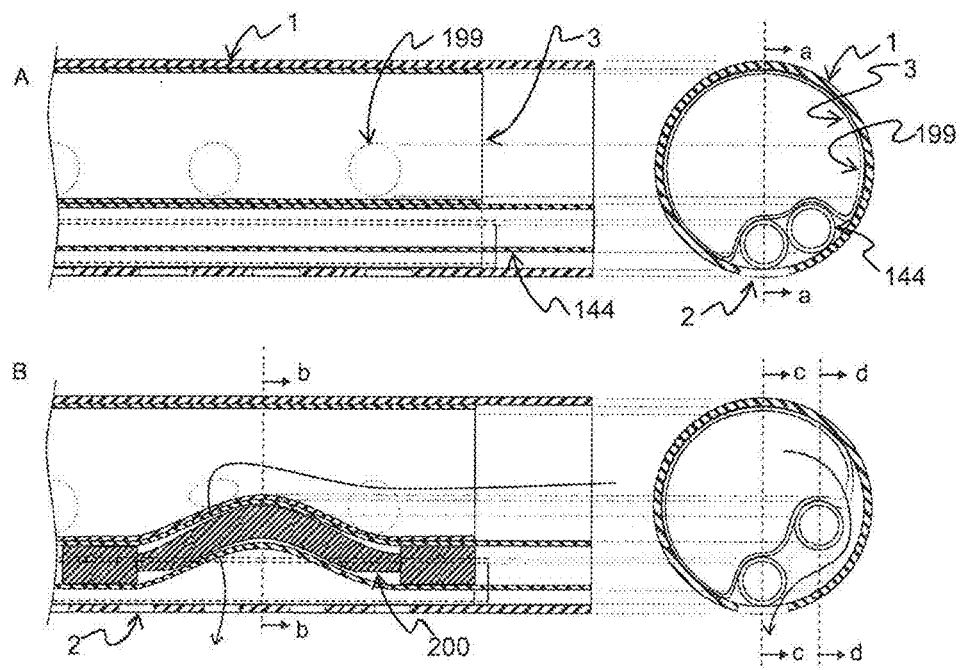

In another embodiment with reference to FIG. 104, a conduit 1 having openings 2 and a membrane disposed internally 3, the membrane being thin and uniform, completely encompasses the conduit interior with holes or cutouts 199 along its length, as a variation on that explained in relation to FIG. 103, a simple flexible tube like thin membrane protected from conduit openings by a dummy tube fastened to the inside of the conduit such as by the use of straps passing through the conduit openings and around the dummy tube, such that it resides along the area of the conduit openings to provide separation and protection of the thin membrane from conduit openings.

The membrane can be attached to the dummy tube to maintain correct rotational alignment to ensure and maintain correct misalignment of the membrane holes 199 with the conduit openings as well as being an aid in the assembly of the membrane to the conduit.

The conduit can also be a thin lay-flat hose, and the membrane a similar such hose. The control tube could also be a thin lay-flat type hose. A suitable shaping device for use could be a simple arch type shaping element as depicted in the diagram, or alternatively could be a pronounced omni-directional cross sectional shaping device such as shown in FIG. 108, diagram 'C' used to separate the membrane from the wall as well as allow fluid to pass between itself in the control tube and the conduit wall to the conduit openings.

In another embodiment with reference to FIG. 105, a conduit 1 having openings 2 and a membrane 3, the membrane being resilient and continuous in the longitudinal direction, and covering a relatively narrow arc section against the conduit wall, a former 198, located internal to the conduit, the former also performing the tasks of housing and retaining a control tube, and responding to the control tube distortion by rotating a member causing penetration between the conduit and membrane separating it from the conduit wall, the former also having protruding members extending to the inside of the membrane for retaining it against the conduit wall.

The former being of a resilient material is formed such as by way of an extrusion, where in cross section comprises a first and a second side, the first side protruding around the conduit internal perimeter and over one side of the membrane applying outward pressure to one side of the membrane retaining it in position against the conduit wall while also serving to retain the body of the former in position within the conduit by applying continuous outward pressure against the conduit. The first side provides one side of a recess inward from the conduit wall, the recess being opposite the membrane for the purpose if housing a control tube, the first side connected by a narrowed interconnecting bridge protruding inboard to the center of the conduit and back to the conduit perimeter to complete the other side of the recess for the housing of a control tube as the second side. The second side protrudes around the side of the other of the conduit perimeter toward the other edge of the membrane where it narrows to a fine point against the conduit wall.

The narrowed bridging section interconnecting the first and second sides of the former allows a degree of flex and acts as an effective hinge axis near the center of the conduit about which the second side can rotate. A control tube being a separate resilient and semi rigid tube or conduit is loosely housed or encaged longitudinally by both the groove formed as the recess in the former, and the conduit wall. A shaping device 200 comprising a shaping element in the form of a simple arched bend in a rod and terminated at one or both ends by a piston, plug or slug is able to slide in the control tube and be propelled by fluid pressure applied separately to the control tube. The presence of the shaping device inside the control tube impresses its shape to the outer surface of the control tube at its longitudinal position at which it resides, the control tube being inside the recess provided by the former, forces the recess to expand or take on the arch shape in the longitudinal direction.

The first side of the former is continuous longitudinally and provides a high degree of rigidity, whereas the longitudinal rigidity of the second side of the former is reduced by the provision of sectioned cuts or slits through its section repeated periodically in the longitudinal direction. The arch of the shaping device causes the recess to expand tangentially to the conduit wall, being the path of least resistance and therefore the preferred direction of poise for the shaping device, the second side of the former therefore rotating about the effective hinge axis causing the pointed end resembling a finger like protrusion to penetrate between the membrane edge and the conduit wall, separating the membrane from the conduit and uncovering conduit openings thereby allowing fluid to be emitted from the conduit in the vicinity of the shaping device. The membrane can be attached and fastened in place to the first side of the former to aid in the assembly process.

In another embodiment, with reference to FIG. 106, a conduit system of similar topology to that as described with reference to FIG. 105, has a variation in the construction of the former 198, where the former is symmetrical in that the first and second sides are mirror images of each other. The first and second side each protruding around the respective side of the conduit interior toward the membrane and terminating in a point prior to reaching the membrane.

Where the first and second sides meet is provided a recess or void for housing a control tube. The first and second sides are joined by a narrowed interconnecting protrusion to the side of the conduit opposite the membrane and inboard of the recess or void for housing of a control tube, the interconnecting protrusion therefore acting as a bridge over the recess for the housing of the control tube and acting as an effective hinge point about which the first and second sides can rotate. The void for housing the control tube is inboard and away from the edge of the conduit, the sides of the void tapering toward each other closer to the conduit wall. Each side of the former has a protrusion emanating from the respective side and narrowing toward the opposite side of the membrane, and making physical contact and applying a constant retaining force to the membrane. Retention of the membrane against the conduit wall is alternatively achieved by a separate retaining system or by narrowing protrusions from the membrane toward and seating against the former.

A circular, semi rigid control tube residing longitudinally in the void which presents as a groove in the longitudinal direction, can be distorted in the presence of a shaping device 200 with a shaping element 201 such as a simple arched bend, forcing the control tube at the peak of the arch to press outwards in the narrowing groove toward the conduit wall, thereby separating the groove and forcing the two sides of the former to rotate toward and under the membrane, thereby evenly separating the membrane form the conduit wall to uncover openings and allowing fluid to be emitted from the conduit.

In another embodiment, with reference to FIG. 107, a similar shaped membrane in a conduit system as described with reference to FIG. 106 has attached inboard, a continuous housing for encaging of a control tube 144 along its length. A separate retaining device in the form of a narrow profile encircling the conduit from the opposite side and indented inward to form a cradle seating against and suspending the membrane and housing profile with a spring retaining force against the conduit interior, the retaining device having periodic slits through the cradle region to reduce longitudinal rigidity. A simple shaping device 200 present inside a control tube encaged longitudinally within the membrane housing, the shaping device having a shaping element in the form of a simple arch, forces the control tube and in turn the membrane structure to bend directly inboard to the conduit interior and uncover openings in the conduit wall allowing fluid to be emitted from the conduit. The membrane housing section for encaging the control tube can benefit from cutouts or slits periodically in the longitudinal direction to reduce longitudinal rigidity.

The membrane longitudinal edges can be tapered to be narrower near the conduit surface for enhanced sealing. Repeating surface patterns in the form of raised ridge or membrane-like micro profiles encircling or separating longitudinally individual openings or groups of conduit openings, can provide improved sealing to prevent fluid passing from areas of manipulated membrane longitudinally between the membrane and conduit to other openings, thereby separately sealing individual or groups of openings.

In a variation to FIG. 107, the cross sectional shape of the membrane can be adapted to locating into a guide channel formed by guide walls within the conduit cross section, such that the membrane is always in alignment with conduit openings.

In a further variation of FIG. 107, the control tube itself doubles as the membrane, where the opening in the membrane for receiving a control tube acts as the control tube for receiving a shaping device.

In another embodiment, with reference to FIG. 109, a conduit system similar to that described with reference to FIGS. 76-84, a variation in which the control tube transporting a magnetic PIG is instead replaced with a control tube for transporting a shaping device, the control tube disposed internal to the conduit and positioned for its outer surface to be in communication with hinged flaps/fins 161 such that they are actuated and deployed when a suitably adapted shaping device traverses the control tube in the vicinity of the flap/fin.

In another embodiment with reference to FIG. 110, an enhanced arrangement for the communication of and imparting of actuation motion from a system utilizing a control tube for the transporting of a shaping device is provided as a differential mode of communication as opposed to a direct mode of communication of actuation motion, resulting in a system providing a lower sensitivity to build tolerance and pressure variation. A control tube 144 for transporting a shaping device 200 has an actuated member 203 with an effective pivoting or hinge attachment to the control tube. The actuated member also has one or more other points of contact or communication to the control tube surface.

On experiencing distortion to the control tube as a result of the presence of a shaping device 200 where the surface of the control tube at the point(s) of communication are raised above the pivot attachment, the actuated member undergoes rotational actuation about the pivot point. Such a differential mode of communication is sensitive only to the differential distortion caused by a shaping device and is not responsive to the absolute pressure, size or positional tolerance of the control tube. As such a lay-flat type control tube can be pressurized to its full size or depressurized to its lay flat state without resulting in actuation of any attached actuated members.

In another embodiment with reference to FIG. 111, a conduit fluid delivery and application system comprising a main fluid delivery conduit 1 having one or more off-take outlets 204 such as in but not limited to a "pipe and riser" type irrigation system, each off-take outlet having disposed a valve such as a hinged flap valve 205 for normally preventing fluid from escaping via the off-take, a control tube 144 passing in the vicinity of each of the off-take valves requiring individual control, a communicating member(s) 206 in communication with the outer surface of the control tube and in turn in communication with the off-take valve provides motion actuation to the control valve when a suitably adapted shaping device 200 is propelled and moves into the vicinity of the communication member, such that the valve state changes from closed to open allowing fluid to be released from the conduit system via the particular off-take.

The control tube can be located internal or external to the main conduit, and the control valve can be any valve adapted to changing state in response to physical actuation. The off-take valve can be of a type which springs closed after actuation force is removed or can be a latching type valve, held open by continued fluid flow, in which case multiple valves can be open simultaneously by the operation of one shaping device.

Alternatively the valve can be a double acting type valve requiring a separate actuation force to perform the closing function, the closing action can be provided by a separate shaping device or a separate shaping element on the shaping device acting inside a single common control tube producing the appropriate actions to performing both the opening and the closing actuation functions in the same or separate passes of the same or separate shaping devices, or can be a separate shaping device in a separate control tube. A counter poise 207 may be required to provide an opposing surface against which the shaping device develops the actuating force. A counter poise can take the form of an irregularity such as a protrusion, post, corner or groove against or within which a control tube can seat.

The control tube and shaping device method can also be used to operate diaphragm/pilot type valves in off-takes deployed along the conduit.

The Control tube can alternatively be disposed external to the conduit with actuation communicated via suitable communication member(s) through conduit openings to valves such as hinge type flaps covering holes in the conduit, or diaphragm/pilot type valves.

Interpretation
  A conduit system comprising:
    a. 1. a delivery carriage for transporting fluid to from openings in the sidewall of the conduit system, with a membrane etc
    b. 2. a control carriage for transportation of an activator
      i. Located internally to delivery carriage, or
      ii. Located externally to delivery carriage, or
      iii. Coincident with delivery carriage (ie one and the same) (Note: the delivery carriage doubles as control carriage for the case of direct acting PIG)
Membrane
  A Membrane is an element which forms a closure over openings in the conduit. In particular it is locatable along the conduit side wall to substantially close the openings of the conduit and movable away from the conduit side wall to allow fluid path through the openings.
  In the invention the membrane is moved or manipulated inboard to the conduit interior for allowing flow to move through the openings to the outboard of the conduit. Conversely with the membrane on the outer side of the conduit, the membrane is moved or manipulated outside the conduit exterior which allows flow through the openings to the inside of the conduit. Therefore membrane is moved or manipulated in each case into the volume of higher pressure in order to create an open fluid path through the openings.
PIG
  A PIG in this description and claims refers to the term "Pipe Inspection Gauge", abbreviated "PIG", known generally in industry as apparatus able to move internal to a conduit or pipeline along its length for a range of purposes most typically for inspecting and cleaning the inside surfaces of pipelines. In this description and claims it shall be understood to have the additional capability of manipulating or communicating with elements integral to the conduit in which it resides, for the purpose of enabling a release of fluid from the conduit in its vicinity. It can be separate or integral with an activator and/or deflector.
Activator:
  An activator is propelled within the control carriage of the conduit system and represents the location where fluid is to be emitted from the delivery carriage.
    PIG system—It represents the PIG body as transported in a single carriage conduit, propelled by;
    a. Direct fluid in fluid delivery conduit or by cable/chain, percussion etc
    b. Magnetic Indirect system—It represents a magnetic PIG which is transported in a separate control conduit, propelled by
    c. Direct fluid in control conduit or by cable/chain etc
    Shaping PIG system—It represents a Shaping device (PIG) which is transported an a control tube/conduit within the fluid delivery carriage, propelled by
    a. Direct fluid in control conduit or by cable/chain etc
    b. Sequential valve System—It represents the current open valve receiving fluid, and is propelled;
      i. to the next open flap by cessation of forward fluid flow
      ii. to the previous (and ultimately first flap) by reversal of fluid flow
Deflector:
  A mechanism for manipulating said membrane in response to the presence of an ACTIVATOR. Implementations of DEFLECTOR:
    a.—PIG system—Protrusions such as Fingers on a physical ACTIVATOR, ie PIG (ie the DEFLECTOR is mounted on the ACTIVATOR)

b.—Magnetic Indirect system—Hinged Flap/Fins in conduit able to respond to the presence of an, ACTIVATOR (Magnetic PIG in control tube) to change angle and thereby redirect fluid to the membrane for indirect manipulation by fluid force.

c.—Shaping PIG system—The outer surface of the control tube moving and interacting directly or indirectly to manipulate the membrane in response to the presence of an ACTIVATOR (Shaping device in control tube).

d.—Sequential valve System—The membrane flap, releaser flap and elastic connection to the conduit, responding to fluid flow/momentum to close or open the valve acting as the ACTIVATOR.

In Accordance with:

As described herein, 'in accordance with' may also mean 'as a function of' and is not necessarily limited to the integers specified in relation thereto.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

EMBODIMENTS

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

For example the system of fluid dispersion and control described herein provides many opportunities and methods for achieving the main goal of being able to universally control and manage a movable fluid plume from within a length of conduit. The diverse range of applications described are each subject to different levels of importance and sensitivity to performance, accuracy of fluid application, durability, system complexity, production, installation and maintenance costs, and therefore demand different combinations of approaches to chosen mechanisms for fluid release, propulsion, sensing and control, hence there are many combinations and variations to the embodiments described, and as such the scope should not be limited to only those described.

It should be realized that the various methods described for the control of fluid release from the conduit, the propulsion of and control of the PIG apparatus, while each is required and relevant to the system goals, each can be adapted for use in variants of systems using alternative methods, for example some propulsion methods disclosed can be used for systems employing other techniques for controlled fluid emission from a conduit and should not be limited for use in conjunction with only the techniques of membrane manipulation described herein. Some methods of propulsion disclosed herein rely on the ability to release fluid from the conduit in the vicinity of the location of the PIG apparatus in order to impart motion to the PIG apparatus in the conduit, and any method of achieving the controlled release of fluid from the conduit would be a suitable foundation to achieve the outcomes of the propulsion methods described.

The conduit can be flexible lay-flat hose such as thin PVC or woven fabric such as fire hose which squashes flat and can be rolled up.

In discussion of elements utilizing magnetics to impart force to a remote element, it should be understood that a force of attraction can be achieved with combinations of two parts separately providing at least one component generating a magnetic field either electrically by way of electro-magnet or by virtue of contained inherently magnetically polarized material, where opposite magnetic polarities produce a force of attraction, (ie North and South Poles) and conversely like polarities produce a force of repulsion. A force of attraction can also be achieved between a magnetically generating element and a non-magnetically generating element containing a magnetically responsive material such as iron.

In this system, where there is a plurality or vast deployment of a particular component such as a distribution along a membrane in the conduit system, the preference is to use a lower cost the lower cost non-magnetically generating element containing a magnetically responsive material such as iron, and the moveable component such as the PIG which affords a higher component cost to contain the magnetically generating element. In such topologies where a force of repulsion is required, the component to which movement is imparted employs a fulcrum to reverse or change the direction of the force, however it should be realized that all combinations of above described methods of imparting force can achieve the same overall outcome. It should also be noted that electrostatic force generating techniques could instead be utilized where magnetic force generating techniques have been described.

In consideration of a need for a pressure differential to create a resultant force, a vacuum must also be considered as valid means of producing a pressure differential such as for use in the propulsion of apparatus such as activator, deflector, shaping device, magnetic or physical PIG, in a conduit or control tube.

It should also be realized that the conduit system described herein also provides functionality for fluid flow in the reverse direction from outside of the conduit through openings in the side wall where the membrane is under manipulation by the influence of activator and/or deflector, and as the system lends itself to applications such as the drainage of fluids and evacuation of gases over a vast region, the system further enhanced by the application of negative pressure or vacuum to the conduit to forcefully extract and remove fluids located adjacent to the conduit for transport to other locations outside of the conduit.

The membrane topology as described as being retained against the conduit wall by built in spring force or by releasable attachment can be enhanced to further benefit operation with reverse fluid flow by the disposing of membrane to the external surface of the conduit to cover openings, the external membrane manipulated by way of:

a. Members of movable PIG apparatus or deflector able to protrude through the conduit to apply outward force to the membrane;

b. An activator in the form of a shaping device in a control tube located internal or external to the conduit producing a force directly, or indirectly via a physical deflector to the membrane;

c. An activator in the form of a magnetically responsive PIG in a control tube located internal or external to the conduit producing a force of magnetic attraction or repulsion directly or indirectly via a physical deflector to the membrane.

In consideration of the fluid distribution system where the conduit throughout the discussion is generally implied to be a fully enclosed conduit such as a pipe, the system also can have application where the conduit with openings is not an enclosed conduit but is open along the length such as in an open channel with openings in the sides or base of the channel and an internal membrane for preventing fluid escape form the openings. Openings in such an open channel conduit can additionally or alternatively take the form of irregularities or cutouts in the longitudinal edges of the channel.

Further, the shaping device which is movable within a control tube located either internal or external to a main fluid conduit with openings such as in a fluid delivery system as herein described for providing a distortion to the control tube to affect manipulation of conduit closure means such a membrane or flap valve can further additionally or separately induce distortion to the main fluid conduit such that the entire group of conduits consisting of fluid delivery conduit and control tube, and/or including any auxiliary conduit making up a cluster of coexisting conduits can be moved by aggressive distortion of a suitably adapted shaping device to thereby reposition or result in a change in position or angle of the conduit to affect the position, location or angle of the openings and therefore correspondingly effect fluid emission from the conduit. Such a shaping device performing such aggressive distortion of the conduit as stated could be a PIG moving in the fluid delivery line and/or the PIG for performing direct membrane manipulation, or a dedicated shaping device in additional control tube for imparting conduit position change of the overall conduit system The system of fluid dispersion and control described herein provides many opportunities and methods for achieving the main goal of being able to universally control and manage a movable fluid plume from within a length of conduit. The diverse range of applications described are each subject to different levels of importance and sensitivity to performance, accuracy of fluid application, durability, system complexity, production, installation and maintenance costs, and therefore demand different combinations of approaches to chosen mechanisms for fluid release, propulsion, sensing and control, hence there are many combinations and variations to the embodiments described, and as such the scope should not be limited to only those described.

It should be realized that the various methods described for the control of fluid release from the conduit, the propulsion of and control of the PIG apparatus, while each is required and relevant to the system goals, each can be adapted for use in variants of systems using alternative methods, for example some propulsion methods disclosed can be used for systems employing other techniques for controlled fluid emission from a conduit and should not be limited for use in conjunction with only the techniques of membrane manipulation described herein. Some methods of propulsion disclosed herein rely on the ability to release fluid from the conduit in the vicinity of the location of the PIG apparatus in order to impart motion to the PIG apparatus in the conduit, and any method of achieving the controlled release of fluid from the conduit would be a suitable foundation to achieve the outcomes of the propulsion methods described.

The conduit can be flexible lay-flat hose such as thin PVC or woven fabric such as fire hose which squashes flat and can be rolled up.

In discussion of elements utilizing magnetics to impart force to a remote element, it should be understood that a force of attraction can be achieved with combinations of two parts separately providing at least one component generating a magnetic field either electrically by way of electro-magnet or by virtue of contained inherently magnetically polarized material, where opposite magnetic polarities produce a force of attraction, (ie North and South Poles) and conversely like polarities produce a force of repulsion. A force of attraction can also be achieved between a magnetically generating element and a non-magnetically generating element containing a magnetically responsive material such as iron. In this system, where there is a plurality or vast deployment of a particular component such as a distribution along a membrane in the conduit system, the preference is to use a lower cost the lower cost non-magnetically generating element containing a magnetically responsive material such as iron, and the moveable component such as the PIG which affords a higher component cost to contain the magnetically generating element. In such topologies where a force of repulsion is required, the component to which movement is imparted employs a fulcrum to reverse or change the direction of the force, however it should be realized that all combinations of above described methods of imparting force can achieve the same overall outcome. It should also be noted that electrostatic force generating techniques could instead be utilized where magnetic force generating techniques have been described.

INDUSTRIAL APPLICABILITY

It is apparent from the above, that the arrangements described are applicable to the irrigation industry or other fluid delivery industries.

| Drawings - Reference Numerals | |
|---|---|
| 1 | Conduit |
| 2 | Openings in conduit side wall |
| 3 | Membrane |
| 4 | Carriage apparatus (PIG) core body or backbone |
| 5a | First end of conduit |
| 5b | Second end of conduit |
| 6 | Membrane manipulating member on carriage apparatus (PIG) |
| 7 | Membrane under manipulation |
| 8 | Fluid path from conduit out through conduit side wall openings |
| 9 | Stretch of membrane unrestrained longitudinal edge |
| 10 | Membrane unrestrained longitudinal edge seated against the conduit wall |
| 11 | Membrane unrestrained longitudinal edge |
| 12 | Attachment of membrane to conduit |
| 13 | Longitudinal direction of motion relative to conduit, of carriage apparatus (PIG) |
| 14 | Shaped barb on membrane edge |
| 15 | External Flap covering conduit openings |
| 16 | Releasable hook-like protrusion from conduit |
| 17 | Lever member integral to membrane |
| 18 | Membrane unrestrained corner |
| 19 | Shaped end extension to membrane |
| 20 | Raised ends of shaped membrane extension |
| 21 | Conduit hook-like retaining protrusions |
| 22 | Conduit irregularity - rotational counterpoise |
| 23 | Membrane end attachment only |
| 24 | Magnetically responsive elements on membrane |
| 25 | Second adjacent conduit |
| 26 | Magnetically responsive element of carriage apparatus (PIG) |
| 27 | Force of magnetic interaction |
| 28 | Sealed, Slidable connection with conduit wall |
| 29 | |
| 30 | Semi rigid rod of carriage apparatus (PIG) |
| 31 | Guide/locating prongs or loops of carriage apparatus (PIG) |
| 32 | Piston, Plug or Slug of carriage apparatus (PIG) |
| 33 | Leading/trailing ends of membrane manipulating protrusion of carriage apparatus (PIG) |
| 34 | Fluid through paths in membrane manipulating member of carriage apparatus (PIG) |
| 35 | Cut-outs or slits in membrane manipulating member of carriage apparatus (PIG) |

| | Drawings - Reference Numerals |
|---|---|
| 36 | Blade-like leading/trailing edges of membrane manipulating members of carriage apparatus (PIG) |
| 37 | |
| 38 | Ridge line of membrane manipulating member of carriage apparatus (PIG) |
| 39 | Inward bend of membrane manipulating member of carriage apparatus (PIG) |
| 40 | Leading and trailing membrane manipulating members of carriage apparatus (PIG) |
| 41 | Rollers disposed to membrane manipulating members of carriage apparatus (PIG) |
| 42 | Slave piston |
| 43 | Spring |
| 50 | Rotational actuation of membrane manipulating member of carriage apparatus (PIG) |
| 51 | Actuator motor |
| 52 | Fluid deflecting element |
| 53 | Hinge Joint for fluid directing element |
| 54 | Rotating joint for fluid directing element |
| 55 | Nozzle as alternative fluid directing element |
| 56 | Actuator Linkage |
| 57 | Modulating member |
| 58 | |
| 59 | One way brake |
| 60 | Valve body slidable within conduit |
| 61 | Valve |
| 62 | Valve linkage/connecting rod |
| 63 | Control Tube |
| 64 | Conduit end cap |
| 65 | Cable/chain attachment point |
| 66 | Pulley/sheave |
| 67 | Cable/chain/cord |
| 68 | Drive cog/Winch |
| 69 | Returning cable |
| 70 | Control tube end attachment |
| 71 | Control tube fluid attachment |
| 72 | Piston in control tube |
| 73 | Control tube release port |
| 80 | Electric generator |
| 81 | Traction wheel |
| 82 | Propulsion motor |
| 83 | Power storage and control |
| 84 | Pump |
| 85 | Valve |
| 86 | Recoiling spool |
| 87 | Conductor |
| 88 | Transmitter and/or receiver |
| 89 | Electrical Inductive Transformer |
| 90 | Central computer system |
| 91 | Manipulator |
| 92 | Conduit emission control apparatus |
| 93 | Movable joint |
| 94 | Sensor - Pressure, Flow |
| 100 | Membrane retainer/former |
| 101 | Fluid emission directing insert |
| 102 | Fluid off-take |
| 103 | Mating tabs |
| 104 | Membrane replacing member |
| 110 | Nozzle assembly |
| 111 | Nozzle frame |
| 112 | Rotatable Nozzle |
| 113 | Locating stud |
| 114 | Nozzle carriage |
| 115 | Return spring |
| 116 | Modulating strap |
| 117 | Extraction Ramp |
| 118 | Extraction Pin |
| 119 | Nozzle head |
| 130 | Membrane section |
| 131 | Realignment taper |
| 132 | Membrane section end - leading edge |
| 133 | Membrane section end - trailing edge |
| 134 | Membrane section end - magnetically responsive element |
| 135 | Controlling magnetic element |
| 136 | Fluid flow |
| 137 | Membrane section end - Fulcrum |
| 140 | Formed membrane section/flap |
| 141 | Hinge member |
| 142 | Leading edge member |
| 143 | magnetically responsive element |
| 144 | Control tube |
| 145 | nozzle outlet |
| 146 | membrane hinge pin |
| 147 | Leading edge Hinge pin |
| 148 | Saddle for Siphon tube |
| 149 | Retainer for siphon tube |
| 160 | formed lip |
| 161 | flap/fin |
| 162 | hinge |
| 163 | membrane end formed lip |
| 165 | cantilever |
| 166 | hinge tabs |
| 167 | mounting former |
| 168 | cut-out/recess |
| 169 | Opposing/reversing Flap/Fin |
| 180 | Linkage |
| 176 | Rib |
| 177 | Rib-backbone |
| 180 | Conduit segment |
| 181 | Membrane segment |
| 182 | Membrane reinforcement member |
| 183 | Membrane attachment to conduit |
| 184 | Membrane attachment to reinforcement member |
| 185 | Releaser Flap |
| 186 | Protruding fulcrum point |
| 187 | Membrane fastening to reinforcement member |
| 190 | Motor |
| 191 | Shaft |
| 192 | fins/propeller/rotor/impeller |
| 198 | Former |
| 199 | Membrane hole or cutout |
| 200 | Shaping device |
| 201 | Shaping element |
| 202 | Piston, Plug or Slug of Shaping device |
| 203 | Actuated member |
| 204 | Off-take outlet |
| 205 | Hinged flap valve |
| 206 | Communicating member |
| 207 | Counter poise |
| 210 | Activator |
| 211 | Deflector |
| 212 | Propulsion |

The invention claimed is:

1. A fluid distribution system for selectively distributing fluid from multiple locations, the system comprising:
   a. a conduit arrangement;
     i. at least one enclosed elongated conduit having a conduit side wall with an internal perimeter for carrying fluid along the conduit side wall; and
     ii. at least one opening along the length of the conduit side wall of the conduit for allowing escape of the fluid; and
   b. at least one closure;
     i. a membrane which forms the closure over individual openings or group of related openings; and
     ii. a deflector of the membrane which has an effect to physically alter openings between an open and closed arrangement for selectively opening and closing at least one group of the at least one opening along the length of the conduit side wall of the conduit for allowing selective escape of the fluid; and c. an activator being a physical body movable longitudinally along the conduit arrangement;

wherein the activator causes the deflector to undertake selective opening or closing of respective ones of the closures to uncover a pathway for fluid to escape from the conduit through one or more of the at least one group of the at least one openings along the length of the conduit side wall.

2. A fluid distribution system according to claim 1, with further control over fluid distribution system for selectively distributing fluid from multiple locations to provide a sweep action from single outlet or group of outlets or over multiple of the single outlets or multiple of the groups of outlets.

3. A fluid distribution system according to claim 1, wherein the activator provides direct or indirect activation of closure where the activator initiates or activates the closure with a direct action or in an indirect manner through an intermediary mechanism or electrical or magnetic connection including a propulsion means for propelling the activator within the conduit arrangement to manipulate or deflect the at least one closure.

4. A fluid distribution system according to claim 3, having the at least one deflector which manipulates the at least one closure to uncover a pathway for fluid to escape from the conduit through one or more of the plurality of groups of one or more of the plurality of openings along the length of the conduit side wall of the conduit;

wherein the at least one closure is at least one closure element extending along an inside of the conduit side wall being a membrane disposed internally to cover the openings for normally preventing fluid from being released from the conduit, the membrane being of resilient material, and of a narrow profile in cross section which encircles a portion of the internal perimeter of the conduit thereby providing at least one longitudinal edge in the conduit for deflection of at least one edge wherein the membrane restricts escape of fluid until manipulated to uncover a pathway from which fluid could escape the conduit from the at least one of said openings in the conduit side wall.

5. A fluid distribution system according to claim 4, wherein at least one closure is at least one membrane element attached discontinuously to the conduit internal perimeter around at least one of said at least one openings thereby having a longitudinal edge in the longitudinal sense of the conduit devoid of permanent attachment to the conduit along a longitudinal length spanning in the longitudinal direction of the conduit at least one opening in the side wall of said conduit.

6. A fluid distribution system according to claim 3, the system further including a fluid dispersal outlet wherein the fluid dispersal outlet comprises a relative interaction of activator, openings and deflector, which align in particular position to provide a flow in particular external directions and subsequently to provide further flows in changed external directions, providing resultant effect for dispersing the fluid out of an open individual opening or group of openings in a defined or definable effect and with further control over fluid distribution system for selectively distributing fluid from multiple locations thereby able to provide a sweep action from single outlet or group of outlets or over multiple of the single outlets or multiple of the groups of outlets in response to longitudinal movement of the activator.

7. A fluid distribution system according to claim 6, wherein the fluid dispersal outlet comprises is a relative interaction of activator, openings and a deflector, wherein the deflector is deployed on a Pipe Inspection Gauge (PIG), the PIG body serving as the activator within the conduit arrangement, and wherein the deflector has shapings for redirecting the conduit fluid path to the at least one openings to provide a resultant dispersal effect.

8. A fluid distribution system according to claim 6, wherein the fluid dispersal outlet includes an activator in the form of an active PIG with propulsion for movement along the conduit and an internal computerised control system for controlling movement and for affecting membrane to be manipulated to uncover and recover openings and thereby allow fluid to escape the conduit.

9. A fluid distribution system according to claim 6, wherein the control of relative fluid flow in both longitudinal directions along the conduit arrangement controls the direction and displacement of the activator.

10. A fluid distribution system according to claim 6, wherein the propulsion of the activator is by a propulsion generator to selectively propel the deflector in the conduit.

11. A fluid distribution system according to claim 10, wherein the propulsion generator of the activator effecting the propulsion of the deflector is by a secondary fluid.

12. A fluid distribution system according to claim 3, wherein the affecting membrane to be manipulated to uncover openings and allow fluid to escape the conduit is by the activator in the form of a PIG being adapted to impart kinetic energy to the fluid in its vicinity in a direction resulting in fluid being incident on an inward protruding surface of membrane, whereby the membrane is able to be manipulated to uncover openings and allow fluid to escape the conduit.

13. A fluid distribution system according to claim 1, wherein the activator is a shaping device for manipulation of a closure wherein the shaping device has a shape for providing longitudinal or cross sectional distortion to containing surfaces within the conduit arrangement, resulting in deflection and manipulation of the closure of the at least one openings of the conduit arrangement allowing the escape of fluid in its vicinity.

14. A fluid distribution system according to claim 13, wherein the shaping device comprises a piston, plug or slug formation as part of or additional to the shape of the shaping device, for sealing against containing surfaces to engage fluid flow for propulsion within the conduit arrangement.

15. A fluid distribution system according to claim 13, wherein the shaping device is contained movable within a separate control tube forming part of the conduit arrangement, whereby said distortion and deflection by the shaping device act indirectly via the control tube surfaces to subsequently result in deflection and manipulation of the closure of the conduit arrangement allowing the escape of fluid in its vicinity.

16. A fluid distribution system according to claim 15, wherein the shaping device for traversing internal to a control tube is adapted to producing distortion in the cross section of the outer surface of the control tube the communication from which can be utilized in performing actuation functions.

17. A fluid distribution system according to claim 13, wherein the shaping device which is movable within a control tube located either internal or external to a main fluid conduit with openings such as in a fluid delivery system as herein described for providing a distortion to the control tube to affect manipulation of closure of the at least one opening of the conduit arrangement such as a membrane or flap valve, can further additionally or separately induce distortion to the main fluid conduit such that the entire group of conduits forming the conduit arrangement including the fluid delivery conduit and control tube, and including any auxiliary conduit making up a cluster of coextending conduits can be moved by aggressive distortion of a suitably adapted shaping device to thereby reposition or result in a change in position or angle of the conduit to affect the position, location or angle of the openings and therefore correspondingly effect fluid emission from the conduit.

18. A fluid distribution system according to claim 1, wherein for sealing against containing surfaces for propulsion therein the shaping device is itself deformed by increasing the fluid back pressure, thereby altering or enhancing the distortion and hence degree of closure manipulation.

19. A deflector apparatus for manipulating one or more members of a conduit assembly to influence the flow of fluid through the wall of said conduit in the vicinity, and having a body serving as an activator with the ability to travel longitudinally within said conduit, the apparatus comprising:
  i. a body as an activator on which is disposed a propulsion generator; and
  ii. a membrane manipulator which manipulates said conduit assembly to alter the passage of fluid through the conduit wall in the vicinity;
  wherein the membrane manipulator for manipulating said conduit assembly includes one or more deflector protrusions emanating from the body of said deflector apparatus, said protrusions slidable longitudinally inside the conduit by the activator, and adapted for use where the conduit assembly comprises a membrane disposed to normally cover openings in the conduit wall, such that said deflector protrusion interacts with the membrane in the vicinity thereby influencing the passage of fluid through the conduit wall.

20. The deflector apparatus of claim 19, wherein the membrane manipulator for manipulating said conduit assembly is by magnetic interaction with the conduit assembly, the apparatus having disposed magnetically responsive elements adapted to apply manipulating force to said conduit assembly in which there are disposed complementary magnetically responsive elements, to alter the passage of fluid through the conduit wall.

21. The deflector apparatus of claim 19, wherein the propulsion generator includes a piston, plug or slug disposed to the apparatus to one side of the membrane manipulator, which can slide substantially sealably in a conduit and thereby convert differential fluid pressure across said piston, plug or slug in the conduit to a longitudinal propulsive force to the apparatus.

22. The deflector apparatus of claim 21, wherein the propulsion generator includes at least one piston, plug or slug disposed to the apparatus separately to each side of the membrane manipulator, the body providing a fluid path through each of the piston, plug or slug to the conduit wall in the vicinity of the membrane manipulator, the separate fluid paths each separately having a valve for varying the restriction to the flow of fluid in its respective fluid path, wherein the control of a valve to restrict the flow of fluid acts to engage the conduit fluid to produce a force of propulsion to the deflector apparatus thereby able to provide movement of the apparatus within the conduit, the relative valve states thereby controlling both the propulsion and flow of fluid through the conduit wall in the region of the membrane manipulator.

23. A system for distributing fluid comprising a conduit with a distributed controllable valving system deployed longitudinally, and apparatus residing internal to the conduit, having a valve control to interact with and control the valving system of the conduit, and having disposed a propulsion generator for producing movement of said apparatus along the conduit.

24. A system for distributing fluid of claim 23, wherein the apparatus has disposed in addition, a velocity control to control the velocity and direction of fluid in the path to said selected one or more of the outlets directing fluid flow.

25. A method of releasing fluid from selected openings along a conduit comprising:
  a. providing a conduit with a conduit arrangement having a fluid flow between conduit side walls and one or more individual openings along the conduit;
  b. providing closure in the form of a membrane which forms a closure over individual openings or group of related openings that allows fluid flow from selected openings independently of other openings;
  c. deflecting of one or more of the closure to selectively switch selected openings between an open and closed arrangement by a deflector, internal to said conduit and having a membrane manipulator to manipulate said membrane; and
  d. providing an activator affecting the deflector relatively located to the closure, or movable to be moved adjacent to each one or each group of the closure, in the presence of which the deflector manipulates the at least one closure to uncover a pathway for fluid to escape from the conduit through one or more of at least one group of one or more of the at least one opening along the length of the conduit side wall of the conduit and having one of the types of:
    i. force deflector for transfer of an electrical, magnetic or pressure wave force for effecting manipulation or deflection of closure;
    ii. physical deflector for physical contact within conduit such as PIG for transport within conduit;
    iii. fluid pressure wave for physical activation to deflector to deflect or manipulate closure;
    iv. physical deflector for physical contact within conduit such as a shaping device which shapes conduit and deflecting membrane to open closure and with the shaping device transportable down the conduit to form a deflecting shape;
    v. physical deflector such as a pivoting or bendable shaping for redirecting of fluid momentum;
    vi. physical deflector for indirect contact within conduit via deflected fluid momentum, such as a compliant shaping at fixed location within conduit; and
    vii. physical deflector comprising one or more shapings attached within the conduit which in the presence of an activator become urged into the fluid path of the conduit causing a deflection and redirecting of fluid momentum toward a deflector of the closure in turn deflecting and affecting the state of the closure.

26. A method of releasing fluid according to claim 25, wherein control of units of fluid distribution system for selectively distributing fluid from particular locations is by one or more of:
  a. control of activator;
  b. control of deflector;
  c. control of propulsion;
  d. control of Fluid Dispersal;
  wherein fluid dispersal of the fluid out of an open individual opening or group of openings is in a defined or definable effect, by relative interaction of activator, openings and deflector providing resultant effect.

27. A method of releasing fluid according to claim 25, further comprising providing a valve at each end of conduit and controlling movement of point of emission whereby fluid supplied to one end of conduit, pressure is reduced and flow increased by adjustment of valve at an end of conduit, the activator is propelled to new position to activate the deflector and cause manipulation of the at least one closure followed by an increase in fluid pressure by closing the end valve to increase emission from the conduit and maintain the state of closure manipulation.

28. A method of releasing fluid according to claim 25, further including providing PIG with piston plug or slug at one end only; and providing to the conduit a valve arrangement to supply, and block fluid at the first end, and to independently supply block and release fluid at the second end of conduit, with PIG piston end toward the second end of the conduit according to the steps of:
1. supply fluid to the second end while blocking fluid at first end to move the PIG toward the first end while expelling fluid from the conduit;
2. supply fluid at the first end which becomes emission from the conduit;
3. release fluid form the second end to allow the PIG to retreat and the point of fluid emission to progress down the conduit; and
4. supply fluid to the second end to move the point of emission back toward the first end;

wherein repeating steps 2 to 4 provides a sweeping action of flow.

29. A method of releasing fluid according to claim 25, further including providing an activator with a deflector forming a symmetric PIG with communicating valve bodies at ends; and providing a valve arrangement to the conduit to supply, block and release fluid independently from both first and second ends of conduit, by steps of:
  a. supply fluid to first end while releasing fluid at second end momentarily to change PIG internal valve state;
  b. block both valves, supply fluid at second end to cause fluid emission from conduit;
  c. supply fluid to first end to push PIG and location of emission from conduit toward the second end; and
  d. repeat steps 1, 2, and 3 from opposite ends to move PIG in the other direction;

wherein a sweeping action of flow is provided.

30. A method of releasing fluid according to claim 25, using membrane manipulation by way of indirect activation of a separate hinged or compliant fluid deflecting surface in the conduit, activated by urging a leading edge into the conduit fluid flow, to thereby redirect fluid flow to be incident with a protruding surface of or attached to a membrane to thereby act to separate the membrane from the conduit wall and uncover openings, where activation is induced by:
  a. field force (magnetically or electrostatically) by PIG in fluid delivery conduit; and
  b. field force (magnetically or electrostatically) by PIG in separate control tube, which is:
    i. internal to main fluid delivery conduit; and
    ii. external to main fluid delivery conduit; and
  c. physical force generated by a shaping device distorting the control tube in direct or indirect communication with hinged fluid deflecting surfaces.

* * * * *